US008151924B2

(12) United States Patent
Radtke

(10) Patent No.: US 8,151,924 B2
(45) Date of Patent: *Apr. 10, 2012

(54) SELF-PROPELLED WHEEL FOR BICYCLES AND SIMILAR VEHICLES

(76) Inventor: Jeffrey L. Radtke, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/925,996

(22) Filed: Nov. 4, 2010

(65) Prior Publication Data

US 2011/0048830 A1 Mar. 3, 2011

Related U.S. Application Data

(63) Continuation of application No. 10/993,961, filed on Nov. 12, 2003, now Pat. No. 7,828,101, which is a continuation-in-part of application No. PCT/US03/35807, filed on Nov. 12, 2003.

(60) Provisional application No. 60/452,775, filed on Mar. 8, 2003, provisional application No. 60/430,554, filed on Dec. 3, 2002, provisional application No. 60/603,629, filed on Aug. 20, 2004, provisional application No. 60/583,461, filed on Jun. 28, 2004, provisional application No. 60/571,291, filed on May 15, 2004, provisional application No. 60/563,735, filed on Apr. 20, 2004, provisional application No. 60/554,936, filed on Mar. 20, 2004, provisional application No. 60/541,456, filed on Feb. 3, 2004, provisional application No. 60/525,951, filed on Nov. 28, 2003.

(51) Int. Cl.
*B62M 7/12* (2006.01)

(52) U.S. Cl. .......................................... 180/205; 180/220

(58) Field of Classification Search .......... 180/205–207, 180/219, 220, 221, 222, 223, 65.51
See application file for complete search history.

(56) References Cited

U.S. PATENT DOCUMENTS

| | | | | | |
|---|---|---|---|---|---|
| 1,179,138 | A | * | 4/1916 | Pascal | 180/223 |
| 1,217,602 | A | * | 2/1917 | Jern | 180/223 |
| 3,340,947 | A | * | 9/1967 | Hollinshead et al. | 180/223 |
| 3,891,044 | A | * | 6/1975 | Tiede | 180/222 |
| 3,912,039 | A | * | 10/1975 | Ordemann | 180/220 |
| 4,028,915 | A | * | 6/1977 | Stahl | 70/233 |
| 4,045,096 | A | * | 8/1977 | Lidov | 305/7 |
| 4,906,053 | A | * | 3/1990 | Kawai | 301/110.5 |
| 5,199,520 | A | * | 4/1993 | Chen | 180/65.51 |
| 5,272,938 | A | * | 12/1993 | Hsu et al. | 74/594.1 |
| 5,341,892 | A | * | 8/1994 | Hirose et al. | 180/220 |
| 5,366,037 | A | * | 11/1994 | Richey | 180/65.51 |

(Continued)

FOREIGN PATENT DOCUMENTS

DE 4000960 * 7/1991

(Continued)

OTHER PUBLICATIONS

Beare et al., The Stinkwheel Saga, Episode 1, 2004, Stinkwheel Publishing, Abermule, Montgomeryshire, UK.

*Primary Examiner* — Anne Marie M Boehler

(57) ABSTRACT

A wheel with a self-contained drive mechanism is provided to propel (or assist in propulsion of) bicycles, tricycles, and similar vehicles. The wheel preferably takes the form of a detachable wheel which is readily received within the dropouts of a bicycle frame or fork to be attached therein by a standard quick-release mechanism. Thus, the wheel may be added to (or removed from) preexisting standard bicycles and the like.

7 Claims, 76 Drawing Sheets

U.S. PATENT DOCUMENTS

| | | | | |
|---|---|---|---|---|
| 5,474,150 A | * | 12/1995 | Mabuchi | 180/220 |
| 5,560,442 A | * | 10/1996 | Canderle | 180/65.51 |
| 5,581,136 A | * | 12/1996 | Li | 310/67 R |
| 5,662,187 A | * | 9/1997 | McGovern | 180/205 |
| 5,755,304 A | * | 5/1998 | Trigg et al. | 180/65.51 |
| 5,763,980 A | * | 6/1998 | Li | 310/323.03 |
| 5,842,535 A | * | 12/1998 | Dennis | 180/205 |
| 5,855,249 A | * | 1/1999 | Nishimura | 180/214 |
| 5,865,267 A | * | 2/1999 | Mayer et al. | 180/205 |
| 6,024,186 A | * | 2/2000 | Suga | 180/291 |
| 6,062,329 A | * | 5/2000 | Chai | 180/205 |
| 6,093,985 A | * | 7/2000 | Chen | 310/67 A |
| 6,100,615 A | * | 8/2000 | Birkestrand | 310/75 C |
| 6,102,148 A | * | 8/2000 | Chien | 180/220 |
| 6,290,014 B1 | * | 9/2001 | MacCready, Jr. | 180/205 |
| 6,321,863 B1 | * | 11/2001 | Vanjani | 180/65.51 |
| 6,347,682 B1 | * | 2/2002 | Buchner | 180/220 |
| 6,497,299 B1 | * | 12/2002 | Sinclair et al. | 180/205 |
| 7,721,835 B2 | * | 5/2010 | Radtke | 180/205 |
| 7,828,101 B2 | * | 11/2010 | Radtke et al. | 180/205 |
| 2002/0100628 A1 | * | 8/2002 | Jones | 180/220 |
| 2002/0147068 A1 | * | 10/2002 | Chikaraishi et al. | 476/21 |
| 2003/0213630 A1 | * | 11/2003 | Pyntikov et al. | 180/220 |
| 2005/0029033 A1 | * | 2/2005 | Rip et al. | 180/220 |
| 2005/0177285 A1 | * | 8/2005 | Honda | 701/22 |

FOREIGN PATENT DOCUMENTS

| | | | |
|---|---|---|---|
| DE | 29808758 | * | 10/1999 |
| EP | 01137154 | * | 9/2001 |
| PL | 9601936-0 | * | 9/1998 |
| WO | 9933696 | * | 7/1999 |
| WO | 0200490 | * | 1/2002 |
| WO | 03065963 | * | 8/2003 |
| WO | 03070554 | * | 8/2003 |
| WO | 03092142 | * | 11/2003 |
| WO | 03097437 | * | 11/2003 |

* cited by examiner

SELF-PROPELLED WHEEL FOR BICYCLES AND SIMILAR VEHICLES

CROSS-REFERENCE TO RELATED APPLICATIONS

This application is a continuation of U.S. patent application
Ser. No. 10/993,961, filed Nov. 12, 2003,
to issue as
U.S. Pat. No. 7,828,101 on Nov. 9, 2010,
which itself is a continuation-in-part of the following International (PCT) application:
PCT/US03/35807 filed Nov. 12, 2003
which itself claims the benefit of priority of the following U.S. Provisional Patent Applications:
60/452,775 filed Mar. 8, 2003; and
60/430,554 filed Dec. 3, 2002.
This application additionally claims the benefit of priority under 35 USC §119(e) of the following U.S. Provisional Patent Applications:
60/603,629 filed Aug. 20, 2004;
60/583,461 filed Jun. 28, 2004;
60/571,291 filed May 15, 2004;
60/563,735 filed Apr. 20, 2004;
60/554,936 filed Mar. 20, 2004;
60/541,456 filed Feb. 3, 2004; and
60/525,951 filed Nov. 28, 2003.
The entireties of all of the foregoing applications are incorporated by reference herein.

FIELD OF THE INVENTION

This document concerns an invention relating generally to devices for assisting in the propulsion of human-powered vehicles (such as bicycles), and more specifically to motor-driven wheels for bicycles.

BACKGROUND OF THE INVENTION

Bicycles, tricycles, and similar human-powered vehicles have in the past been provided with propulsion assistors which help the vehicle's operator propel the vehicle with less effort on the operator's part. Examples of such propulsion assistors are found in U.S. Pat. No. 5,755,304 to Trigg; U.S. Pat. No. 5,855,249 to Nishimura; U.S. Pat. No. 6,347,682 to Buchner; U.S. Pat. No. 6,290,014 to MacCready, Jr.; U.S. Pat. No. 6,024,186 to Suga; U.S. Pat. No. 5,865,267 to Mayer et al.; U.S. Pat. No. 5,842,535 to Dennis; U.S. Pat. No. 5,662,187 to McGovern; U.S. Pat. No. 4,906,053 to Kawai; U.S. Pat. No. 4,028,915 to Stahl; U.S. Pat. No. 5,560,442 to Canderle; U.S. Pat. No. 5,341,892 to Hirose et al.; U.S. Pat. No. 5,474,150 to Mabuchi; U.S. Patent Appln. Publication 2002/0147068 to Chikaraishi; German Patent DE4000960 to Stoll; and Brazilian Patent PI 9601936-0 to Tanaka.

A common approach was to provide a roller which frictionally engaged to a vehicle wheel at the wheel's top, with the roller being driven by an electric or internal combustion engine to thereby drive the vehicle wheel. This approach has several disadvantages, e.g., it raises the center of gravity of the vehicle (which can hinder operation), and it is inefficient insofar as propulsion relies on continuously distorting the vehicle's tire.

Another approach has been to add an external cart behind or adjacent the vehicle, with the cart including a motor and serving as the propulsion assistor. This approach also carries disadvantages, e.g., it changes the handling characteristics and effective size of the vehicle.

A more recent approach has been to provide a motor in place of the hub assembly of one of the vehicle wheels. Batteries and controls for this motor are attached to the vehicle's frame. This approach is disadvantageous in that installation and removal of the propulsion assistor is time-consuming: the vehicle is not readily convertible between a solely human-powered vehicle and a propulsion-assisted vehicle. In some cases, it has been proposed to place the battery for the motor in the rotating portion of the wheel. Given the substantial mass of the battery, this increases the rotational inertia of the wheel, degrading vehicle handling and performance.

BRIEF DESCRIPTION OF THE DRAWINGS

A first exemplary version of the invention is illustrated in FIGS. 1-10, wherein:
FIG. 10 is an electronic block diagram of control circuitry for the wheel of FIG. 1.
A second exemplary version of the invention is illustrated in FIGS. 11-23, wherein:
FIG. 23 is a cross-sectional view of the drive of FIG. 22.
A third exemplary version of the invention is illustrated in FIGS. 24-27, wherein.

Figure 28:
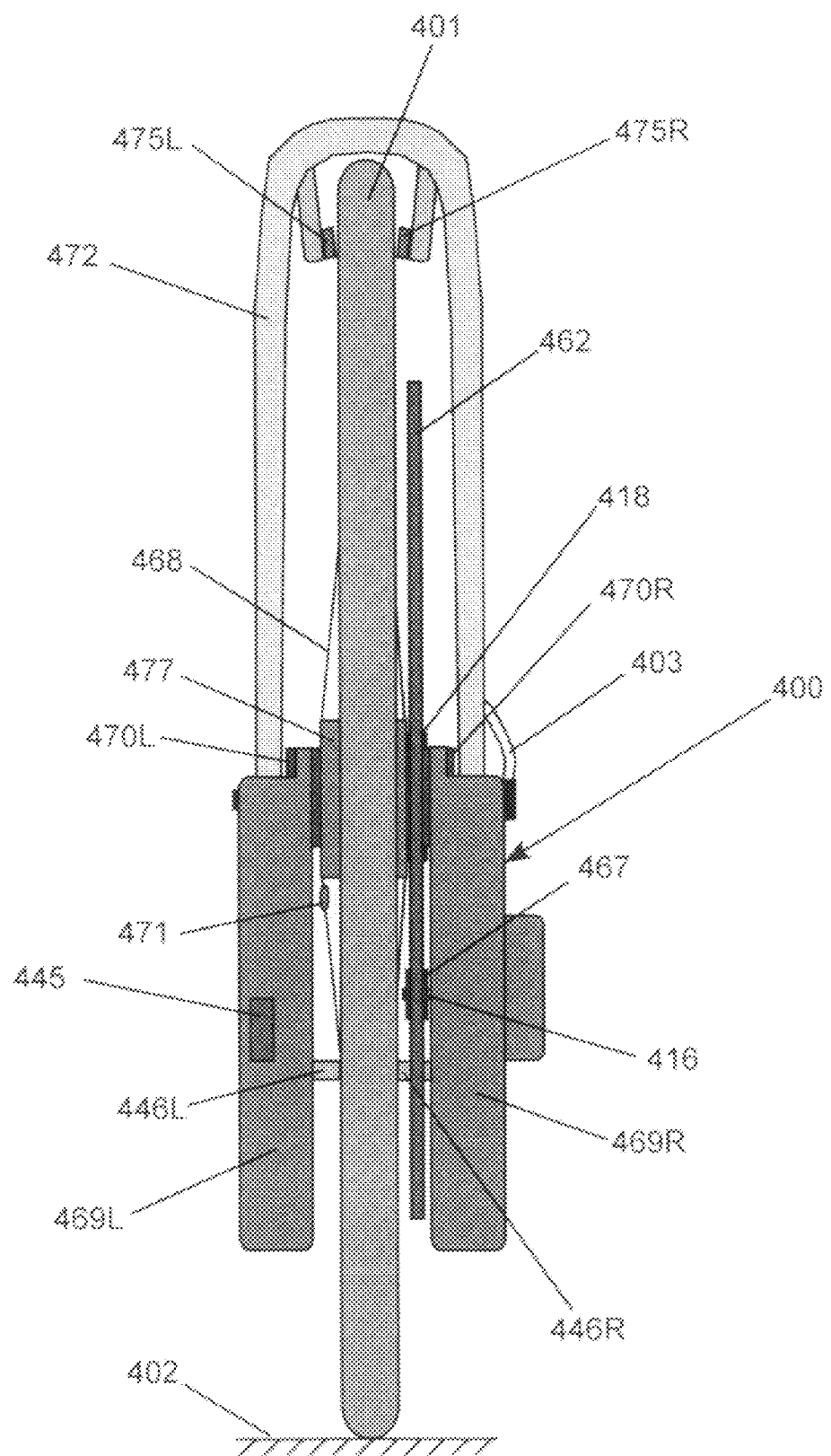
Figure 29:
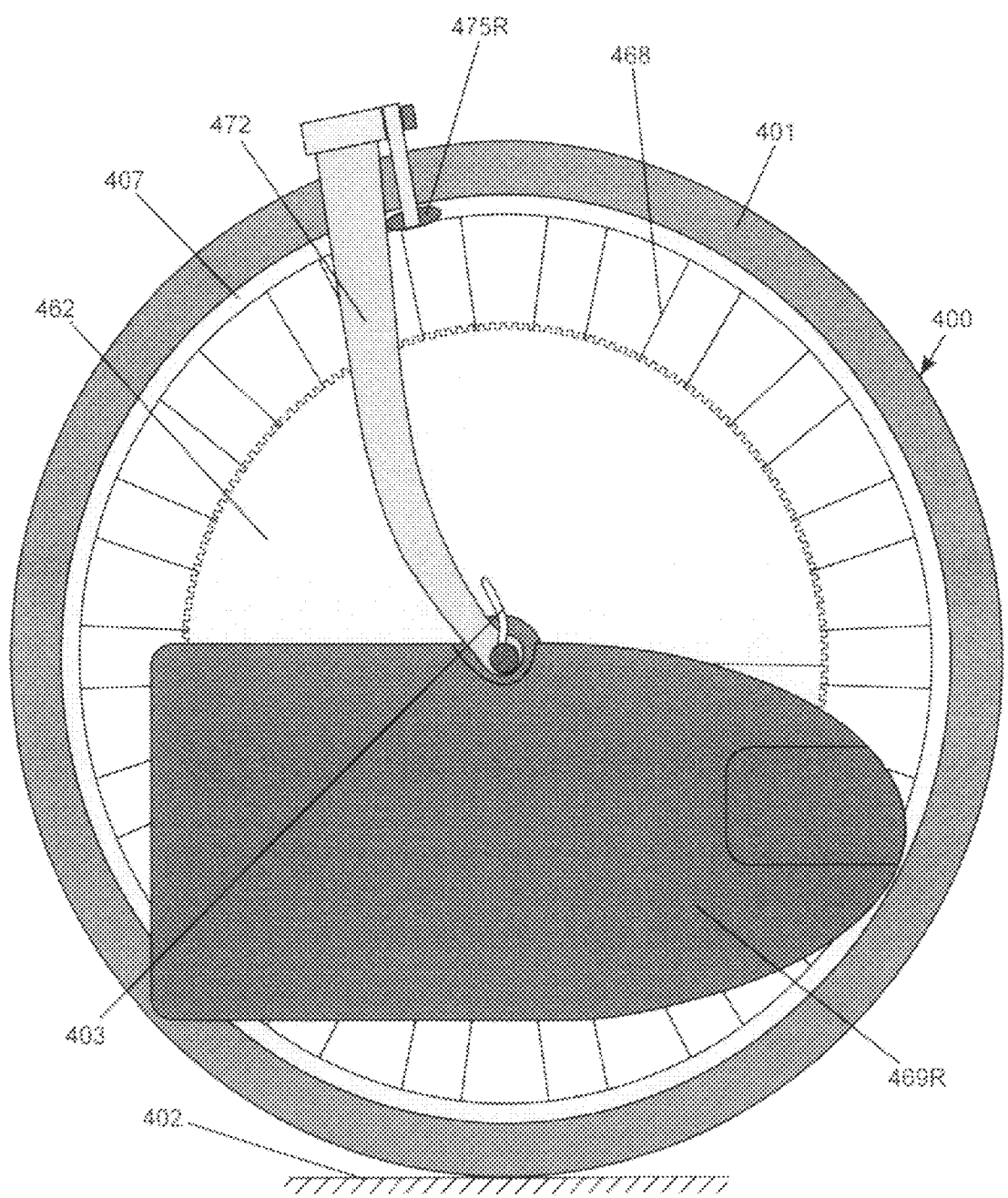
Figure 30:
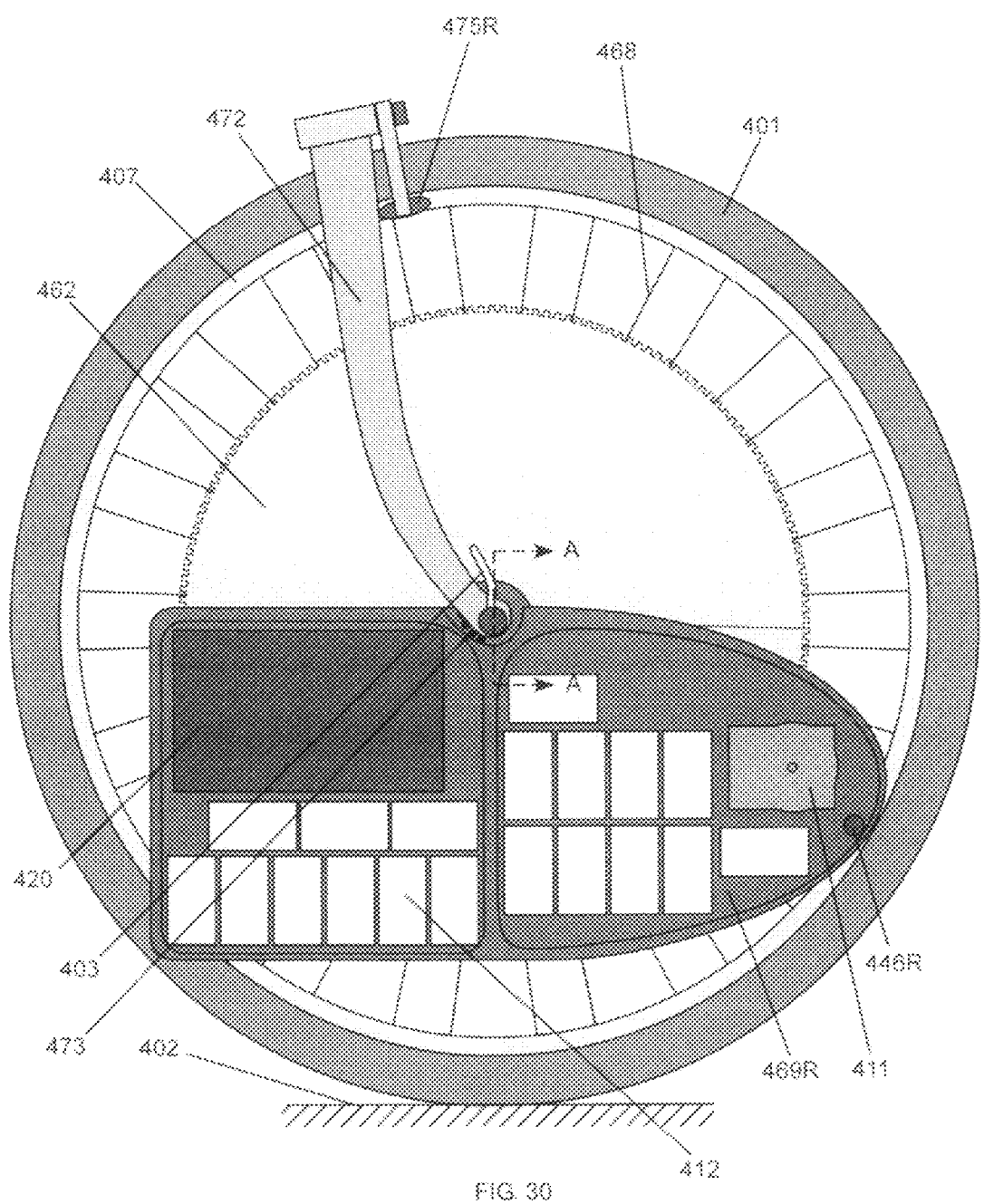
Figure 31:
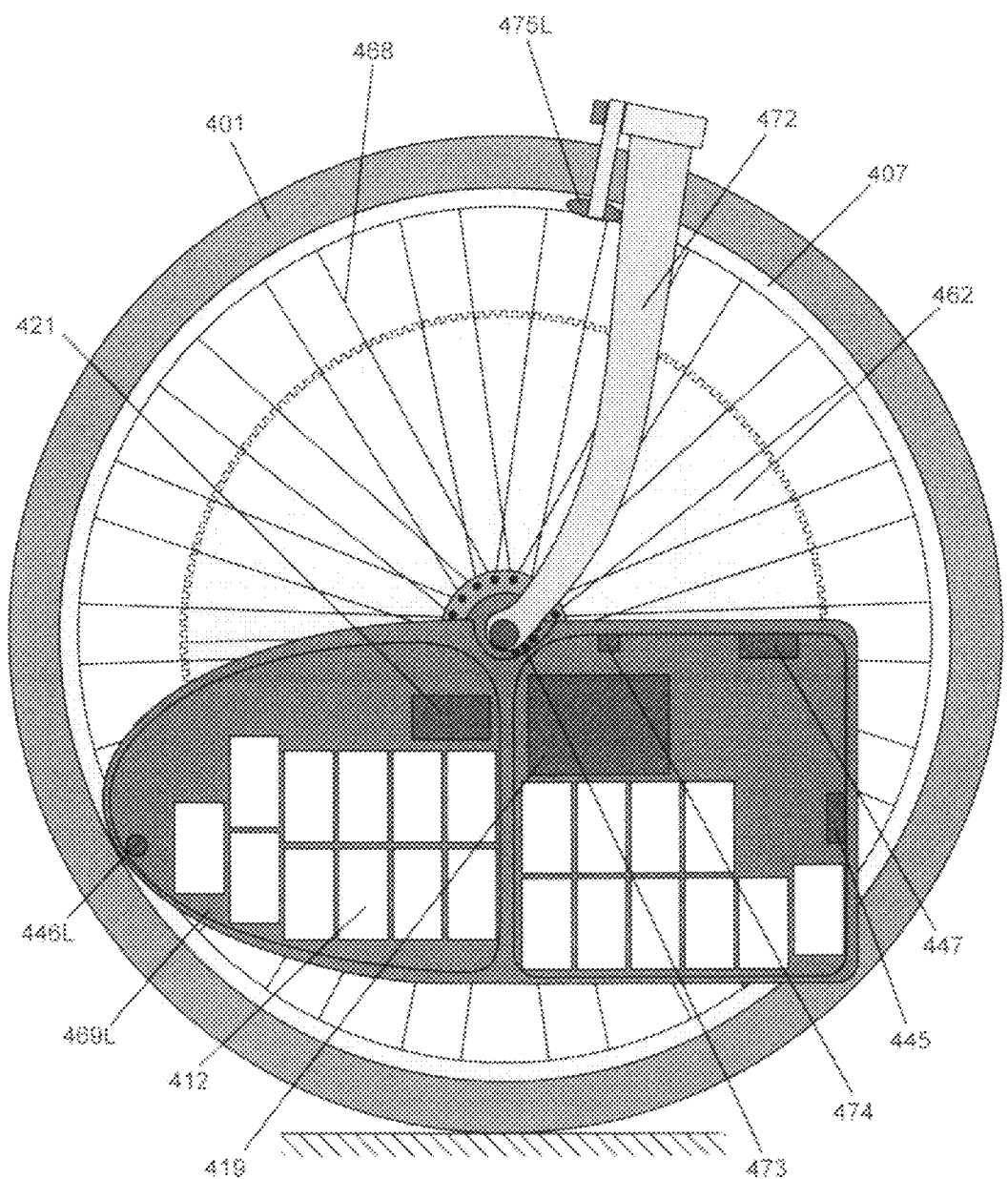
Figure 32:
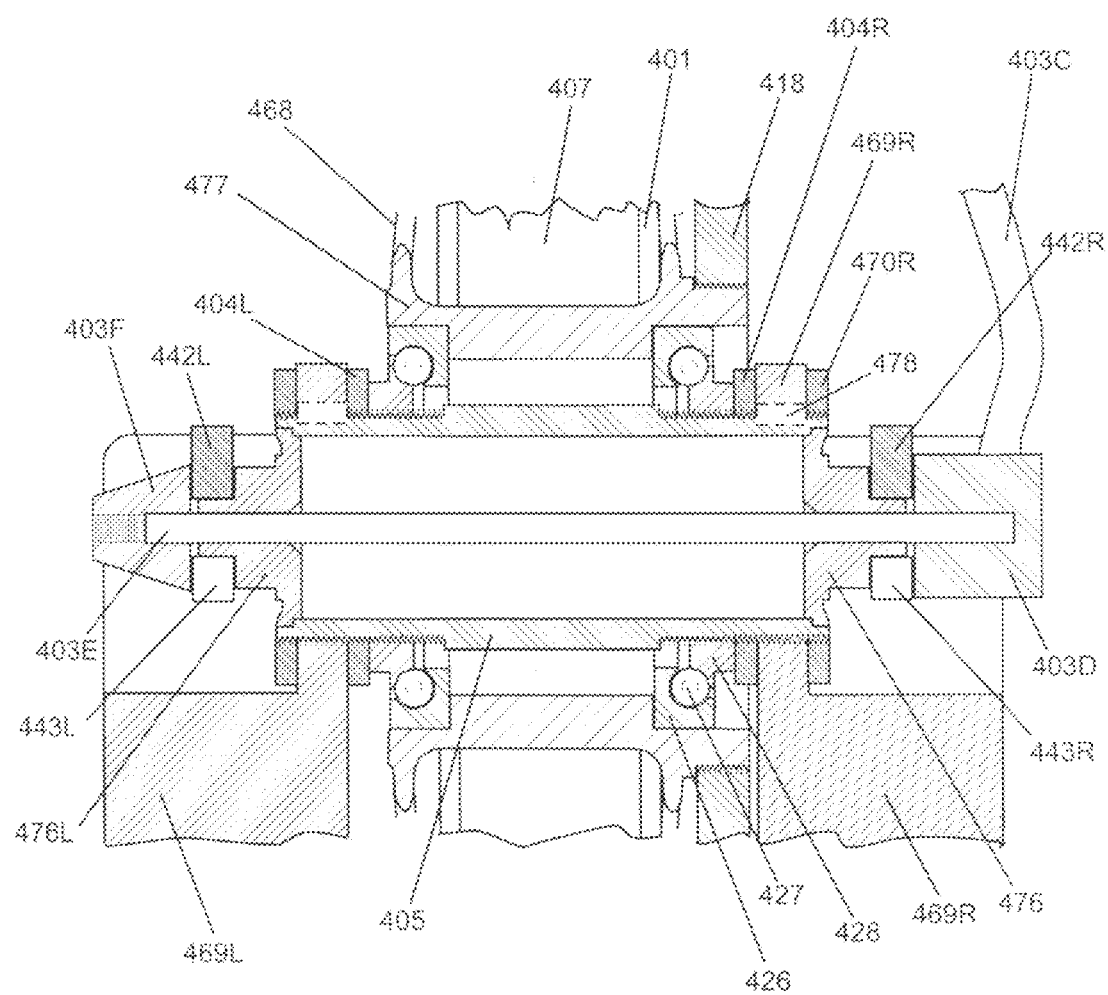

A fourth exemplary version of the invention is illustrated in FIGS. 28-32, wherein:

FIG. 28 is an external view of the rear of the drive attachment for the front of a standard bicycle;

FIG. 29 is an external view of the right side of a drive attachment of FIG. 28;

FIG. 30 is an external view of the right side of the drive attachment of FIG. 29, with the electronics enclosure cover removed;

FIG. 31 is an external view of the left side of the drive attachment of FIG. 29, with the electronics enclosure cover removed; and FIG. 32 is a removed cross-section A-A of FIG. 30.

Figure 33:
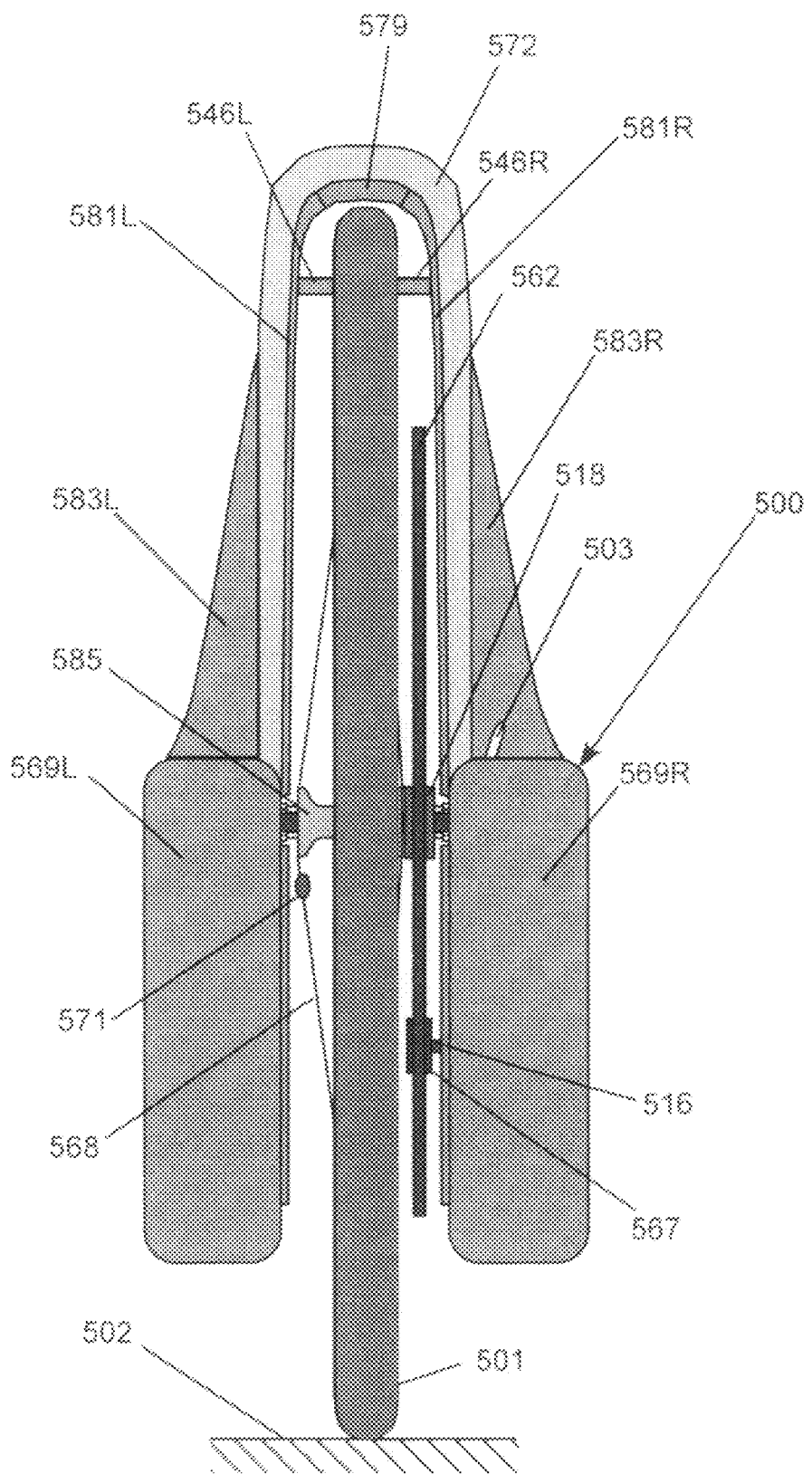
Figure 34:
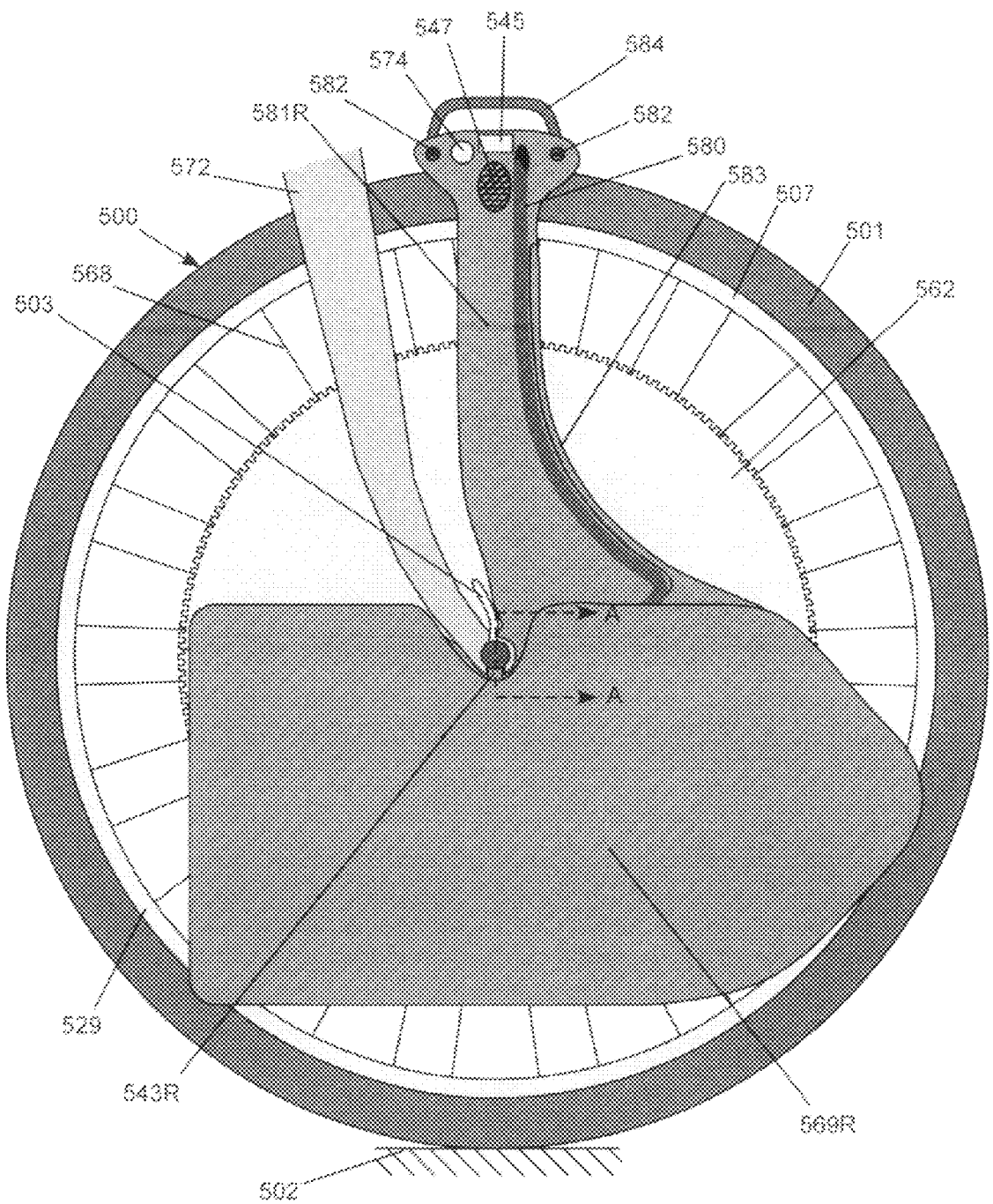
Figure 35:
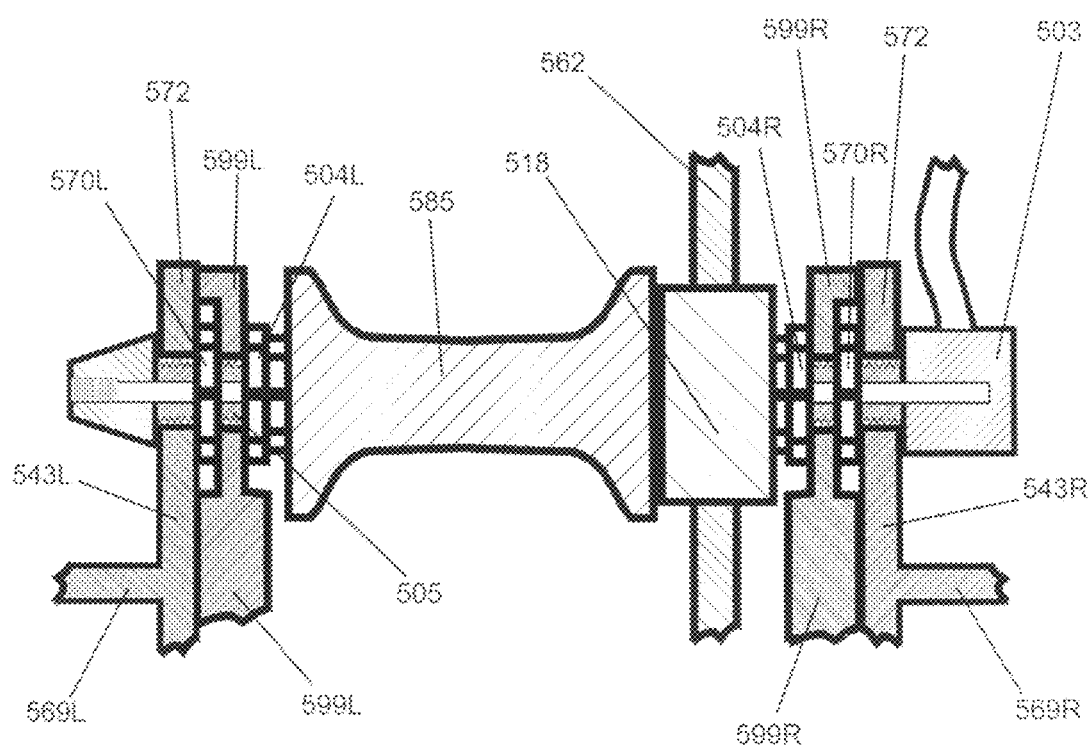

A fifth exemplary version of the invention is illustrated in FIGS. 33-35, wherein:

FIG. 33 is an external view of the rear of the drive attachment for the front of a standard bicycle;

FIG. 34 is an external view of the right side of a drive attachment of FIG. 33; and FIG. 35 is a cross-sectional rear view of the hub assembly and fastening points of the drive attachment of FIG. 34, section A-A.

Figure 36:
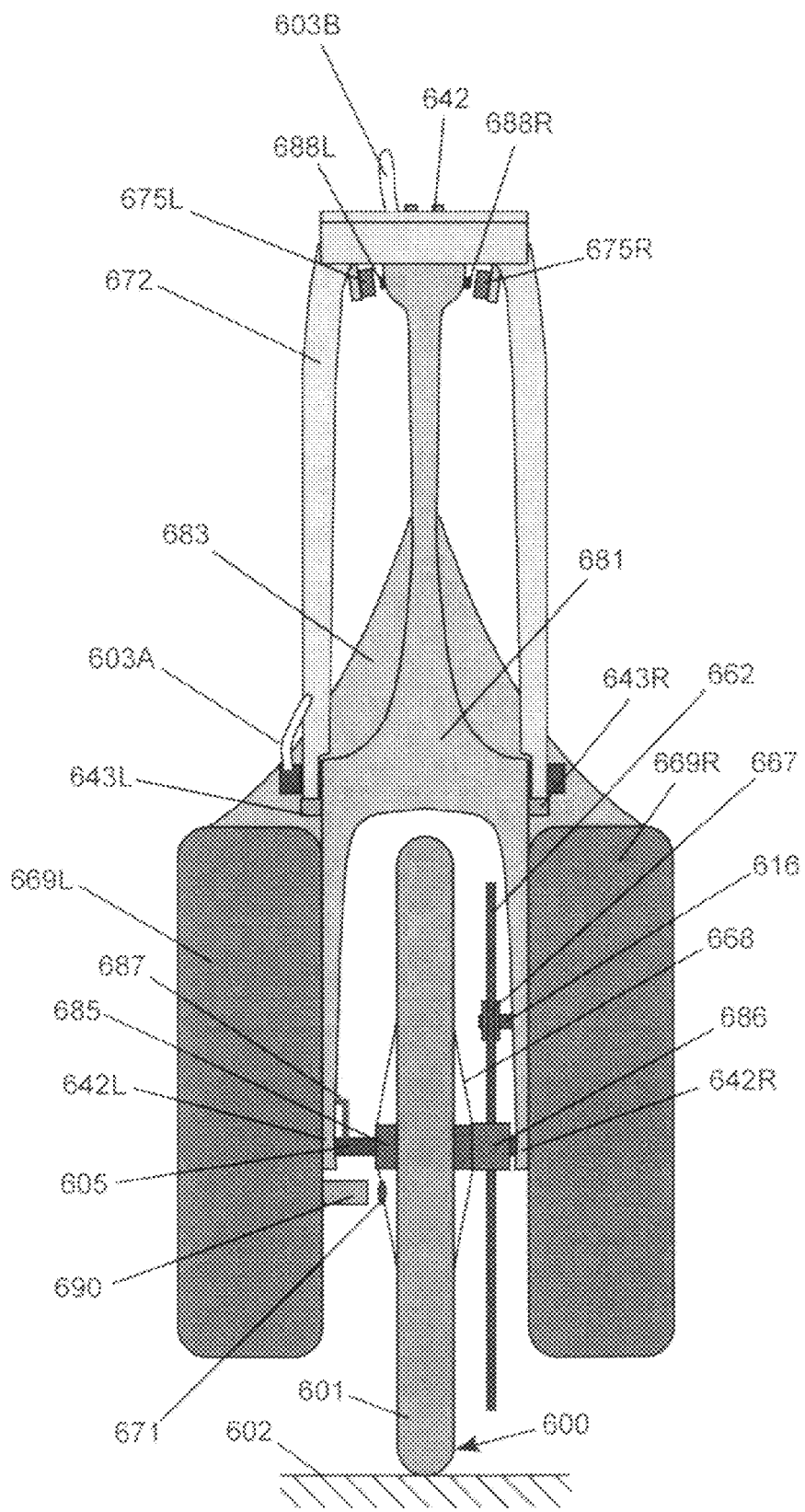
Figure 37:
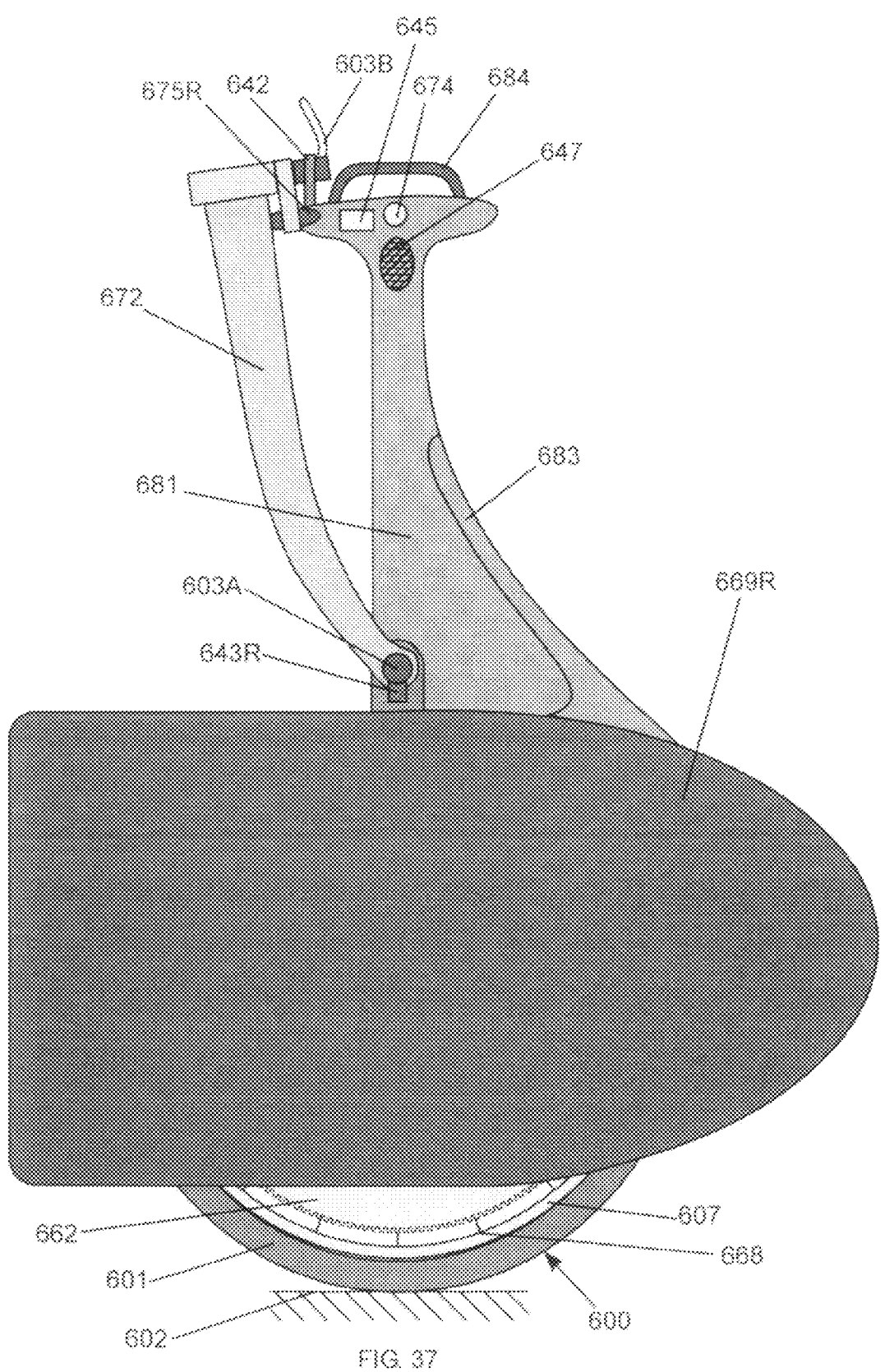

A sixth exemplary version of the invention is illustrated in FIGS. 36-37, wherein:

FIG. 36 is an external rear view of the drive attachment for the front of a standard bicycle; and FIG. 37 is an external view of the right side of a drive attachment of FIG. 36.

Figure 38:
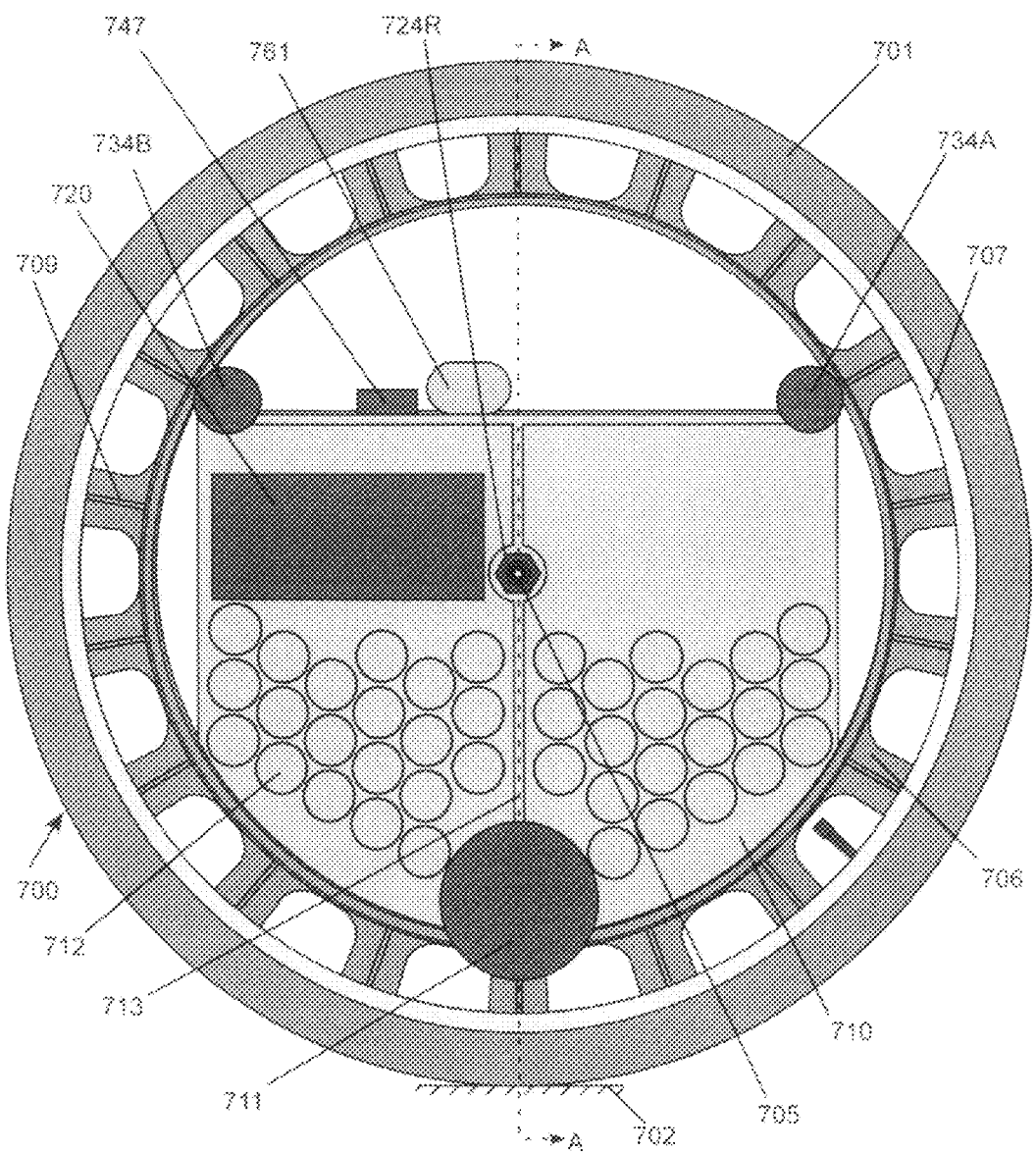
Figure 39:
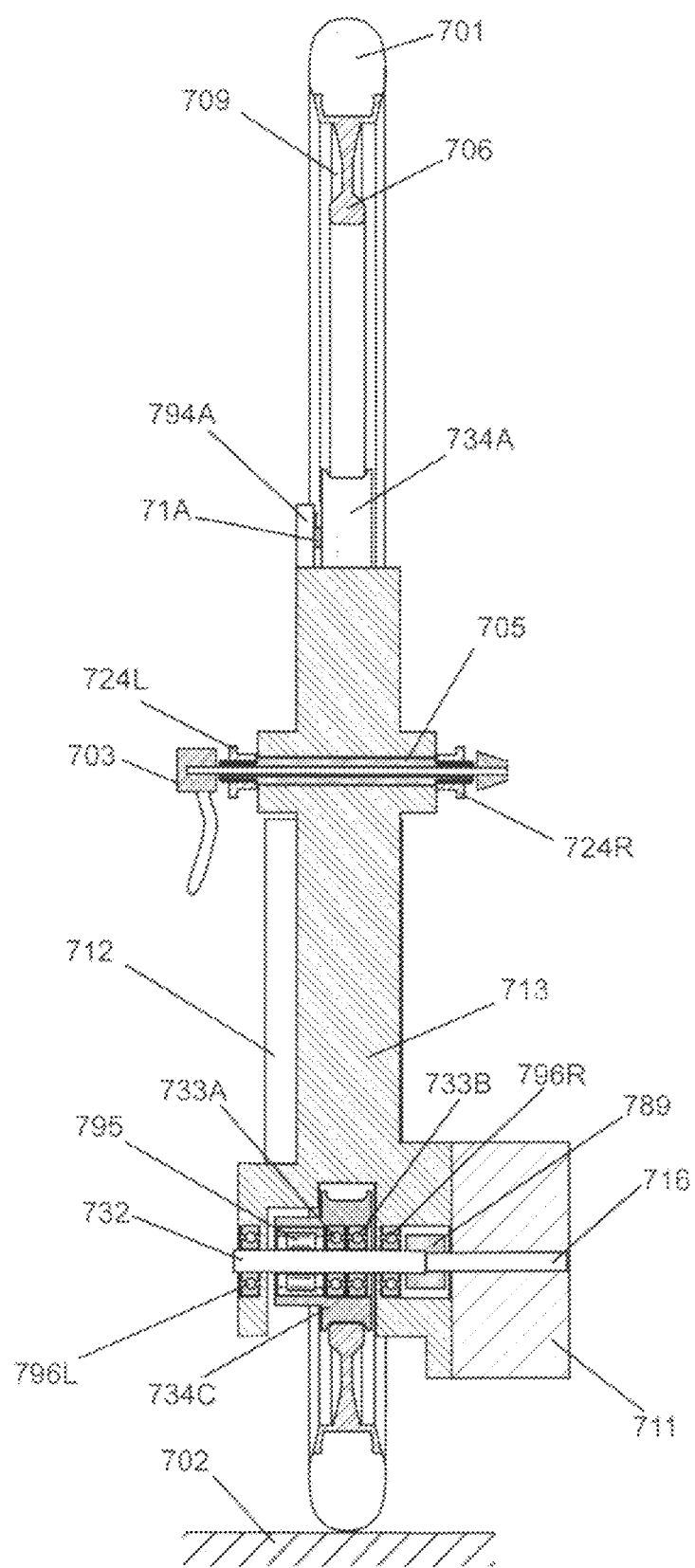
Figure 40:
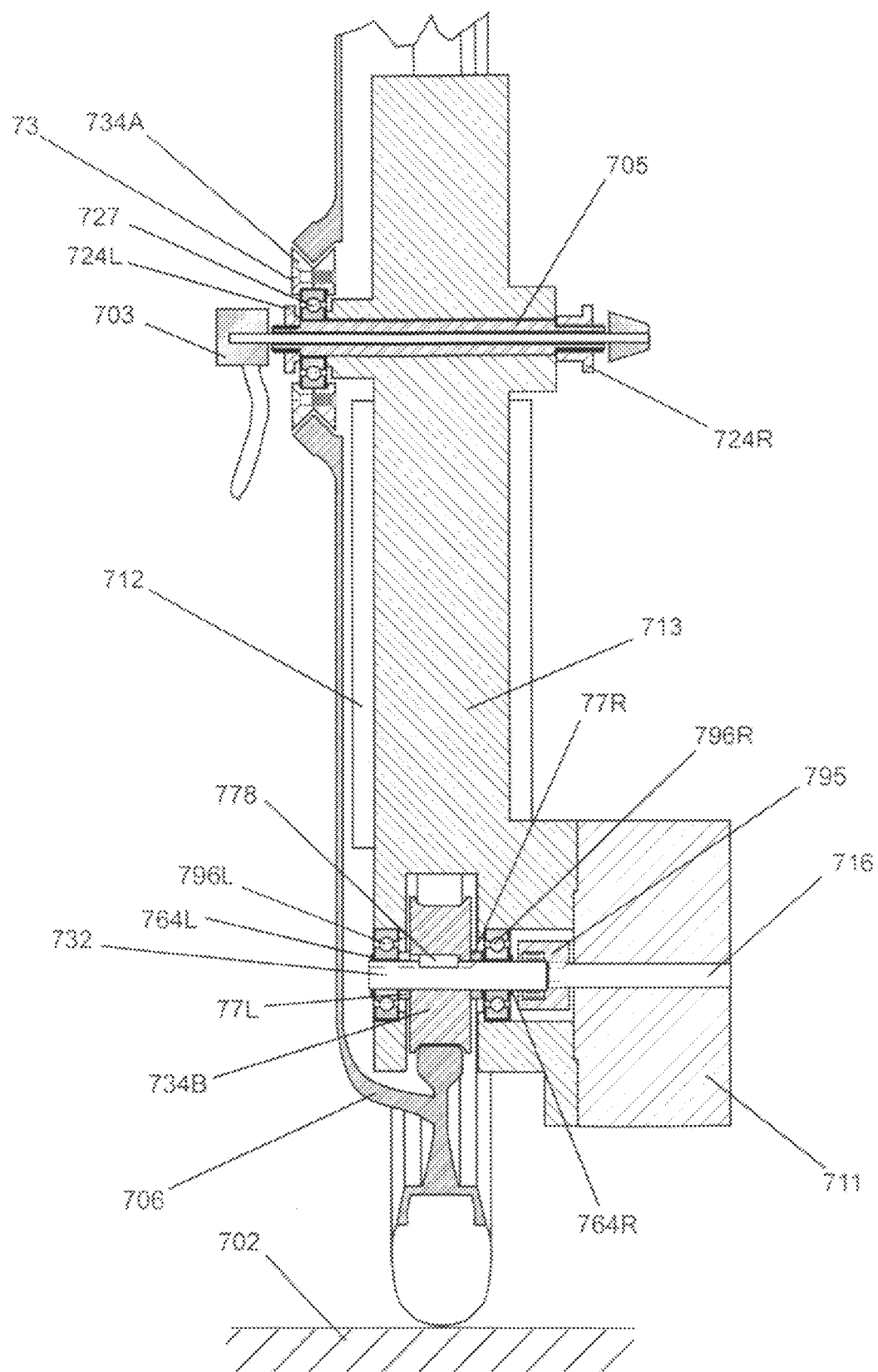

A seventh exemplary version of the invention is illustrated in FIGS. 38-40, wherein:

FIG. 38 is an external view of the right side of the drive attachment for the front of a standard bicycle;

FIG. 39 is a cross-sectional view AA of FIG. 38; and

FIG. 40 is an external view of the right side of an alternative drive attachment for the front of a standard bicycle.

Figure 41:
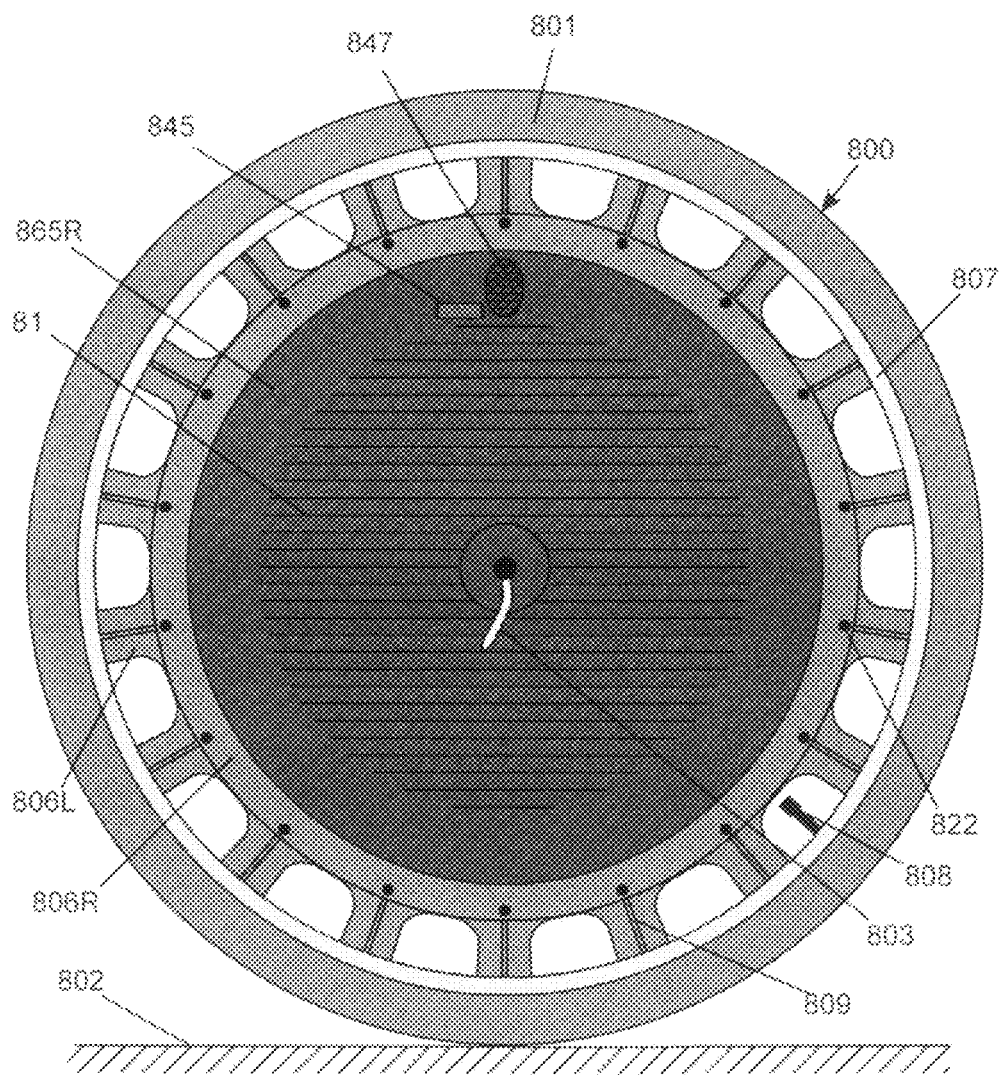
Figure 42:
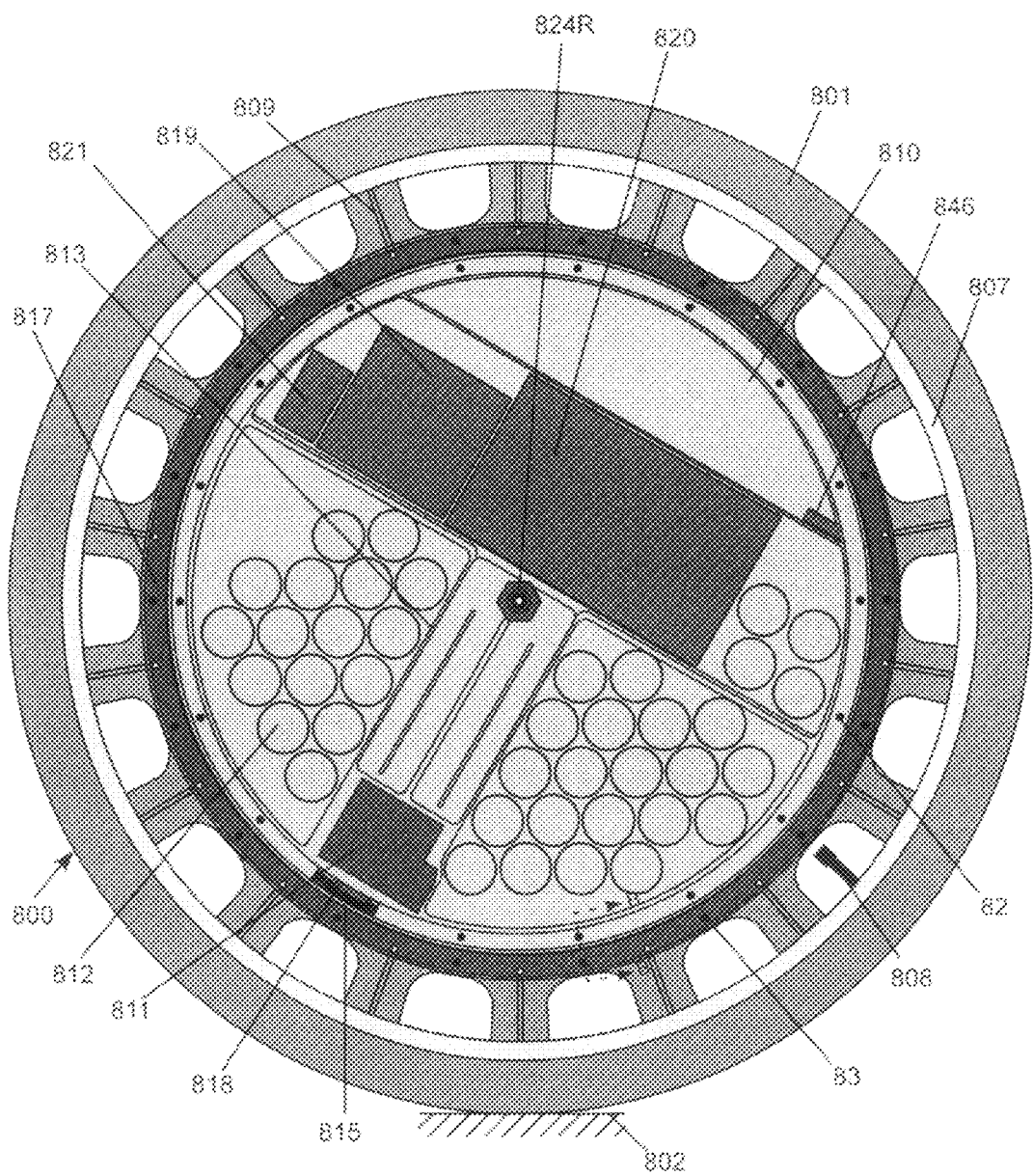
Figure 43:
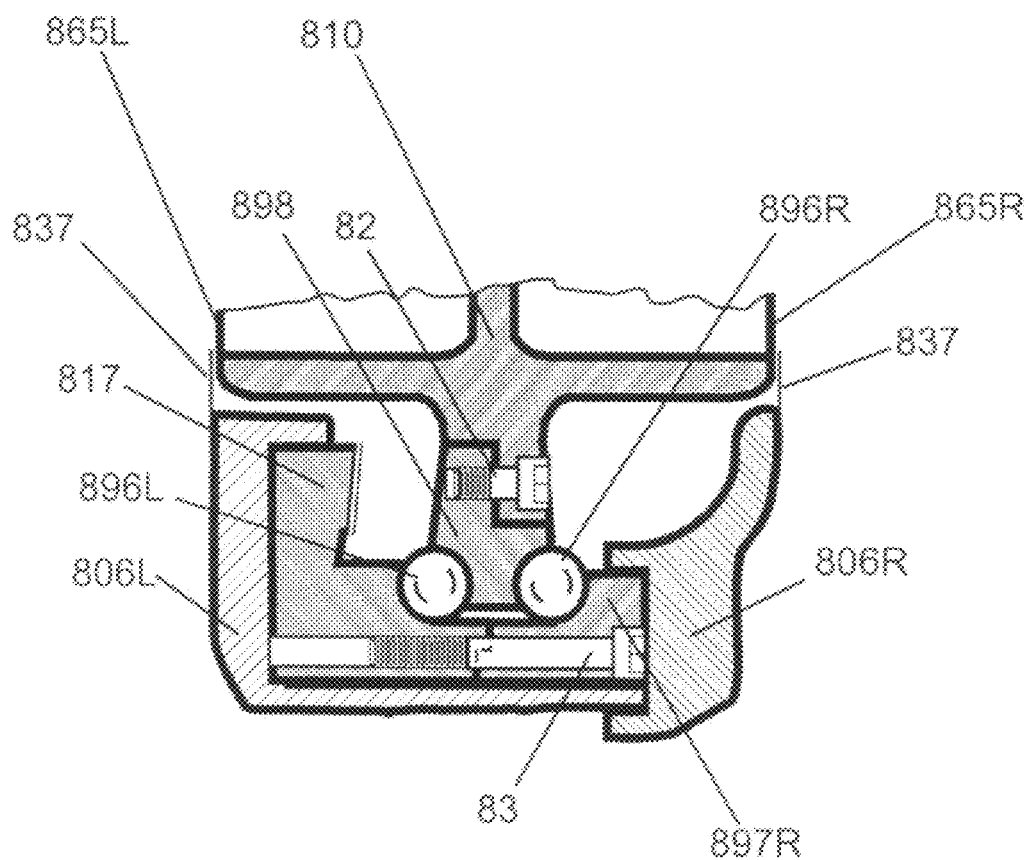

An eighth exemplary version of the invention is illustrated in FIGS. 41-43, wherein:

FIG. 41 is an external view of the right side of a wheel, with access panels attached;

FIG. 42 is an external view of the right side of the wheel of FIG. 41, with access panels removed;

FIG. 43 is a removed cross-sectional view B-B of the wheel of FIG. 42.

Figure 44:
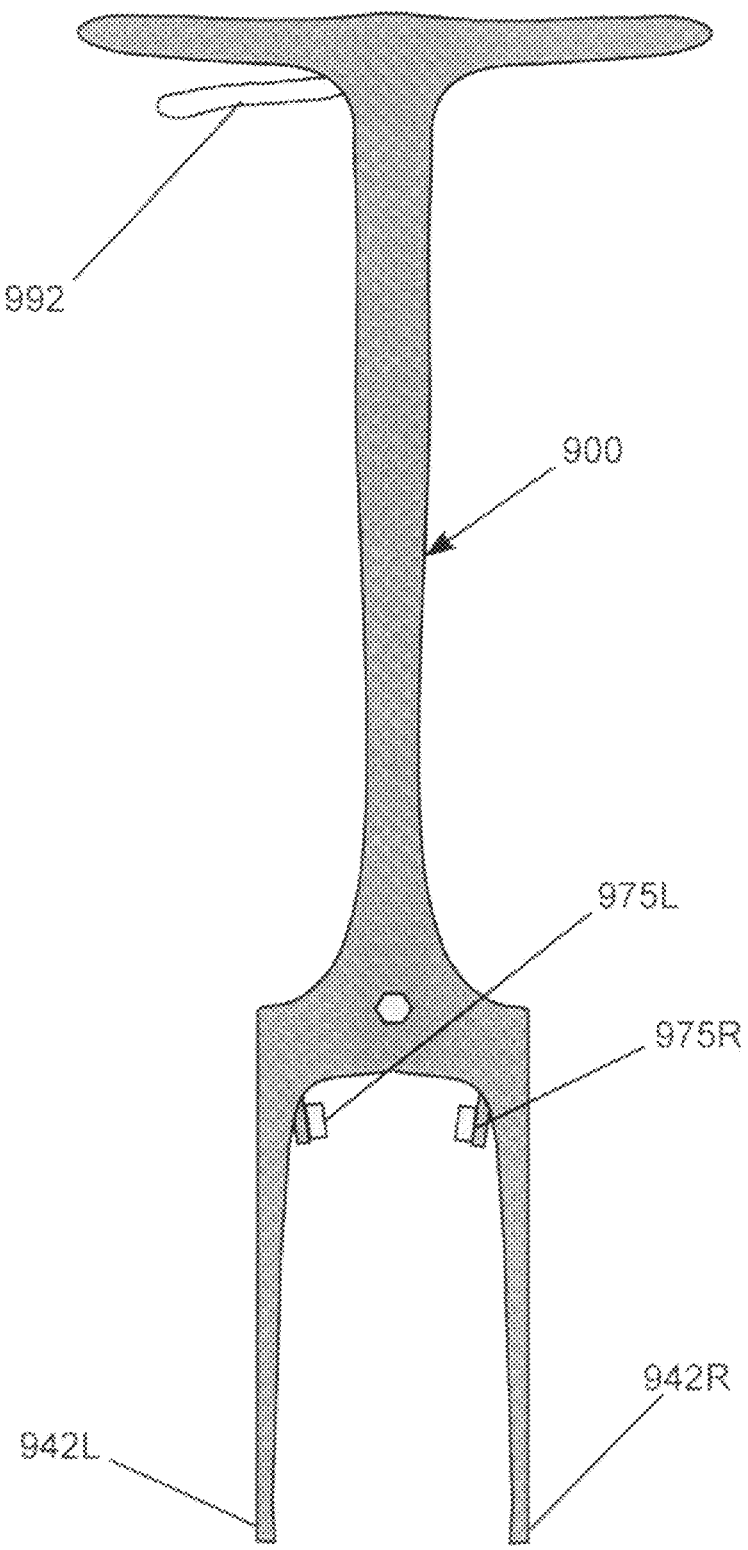

A ninth exemplary version of the invention is illustrated in FIG. 44, wherein:

FIG. 44 is a view of an exemplary handle wherein some of the foregoing and following wheels may be mounted to allow the wheel to propel in-line skaters, skateboarders, and the like.

Figure 45:
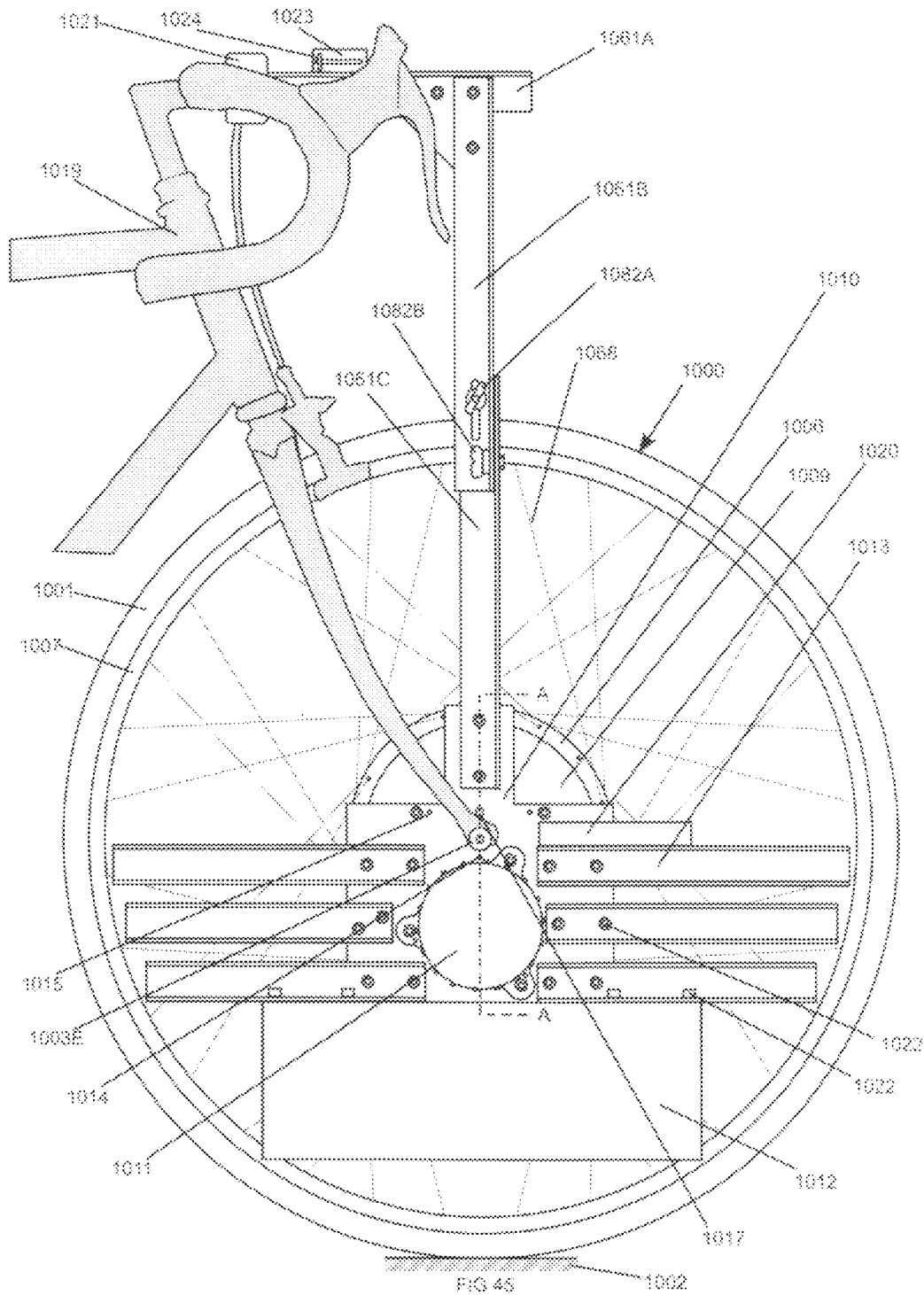
Figure 46:
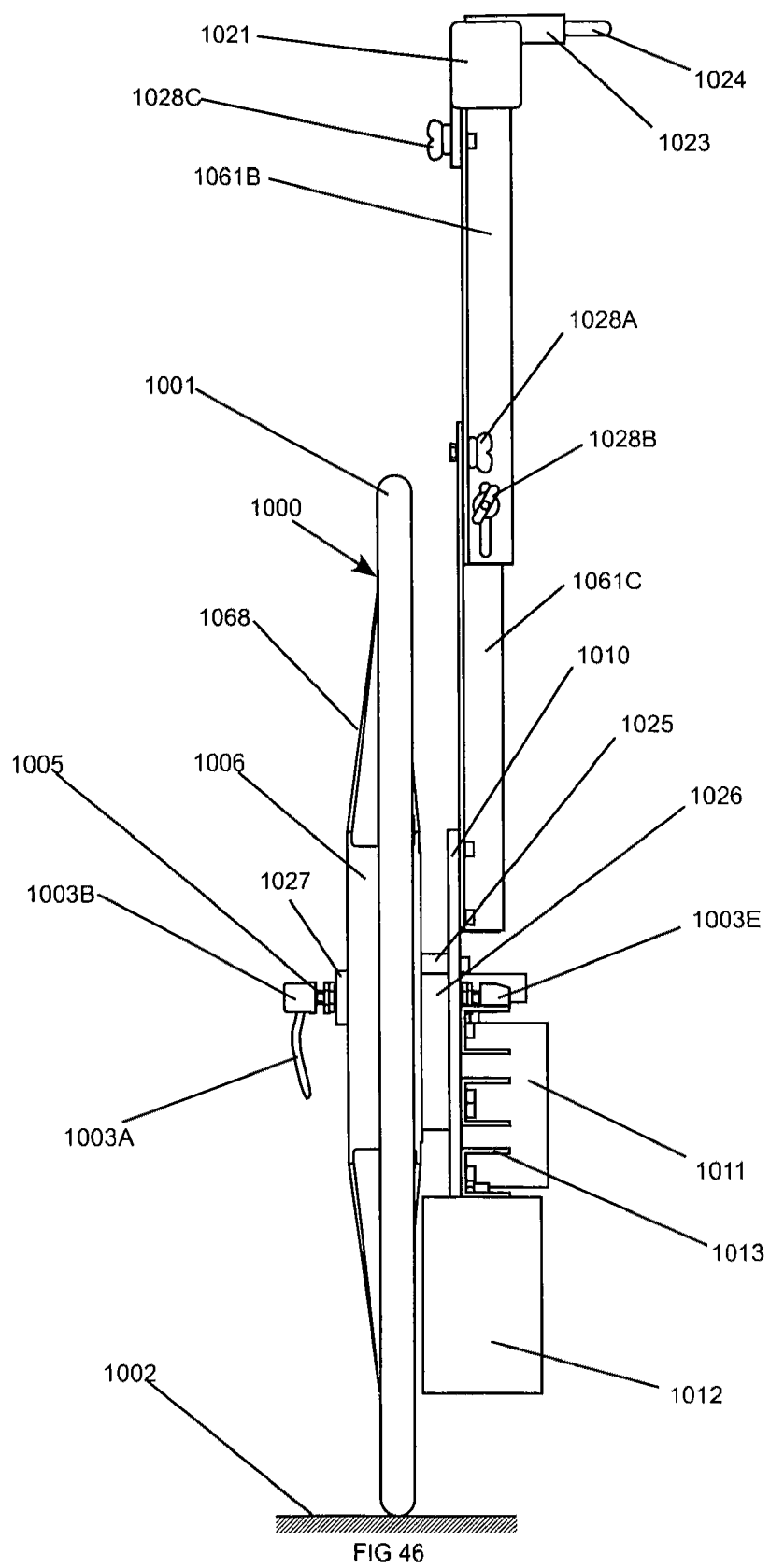
Figure 47:
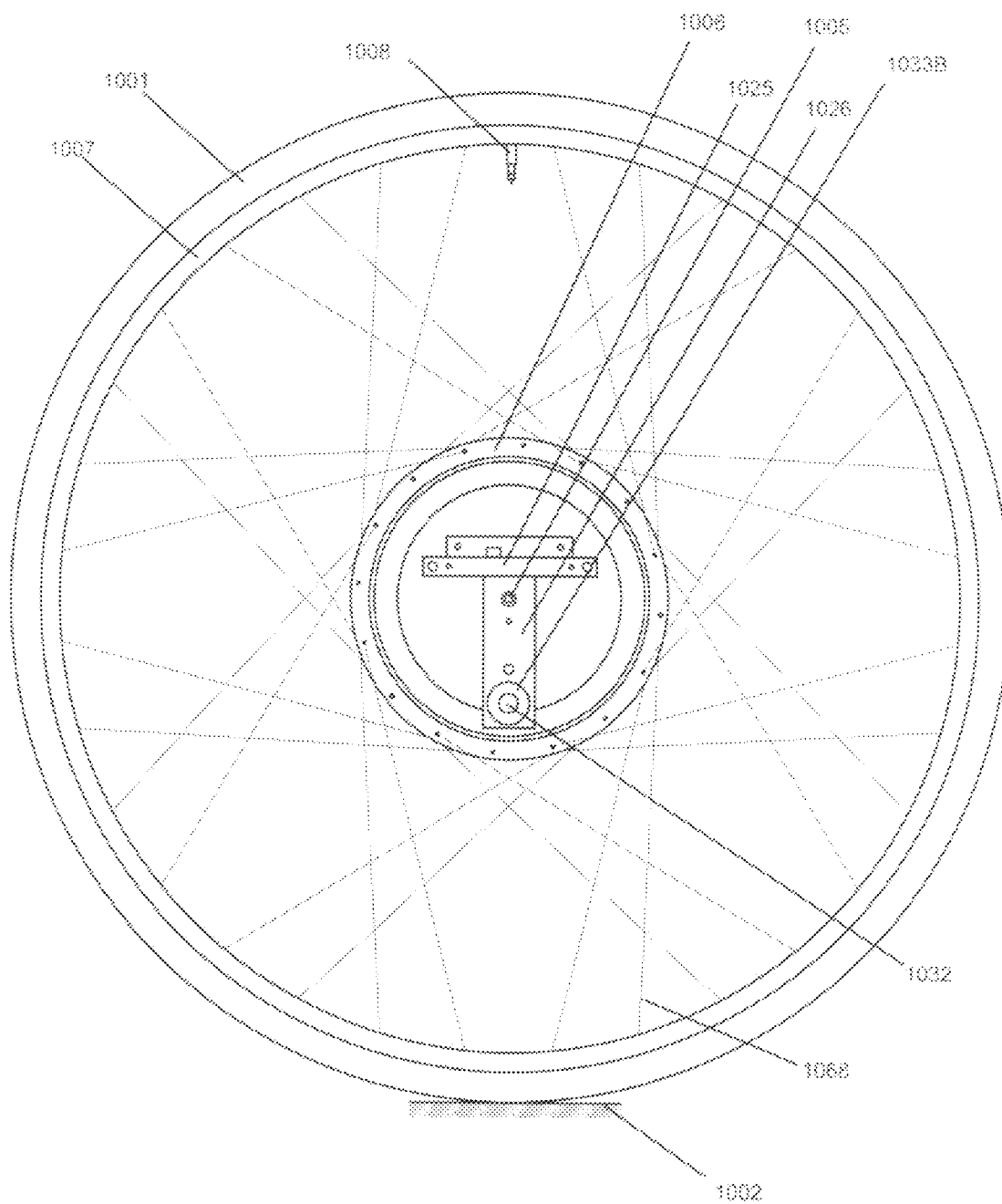
Figure 46:
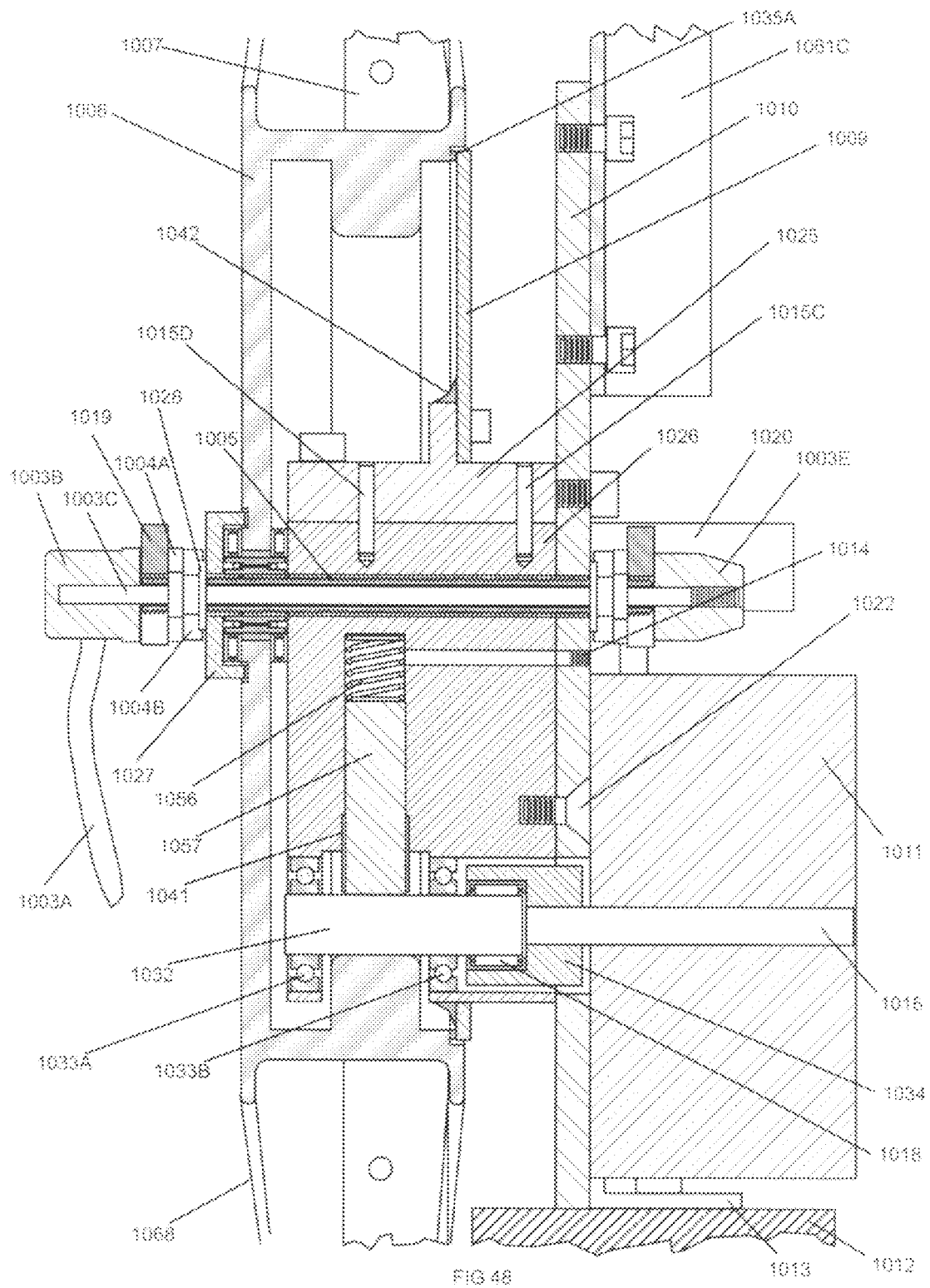
Figure 49:
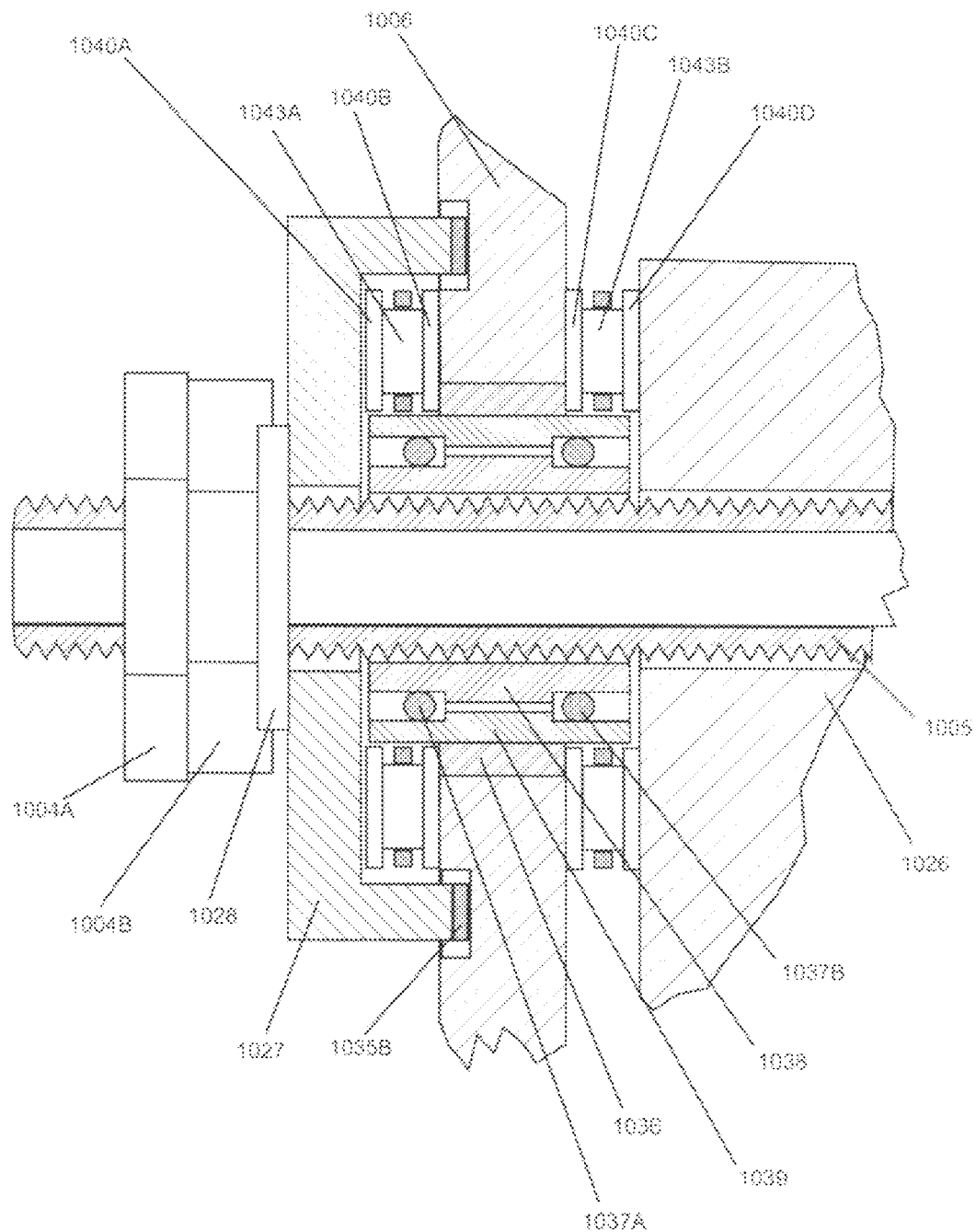

A tenth exemplary version is illustrated in FIGS. 45-52, wherein:

FIG. 45 is an external view of the right side of a front wheel for a standard bicycle;

FIG. 46 is an external view of the end of the wheel of FIG. 45;

FIG. 47 is a view of the right side of the wheel of FIG. 45, with the motor mount and hub cover removed;

FIG. 48 is a removed cross sectional view A-A of the wheel of FIG. 45;

FIG. 49 is an enlarged, removed cross sectional view of the central hub bearings, with section in the same plane as FIG. 48.

Figure 50:
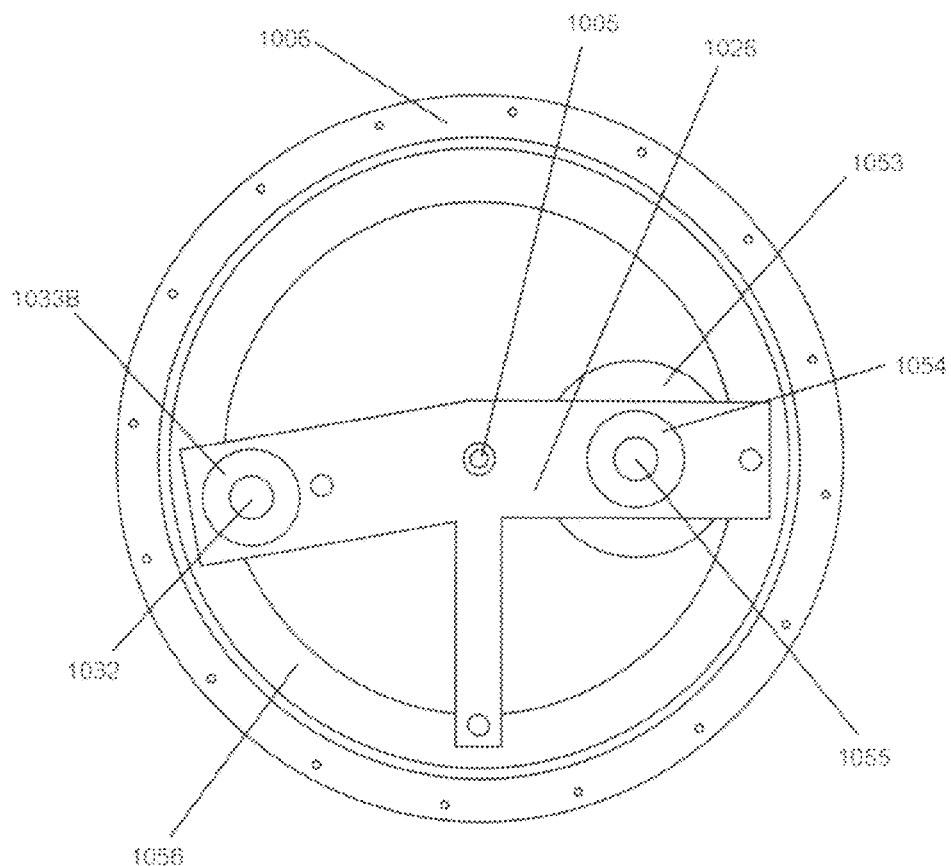
Figure 51:
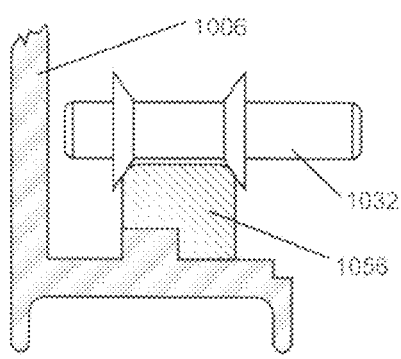
Figure 52:
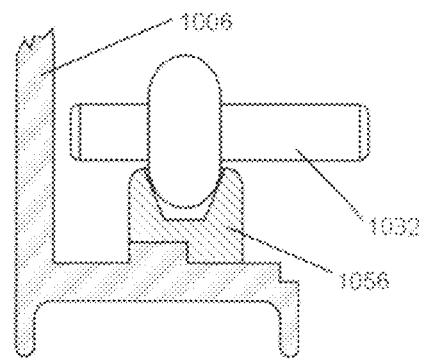

FIG. 50 is view of the right side of the wheel of FIG. 45, with the hub cover and motor mount removed, and showing a first alternative friction drive contact force multiplication method;

FIG. 51 is an enlarged, removed cross sectional view of the drive spindle contact area, with section in the same plane as FIG. 48, and showing a second alternative friction drive contact force multiplication method;

FIG. 52 is an enlarged, removed cross sectional view of the drive spindle contact area, with section in the same plane as FIG. 48, and showing a third alternative friction drive contact force multiplication method.

Figure 53:
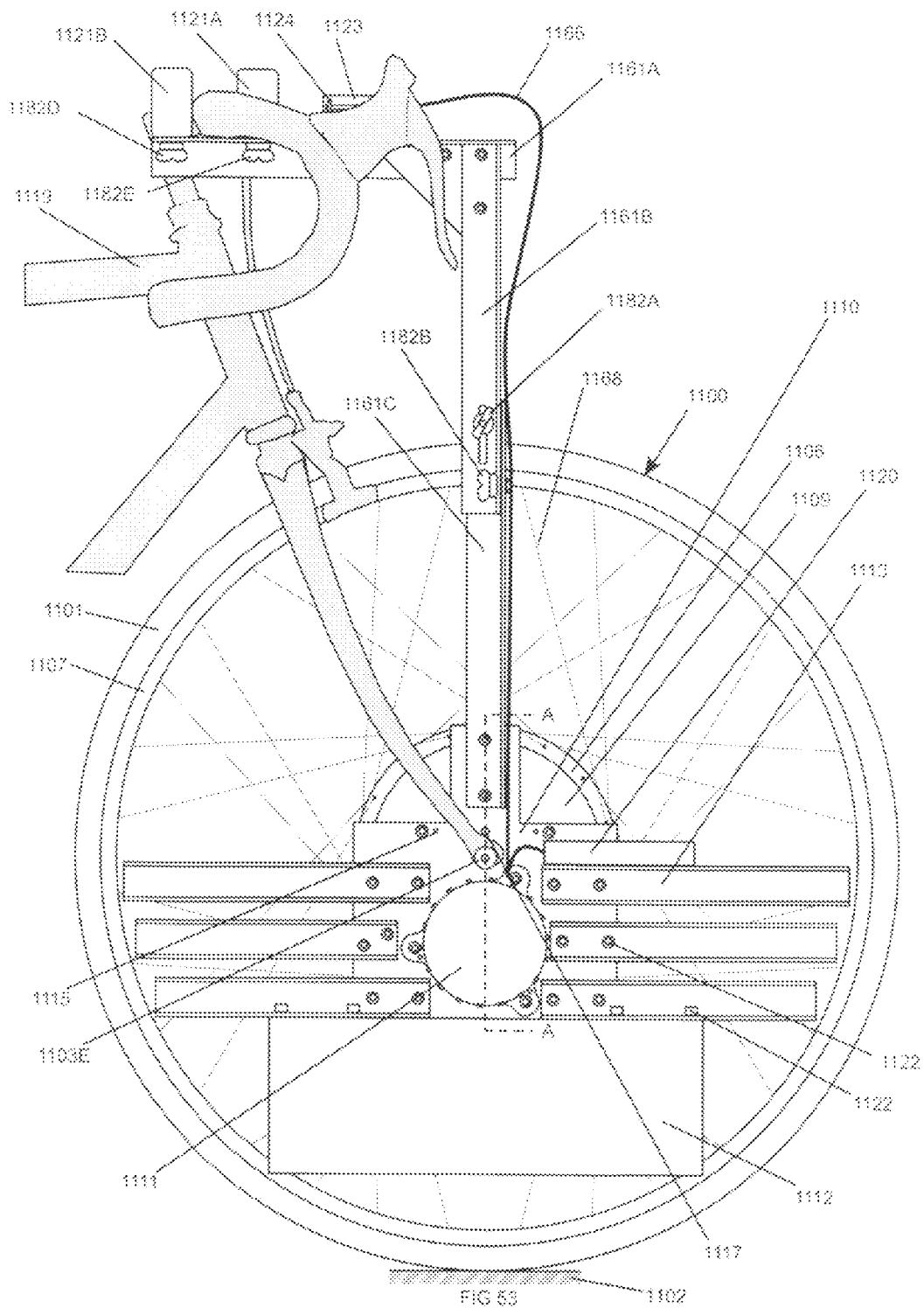
Figure 54:
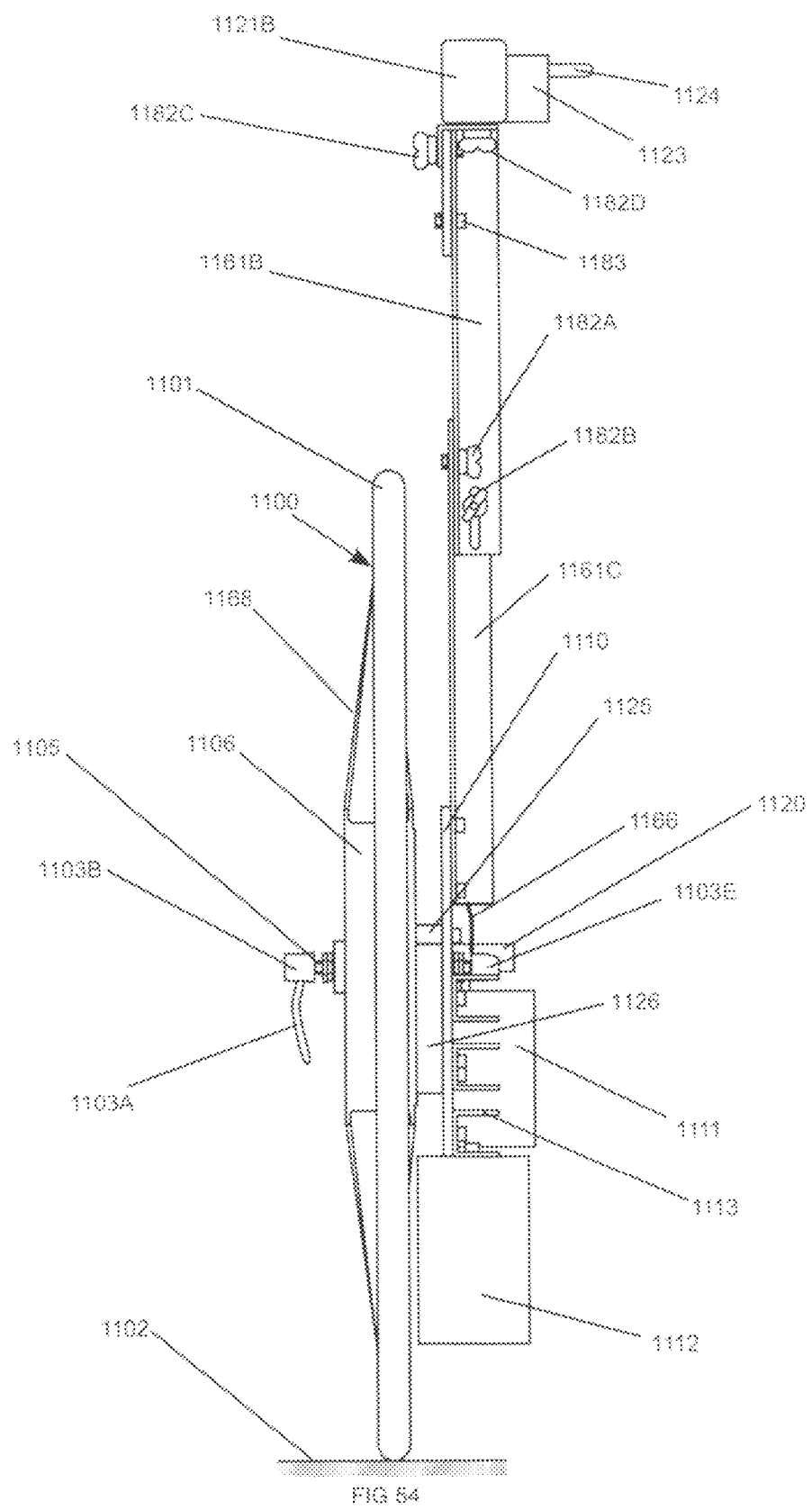
Figure 55:
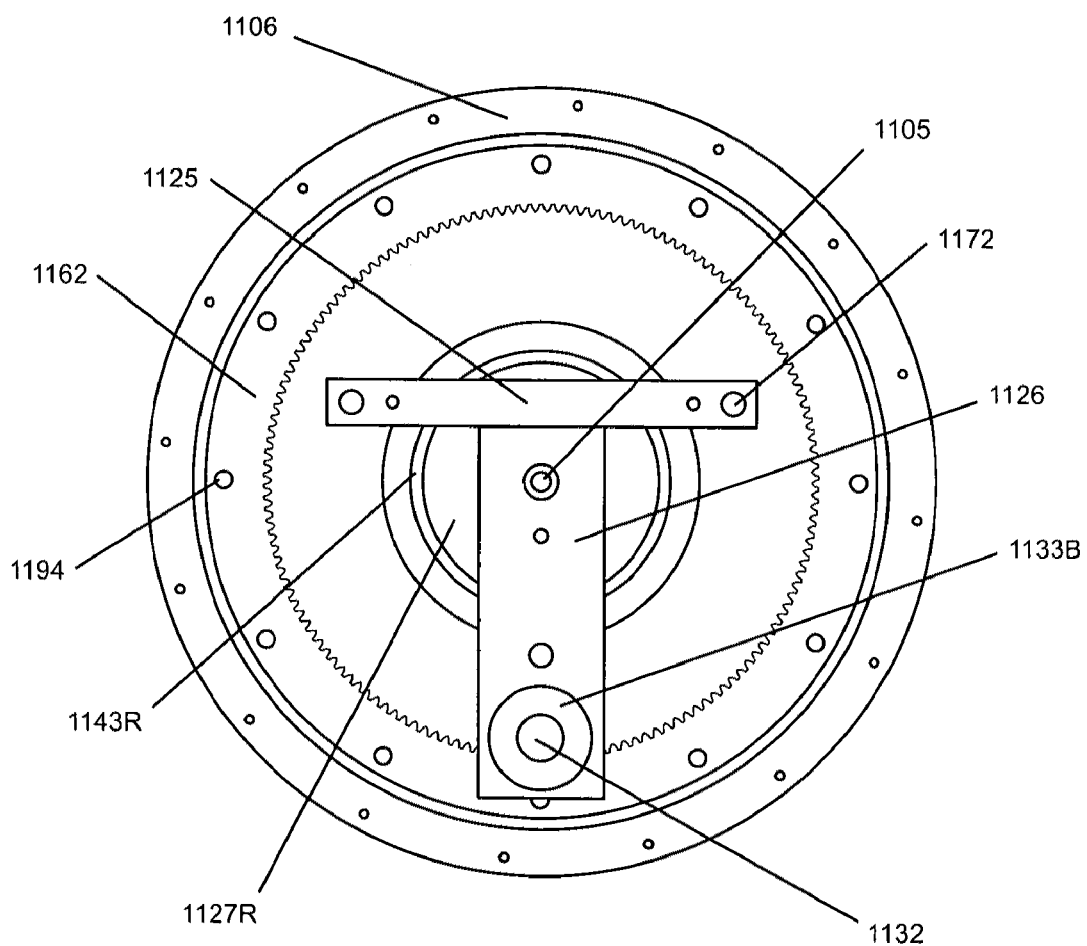
Figure 56:
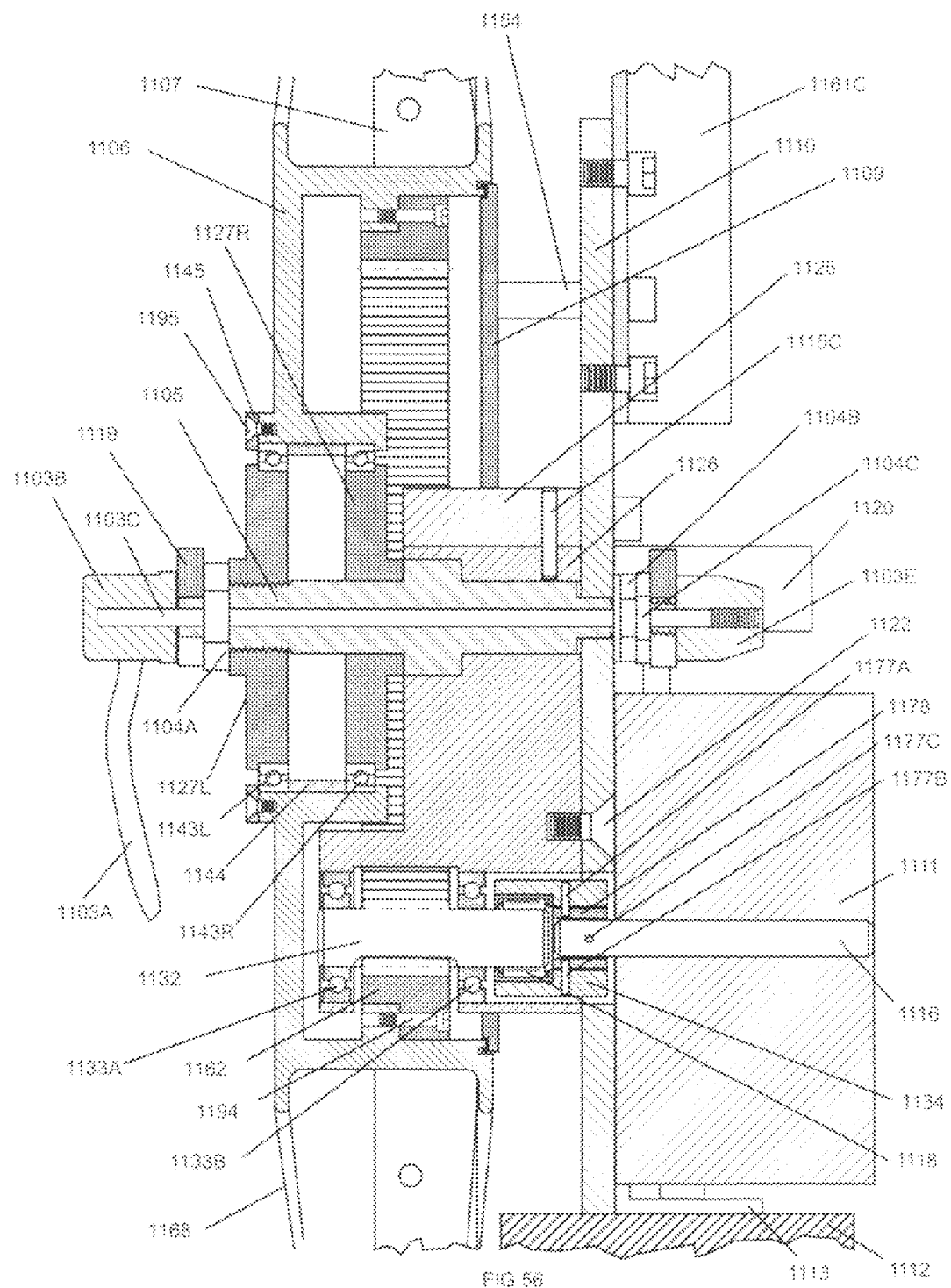
Figure 57:
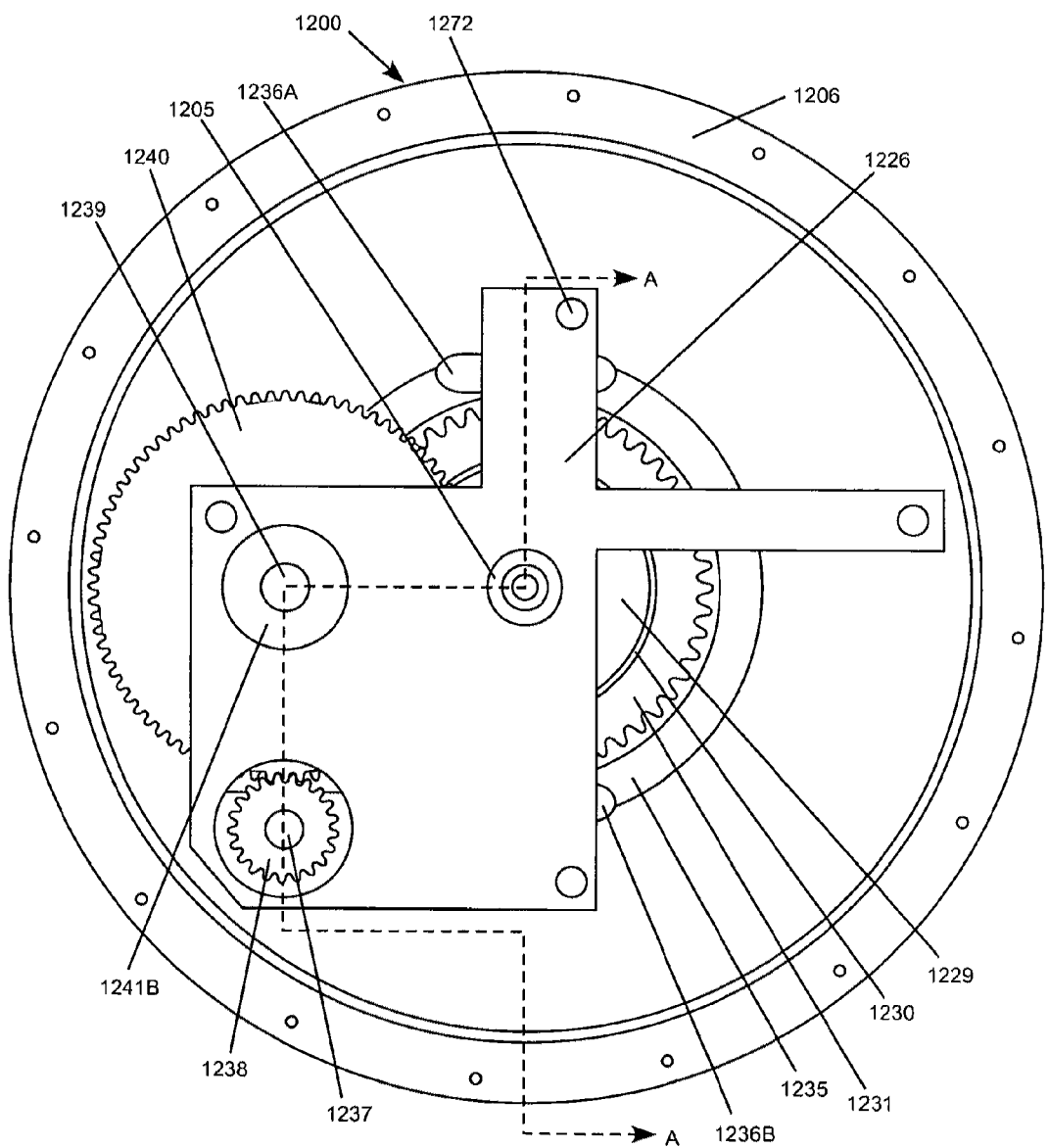
Figure 58:
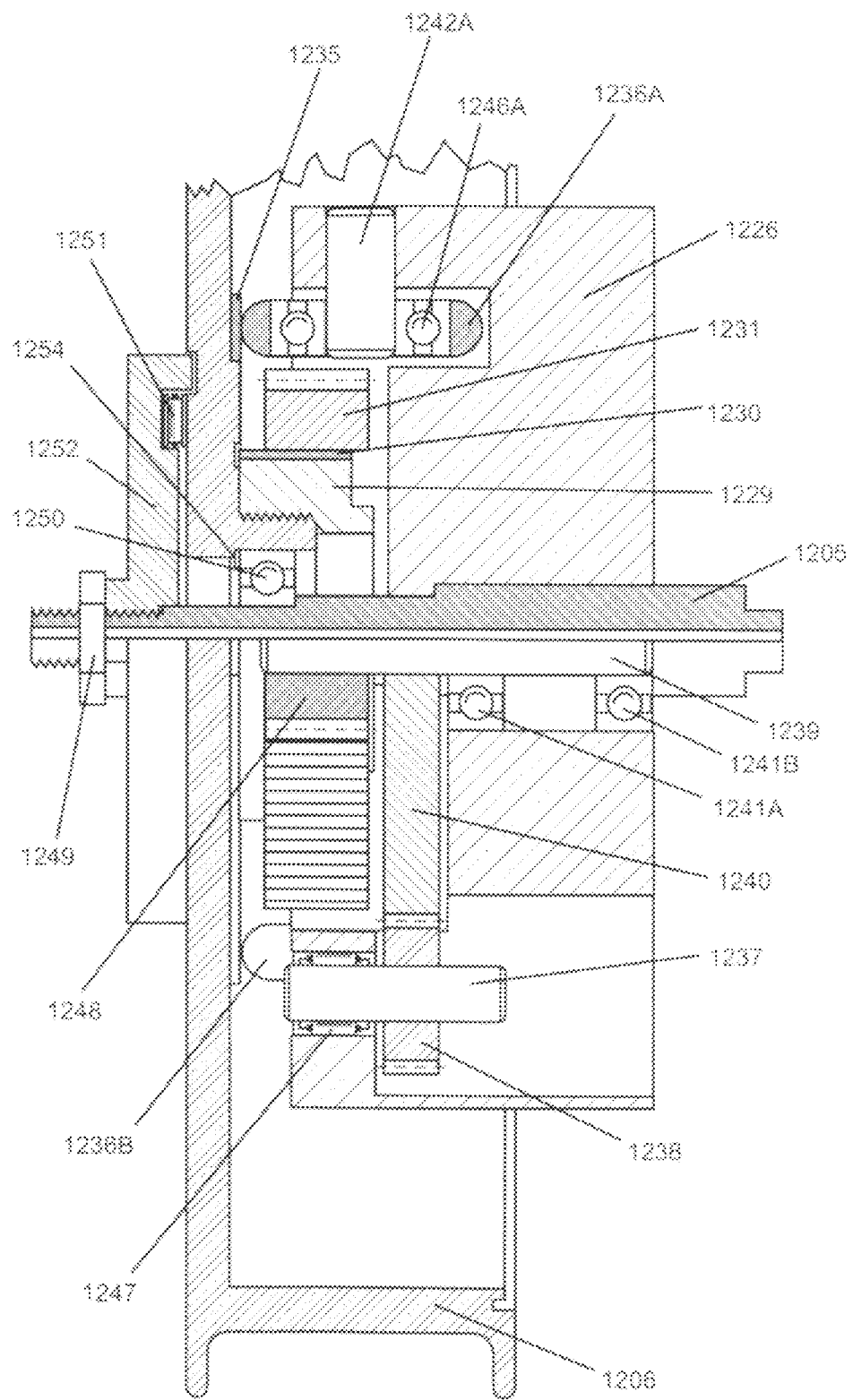

An eleventh exemplary version is illustrated in FIGS. 53-56, wherein:

FIG. 53 is an external view of the right side of a front wheel for a standard bicycle;

FIG. 54 is an external view of the end of the wheel of FIG. 53;

FIG. 55 is a view of the right side of the hub assembly for the wheel of FIG. 53, with the motor mount and hub cover removed;

FIG. 56 is a removed cross sectional view A-A of the wheel of FIG. 53;

A hub assembly for a twelfth exemplary version is illustrated in FIGS. 57-58, wherein:

FIG. 57 is a view of the right side of a hub assembly of a wheel for a standard bicycle, with the motor mount and hub cover removed;

FIG. 58 is a removed cross sectional view A-A of the hub assembly of FIG. 57.

Figure 59:
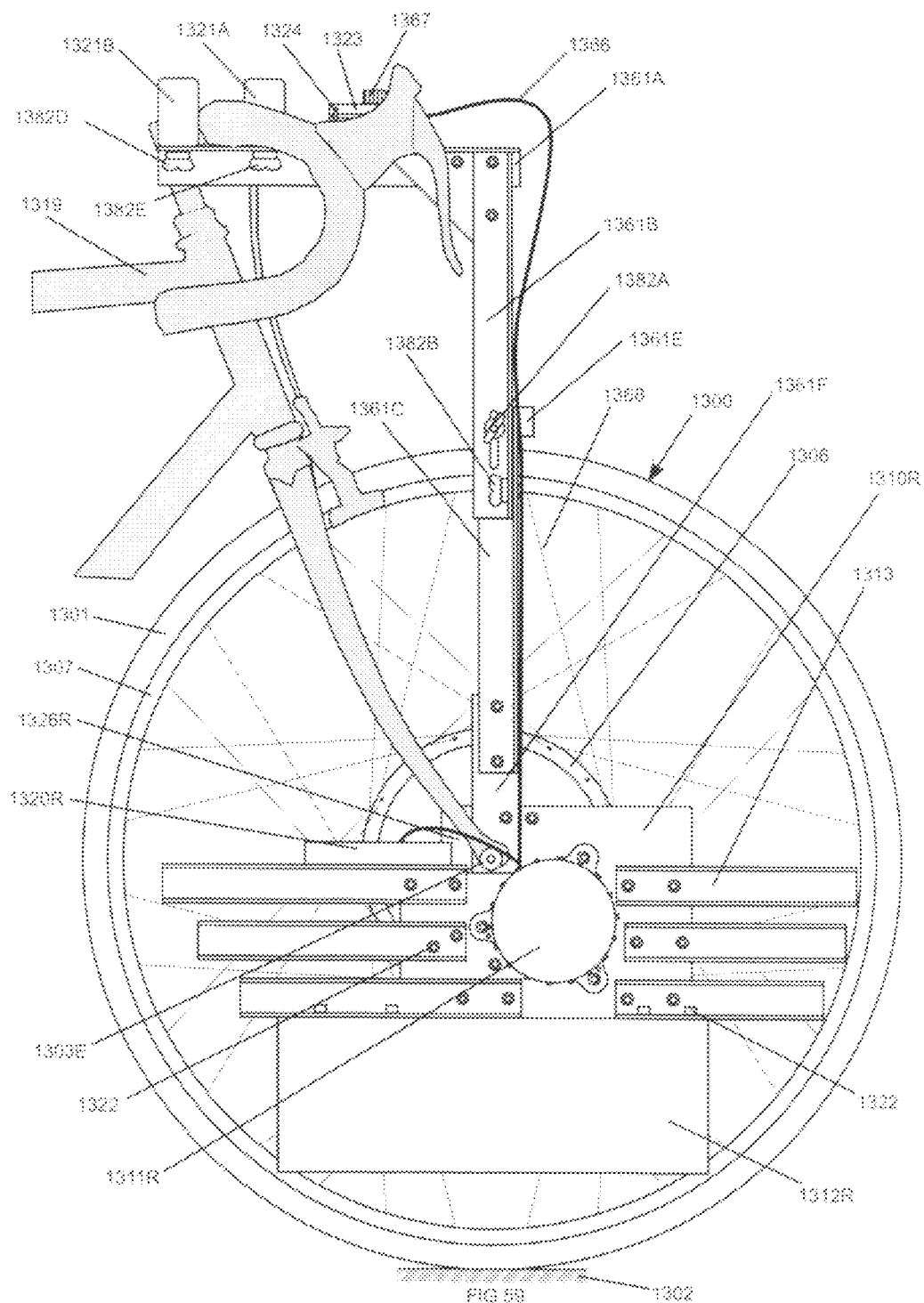
Figure 60:
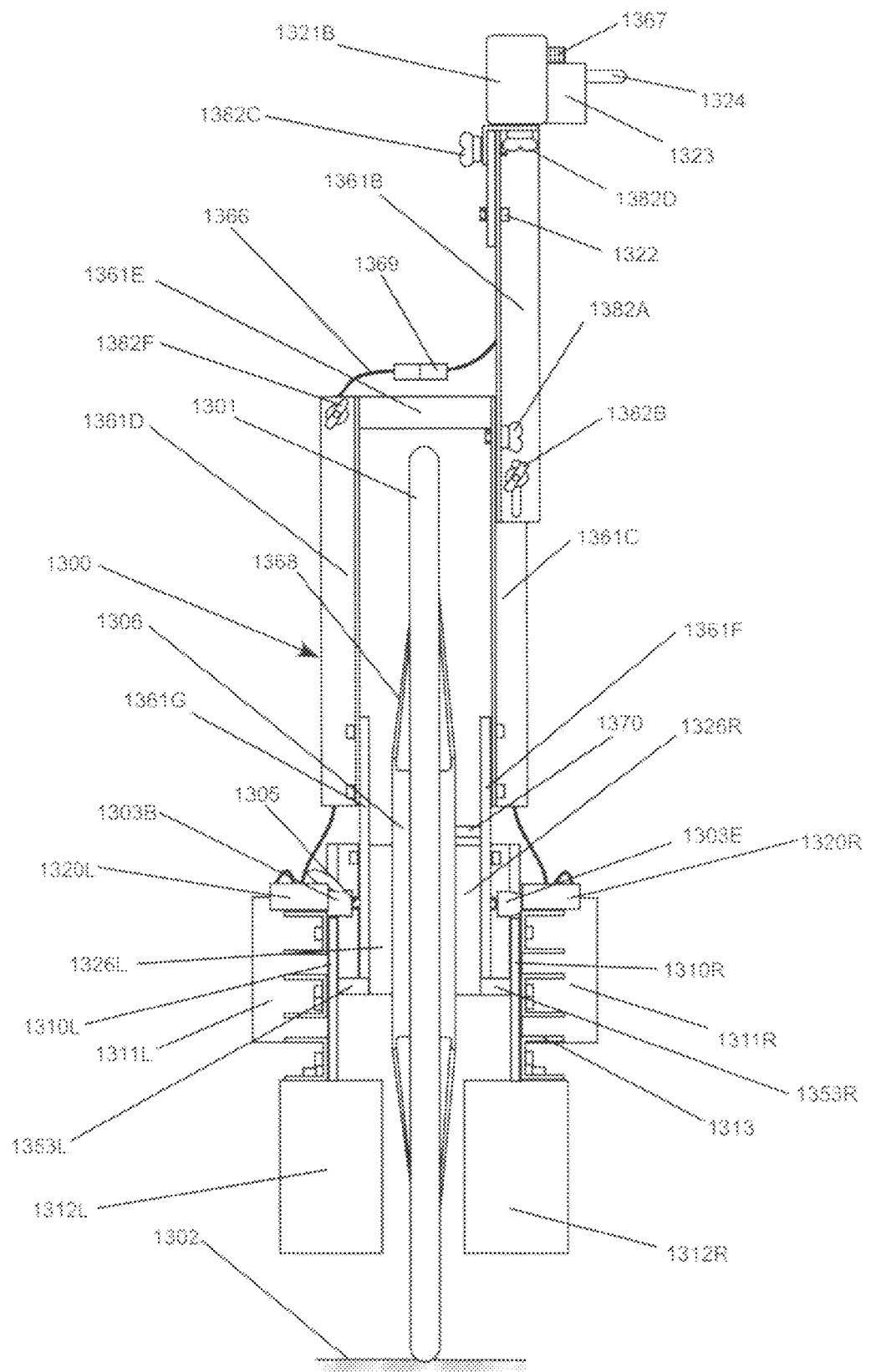
Figure 61:
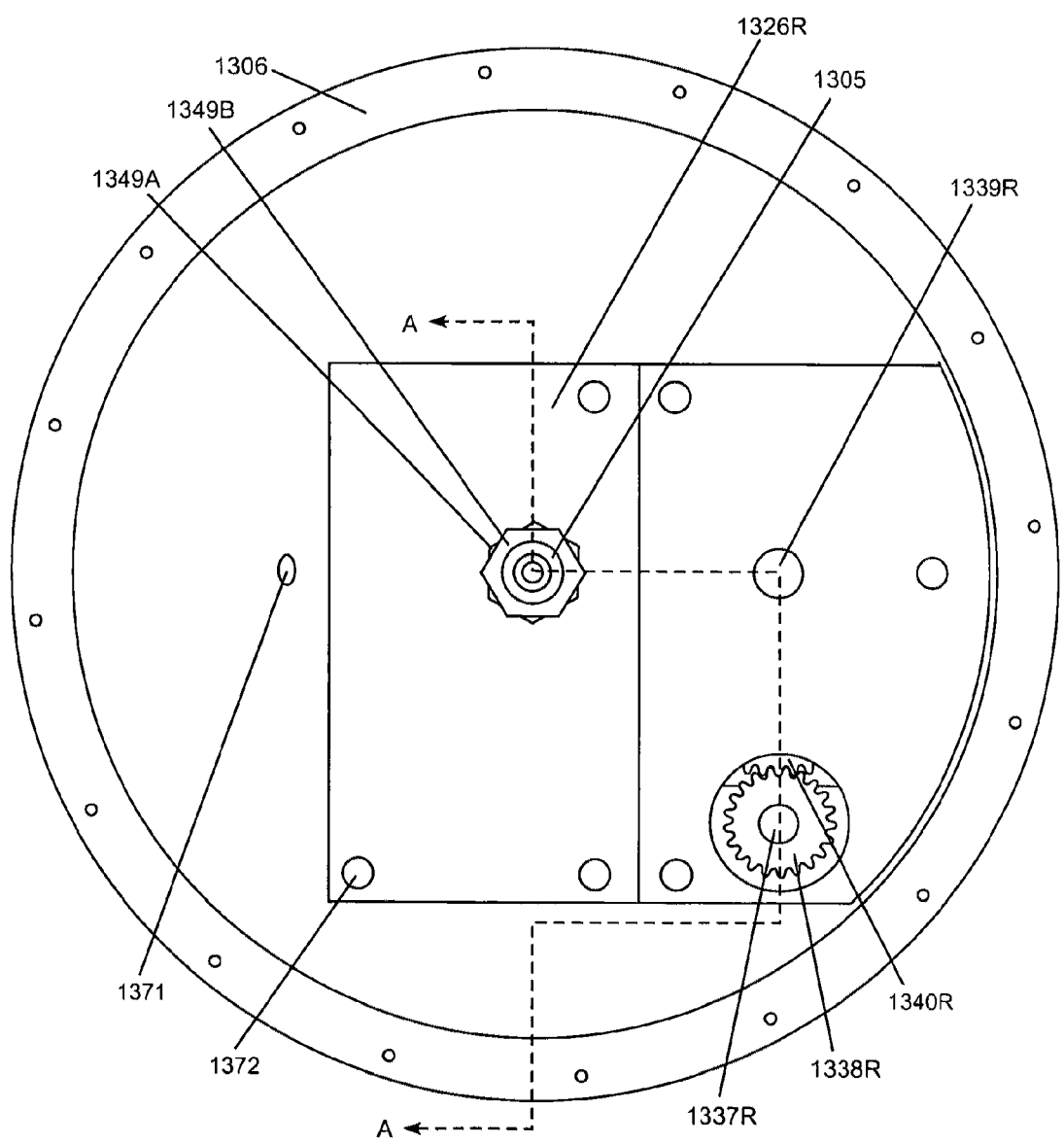
Figure 62:
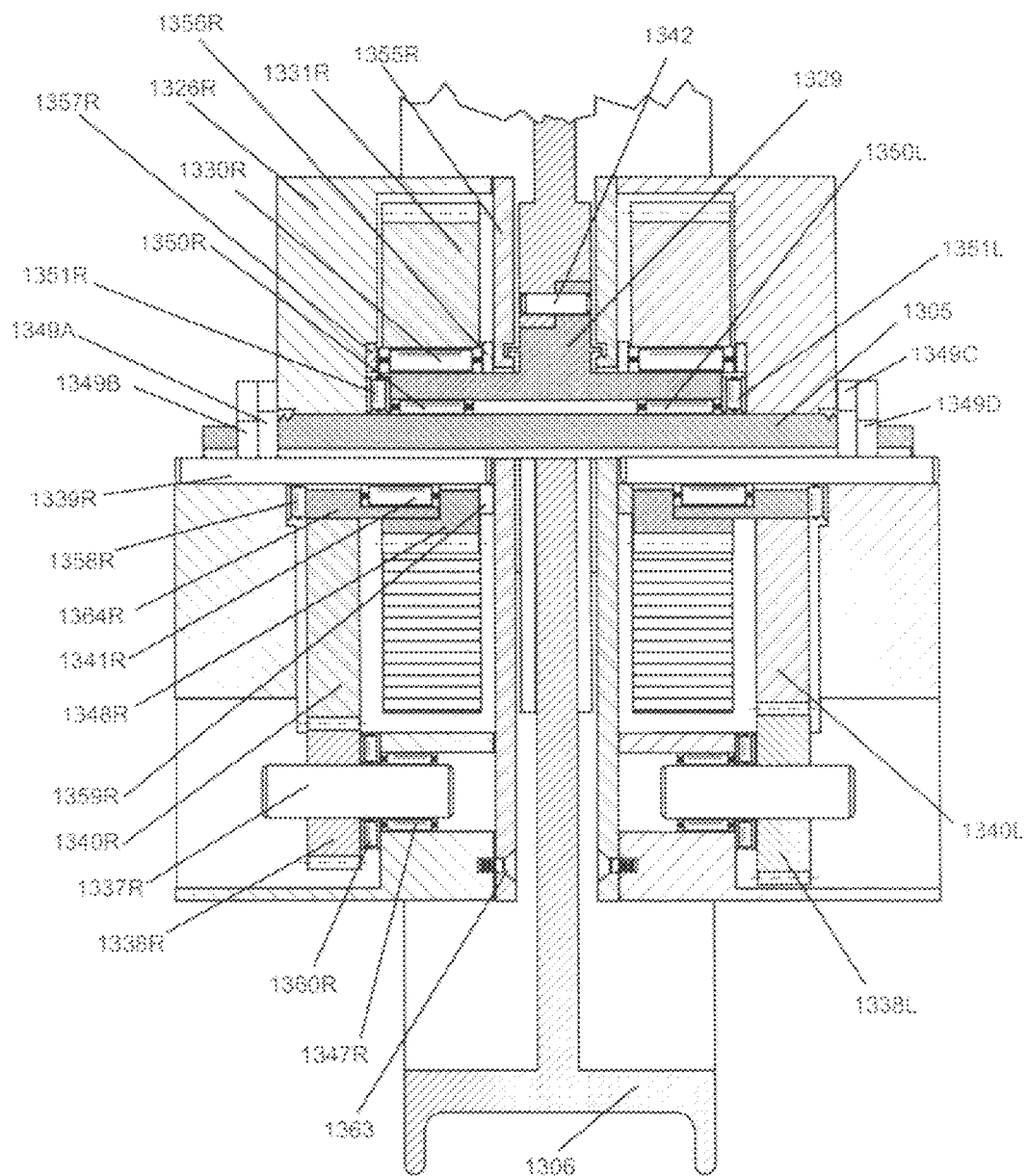

A thirteenth exemplary version is illustrated in FIGS. 59-62, wherein:

FIG. 59 is an external view of the right side of a front wheel for a standard bicycle;

FIG. 60 is an external view of the end of the wheel of FIG. 59;

FIG. 61 is a view of the right side of the hub assembly for the wheel of FIG. 59, with the motor mount removed;

FIG. 62 is a removed cross sectional view A-A of the hub assembly of FIG. 61.

Figure 63:
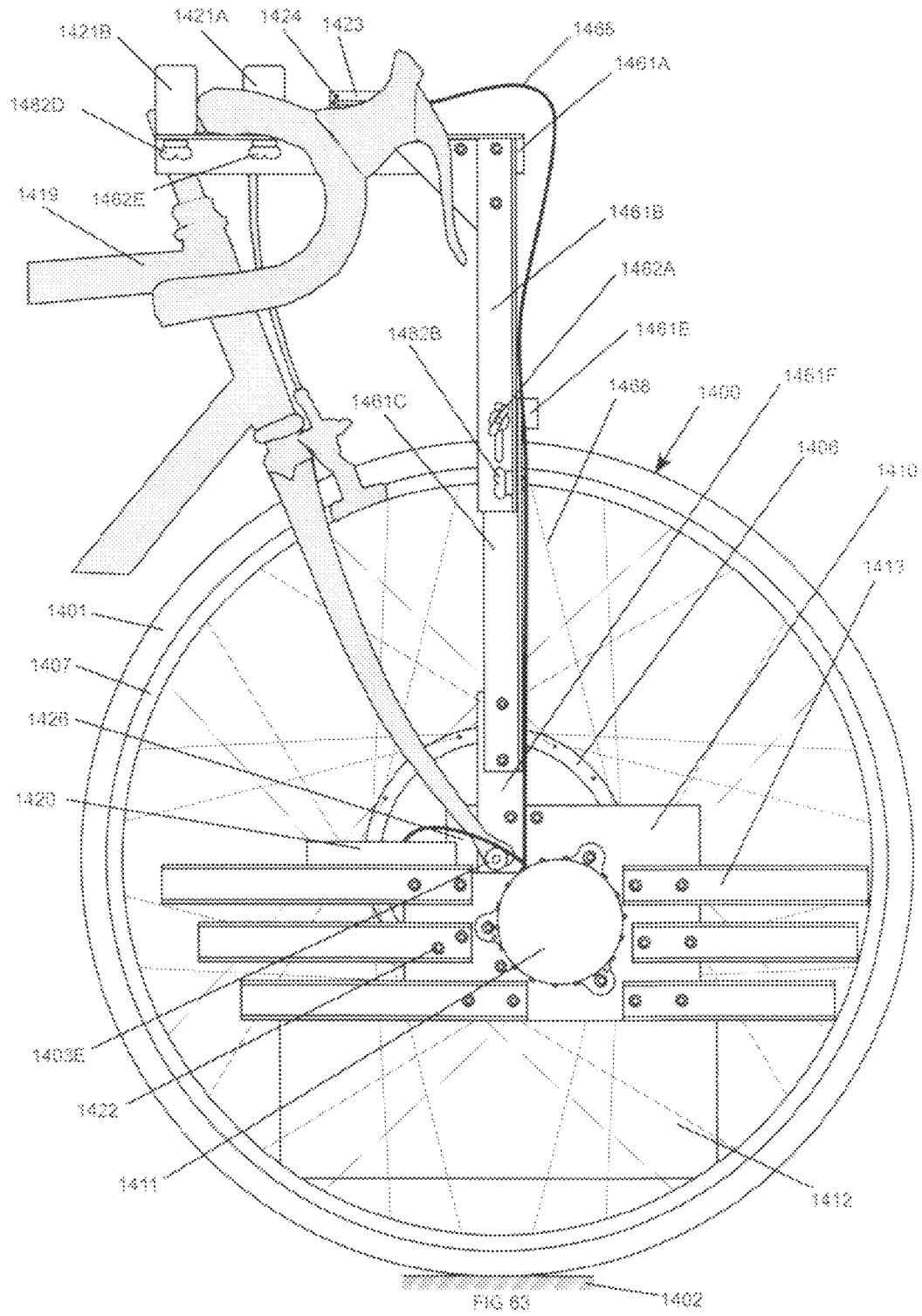
Figure 64:
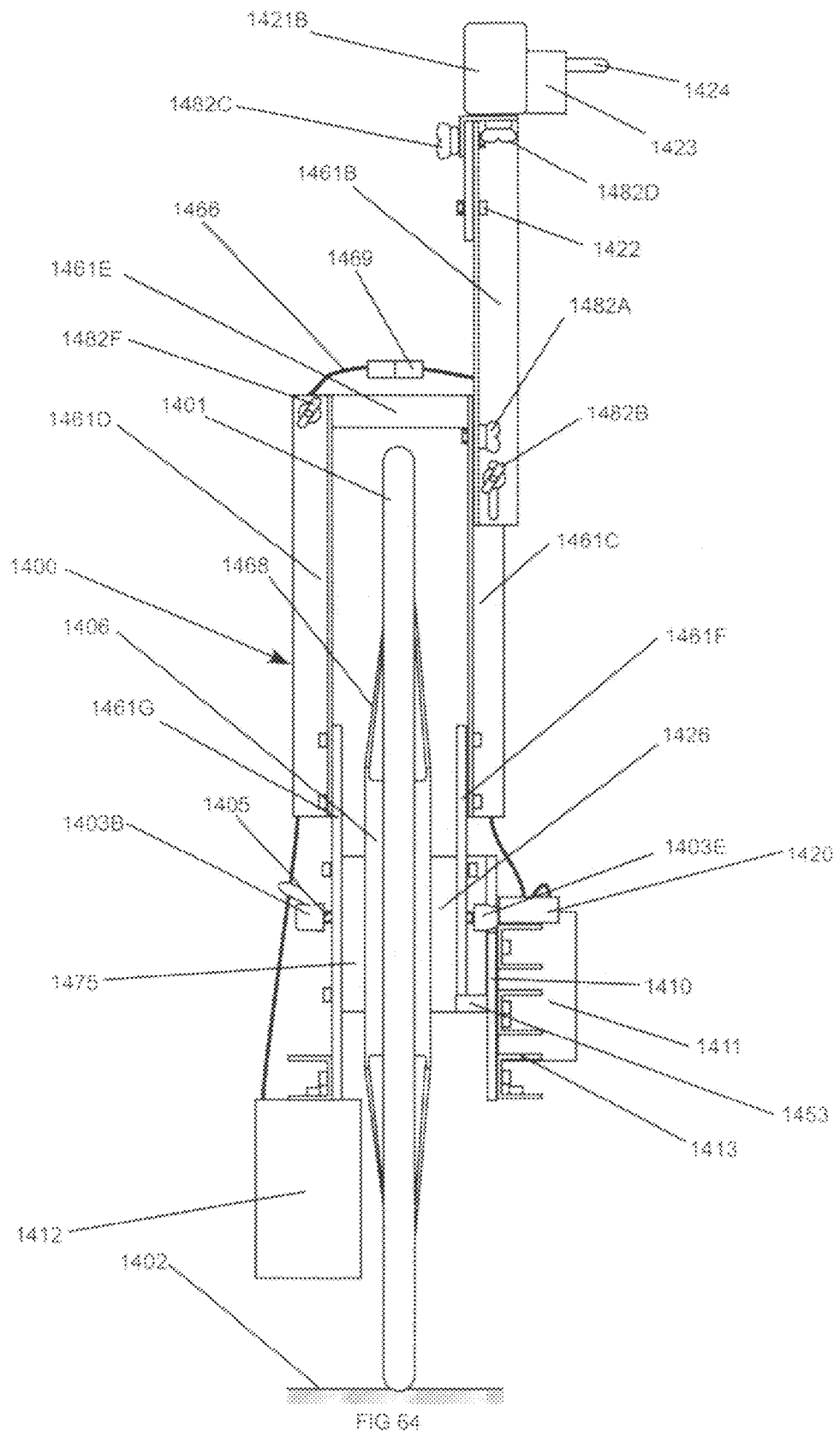
Figure 65:
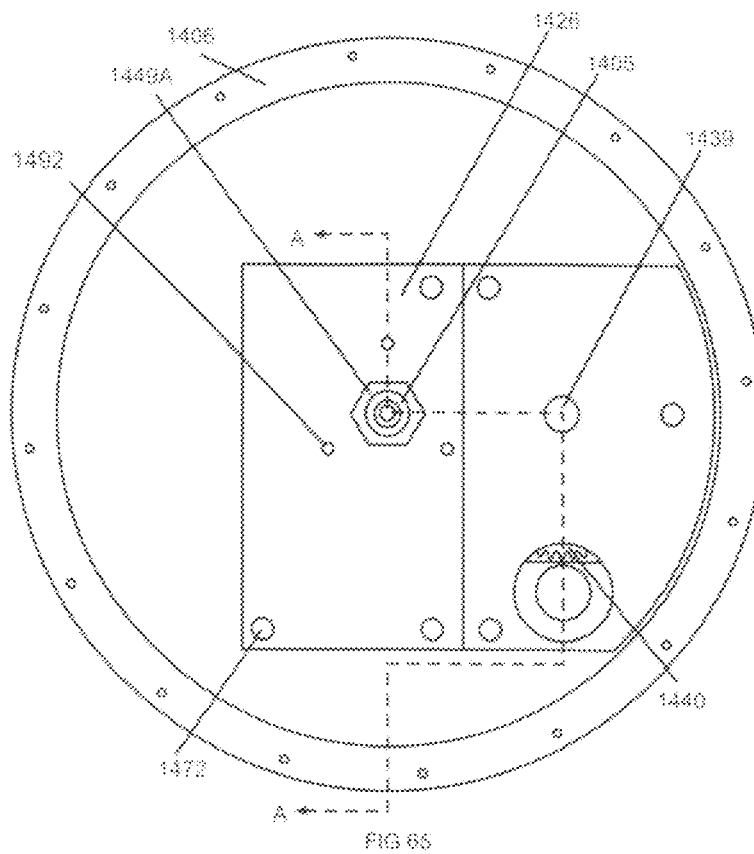
Figure 66:
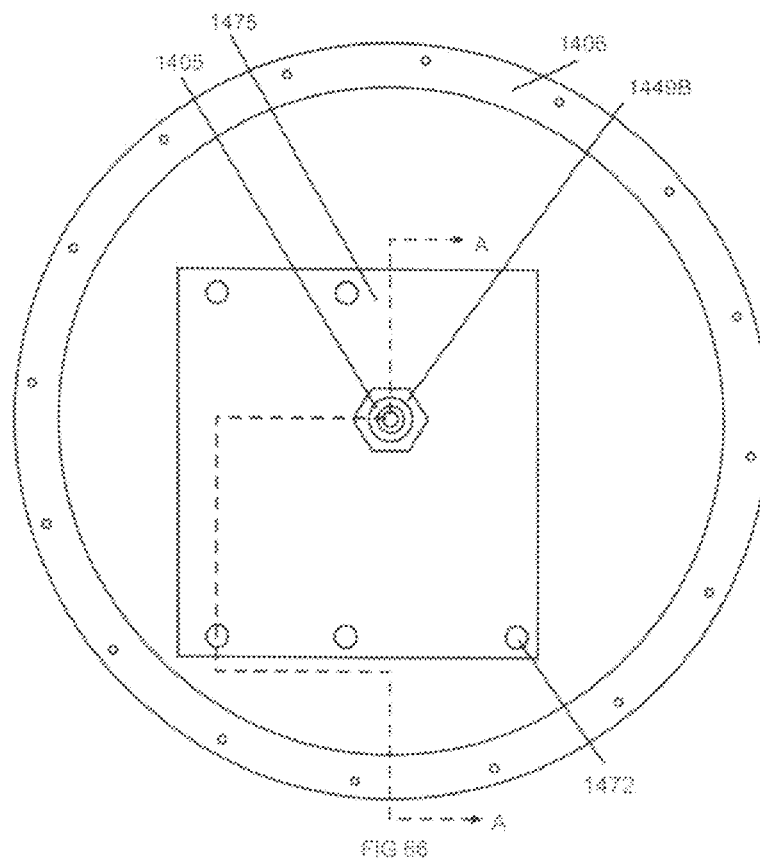
Figure 67:
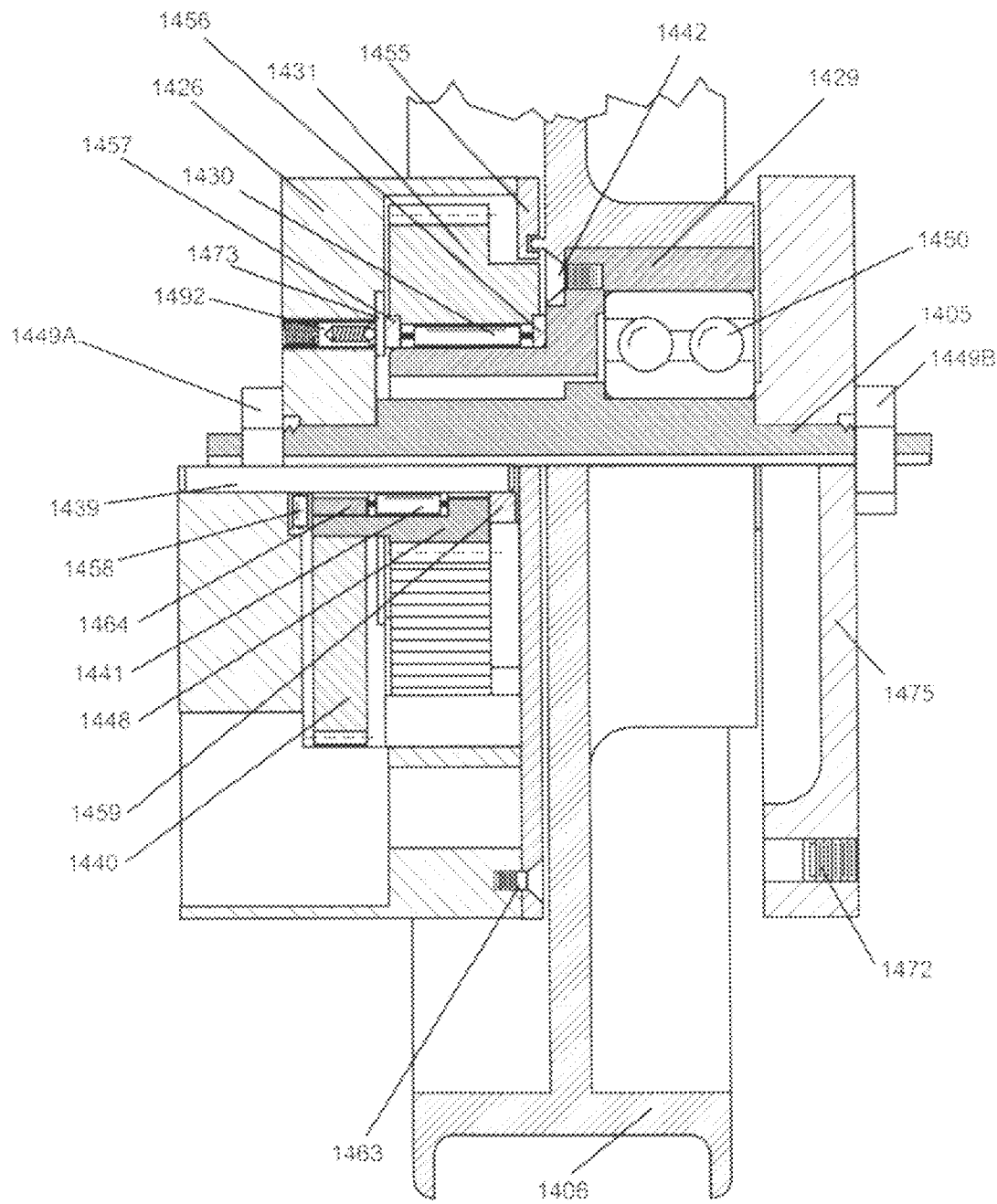
Figure 68:
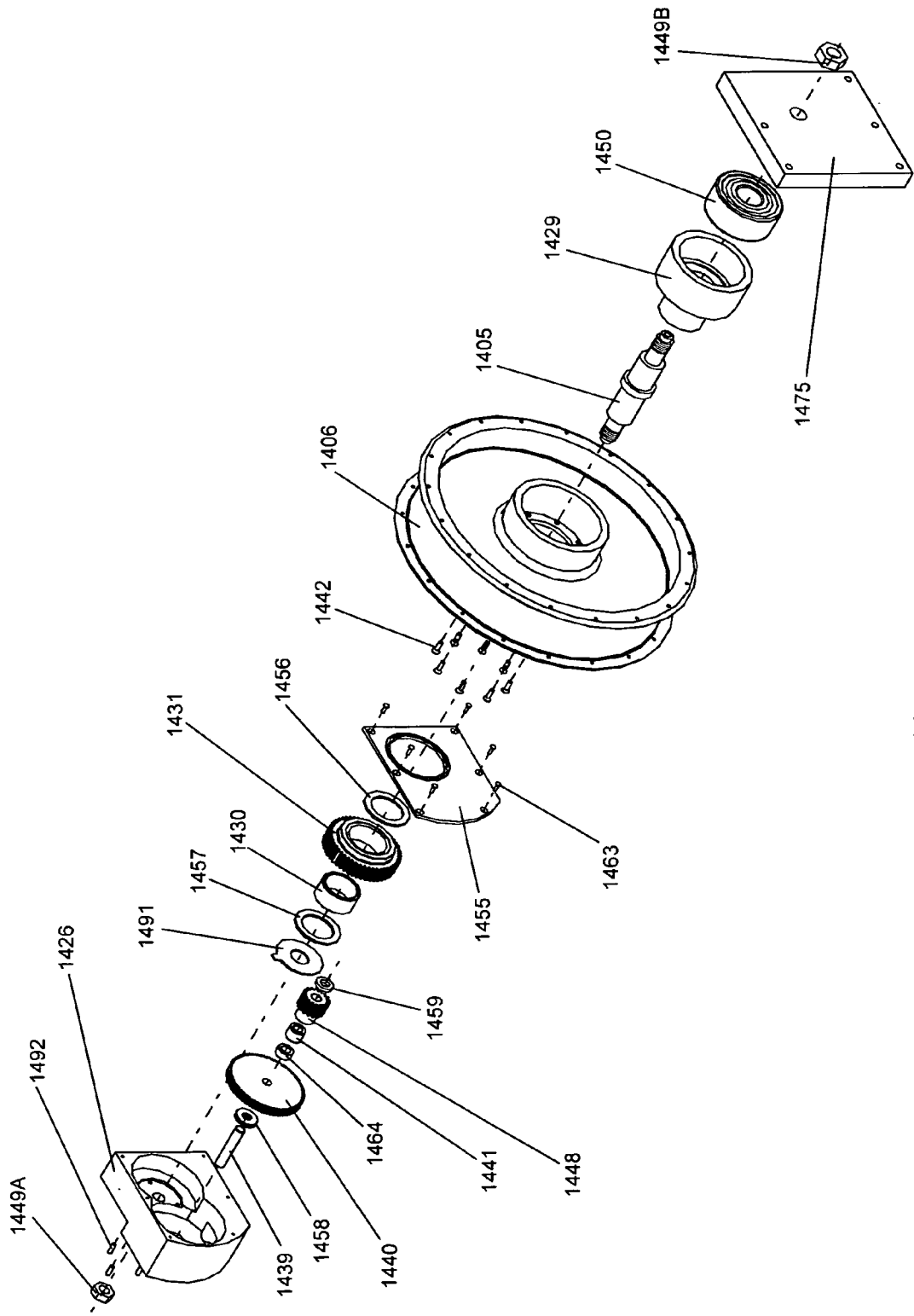
Figure 69:
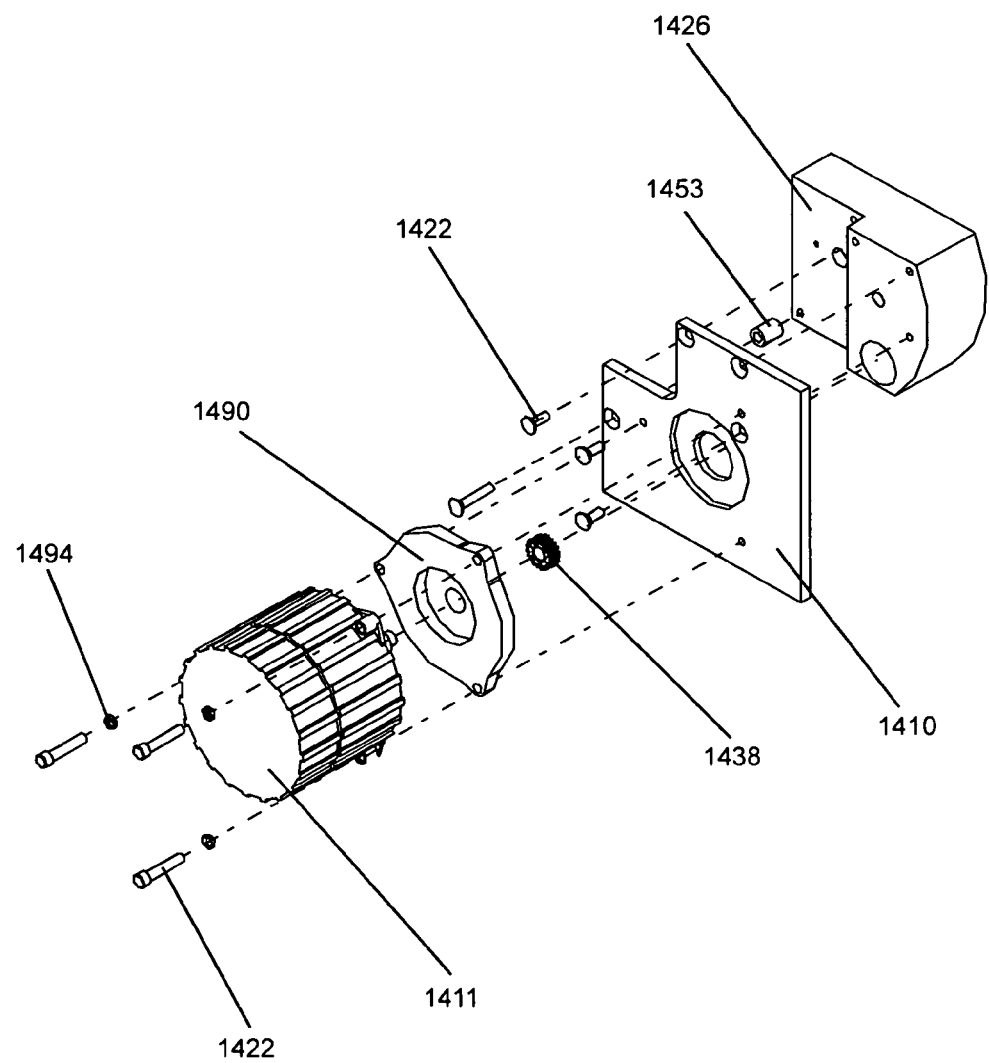

A fourteenth exemplary version is illustrated in FIGS. 63-69, wherein:

FIG. 63 is an external view of the right side of a front wheel for a standard bicycle;

FIG. 64 is an external view of the end of the wheel of FIG. 63;

FIG. 65 is a view of the right side of the hub assembly for the wheel of FIG. 63, with the motor mount and anti-rotation leg removed;

FIG. 66 is a view of the left side of the hub assembly for the wheel of FIG. 63, with the battery and battery bracket removed;

FIG. 67 is a removed cross sectional view A-A of the hub of FIG. 65 and FIG. 66;

FIG. 68 is an exploded view of the hub assembly of FIG. 65 and FIG. 66;

FIG. 69 is an exploded view of the motor mount assembly for the wheel of FIG. 63.

Figure 70:
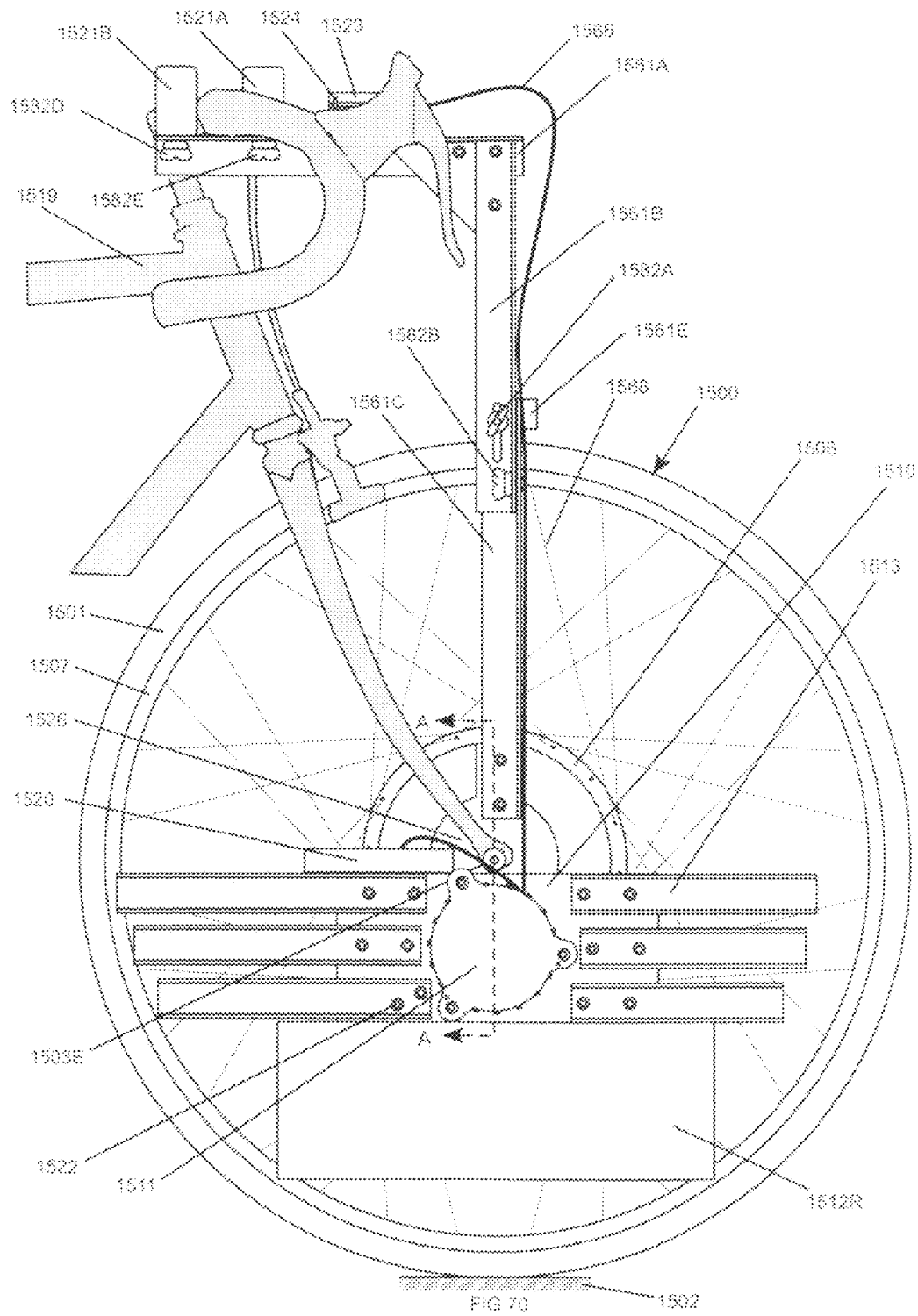
Figure 71:
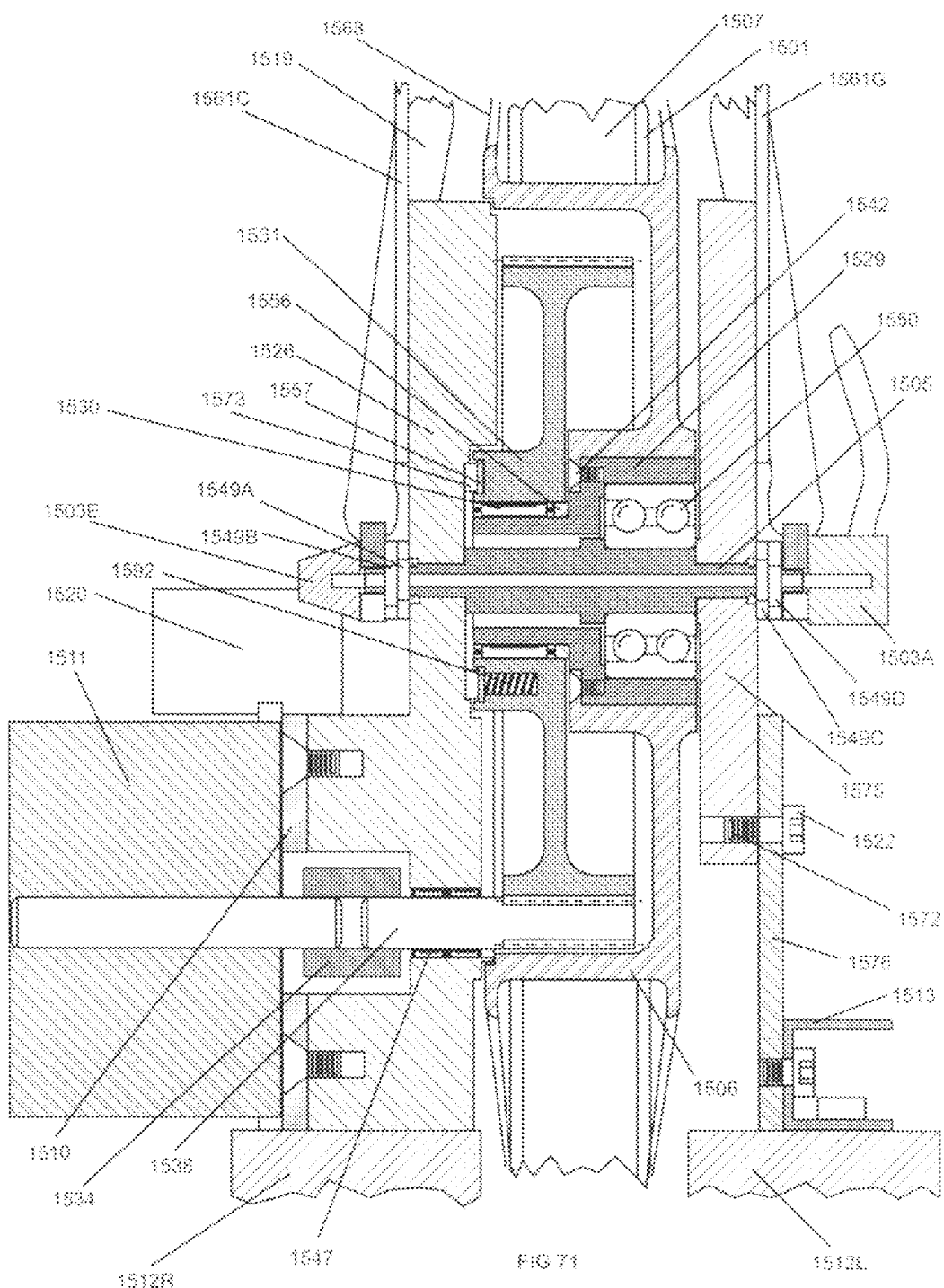

A fifteenth exemplary version is illustrated in FIGS. 70-71, wherein:

FIG. 70 is an external view of the right side of a front wheel for a standard bicycle;

FIG. 71 is a removed cross sectional view A-A of the wheel of FIG. 70.

Figure 72:
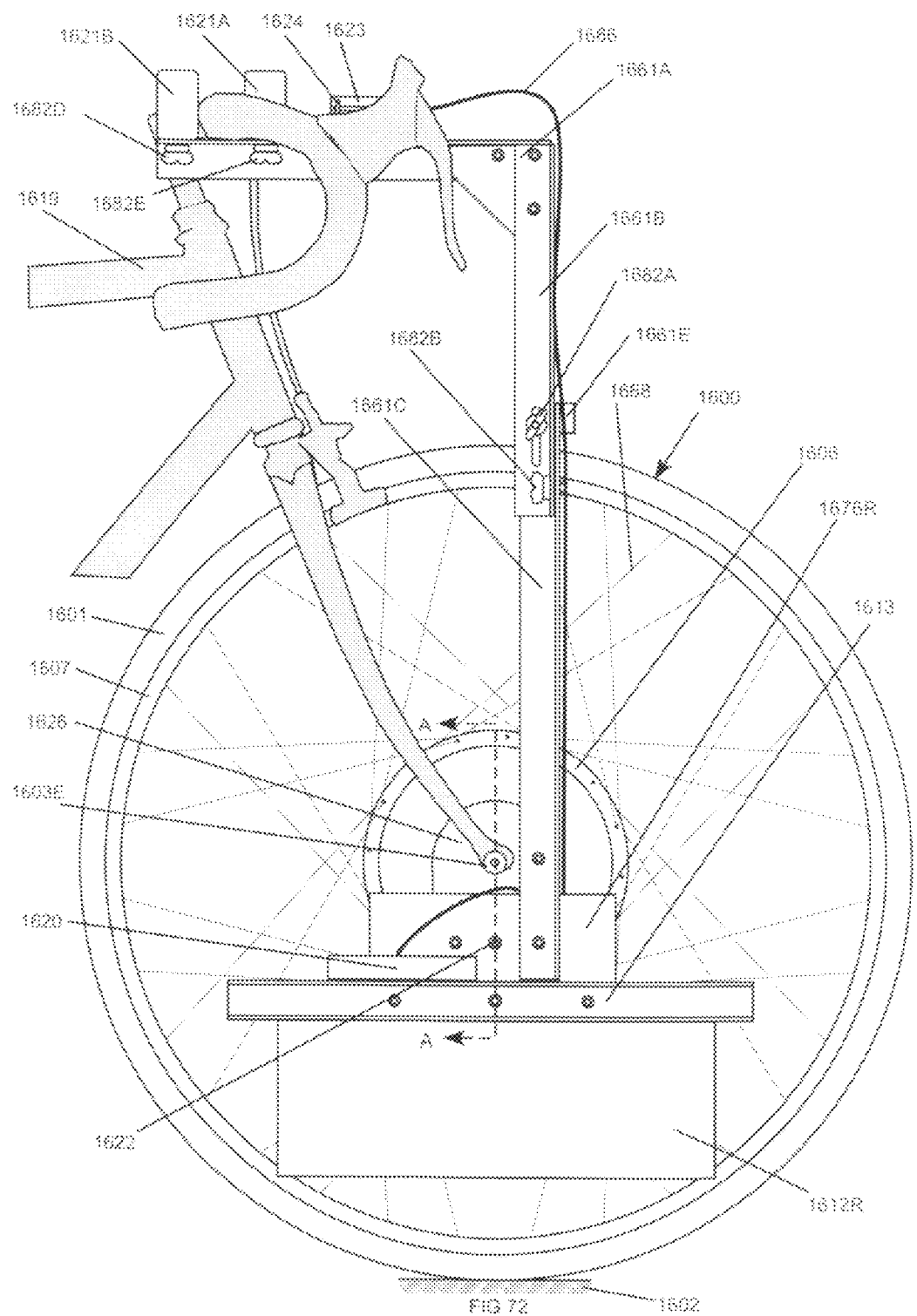
Figure 73:
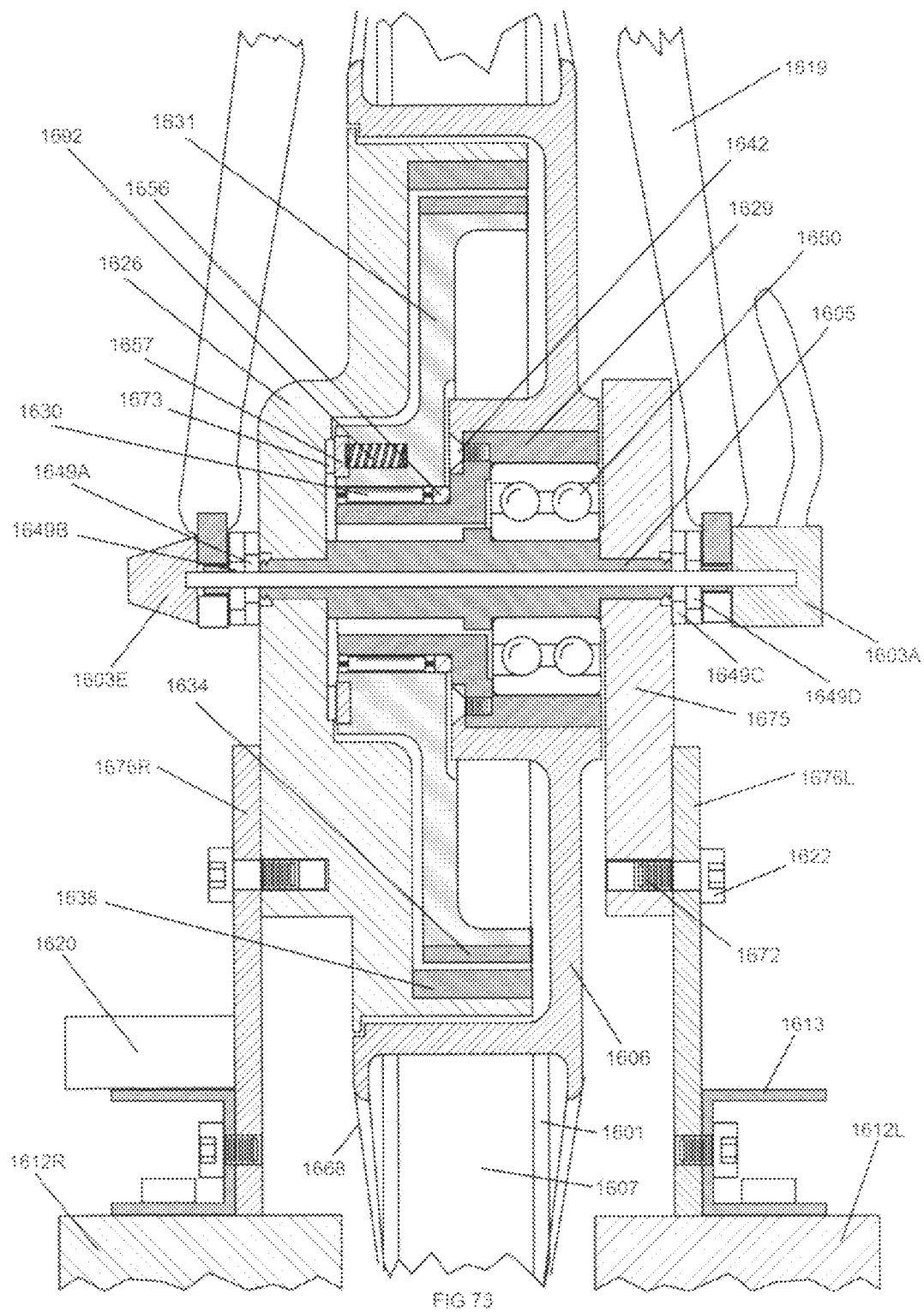

A sixteenth exemplary version is illustrated in FIGS. 72-73, wherein:

FIG. 72 is an external view of the right side of a front wheel for a standard bicycle;

FIG. 73 is a removed cross sectional view A-A of the wheel of FIG. 72.

Figure 74:
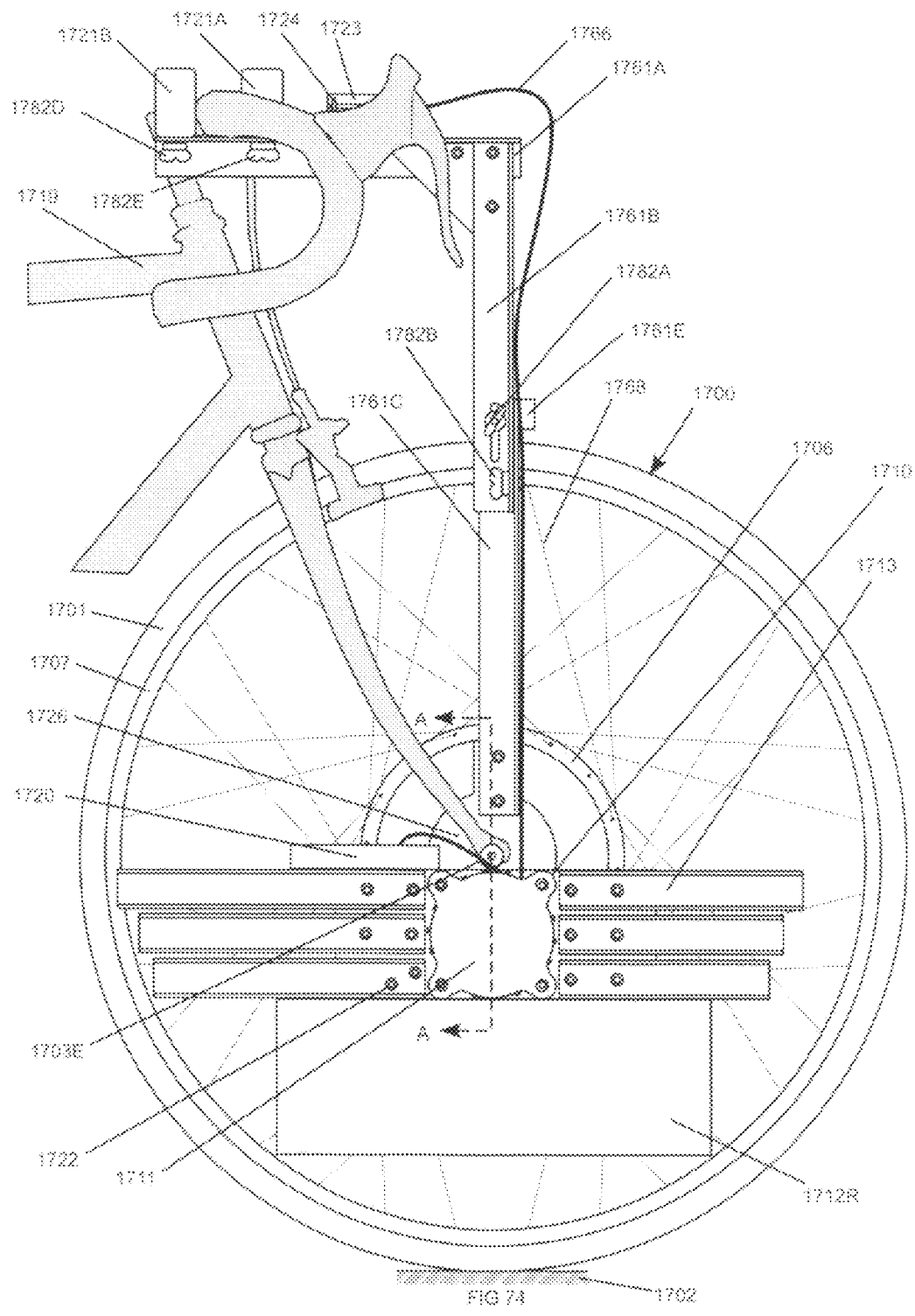
Figure 75:
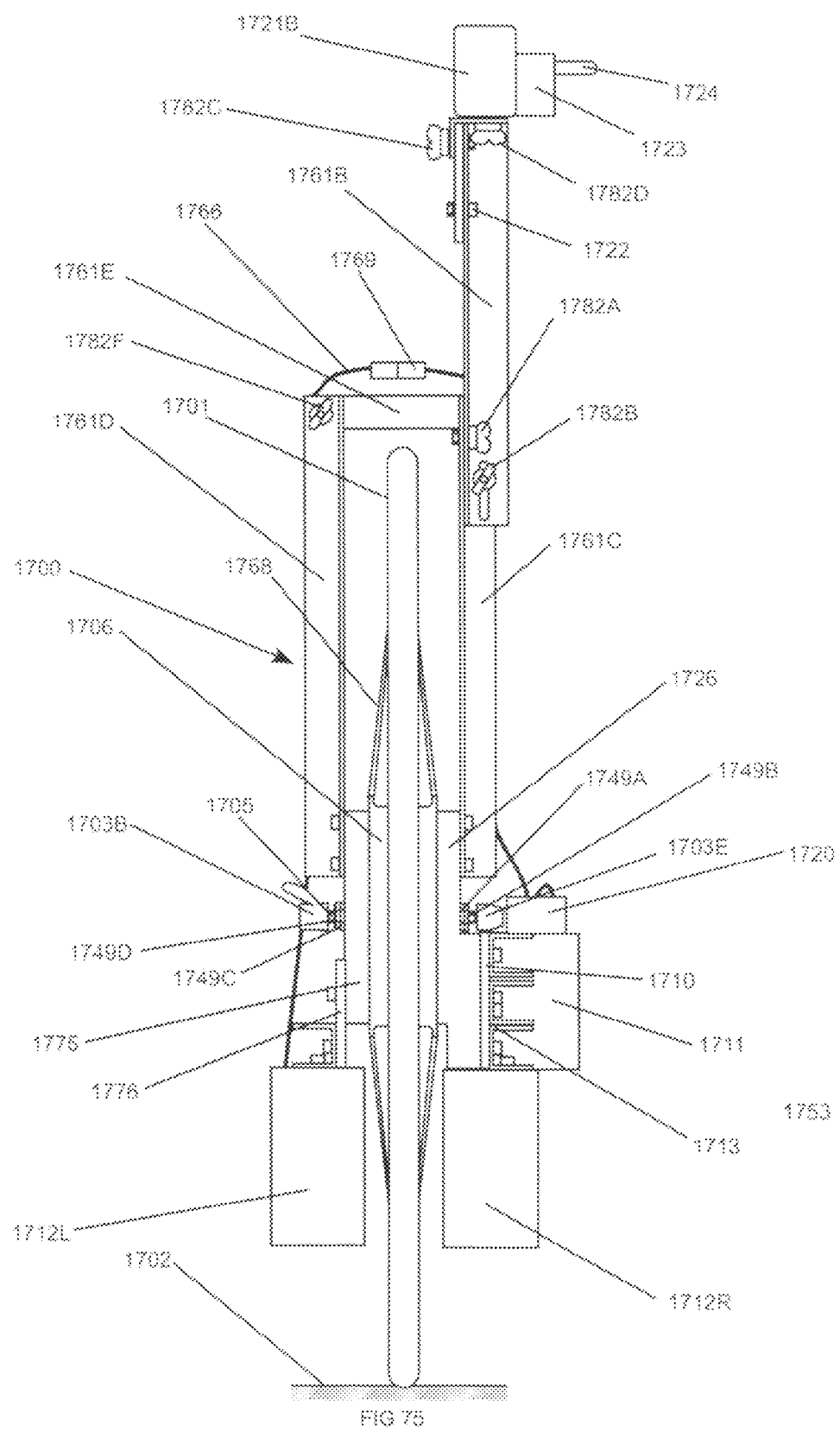
Figure 76:
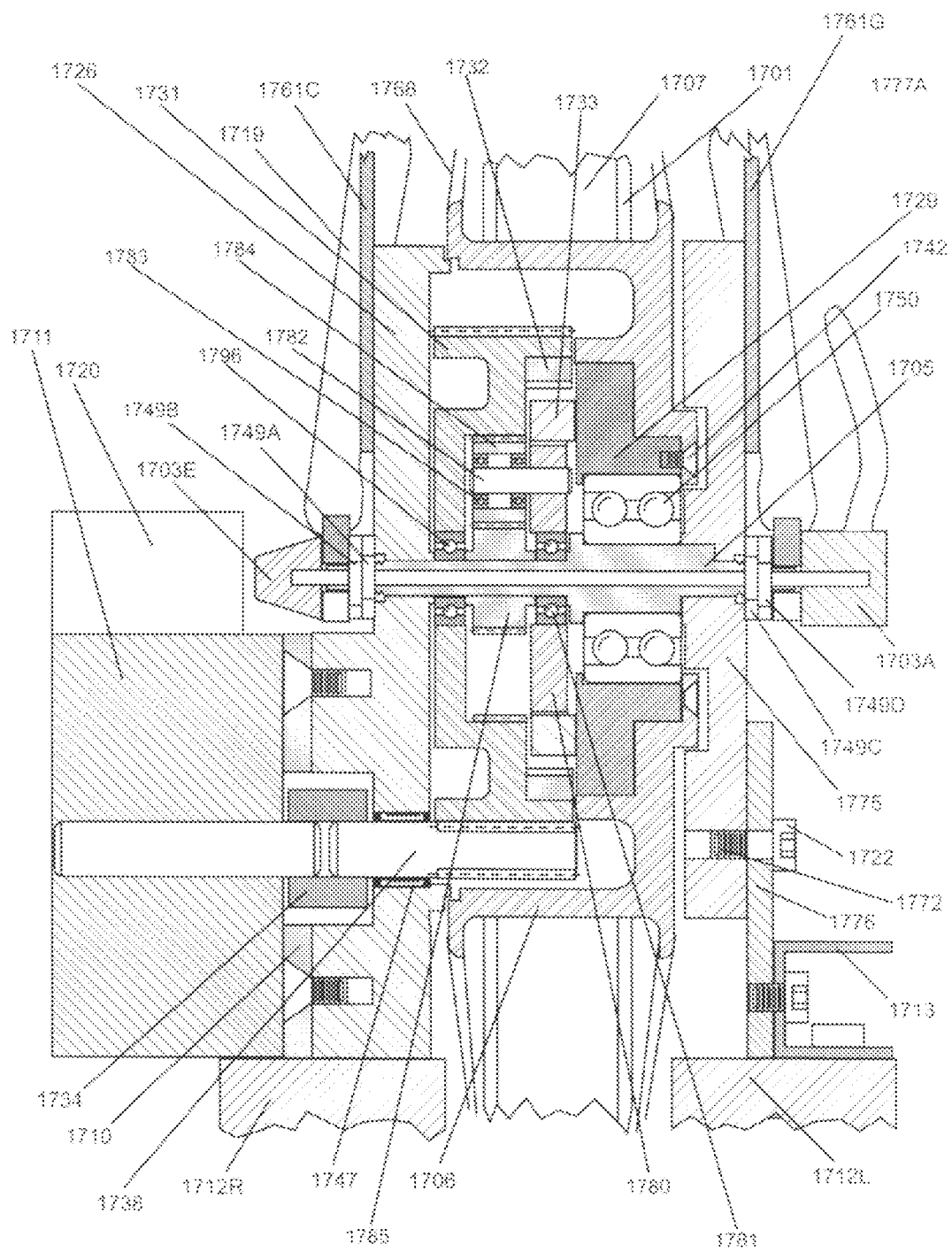
Figure 77:
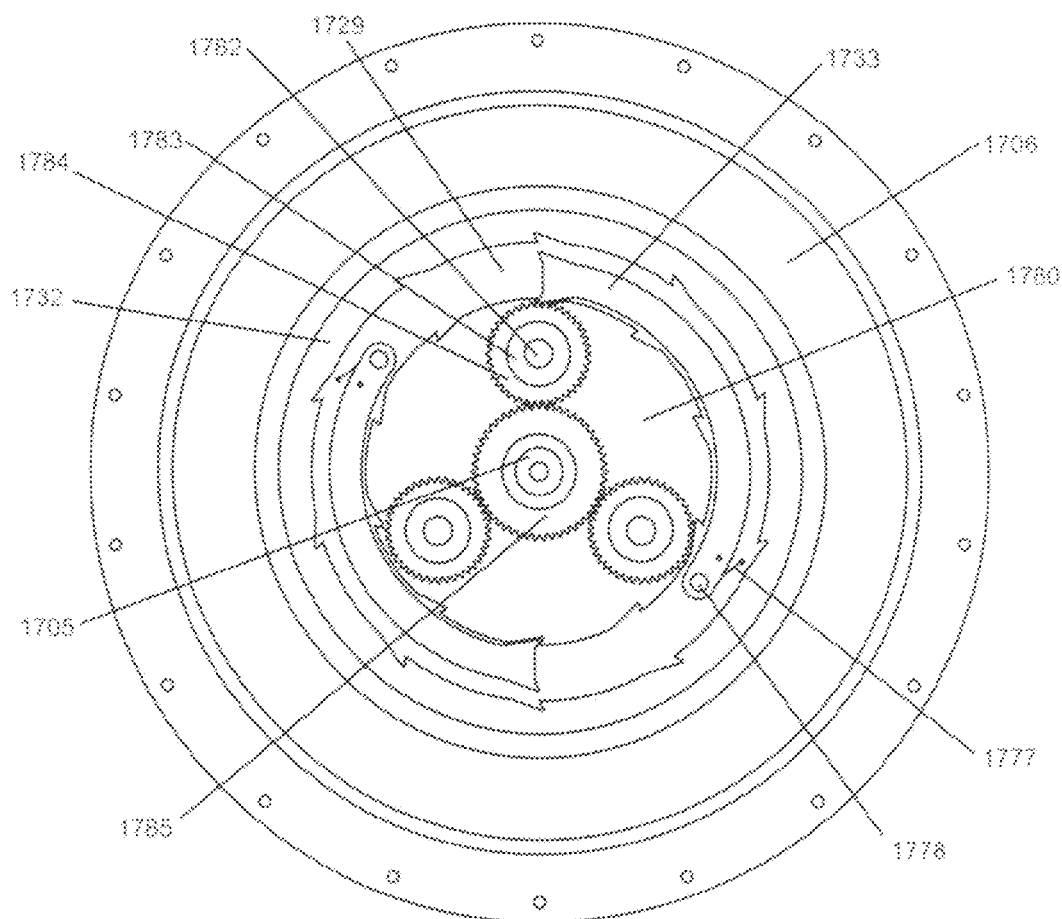
Figure 78:
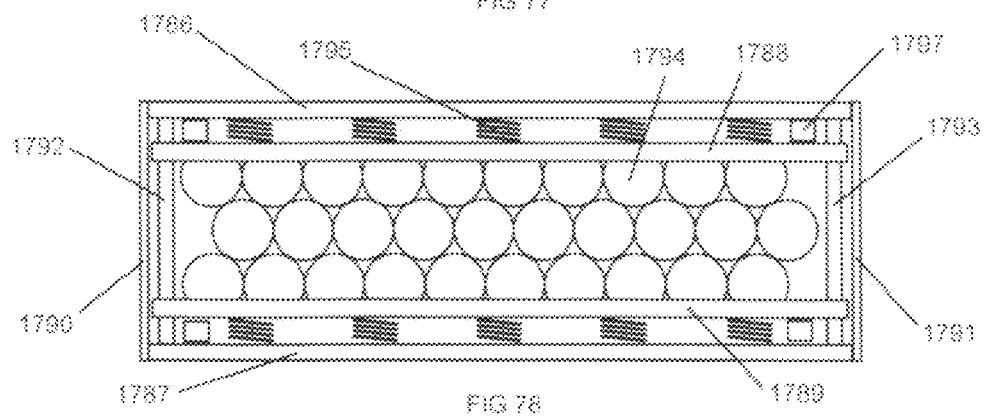
Figure 79:
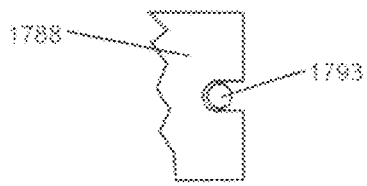

A seventeenth exemplary version is illustrated in FIGS. 74-79, wherein:

FIG. 74 is an external view of the right side of a front wheel for a standard bicycle;

FIG. 75 is an external view of the end of the wheel of FIG. 74;

FIG. 76 is a removed cross sectional view A-A of the wheel of FIG. 74;

FIG. 77 is an end view of the automatic clutch assembly of the wheel of FIG. 74;

FIG. 78 is a side view of the battery compartment, with access panel removed, of the wheel of FIG. 74;

FIG. 79 is a top view of the inside of the battery compartment of the wheel of FIG. 74.

Figure 80:
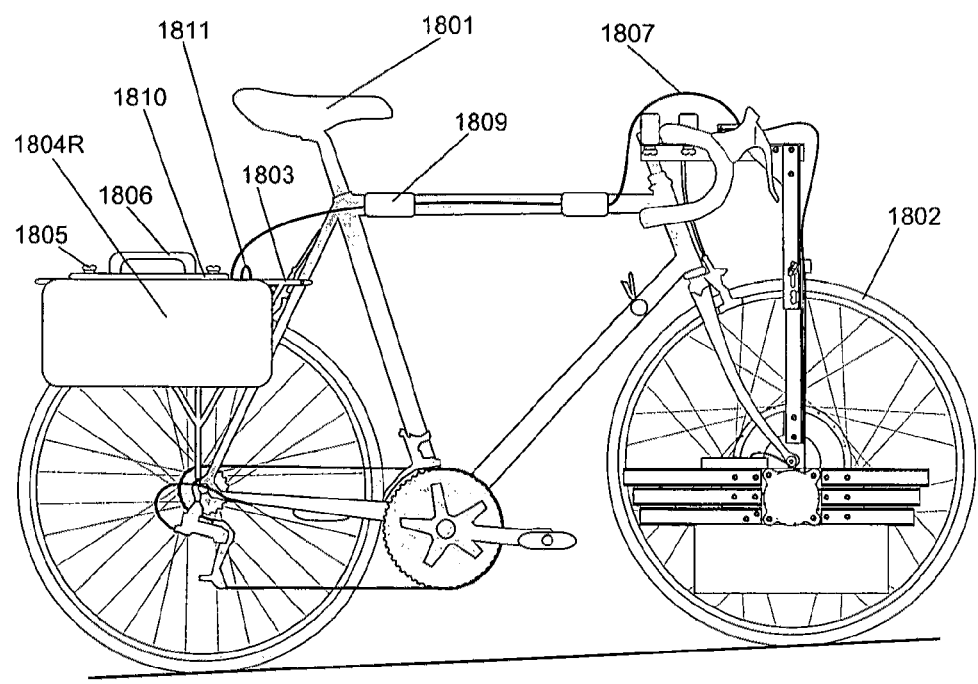

An eighteenth exemplary version is illustrated in FIG. 80, wherein:

FIG. 80 is an external view of the right side of a standard bicycle fitted with propulsion accessories.

Figure 81:
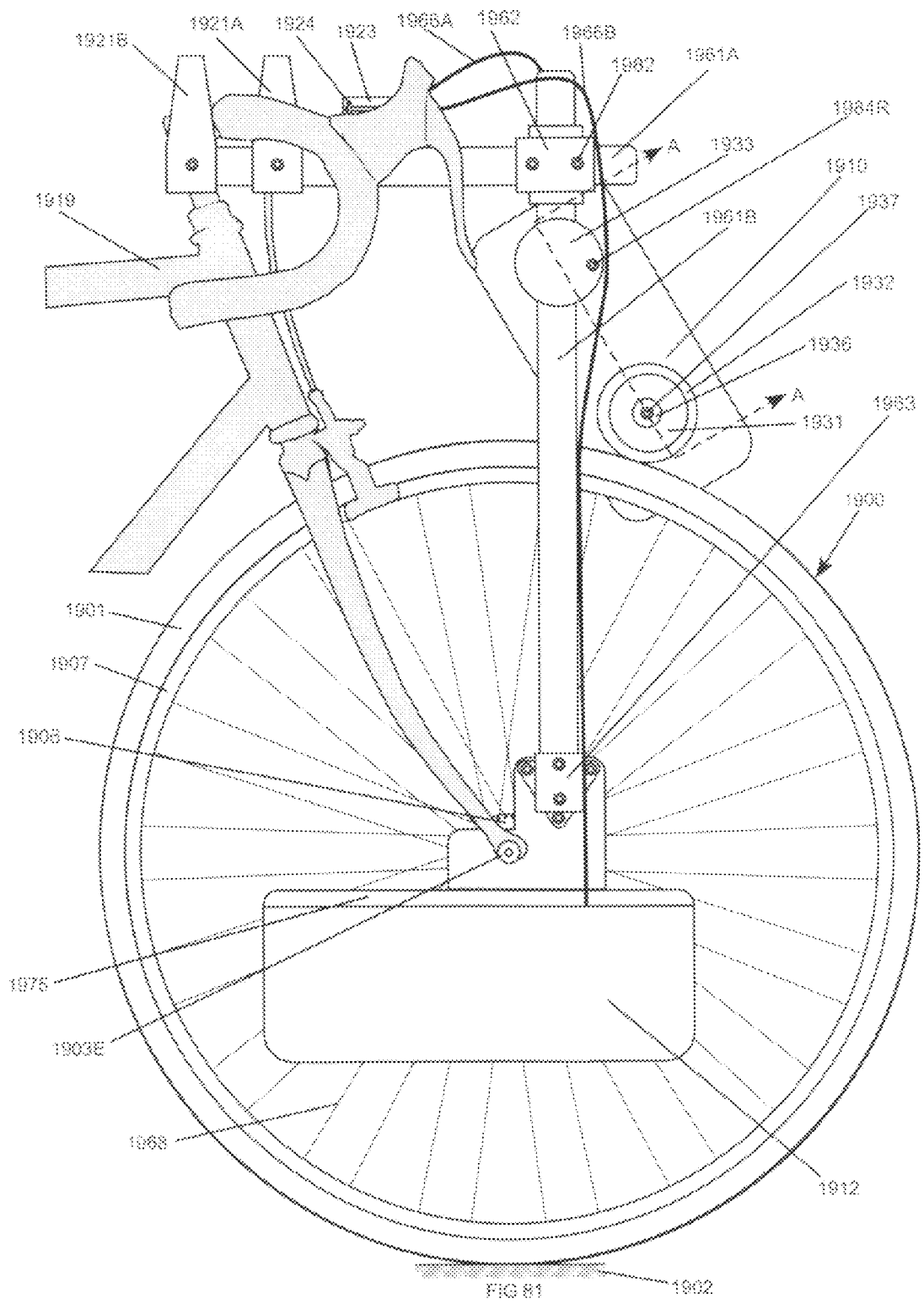
Figure 82:
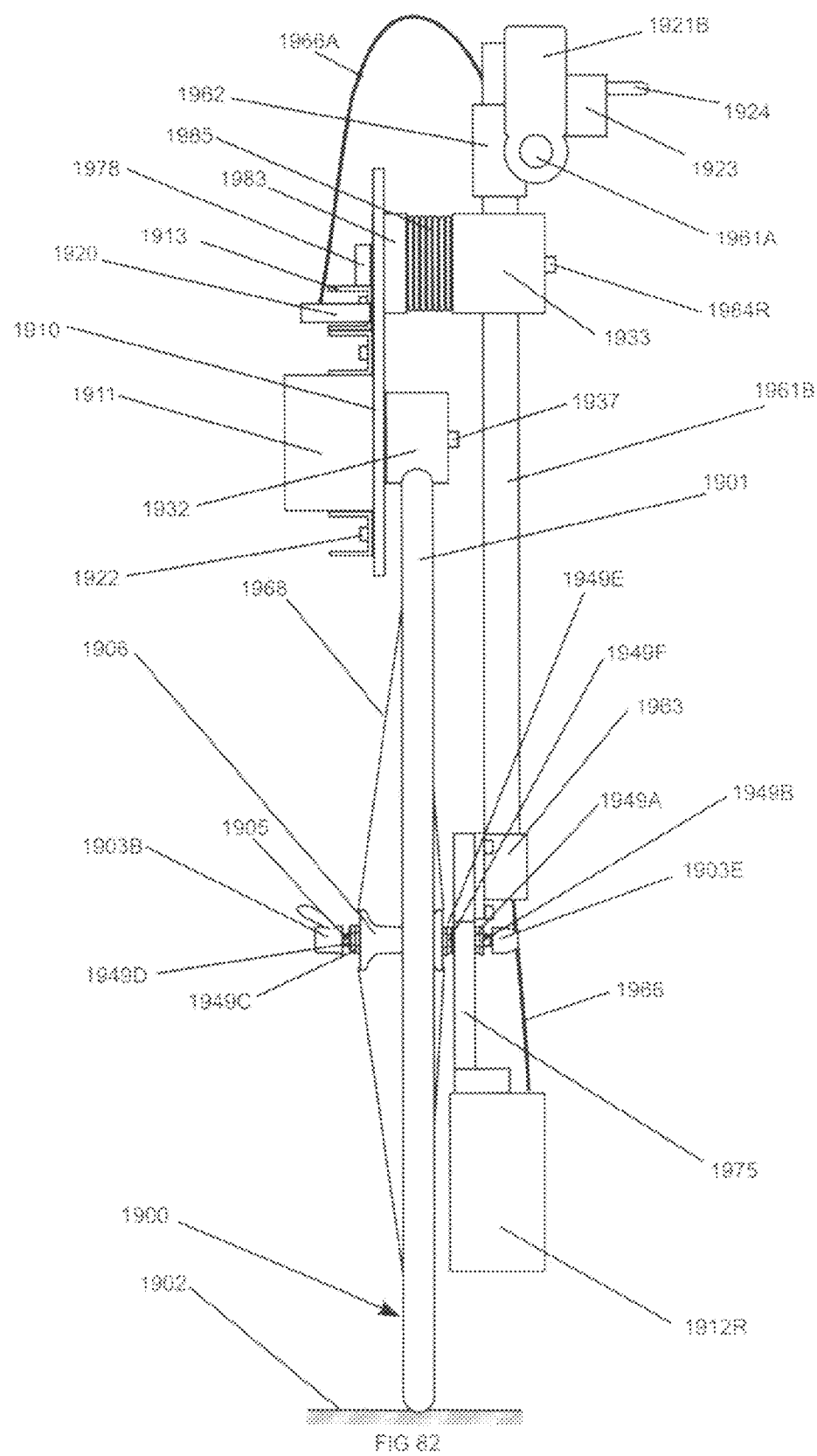
Figure 83:
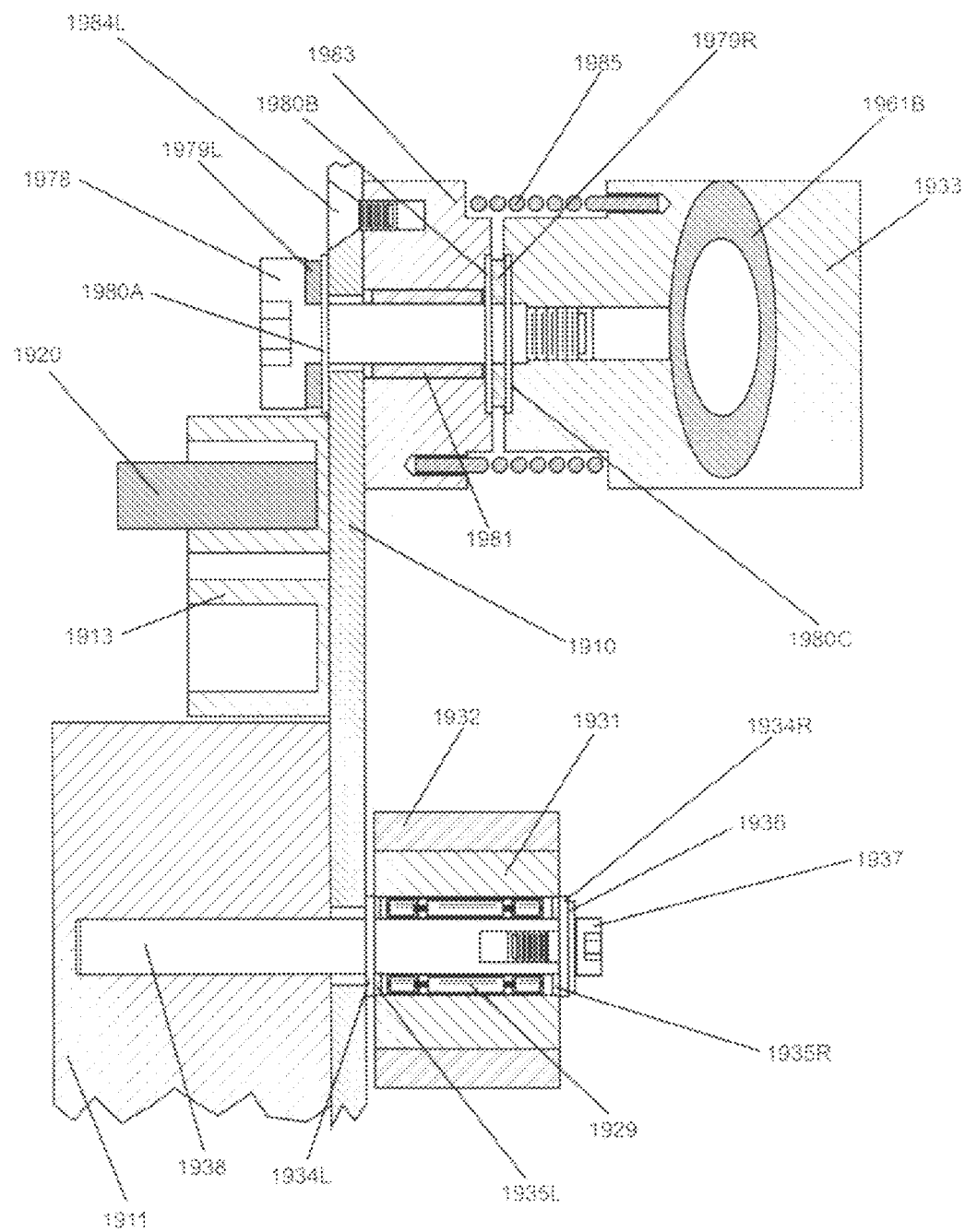

A nineteenth exemplary version is illustrated in FIGS. 81-83, wherein:

FIG. 81 is an external view of the right side of a front wheel for a standard bicycle;

FIG. 82 is an external view of the end of the wheel of FIG. 81;

FIG. 83 is a removed sectional view A-A, showing the drive components of the wheel of FIG. 81.

Figure 84:
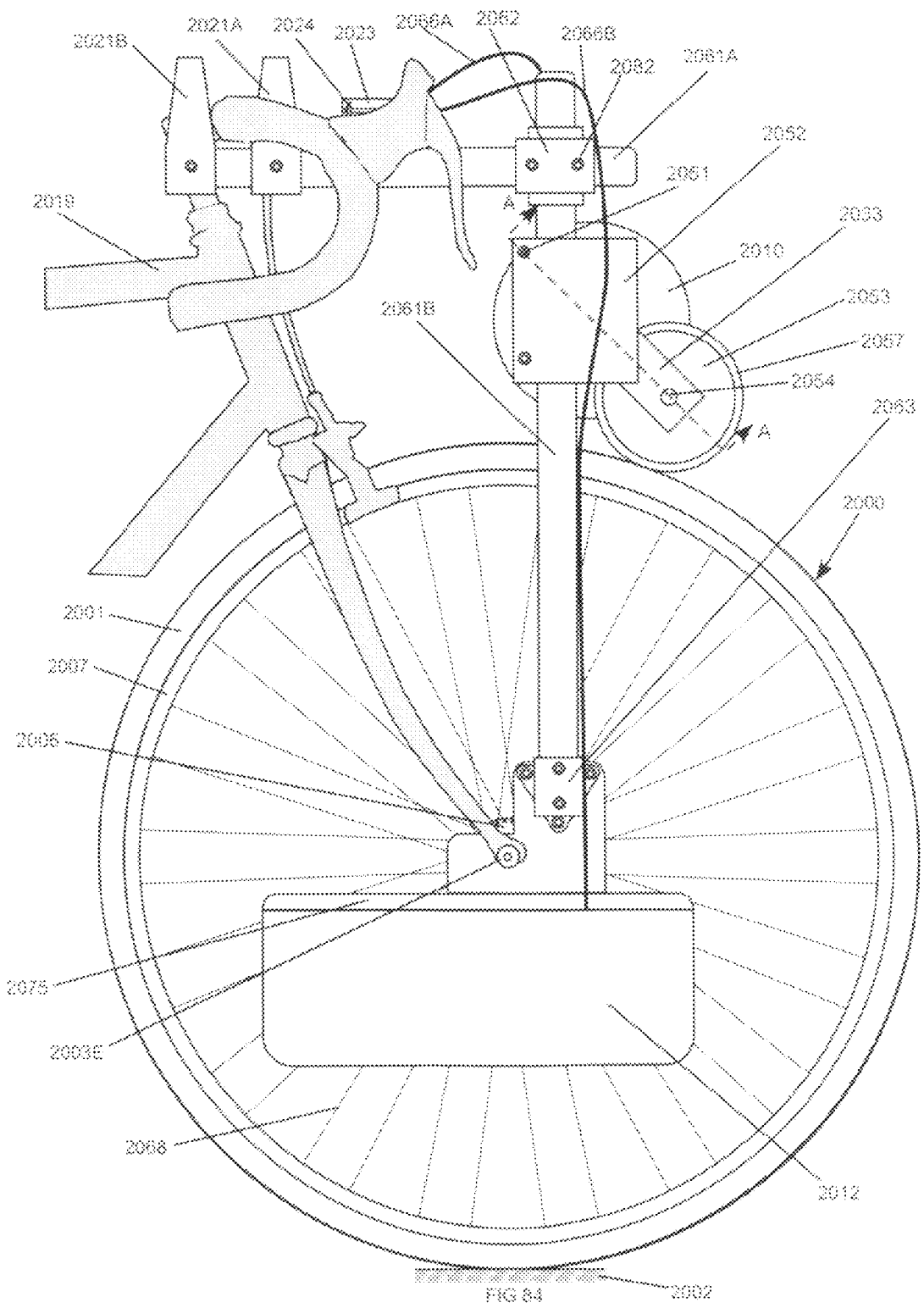
Figure 85:
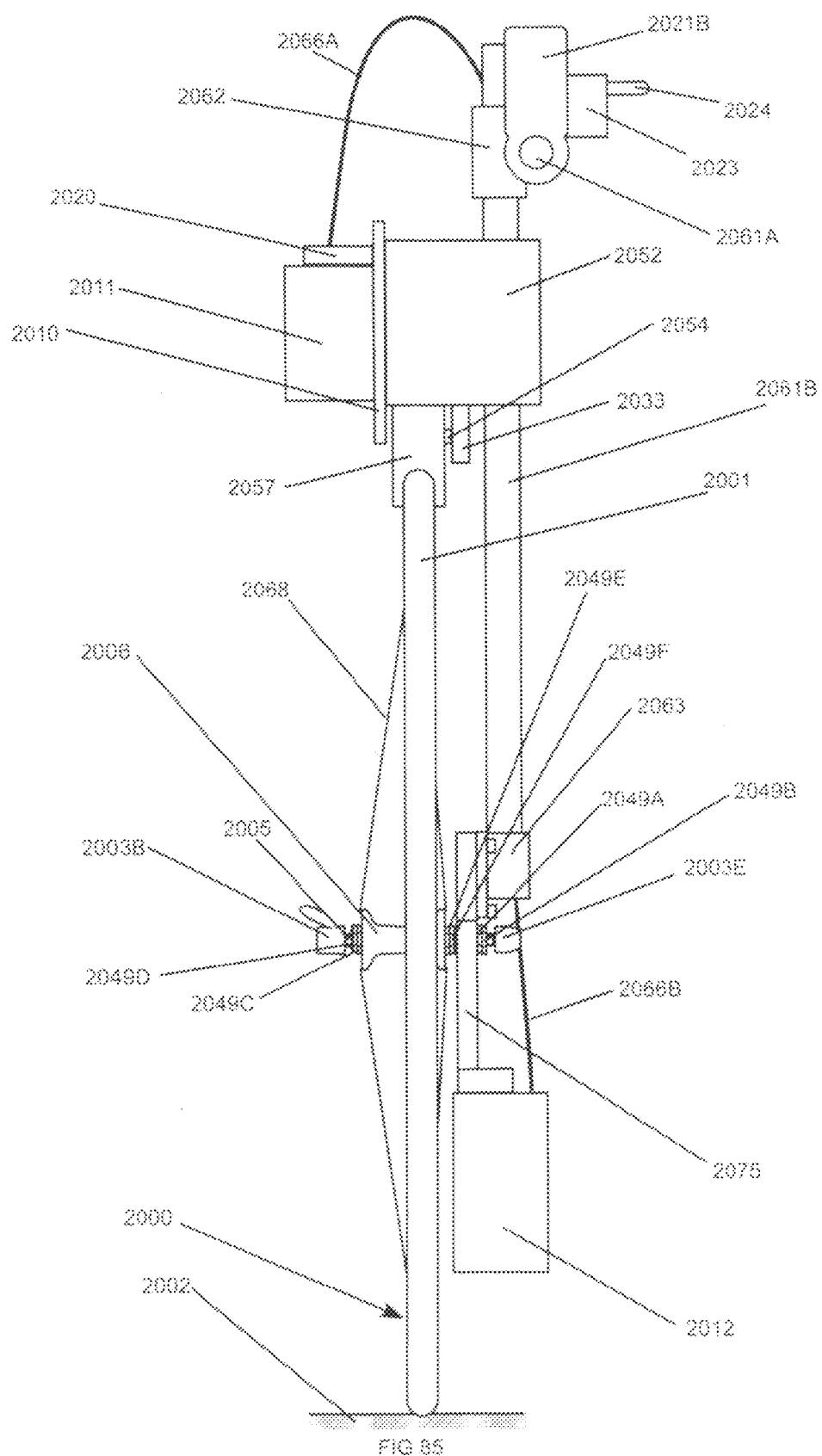
Figure 86:
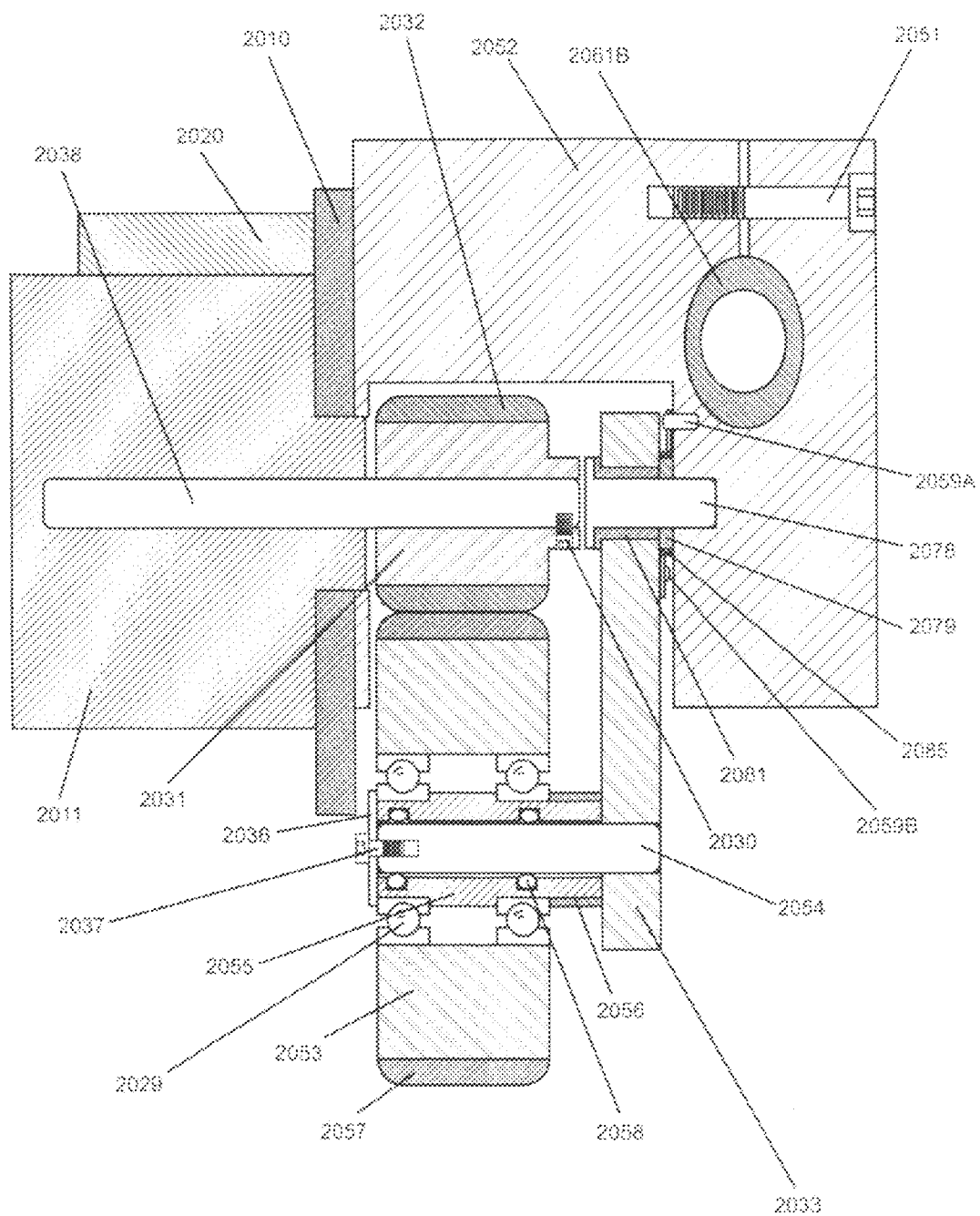

A twentieth exemplary version is illustrated in FIGS. 84-86, wherein:

FIG. 84 is an external view of the right side of a front wheel for a standard bicycle;

FIG. 85 is an external view of the end of the wheel of FIG. 84;

FIG. 86 is a removed sectional view A-A, showing the drive components of the wheel of FIG. 84.

Figure 87:
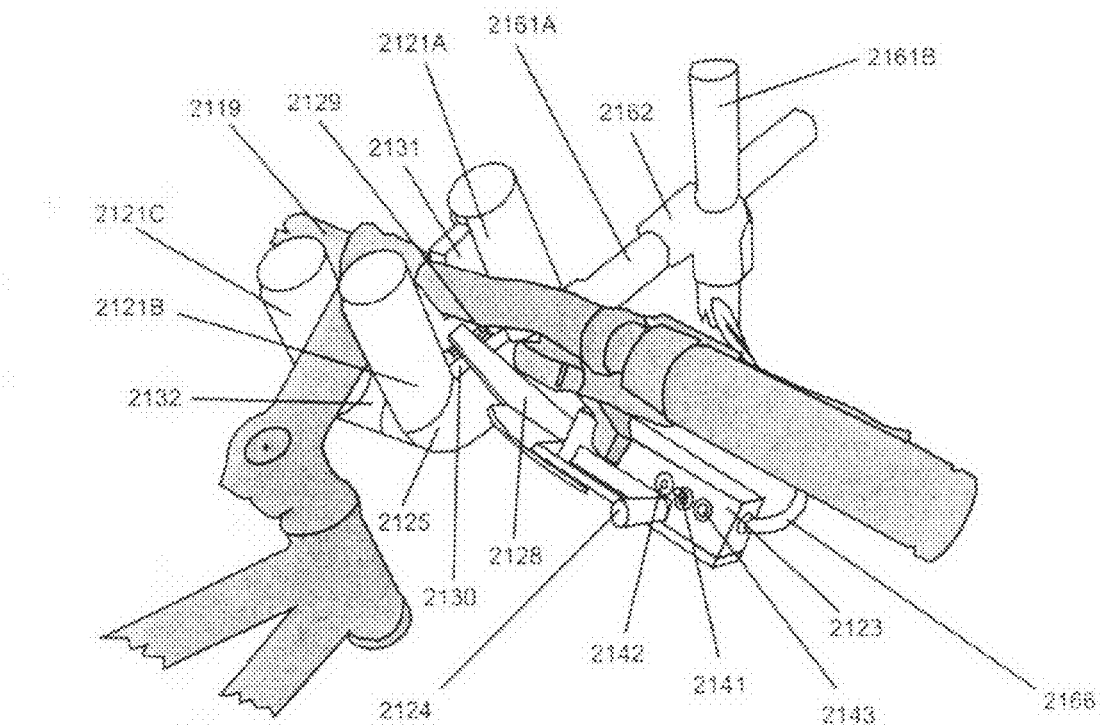
Figure 88:
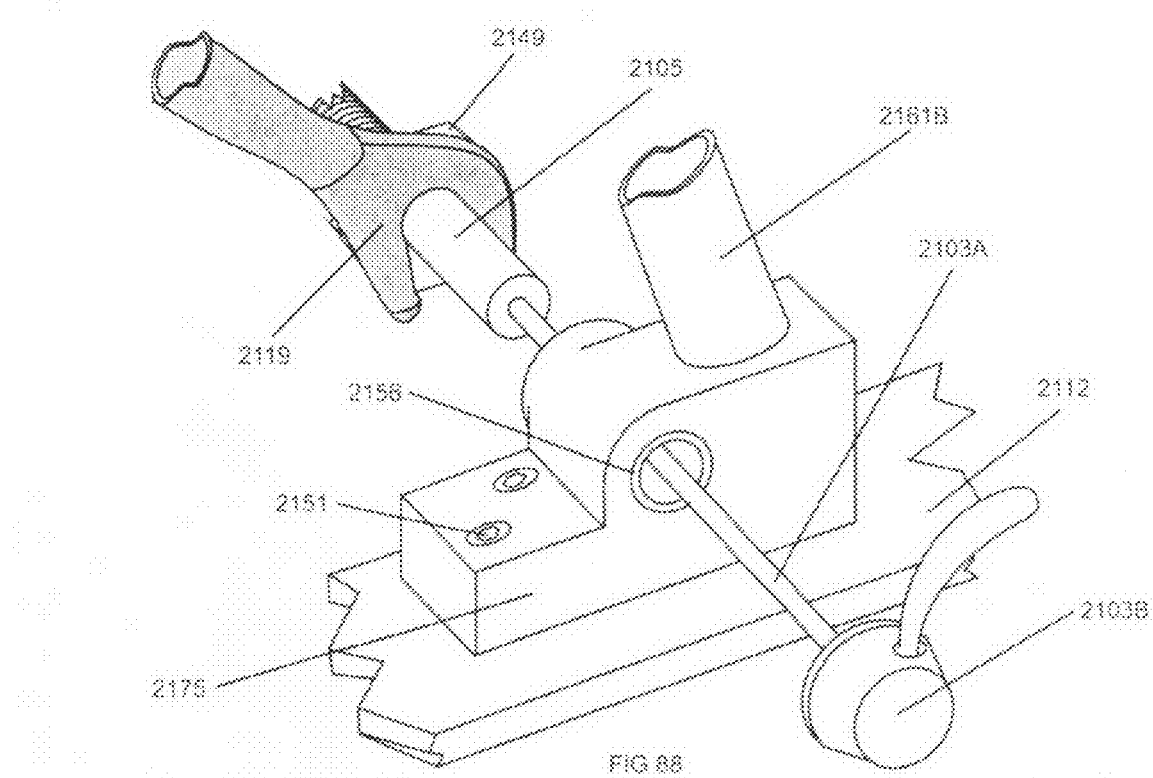

A twenty first exemplary version is illustrated in FIG. 87-88, wherein:

FIG. 87 is an external view of an alternate mounting and control arrangement, that is applicable to all versions described in the attached material;

FIG. 88 is an external of an alternate hub battery support arrangement, which is applicable to the nineteenth and twentieth versions.

DETAILED DESCRIPTION OF PREFERRED VERSIONS OF THE INVENTION

To illustrate the invention and the various forms that it may take, following is a description of several exemplary versions of the invention, which will be described with reference to the accompanying drawings.

First Exemplary Version of the Invention (FIGS. 1-10)

Figure 1:
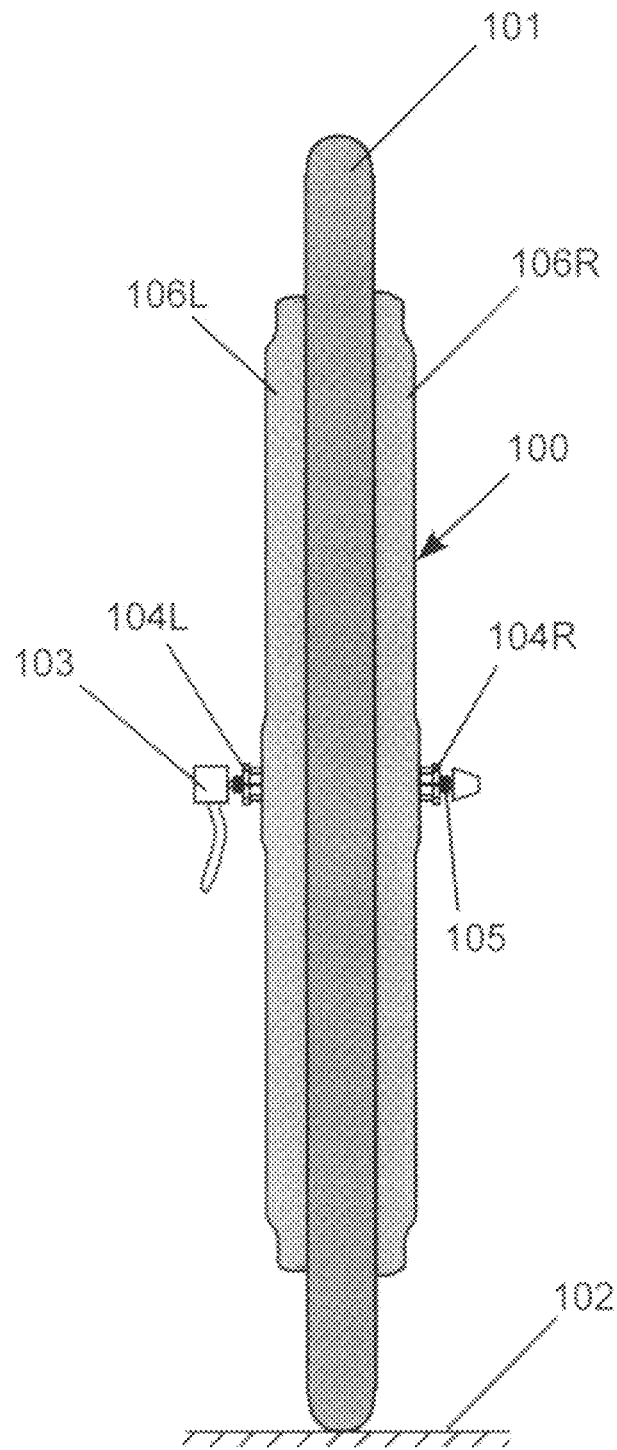
FIG. 1 is an external view of the end of a front wheel for a standard bicycle.

FIG. 1 shows an end view of a wheel 100 specifically configured for use with a bicycle. The wheel 100 includes a tire 101, which contacts the pavement 102 during normal use. The tire 101 may be a standard 26×1.5 inch tire in this version. The wheel preferably attaches to the bicycle with a quick release assembly 103, such as is found on many bicycles currently sold. The quick release assembly 103 functions in the usual way, such that compression between the quick release assembly 103 and a left bearing cone locknut 104L and a right bearing cone locknut 104R rigidly attaches the wheel 100 to a standard bicycle, with an axle 105 fitting into a bicycle fork dropout. A left external support member 106L and a right external support member 106R define the boundary of much of the wheel in this view. The space between the left external support 106L and the right external support 106R is narrow enough to fit the bicycle without modification. The left external support 106L and the right external support 106R are preferably formed of aluminum, but could be molded, cast, spun, or machined from metal, composites, or other materials.

Figure 2:
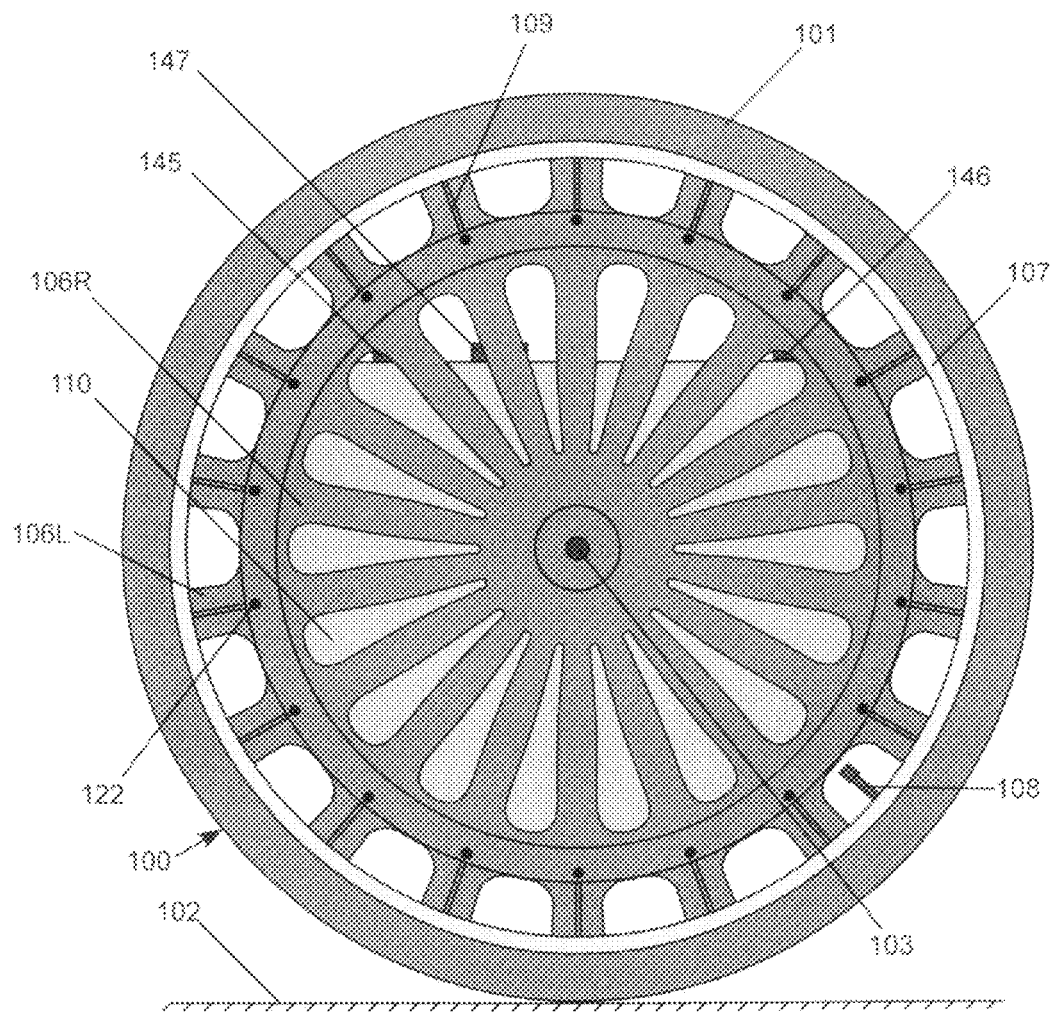
FIG. 2 is an external view of the right side of the wheel of FIG. 1.

FIG. 2 shows a right side view of the wheel 100. The tire 101 is attached to a rim 107 in standard fashion. Inside the tire 101 is a tube, indicated by a tube stem 108; alternatively, the tire 101 could be tubeless. The rim 107 is preferably formed of an aluminum alloy, but could be fabricated from a high strength plastic. The rim 107 is attached to the left external support 106L. The left external support 106L is actually larger diameter than the right external support 106R, as will be more apparent in FIG. 4. The left external support 106L includes several external support ribs 109, which strengthen the mechanical attachment between the rim 107 and the interior of the wheel 100. An internal support member 110, which does not rotate with the tire 101, can be seen in this view through ventilation voids in the right external support 106R. The internal support 110 supports the active elements of the wheel 100 which provide propulsion, and it (and the axle 105 to which it is affixed) remains in the illustrated position while the tire 101 and external supports 106R and 106L rotate. The spokes in the right external support 106R are twisted slightly to promote airflow around the internal support 110, which also serves as a heat sink. Several external support bolts 122 attach the left external support 106L and the right external support 106R to a common element, as will be shown in FIG. 4.

Figure 3:
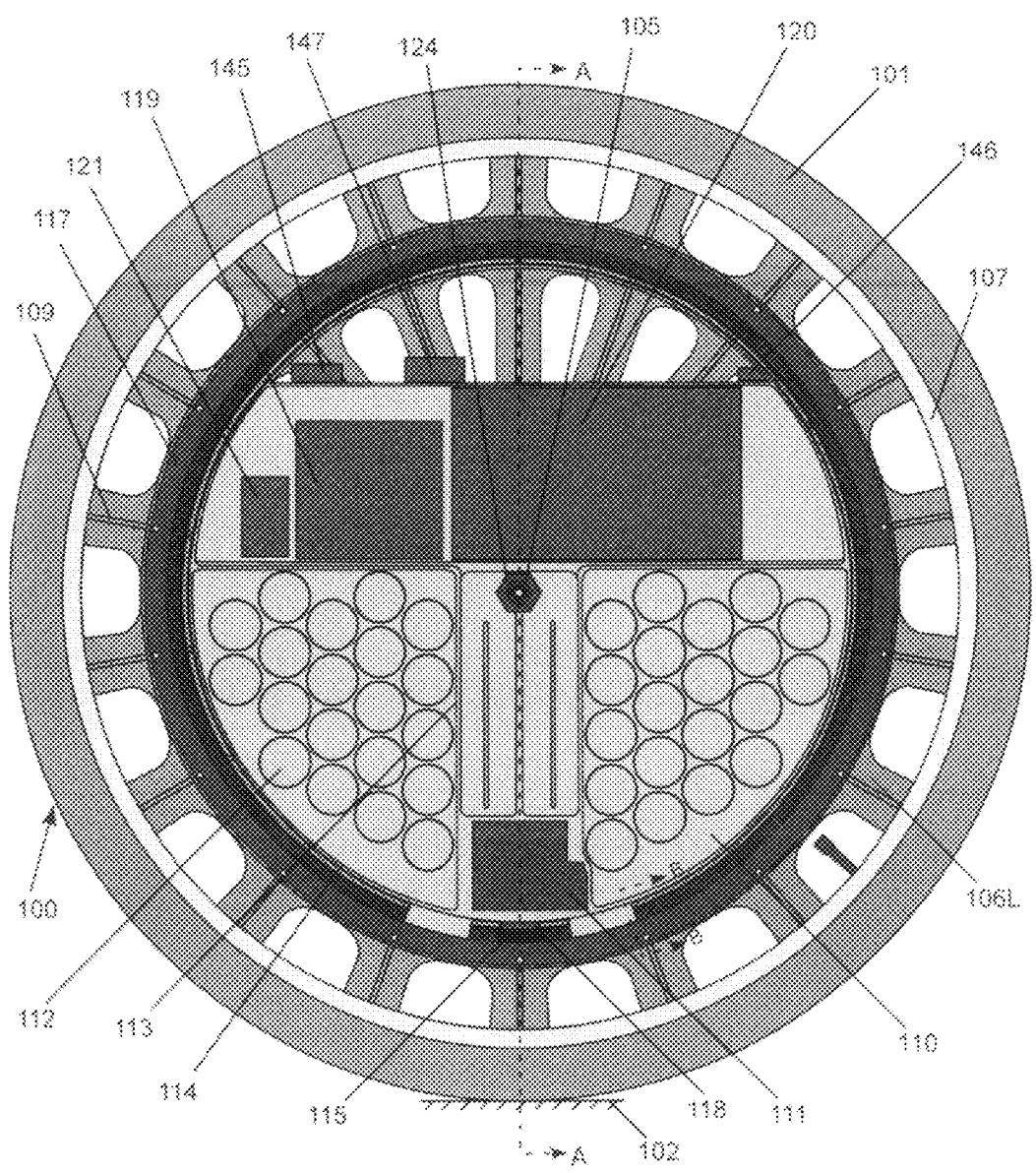
FIG. 3 is a view of the right side of the wheel of FIG. 1, with the right spoke assembly, electronics covers, and right bearings removed.

FIG. 3 is a right side view of the wheel 100, with the right external support 106R, electronics covers, and bearings removed to show internal details. The axle 105 is secured to the internal support 110 with an axle nut 124. The internal support 110 supports a drive motor 111 and one or more batteries 112 (here depicted as forty rechargeable D-size cells, which provide 48 total Volts and total capacity of nine Amp-hours). The drive motor 111 is preferably a compact NdBFe permanent magnet motor capable of providing 220 Watts of continuous output power, at about 88% system efficiency at 3500 rpm. An exemplary suitable motor 111 is the #TG3600-120 brushless motor manufactured by G&G Technology, Inc. (Santa Barbara, Calif., USA). The internal support 110 has sufficient stiffness and strength to support the batteries 112 and the drive motor 111, and may be made of cast aluminum. The internal support 110 includes several internal support ribs 113, which strengthen the internal support 110, serve as cooling fins, and divide the internal support 110 into separate compartments. These components can be made water resistant when fitted with covers and gaskets. The internal support 110 also includes an internal support drum 114, which encircles internal support 110, further strengthening the internal support 110.

Figure 4:
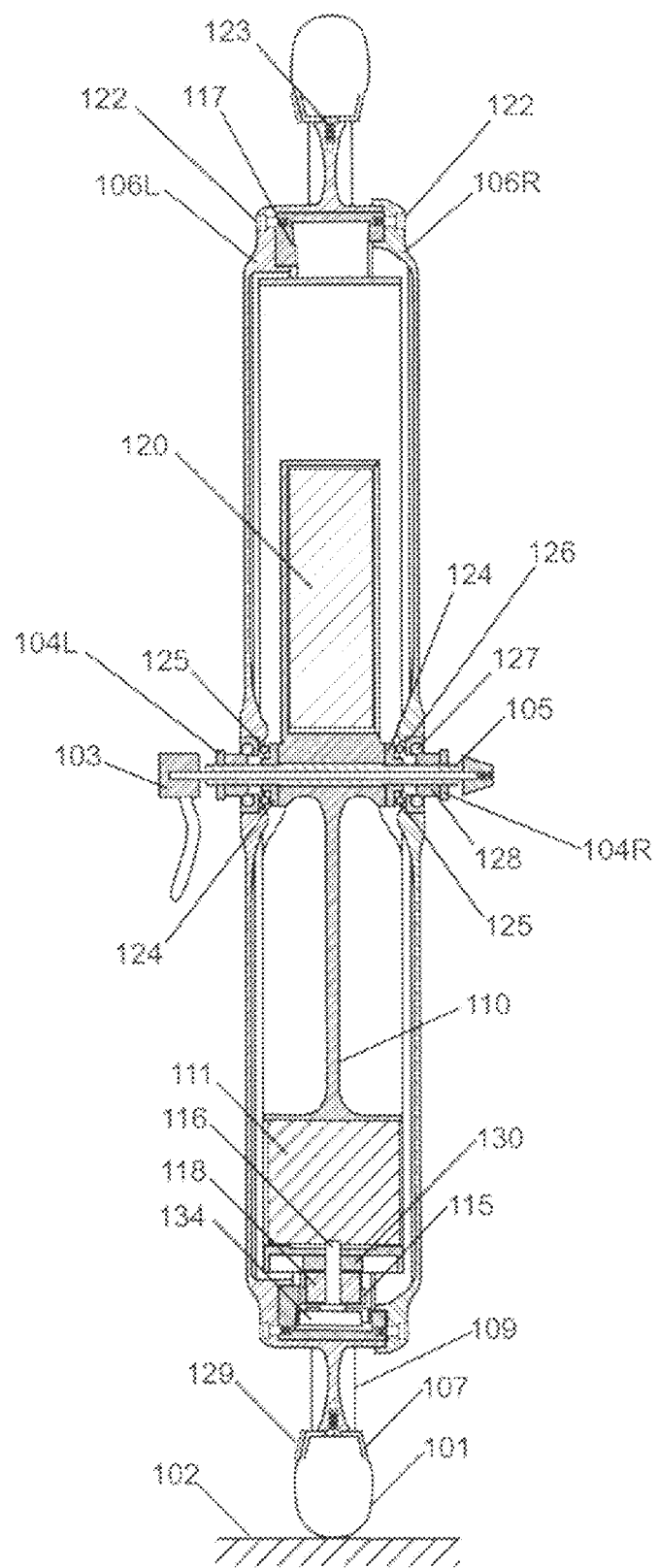
FIG. 4 is a cross-sectional view A-A of the wheel of FIG. 3.

Rotational energy is transmitted from the drive motor 111 to the tire 101 through a pinion gear 115, as will be detailed in FIG. 4. The gear ratio between the pinion gear 115 and the bevel gear 117 is chosen for optimum motor efficiency in powering a bicycle at the 10 to 20 mile per hour speed range on level pavement, which requires approximately 200 watts. If the aforementioned exemplary drive motor 111 is used (which provides about 220 watts of output power at maximum efficiency at about 3500 rpm), the gear ratio is preferably chosen to move the surface of the tire 101 at 16 miles per hour with a 3500 rpm motor speed. The pinion gear 115 is coupled to the drive motor 111 through a freewheel 118, such that the tire 101 will turn without rotating the rotor of the drive motor 111 if the drive motor 111 is unpowered. The freewheel 118 thus enables the rider to pedal with no resistance from the drive motor 111 if the bicycle is traveling too slowly or quickly for the drive motor 111 to be of assistance, or if the drive motor 111 is disabled.

FIG. 4 is a cross-sectional view AA of FIG. 3. Several external support bolts 122 attach the left external support 106L and right external support 106R to the bevel gear 117. Several rim bolts 123 attach the rim 107 to the left external support 106L. An axle 105 is secured to the internal support 110 with an axle nut 124. The outer face of the axle nut 124 contains a polished race for a caged thrust bearing assembly 125. The caged thrust bearing assembly 125 also contacts a hub bearing cup 126, which supports several hub bearings 127. The hub bearings 127 are constrained between the hub bearing cup 126 and a hub bearing cone 128, and function in a manner similar to that of a conventional bicycle wheel. The caged thrust bearing assembly 125 is useful because there is no rotating central axle or other support, as in a conventional hub. The left hub bearings are identical to the right, and each side is held together by locking the cone with a corresponding bearing cone locknut 104L or 104R.

The drive motor 111 transmits rotational energy along a motor shaft 116 to the pinion gear 115. The pinion gear 115 is beveled toward the point of intersection of the axis of the motor shaft 116 with the major wheel axis. This bevel angle matches that of a bevel gear 117, which is driven by the pinion gear 115. A support roller 134 (here an outer bearing sleeve) contacts smooth walls of a groove in the bevel gear 117, to keep the wheel running true, for efficient power transmission, as will be shown in FIG. 5. Given the proper material and manufacturing technique, it may be possible to combine the left external support 106L, the bevel gear 117, and the rim 107 into a single part, which could be cast or molded from plastic or metal.

Figure 5:
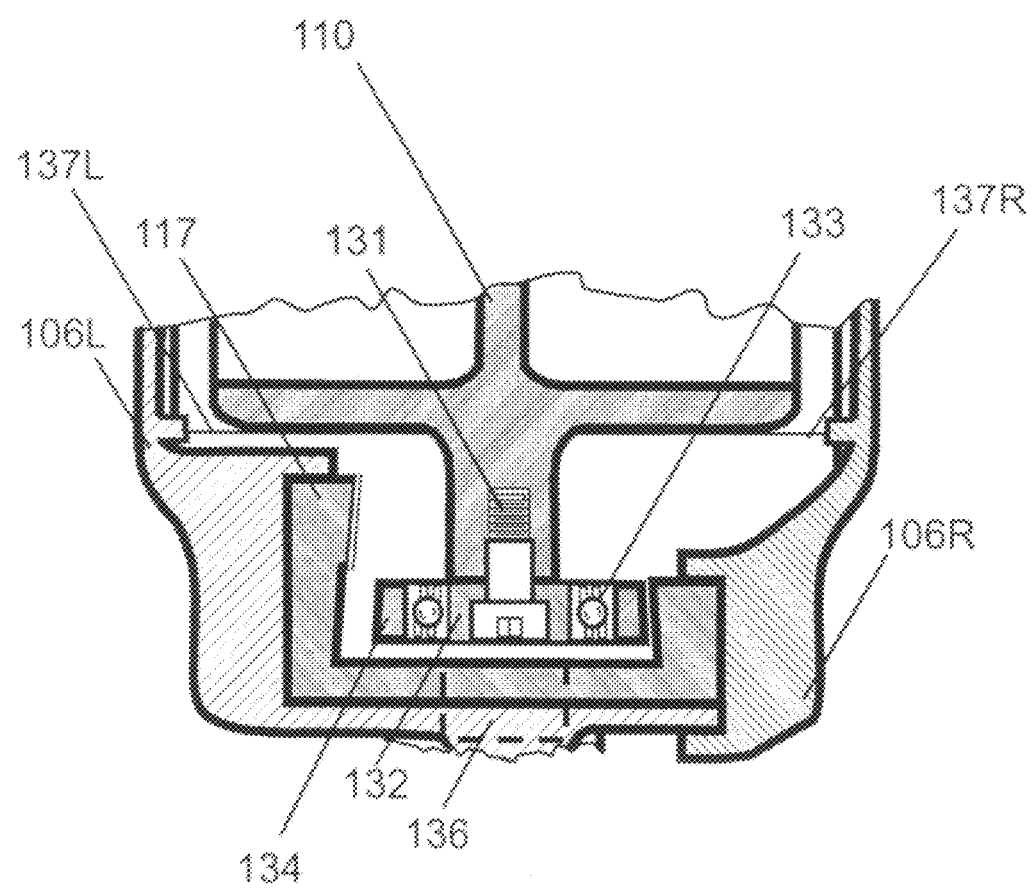
FIG. 5 is a removed cross-sectional view B-B of FIG. 3.

FIG. 5 shows the removed cross-sectional view BB of FIG. 3. A shoulder bolt 131 accurately attaches a bearing spindle 132 to the internal support 110. The bearing spindle 132 is press fit to hold a set of truing bearings 133 which rotationally bear the support roller 134. Suitable truing bearings 133 are the #6680K11 bearings from McMaster-Carr (Chicago, Ill., USA). Roller or plain bearings could also be used here, and may be preferred, provided they would withstand both the axial and radial stresses in operation. The outer diameter of the truing bearings 133 is press fit into the support roller 134. The outer cylindrical surface of the support roller 134 is beveled toward the intersection of the axis of the bearing spindle 132 with the major axis of the wheel 100, as defined by the center of the axle 105. A right beveled slot wall in the bevel gear 117 is beveled at the same angle as the support roller 134, and is normally about 0.01 inches from the support roller 134. During a left turn, however, the external support twists slightly, bringing the right beveled slot wall in the bevel gear 117 in contact with the support roller 134. Referring back to FIG. 4, another support roller (again provided as an outer bearing sleeve) 134 can be seen which will come into contact with a left beveled slot wall in the bevel gear 117 during a right turn. Another pair of truing bearings 133 are located on the other side of the pinion gear 115. Acting together, these four truing bearings 133 and the support rollers 134 use the stiff, non-rotating internal support 110 to keep the bevel gear 117 spinning true, and the pinion gear 115 efficiently engaged. Alternatively, the truing bearings 133 may be lightly preloaded to have the support rollers 134 maintain contact with the beveled slot walls at all times. Additional truing bearings 133 and support rollers 134 may be added if desired to reduce wheel shimmy at high speeds. An access hole 136 is bored through the left external support 106L and the bevel gear 117 so that the shoulder bolt 131 can be inserted and tightened during assembly. A cylindrical dust shield 137L,R prevents dust from entering the region near the bevel gear 117.

Alternative means of power transmission that are more tolerant of wheel trueness could be used instead of (or in addition to) the pinion gear 115. For example, a spur gear in contact with teeth cut on the interior diameter of bevel gear 117, with such teeth pointing towards the axle 105, would be less affected by variations in the axial position of the bevel gear 117. This would require the addition of another set of gears to couple to the drive motor 111.

It is assumed that the left external support 106L and the right external support 106R are strong enough to prevent buckling and significant changes in the radial distance of the bevel gear 117 from the non-rotating parts of the wheel during use and minor collisions. However, the addition of another set of bearings in the vicinity of the bottom and front of the wheel 100, and having an axis parallel to the major wheel axis (the axle 105), would help prevent the left external support 106L and the right external support 106R from experiencing such deformation. These bearings could be supported by the internal support 110, and would contact the bottom of the slot in the bevel gear 117 if there is a radial (out of round) distortion.

Figure 6:
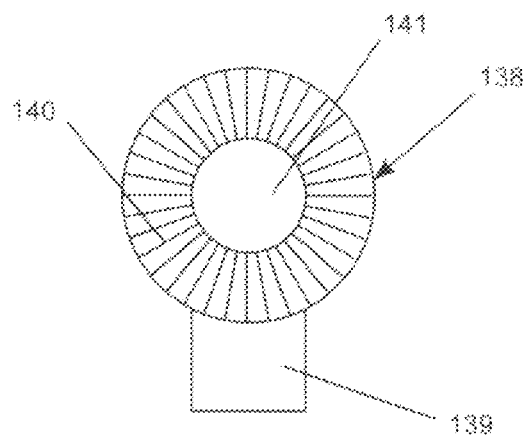
FIG. 6 is a side view of a serrated, lobed anti-rotation washer for a wheel similar to that of FIG. 1.

It is thus seen that the tire 101 (and its external supports 106L, 106R) are rotationally driven by the drive motor 111 and its pinion gear 115 on the stationary internal support 110, which is held fixed to the bicycle by the stationary axle 105. Thus, the wheel 100 may be simply installed as a unit within a standard bicycle by affixing the axle 105 within the dropouts of a bicycle fork. Since high torque from the wheel 100 may cause the wheel 100 to rotate within the fork dropouts, modifications can be made to the above-described wheel to better prevent such rotation. To illustrate, FIG. 6 is a side view of a serrated, lobed anti-rotation washer for a wheel similar to that of FIG. 1. A left anti-rotation washer 138 is designed to prevent the internal support 110 from rotating in the direction opposite the wheel 100 rotation when the drive motor 111 is engaged. Pressure from the quick release assembly 102 alone may be insufficient to prevent such rotation, so a dropout tang 139 fits into the bicycle fork dropout. Several serrations 140 engage matching serrations cut into the left bearing cone locknut 104L. A through hole 141 allows the axle 105 to pass through.

Figure 7:
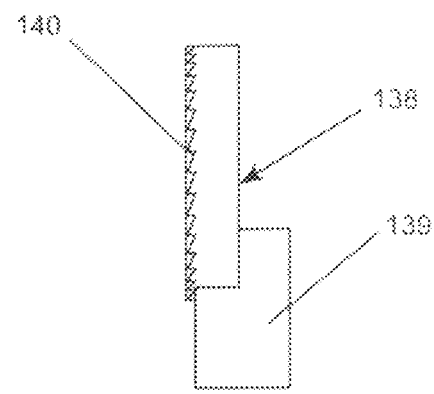
FIG. 7 is an edge view of a serrated, lobed anti-rotation washer for a wheel similar to that of FIG. 1.

Another modification is depicted in FIG. 7, which provides an edge view of a serrated, lobed anti-rotation washer for a wheel similar to that of FIG. 1. The serrations 140 are cut for maximum strength in preventing clockwise rotation. A similar part for the right side of the wheel 100 has the serrations 140 cut in the opposite direction to prevent counterclockwise rotation. Alternatively, the serrations 140 could be complimentary dimples and protrusions, or ridges and slots, cut into the left anti-rotation washer 138 and the left bearing cone locknut 104L.

Figure 8:
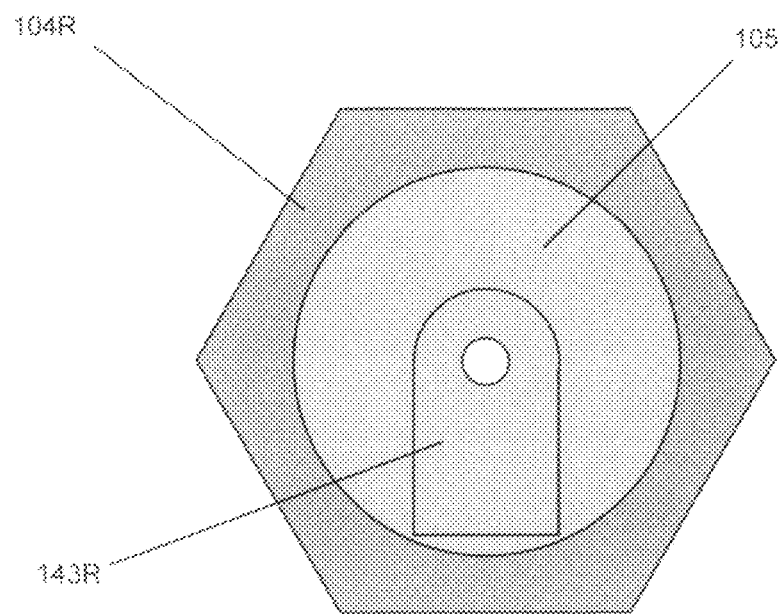
FIG. 8 is a side view of an alternate modification to prevent rotation of the internal support member.

FIG. 8 is a side view of another modification to prevent rotation of the internal support 110. The bearing cone locknut 104R is enlarged so that its inner threaded diameter is about twice as large as the height of the slot in the bicycle fork dropout. Note that other hub bearing components must be similarly enlarged to thread onto the enlarged axle 105. A dropout tang 143R is an axial extension of the axle 105.

To activate the drive motor 111 and drive the wheel 100, control wiring could extend from the wheel to controls situated on the bicycle handlebars or elsewhere (as will be discussed with respect to other versions of the invention described elsewhere in this document); however, a particularly preferred control arrangement is to provide all controls within the wheel 100 itself, so that installation of the wheel 100 within a bicycle is completed upon fitting the wheel 100 within the bicycle fork. An example of such an arrangement follows.

Referring back to FIG. 3, control of the drive motor 111 is preferably accomplished through a microcontroller 119. The microcontroller 119 may be a model #3500 single board computer, manufactured by Z world (Davis, Calif., USA) for real time operation in embedded system applications. Many similar products are available which could substitute for this microcontroller. A motor torque control voltage is sent from the microcontroller 119 to a PWM motor driver 120, which sends pulsed electrical energy from the batteries 112 to the drive motor 111 to maintain a given output torque. A suitable PWM motor driver 120 is a #B30A8 driver available from Advanced Motion Controls (Camarillo, Calif., USA). An interface board 121 contains the analog and digital circuit elements which are not found on the microcontroller 119, but which are required for operation of the system in the manner specified in the block diagram of FIG. 10 (discussed below).

A brake sensor strip 129 (FIG. 4) may be attached to the rim 107 for providing commands to the microcontroller 119 while the bicycle is in motion. A freewheel tachometer 130 may be attached to the internal support 110 adjacent the freewheel 118 for speed measurement. Note that the bicycle speed is measured by observing the angular velocity of the freewheel 118, which is attached to the pinion gear 115. The freewheel tachometer 130 can be of either optical or magnetic (Hall effect) design, with a reflective spot or magnet attached to the adjacent rotating freewheel 118.

Figure 9:
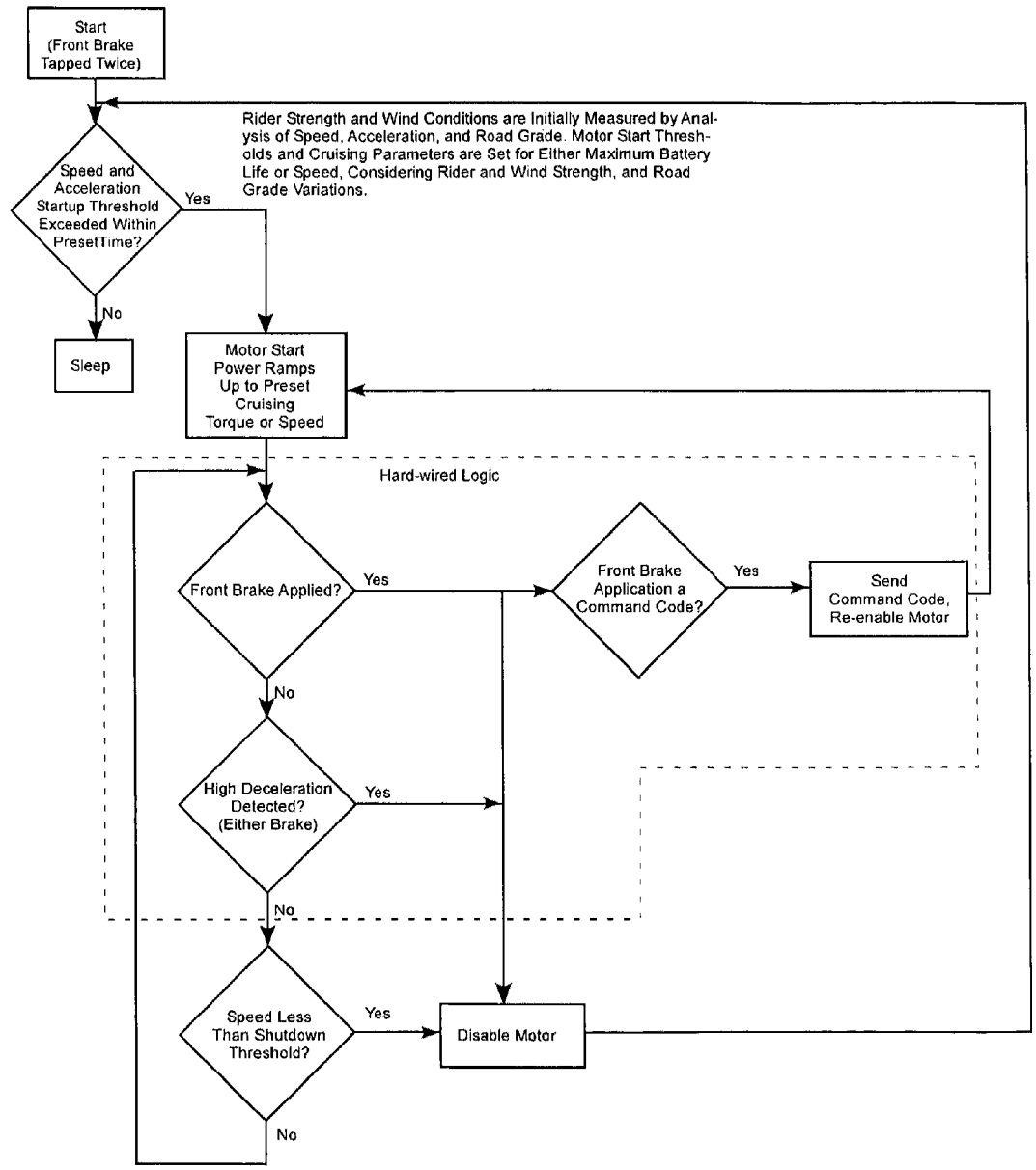
FIG. 9 is a flow chart for control of the wheel of FIG. 1.

FIG. 9 shows the overall operation of the wheel 100 from a systems viewpoint. The control system is normally in a sleep mode, with power removed from all circuitry except that required to detect a "wake" command which activates power to the system. A suitable signal, e.g., tapping the front brake twice, may be interpreted by as a "wake" command. This prevents power from being applied to the drive motor 111 unless the means for disabling it are working.

The efficiency of the drive motor 111 varies with rotation rate and torque. Battery life is maximized if the motor provides assistance only in a certain speed range. Some riders may not be concerned with maximizing battery life, and can specify this with the user preference switch on the user interface 145 (FIG. 2), which also includes a battery charging jack. In this case, the motor will provide maximum assistance over the widest possible speed and torque ranges, as preset using the rated capabilities of the drive motor 111. The motor engages after the bicycle exceeds a minimal preset speed and acceleration, provided this occurs within 30 seconds of tapping the front brake twice. Subsequently, output power gradually ramps up to the maximum.

It is anticipated that most riders will have at least some interest in maximizing battery life. Several factors are assigned various weights to influence motor operation thresholds by the control software. These factors include rider strength, wind conditions, road grade, and the rider's willingness to maintain a microcontroller-specified effort in pedaling. During the beginning of a ride, and after each stop exceeding 30 seconds, the microcontroller 119 obtains determines how to assist the rider based partially on the rider's strength and wind conditions. The net work done by these forces during the first 30 seconds (or other time set by user preference) is determined by measuring the speed, acceleration, and road grade. Using the rider work measurement, and the efficiency profile of the drive motor 111, the microcontroller 119 will set a torque and speed range over which the drive motor 111 will receive power. Also considered in the determination of this range is the user's preset economy request; the rider who isn't interested in a long trip can expect an assist over a wider speed and torque range. The rider who needs to travel as far as the battery will allow will operate in economy mode, and be prompted for assistance when the motor is not operating at highest efficiency. The rider looking to travel as quickly as possible will receive assistance at higher speeds. The rider who dislikes pedaling uphill will receive greater assist when the road grade sensor 193 detects a hill. There is a continuum of choice in the setup parameters for various levels of economy, with up to 256 distinct setup options selectable by the user preference switch on the user interface 145.

An increase in road grade will temporarily lower the motor start thresholds. On level pavement, both speed and acceleration thresholds must be surpassed within the performance evaluation period, or the system goes back into sleep mode. When motor start thresholds are exceeded, power to the drive motor 111 gradually ramps up until optimum cruising speed and torque is attained. In an economy mode, the microcontroller 119 will request assistance from the rider if required to maintain this optimum speed. Cruising torque can be changed by cyclist while riding by sending an appropriate code through the front brake. This feature is especially useful when traveling with others. When the rider slows below a shutdown threshold, the motor is disabled until the rider accelerates to exceed startup parameters, if completed within the preset evaluation time. The motor is disabled when the bicycle travels down a steep hill, or is otherwise traveling at greater than 20 miles per hour.

Figure 10:
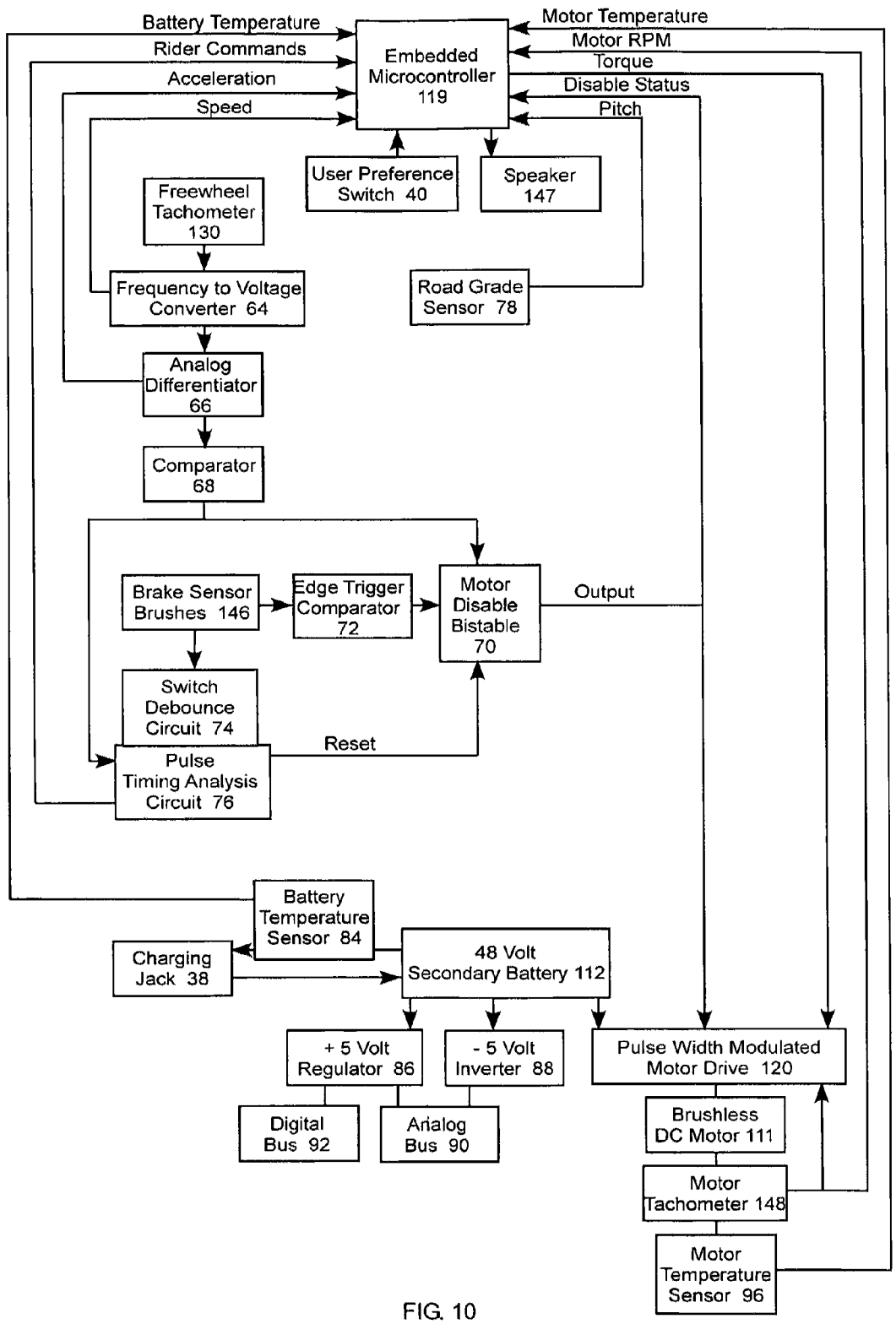

FIG. 10 shows the electronics associated with the wheel 100 in block diagram form. The microcontroller 119 includes analog and digital input and output capabilities. The microcontroller 119 receives setup information about the system from a user preference switch 40, located on the user interface 145. The user preference switch 40 is an 8 position water resistant dip switch, providing 256 combinations of setup parameters. These setup parameters are configured by the rider when the wheel 100 is stationary. Rider commands are sent to the microcontroller 119 while the bicycle is in motion through a pair of front brake pickup brushes 146, which are electrically connected to the rim 107 and a brake sensor strip 129. The brake sensor strip 129, shown in FIG. 4, is electrically insulated from the rim 107. Conductive brake pads electrically connect the brake sensor strip 129 and the rim 107 when brakes are applied. The brake sensor strip 129 is connected through an element of the front brake pickup brushes 146 to an edge trigger comparator 72, and, with appropriate current limitation, to +5 volts on an analog bus 90. The rim 107 is connected through the other element of the front brake pickup brushes 146 to the electrical system ground. When the rider applies the front brake, the input voltage to the edge trigger comparator 72 drops from +5 volts to zero. The transition of the output of edge trigger comparator 72 causes a motor disable bistable 70 to output a signal to the PWM motor driver 120 that will disable the drive motor 111. The motor disable bistable 70 also sends this information to the microcontroller 119. Note that the microcontroller 119 cannot override a motor disable command sent by the rider via the brake system, so that motor disable is independent of software loaded onto the microcontroller 119.

Application of either the front or rear brake can slow the bicycle, whether the drive motor 111 is operating or not. Deceleration is detected and used to disable the drive motor 111, providing a redundant brake sensing means, which is useful if the front brake is somehow damaged. The freewheel tachometer 130 output is a stream of pulses, with a frequency proportional to the speed of the wheel 100. A frequency to voltage converter 64 converts this frequency to an analog voltage, which is differentiated with respect to time by an analog differentiator 66. The output of the analog differentiator 66 is a voltage proportional to the acceleration of the wheel 100. A comparator 68 changes state when the acceleration exceeds a certain negative threshold value. The output of the comparator 68 is used to edge trigger the motor disable bistable 70, resulting in the drive motor 111 being disabled if the bicycle deceleration exceeds the threshold set in the comparator 68.

Front brakes send rider commands to the microcontroller 119 when the rider taps the brakes, creating electrical pulses. A switch debounce circuit 74 prevents very short pulses, on the order of micro to milliseconds in duration, from being interpreted as command codes. (Such short duration transition pulses occur during the actuation of most mechanical switches, and are referred to as switch "bounce.") An open circuit condition must exist for at least 100 ms to be interpreted as a command pulse end. Continuity maintained for between 100 ms and one second is interpreted as a tap. An open circuit condition must exist for at least one second to be interpreted as an end to a series of taps, or a command "word" end. A pulse timing analysis circuit 76 interprets the pulses as command codes. The pulse timing analysis circuit 76 can use, as will be apparent to those skilled in the art, an oscillator clock, or RC, delay line, or multivibrator circuits to measure time. The pulse timing analysis circuit 76 counts the pulses, and if the output of the comparator 68 did not indicate deceleration during the detection of these command pulses, the pulse timing analysis circuit 76 reenables the drive motor 111 by resetting the motor disable bistable 70. The pulse timing analysis circuit 76 also sends the command code to the microcontroller 119 for implementation.

A speaker 147 may be provided to deliver audio confirmation of user commands received by the microcontroller 119. The microcontroller 119 can communicate with the rider in various languages, as set by the user preference switch, located on the user interface 145. The rider may also receive system updates regarding battery life, motor and battery temperature, speed, battery economy requirements, and command confirmations, via the speaker 147.

The microcontroller 119 includes an analog-to-digital converter to read analog parameters, including bicycle speed, acceleration, and pitch (road grade). A road grade sensor 78 is connected to the microcontroller 119, so that the slope of the road on which the bicycle is traveling is measured. The tachometer frequency to voltage converter 64 and the analog differentiator 66 are also connected to the microcontroller 119, for reading bicycle speed and acceleration.

The PWM motor driver 120 is controlled by the microcontroller 119. A motor tachometer 148 provides feedback on the rotation rate of the drive motor 111 to the PWM motor driver 120 and the microcontroller 119. A motor temperature sensor 96 provides the microcontroller 119 with the temperature of the drive motor 111.

Power is provided by the batteries 112, which total 48 Volts, with 9 Amp-Hour capacity using nickel-metal hydride secondary batteries. Other alternative power sources could include lead acid, nickel cadmium, lithium ion, and fuel cells, or any other suitable means of storing or releasing electrical energy. A battery temperature sensor 84 measures the temperature of the batteries 112 during charging and discharging. During charging, this parameter is read by the charger through a charging jack 38, located on the user interface 145. During discharge, the battery temperature is monitored by the microcontroller 119. The batteries 112 power all electrical and electronic devices in the wheel 100. A digital bus 92 is supplied with +5 volts via a +5 volt regulator 86 connected to the batteries 112. An analog bus 90 receives +5 volt power from a +5 volt regulator 86. The analog bus 90 also receives −5 volt power from a −5 volt inverter 88.

Control of the motor can alternatively be by direct, open loop means, as with a throttle type control. As an example, a radio frequency throttle mounted on the bicycle handlebar (preferably with a quick release mechanism for ease of installation and removal) could communicate commands to the microcontroller 119. A throttle control could simplify overall control and allow use of a less expensive, brush commutated motor. Also, a microphone and voice recognition capability could replace or supplement the brake command codes, allowing the rider to verbally command the wheel. The wheel 100 can also incorporate theft prevention devices, including a lockable quick release assembly 103, and a siren that is activated if a physical disturbance is detected when in a locked/sleep mode.

The invention may be modified in various other ways as well, and some exemplary modifications are illustrated in the following alternative versions of the invention. It should be understood that these alternative versions may incorporate features of the foregoing wheel 100 (e.g., they might utilize the control methodology described above); similarly, the foregoing wheel 100 may in some instances be modified to incorporate features of the later wheels.

Second Exemplary Version of the Invention (FIGS. 11-23)

Figure 11:
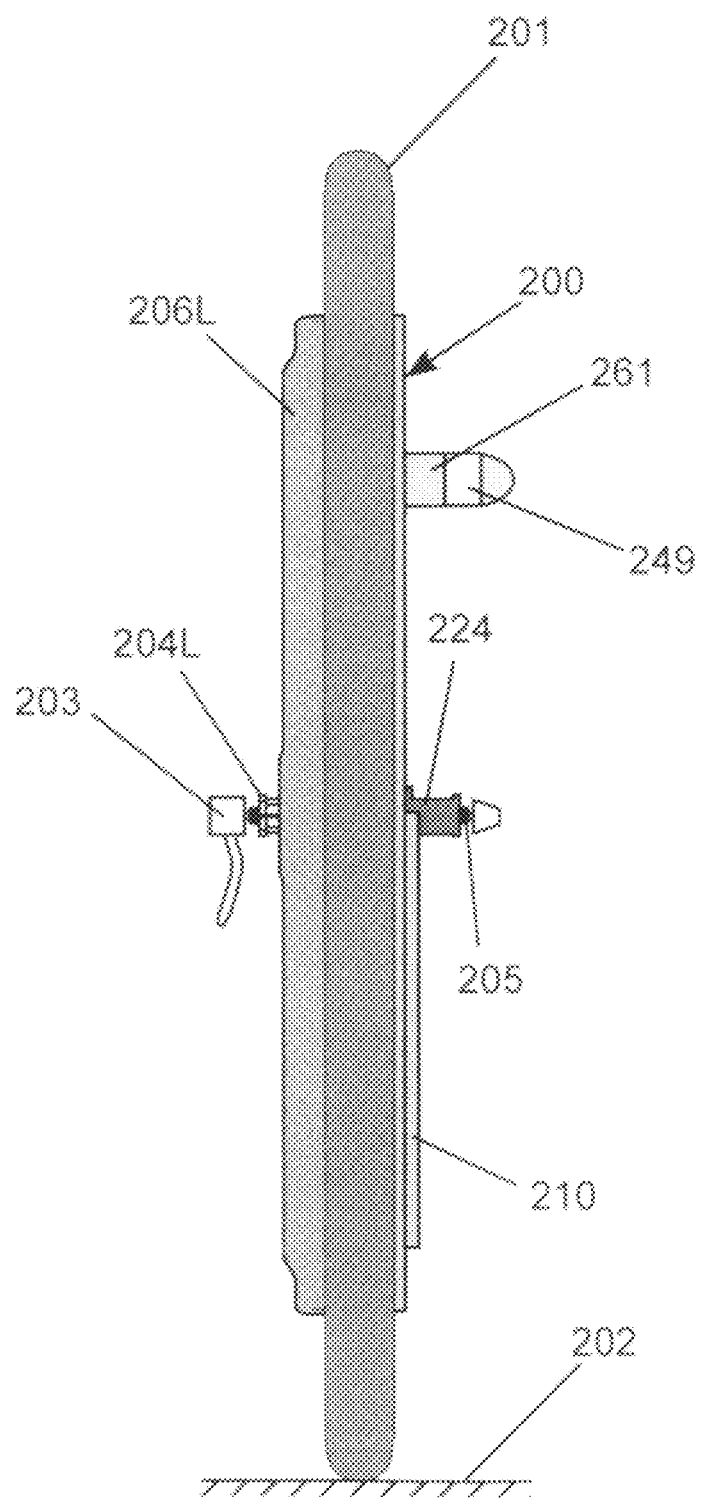
FIG. 11 is an external view of the end of a front wheel for a standard bicycle.

FIG. 11 shows an end view of a wheel 200 which also exemplifies the invention. The wheel 200 includes a tire 201 which rides on the pavement 202 during normal use. A quick release assembly 203 functions in the usual way, such that compression between the quick release assembly 203 and a left bearing cone locknut 204L and an axle nut 224 rigidly attaches the wheel 200 to a standard bicycle, with the wheel axle 205 fitting into a bicycle fork dropout. The axle 205 is again rigidly secured to an internal support 210 with the axle nut 224 so that the axle 205 and internal support 210 do not experience relative rotation. Unlike the tire 100, the tire 201 is supported radially only by a left external support 206L, so the right side of the wheel 200 is exposed for easy access to drive components (and also resulting in less rotating mass and fewer bearings for reduced friction at the hub). An anti-rotation peg 261 is attached to the internal support 210 and is brought into contact with the leading edge of the bicycle fork when the wheel 200 is installed on the bicycle, and thereby prevents rotation of the internal support 210 when the motor is engaged. A fork contact pad 249, located on the anti-rotation peg 261, prevents marring of the finish on the bicycle fork.

Figure 12:
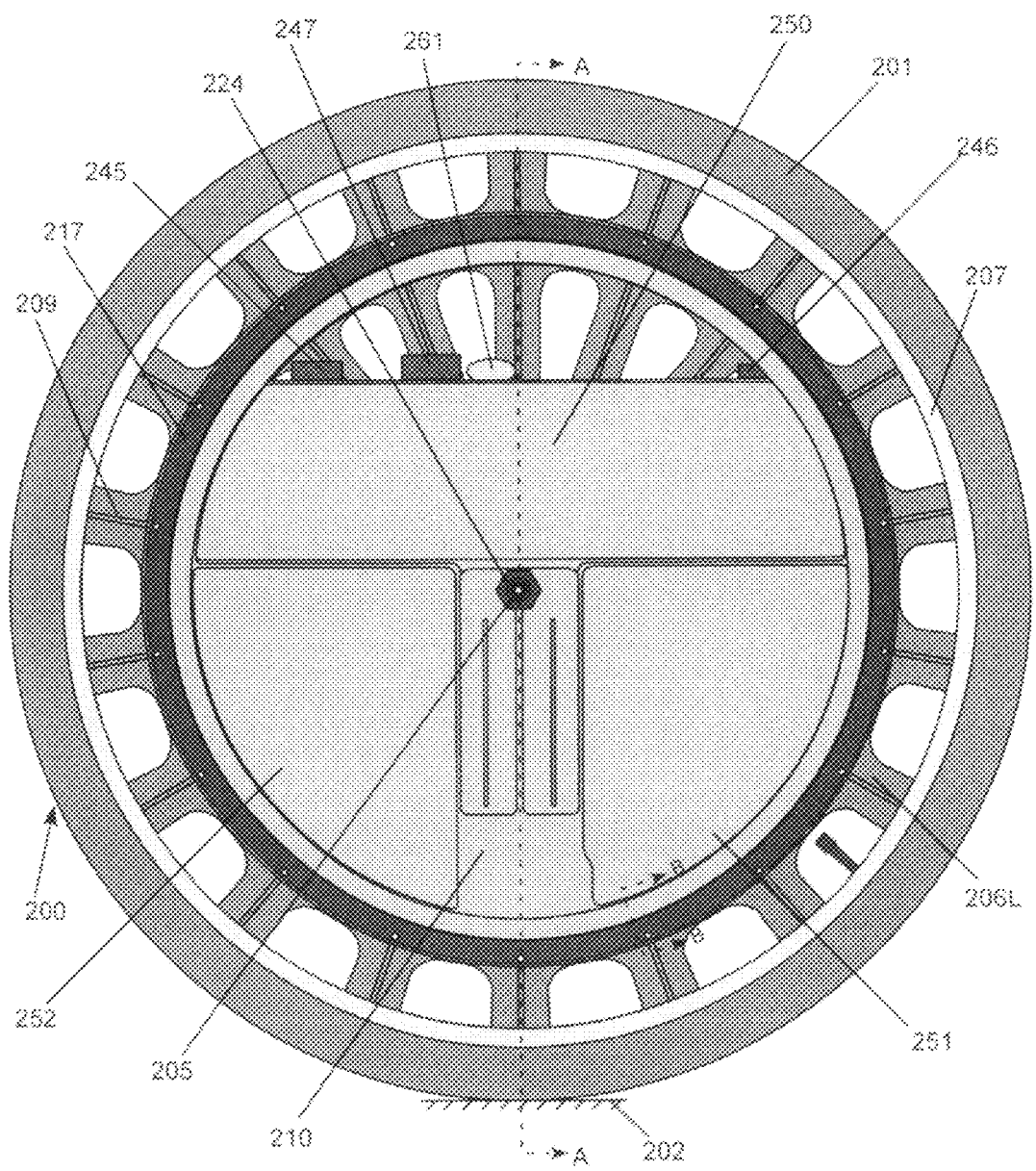
FIG. 12 is an external view of the right side of the wheel in FIG. 11, with access panels attached.

FIG. 12 is an external view of the right side of the wheel in FIG. 11, with access panels attached. Separate compartment covers attach to the internal support 210, including an electronics section access panel 250, a forward battery section access panel 251, and an aft battery section access panel 252. The covers do not completely enclose wheel, and are not independently attached to the bicycle frame. A section of the internal support 210 below the axle 205 is uncovered for exposure to airflow, providing heat sink capability. The left external support 206L includes several external support ribs 209, which strengthen the mechanical attachment between a rim 207 and the interior of the wheel 200. A user preference switch and a charging jack are located on a user interface 245, and a speaker 247 may provide audio confirmation of user commands. A pair of front brake pickup brushes 246 detect braking, as discussed with regard to the wheel 100. The edge of a bevel gear 217 is visible in this figure, and its function will be described when reviewing FIG. 14.

Figure 13:
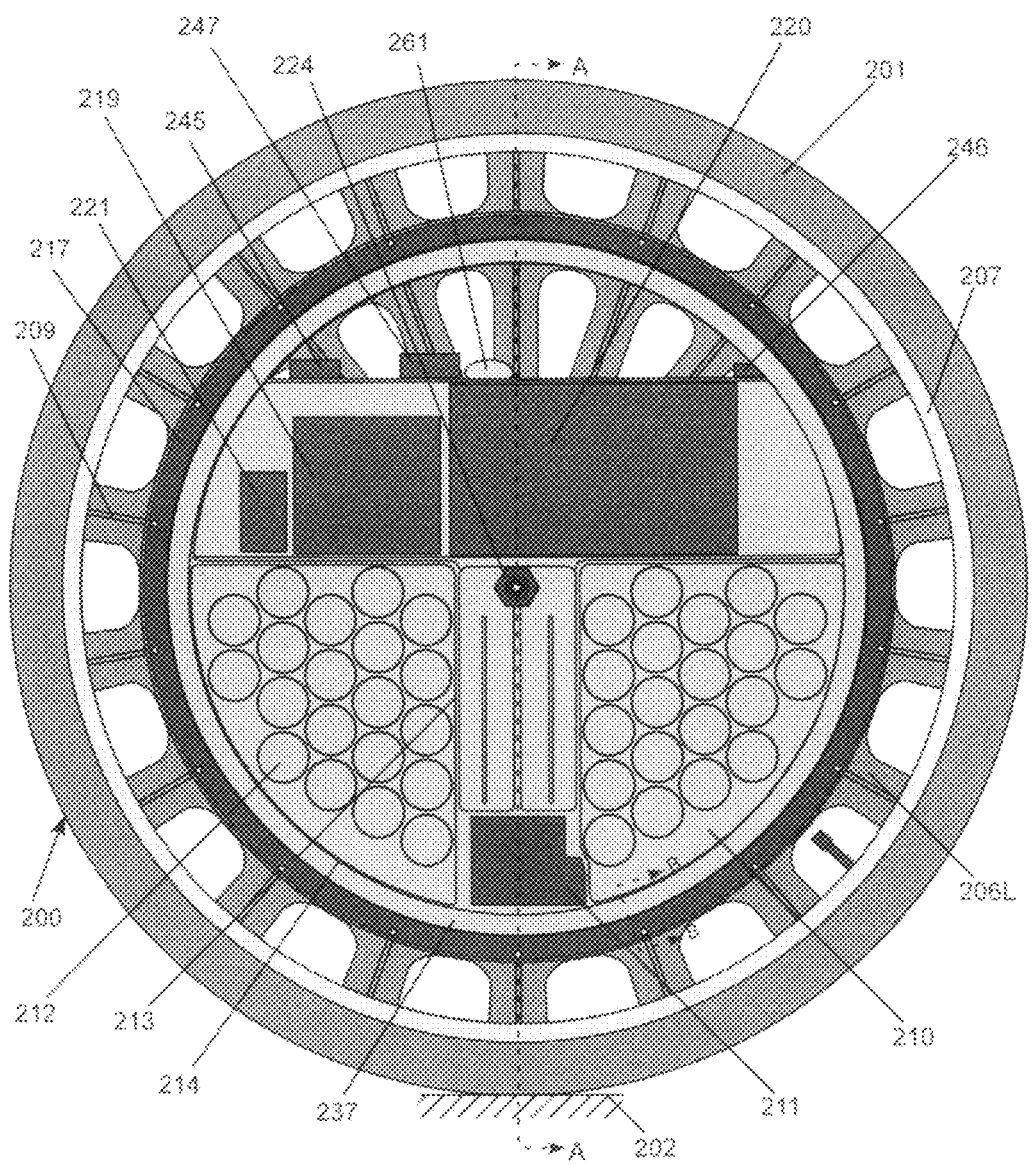
FIG. 13 is an external view of the right side of the wheel in FIG. 11, with access panels removed.

FIG. 13 shows an external view of the right side of the wheel in FIG. 11, with access panels removed. An annular extension of the internal support 210 serves as a dust shield 237 for the bevel gear 217. The internal support 210 supports several batteries 212 (again depicted as forty rechargeable D size cells). The internal support 210 includes several internal support ribs 213, which strengthen the internal support 210, serve as cooling fins, and divide the internal support 210 into separate compartments. The internal support 210 also includes an internal support drum 214, which encircles the internal support 210 for further strength.

A drive motor 211 converts electrical energy into rotational energy for driving the tire 201. Control of the drive motor 211 is preferably accomplished through a microcontroller 219 in conjunction with a PWM motor driver 220 and an interface board 221 (if needed), as in the wheel 100.

Figure 14:
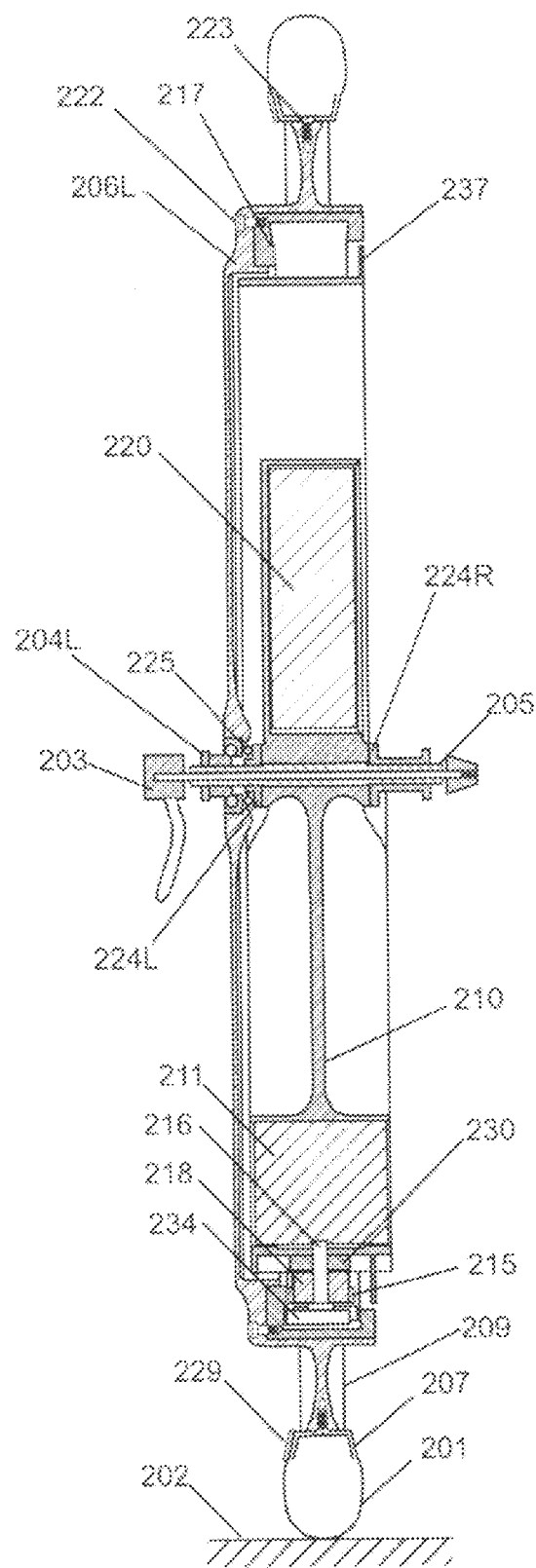
FIG. 14 is a cross-sectional view A-A of the wheel of FIG. 13.

FIG. 14 is a cross-sectional view A-A of the wheel of FIG. 13. The right axle nut 224R is extended axially in the wheel 200, occupying the space taken up by the bearings in the wheel 100. Alternatively, the function of the axle nut 224 could be replaced by axial extension of the internal support 210. Several external support bolts 222 attach the external support 206L to the bevel gear 217. Several rim bolts 223 attach the rim 207 to the left external support 206L. The outer face of the axle nut 224L contains a polished race for a caged thrust bearing assembly 225. A brake sensor strip 229 is attached to the rim 207. A freewheel tachometer 230 is attached to the internal support 210 for speed measurement.

Rotational energy is transmitted from the drive motor 211 to the tire 201 through a motor shaft 216 attached to a pinion gear 215. The gear ratio between the pinion gear 215 and the bevel gear 217 is chosen for efficient power transmission as discussed with the wheel 100. The pinion gear 215 is coupled to the drive motor 211 through a freewheel 218 to allow the tire 201 to turn without driving the drive motor 211 if the drive motor 211 is unpowered. A support roller 234, which will be discussed at greater length with reference to FIG. 15, assists in keeping the tire 201 running true.

Figure 15:
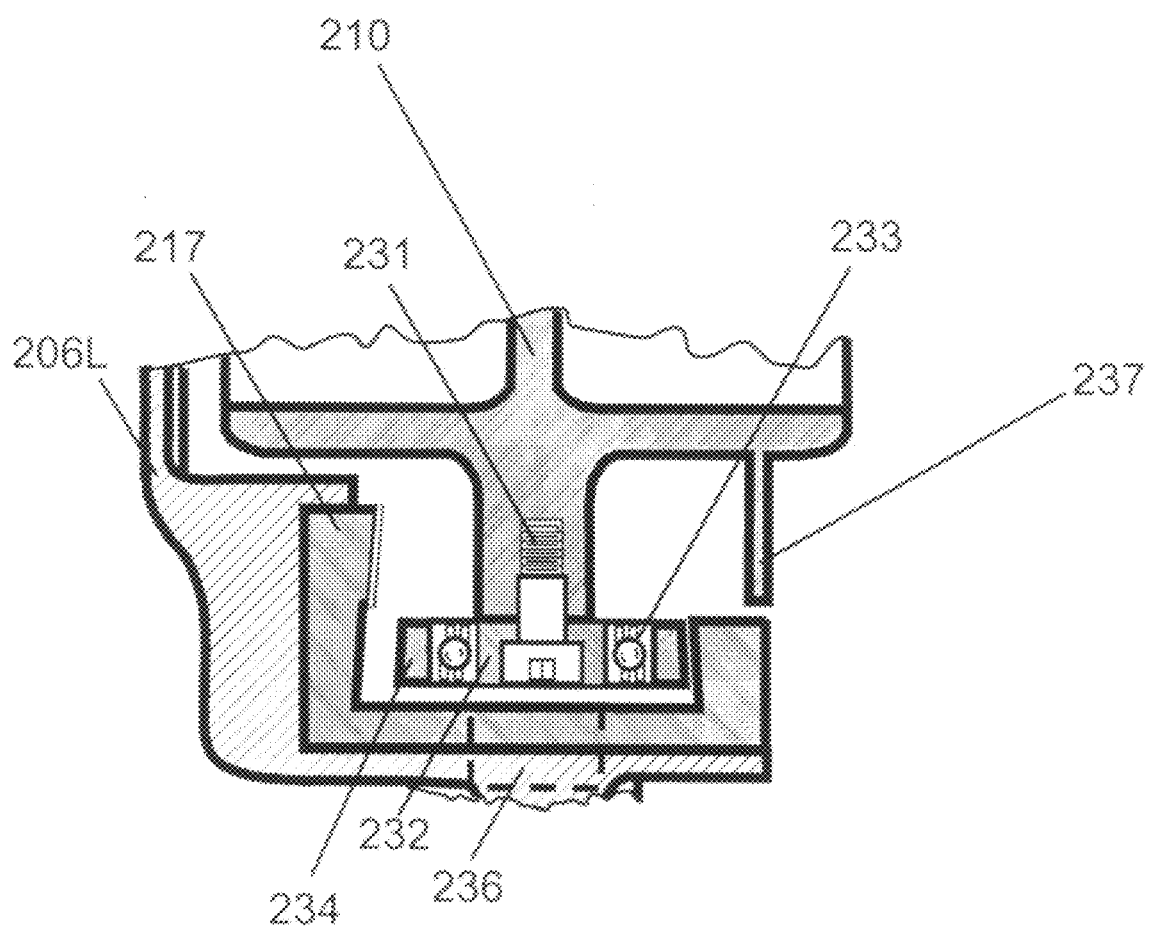
FIG. 15 is a removed cross-sectional view B-B of the wheel of FIG. 13.

FIG. 15 is a removed cross-sectional view B-B of the wheel of FIG. 13. A shoulder bolt 231 accurately attaches a bearing spindle 232 to the internal support 210. The bearing spindle 232 is press fit to hold a set of truing bearings 233, which in turn rotatably support the support roller 234. The radial extension of the internal support 210 forms the dust shield 237. A slot cut into the bevel gear 217 provides side walls beveled at the same angle as the support roller 234. The right wall of this slot or groove is normally about 0.01 inches from the support roller (outer bearing sleeve) 234, but during a left turn, the external support 206L twists slightly, bringing the right beveled slot wall in contact with the support roller 234. Referring back to FIG. 14, another support roller 234 can be seen which will come into contact with a left beveled slot wall during a right turn. Alternatively, the truing bearings 233 may be lightly preloaded to maintain contact with the beveled slot walls at all times. An access hole 236 is bored through the left external support 206L and the bevel gear 217 so that the shoulder bolt 231 can be inserted and tightened during assembly.

Figure 16:
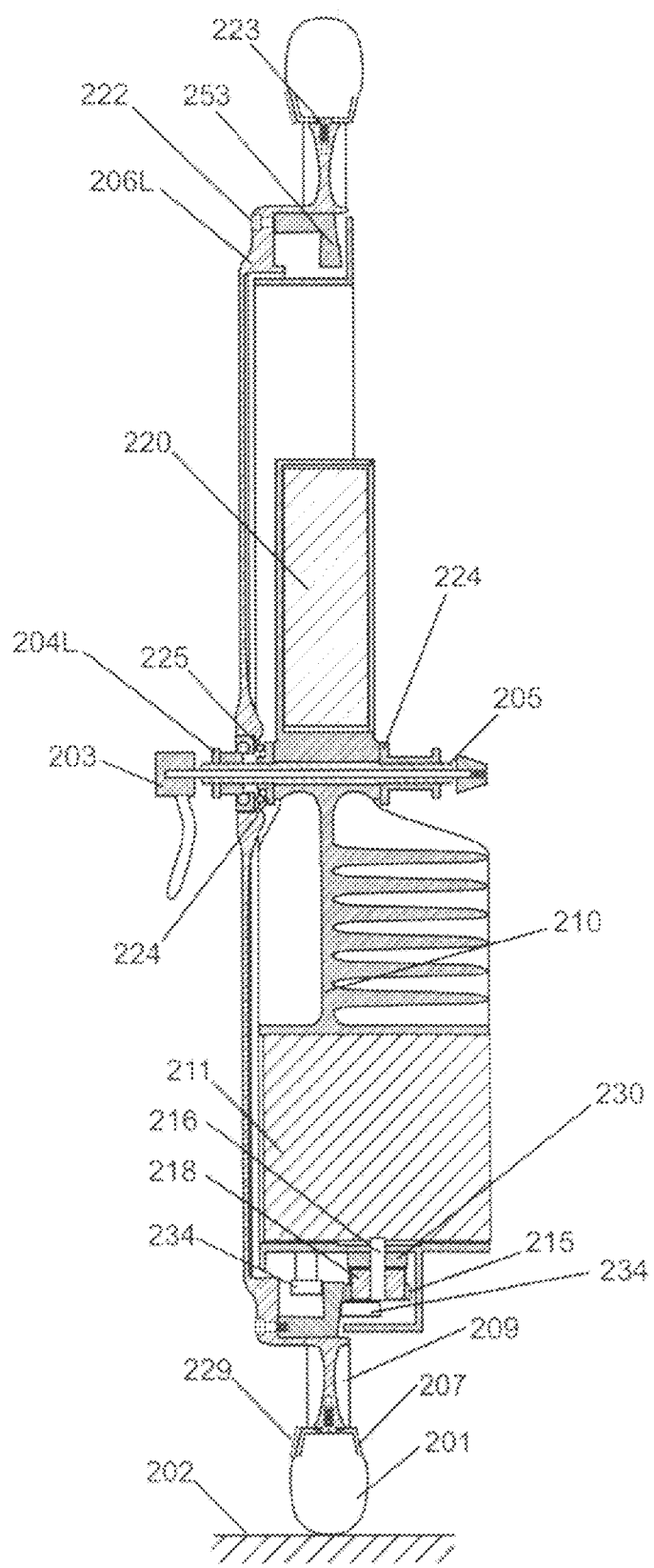
FIG. 16 is a cross-sectional view A-A of the wheel similar to that of FIG. 13, but designed to accommodate a larger motor.

FIG. 16 is a cross-sectional view A-A of a wheel similar to that of FIG. 13, but designed to accommodate a larger motor. The bevel gear 217, with its groove for maintaining wheel trueness, is replaced by an annular drive disk 253. The annular drive disk 253 is attached to the rim 207 in a manner similar to the attachment of the bevel gear 117 and the rim 107. The support rollers 234 contact opposite sides of the annular drive disk 253, rather than riding inside a groove. Bevel gear teeth are defined in the annular drive disk 253 to engage the pinion gear 215.

This wheel 200 is readily adaptable to driving the rear wheel of a bicycle. This entails mounting a freewheel and pedal driven sprocket to the outside of the left external support 206L, and axial displacement of the tire 201 to center it between the dropouts. The modified wheel 200 is oriented such that the left external support 206L is actually on the rider's right side, and the pedal driven chain engages the added sprocket. Control electronics are modified to rotate the tire 201 in the opposite direction while under power.

Figure 17:
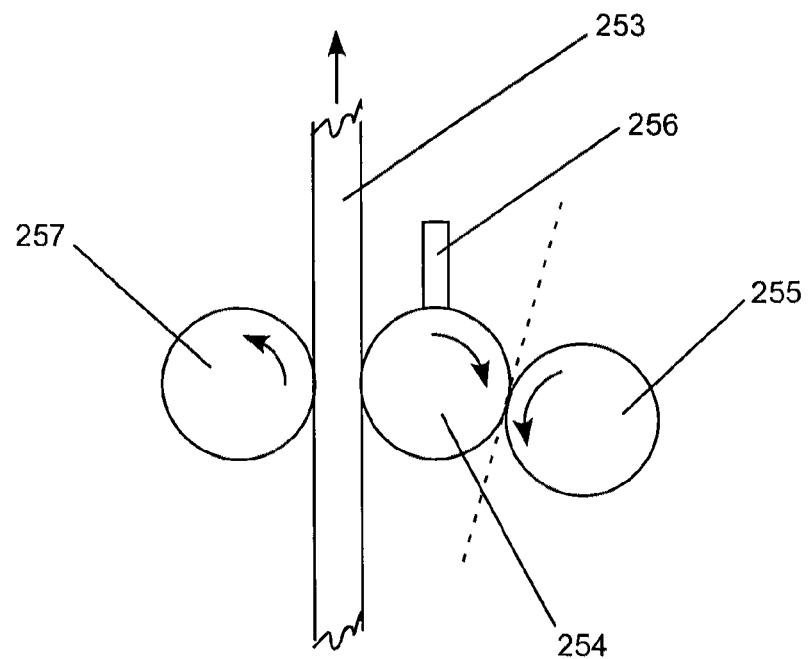
FIG. 17 is a schematic representation of an engaged frictional drive for a wheel similar to that of FIG. 16.

It was previously noted that the drive disk 253 may bear teeth to allow positive engagement between the pinion gear 215 and the drive disk 253. As an alternative, traction/friction engagement between the motor shaft 216 and the annular drive disk 253 can simplify manufacturing and reduce noise. To illustrate, FIG. 17 is a schematic representation of an engaged frictional drive for a wheel similar to that of FIG. 16. A normal force must be applied between a wedge roller 254 and the annular drive disk 253 to prevent slippage when the motor 211 is driving the wheel. This force is greater than the transmitted force (or power divided by speed) divided by the coefficient of static friction between the wedge roller 254 and the annular drive disk 253. This force is maintained by passive means through the wedge roller 254, placed between a drive roller 255 and the annular drive disk 253. The wedge roller 254 moves along a line substantially parallel to the surface of the annular drive disk 253. The angle between a line tangent to the wedge roller 254 and the drive roller 255 at the point of contact, and the contact surface of the annular drive disk 253, is chosen for most efficient transmission. This angle should typically be less than twice the arctangent of the coefficient of static friction between the drive roller 255 and the wedge roller 254. A spring 256 maintains light contact force between the drive roller 255 and the wedge roller 254 when the drive roller 255 is not being driven by the motor 211. This light contact force is just sufficient to keep the wedge roller 254 in contact with the drive roller 255, so that once the drive roller 255 is driven by the motor 211, the wedge roller 254 is pulled between the drive roller 255 and the annular drive disk 253, exerting a normal force to the annular drive disk 253 that is proportional to the torque applied by the drive roller 255, and sufficient to drive the annular drive disk 253 without slipping. Alternatively, the spring 256 could be replaced by a solenoid, so that an engaging force is applied when needed. By disengaging the motor 211 when not in use, friction is reduced. A fixed roller 257 and the wedge roller 254 also act to keep the wheel true, whether the drive roller 255 is engaged or not, replacing the support rollers described previously.

Figure 18:
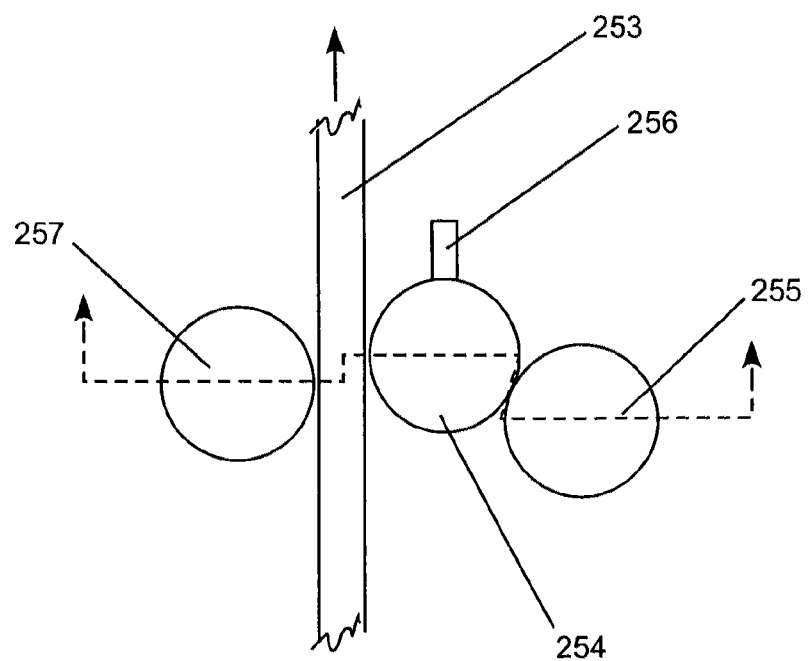
FIG. 18 is a schematic representation of a disengaged frictional drive for a wheel similar to that of FIG. 16.

FIG. 18 is a schematic representation of a disengaged frictional drive for a wheel similar to that of FIG. 16. Note the clearance between the annular drive disk 253, and the fixed roller 257 and the wedge roller 254.

Figure 19:
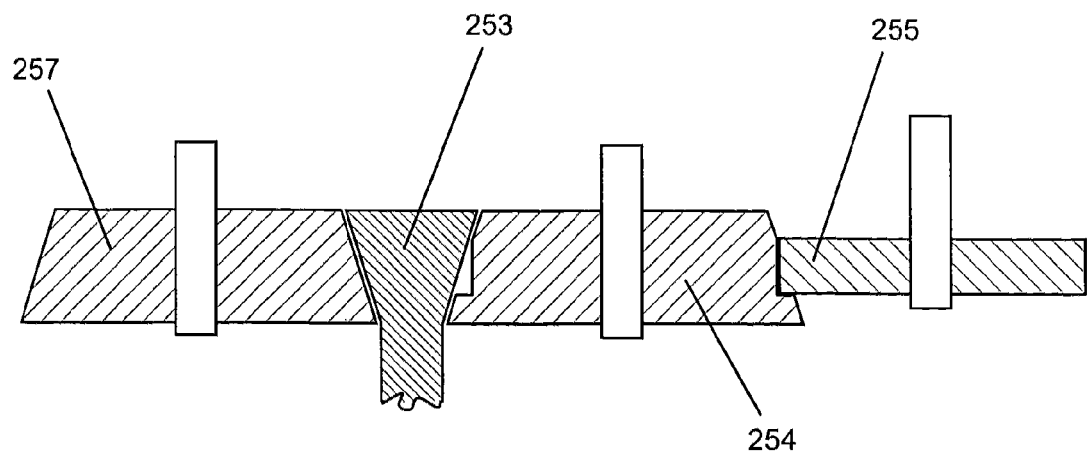
FIG. 19 is a cross-sectional view of the drive of FIG. 18.

FIG. 19 is a cross-sectional view of the drive of FIG. 18. The wedge roller 254 and the fixed roller 257 are beveled toward the major wheel axis for reduced friction. Alternatively, the wedge roller 254, the fixed roller 257A, and the annular drive disk 253 can be unbeveled to simplify fabrication. If beveled, a groove is cut into the wedge roller 254 to provide a mating surface for the drive roller 255. The drive roller 255 may or may not be freewheel mounted. The wedge roller 254 may provide clutch action to prevent the drive roller 255 from turning while disengaged, even if the annular drive disk 253 comes into contact with the wedge roller 254.

Figure 20:
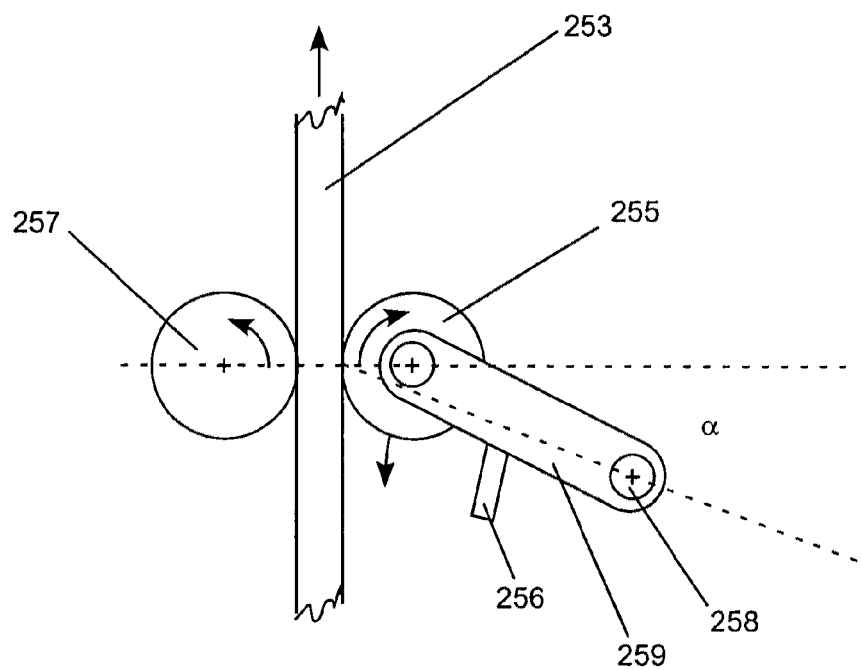
FIG. 20 is a schematic representation of an engaged frictional drive for a wheel similar to that of FIG. 16.

FIG. 20 is a schematic representation of another exemplary frictional drive (in its engaged state) for a wheel similar to that of FIG. 16. As is the case with the wedge roller frictional drives described above, a normal force is needed to prevent slippage in the system. However, a wedge roller is unnecessary in this arrangement. The annular drive disk 253 is a planar disk that is part of the rotatable wheel assembly. The fixed roller 257 is attached to the internal support 210 (not shown in FIG. 20). The spin axis of the fixed roller 257 intersects the spin axis of the annular drive disk 253 and is perpendicular to it. An eccentric pivot 258 is attached to the internal support 210 such that the eccentric pivot axis is parallel to the spin axis of the fixed roller 257. Thus, the distance between the eccentric pivot 258 and the fixed roller 257 is held constant. The axis of eccentric pivot 258 and the spin axis of the annular drive disk 257 do not intersect; the distance between them is also held constant. A drive roller support 259 swings about the eccentric pivot 258. The drive roller 255 is mounted on the drive motor 211 (not shown in FIG. 20), which is attached to the drive roller support 259. Thus, the distance between the eccentric pivot 258 and the spin axis of the drive roller 255 is held constant. In addition, the spin axis of the drive roller 255 is parallel to the eccentric pivot 258 and thus perpendicular to the spin axis of the annular drive disk 253. The spring 256 provides a small initial preload force between the drive roller 255 and the annular drive disk 253 such that the surfaces are in contact when the drive motor 211 is energized to drive the wheel. The fixed roller 257 prevents deflection of the annular drive disk 253 when normal forces are present between the annular drive disk 253 and the drive roller 255. The proportions between the length of the drive roller support 259, and the distance between the eccentric pivot 258 and the spin axis of the annular disk 253, are such that (a) the spin axis of the drive roller 255 intersects (or nearly intersects) the spin axis of the annular disk 253 when they are in contact, and (b) the geometric relationship among the elements serves to generate sufficient contact force between the drive roller and the annular drive disk to prevent significant slippage when torque is applied to the drive roller in the direction shown. The critical factor is the relationship between the coefficient of friction and an angle alpha, defined below.

Suppose the drive roller support 259 is rotated to a position such that the drive roller 255 is in contact with the annular drive disk 253. A plane P1 is perpendicular to the annular drive disk 253 and passes through the spin axis of drive roller 255. A plane P2 passes through the eccentric pivot 258 and the contact between drive roller 255 and annular drive disk 253. The plane P2 is indicated by the dashed line in FIG. 38. Alpha is the angle between planes P1 and P2. The angle alpha is chosen to maximize rotational energy transmission efficiency, and is therefore dependent on the coefficient of friction between the drive roller 255 and the annular drive disk 253. The angle alpha should typically be less than the arctangent of the coefficient of friction.

Suppose a rotational load is present on the annular drive disk 253 and that the drive motor 211 begins to apply torque to the drive roller 255 in the direction indicated (clockwise). The initial frictional force between the annular drive disk 253 and the drive roller 255 will cause the drive roller (along with the drive motor 211 and the drive roller support 259) to swing slightly about the eccentric pivot 258 in the direction indicated (counterclockwise), increasing the force between drive roller and annular drive disk. Thus a normal force that is directly proportional the drive torque will be generated between the drive roller 255 and the annular drive disk 253, and this force will be sufficient to prevent significant slippage.

Figure 21:
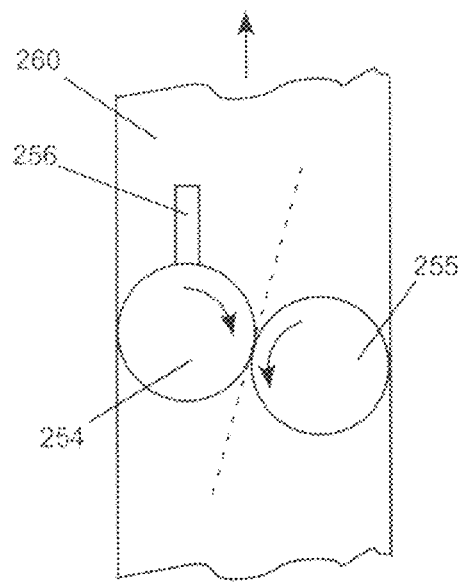
FIG. 21 is a schematic representation of an engaged frictional drive for a wheel similar to that of FIG. 14.
Figure 22:
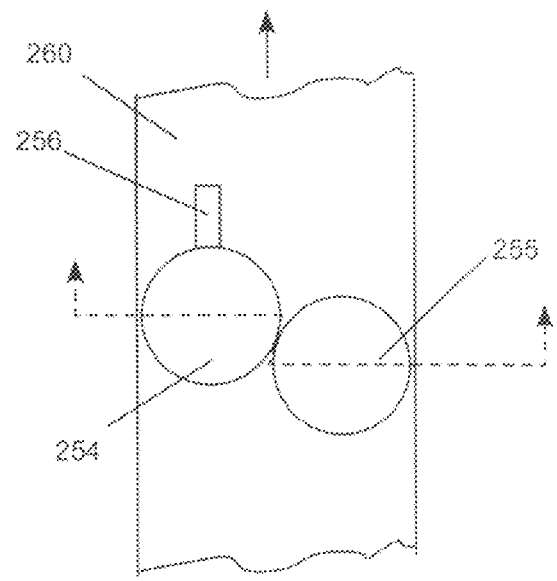
FIG. 22 is a schematic representation of a disengaged frictional drive for a wheel similar to that of FIG. 14.

Alternatively, in a manner similar to a bevel gear set, the annular drive disk 253, the fixed roller 257 and the drive roller 255 may be beveled (conical) to eliminate differential velocity across the contacting surfaces. The annular drive disk 253 may be crowned to reduce or eliminate edge loads. The drive roller 255 and the fixed roller 257 may be cylindrical or conical to match the annular drive disk 253, and may also be crowned. The spring 256 may be replaced by a torsion spring or another passive mechanism that provides an initial preload force between the drive roller 255 and the annular drive disk 253. The spring 256 may be replaced by a solenoid or another active mechanism that provides an initial preload force when the wheel is to be driven. With an active mechanism, the drive roller 255 could move away from the annular drive disk 253 when the drive motor 211 is not driving the wheel; this would eliminate motor drag on the wheel and thus make pedaling easier FIG. 21 is a schematic representation of an engaged frictional drive for a wheel similar to that of FIG. 14 (and FIG. 22 provides a disengaged view). A normal force must be applied between the wedge roller 254, the drive roller 255, and a bevel groove 260 to prevent slippage when motor is driving the wheel. This force is greater than the transmitted force (or power divided by speed) divided by the coefficient of static friction between the wedge roller 254, the drive roller 255, and the bevel groove 260. This force is maintained by passive means through the wedge roller 254, placed between the drive roller 255 and the bevel groove 260. The wedge roller 254 is moves along a line substantially parallel to the beveled surface of the bevel groove 260. The angle between a line tangent to the wedge roller 254 and the drive roller 255 at the point of contact, and the beveled surface of the bevel groove 260, is chosen for most efficient transmission. This angle should typically be less than twice the arctangent of the coefficient of static friction between the drive roller 255 and the wedge roller 254. A spring 256 maintains light contact force between the drive roller 255 and the wedge roller 254 when the drive roller 255 is not being driven by the motor. This light contact force is just sufficient to keep the wedge roller 254 in contact with the drive roller 255, so that once the drive roller 255 is driven by the motor, the wedge roller 254 is pulled between the drive roller 255 and the bevel groove 260, exerting a normal force to the bevel groove 260 that is proportional to the torque applied by the drive roller 255, and sufficient to drive the bevel groove 260 without slipping. Alternatively, the spring 256 could be replaced by a solenoid, so that an engaging force is applied when needed. By disengaging when motor is not driving the wheel, friction is reduced. The drive roller 255 and the wedge roller 254 also act to keep the wheel true, whether the drive roller 255 is engaged or not, replacing the support rollers described previously.

Figure 23:
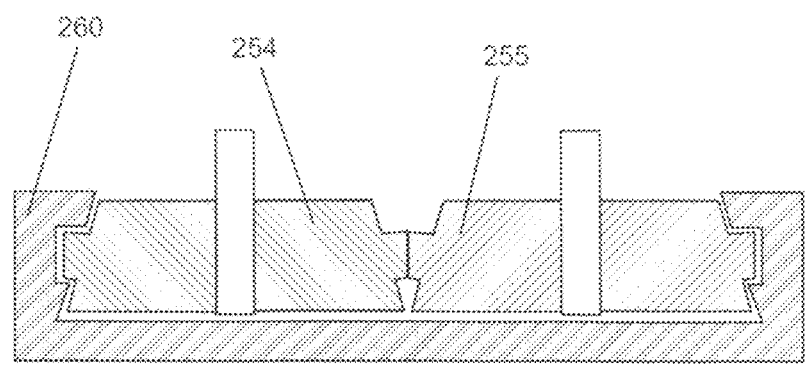

FIG. 23 is a cross-sectional view of the drive of FIGS. 21 and 22. The wedge roller 254 and the drive roller 255 are beveled toward the major wheel axis for reduced friction. The wedge roller 254 and the drive roller 255 include cylindrical extensions with straight, unbeveled sides to provide surfaces for mutual rotational engagement. Grooves cut into the beveled walls of the bevel groove 260 provide clearance for these extensions. The extensions are vertically centered on the beveled surfaces to give symmetric loading about the shafts supporting the wedge roller 254 and the drive roller 255. The drive roller 255 may or may not be freewheel mounted. The wedge roller 254 may provide clutch action to prevent the drive roller 255 from turning while disengaged, even if the bevel groove 260 comes into contact with the wedge roller 254. Alternatively, the walls of the bevel groove 260 are straight, and the sides of the wedge roller 254 and the drive roller 255 are straight or crowned.

Third Exemplary Version of the Invention (FIGS. 24-27)

Figure 24:
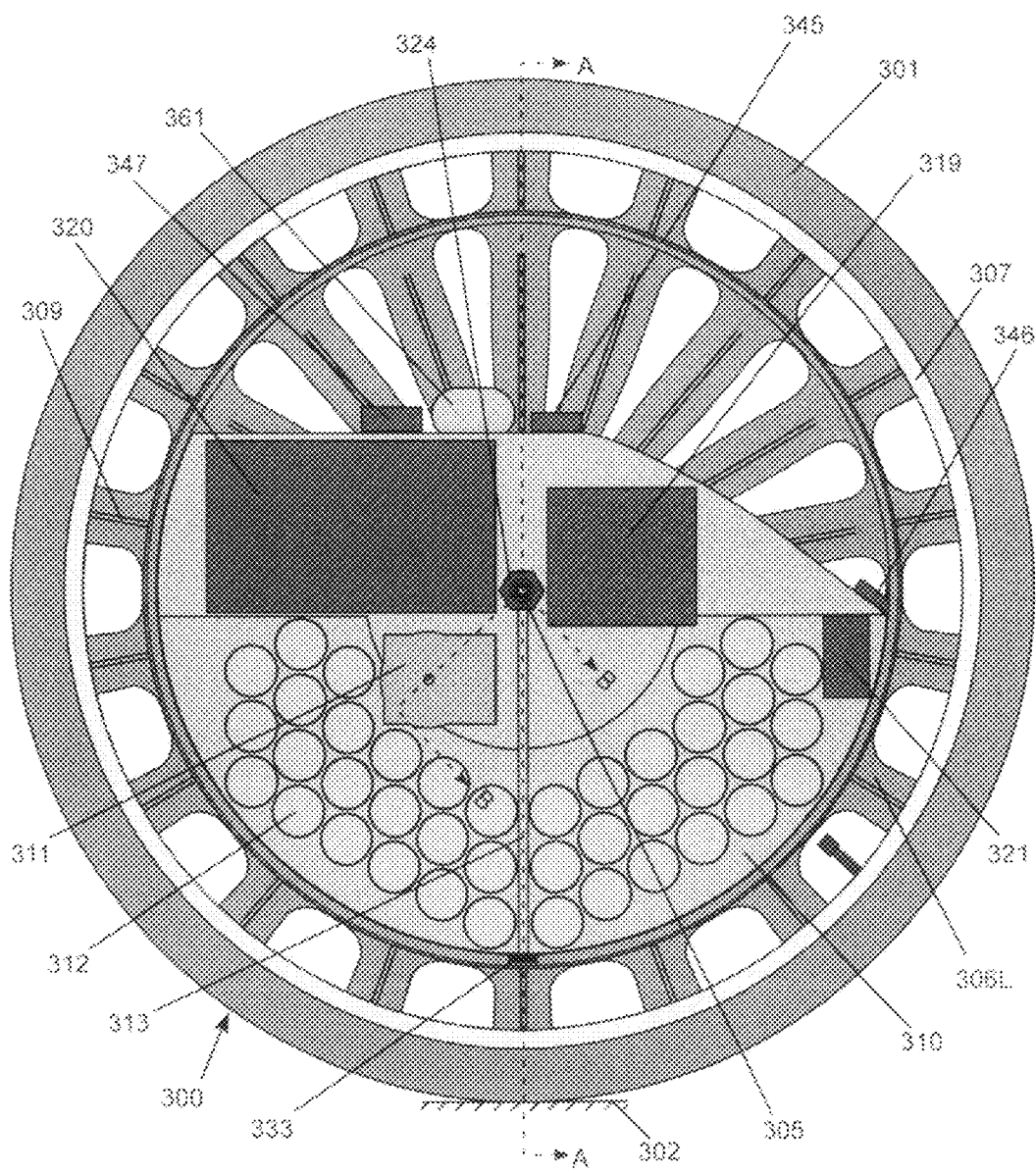
FIG. 24 is an external view of the side of a front wheel for a standard bicycle, with access panels removed.

FIG. 24 is an external view of another exemplary wheel 300 for a standard bicycle, with access panels removed. The wheel 300 includes a tire 301 attached to a rim 307. An anti-rotation peg 361, which is attached to an internal support 310, is brought into contact with the leading edge of the bicycle fork when the wheel 300 is installed on the bicycle, thereby preventing the internal support 310 from rotating in the opposite direction from which the tire 301 is driven by a drive motor 311. An axle nut 324 attaches the internal support 310 to an axle 305. The drive motor 311 is attached to the internal support 310 so that the axis of the drive motor 311 is parallel to the wheel axis.

A left external support 306L includes several external support ribs 309, which strengthen the mechanical attachment between the rim 307 and the interior of the wheel 300. The internal support 310 includes a pair of internal support ribs 313, which strengthen the internal support 310, serve as cooling fins, and divide the internal support 310 into separate compartments.

The wheel 300 is readily adaptable to driving the rear wheel of a bicycle. This entails mounting a freewheel and pedal driven sprocket to the outside of the left external support 306L, and axial displacement of the rim 307 to center it between the dropouts. The modified wheel is oriented such that the left external support 306L is actually on the rider's right side, and the pedal driven chain engages the added sprocket. Control electronics are modified to rotate the tire 301 in the opposite direction while under power. Note that a non-standard freewheel, designed to lock in the counterclockwise direction, is required on the motor driven side.

Control of the drive motor 311 is preferably accomplished through a microcontroller 319. However, control of the motor in the wheel 300 (as well as in the other wheels described in this document) can alternatively be by direct/open loop means, as with a throttle type control. A motor torque control voltage is sent from the microcontroller 319 to a PWM motor driver 320, which sends pulsed electrical energy from the batteries 312 to the drive motor 311 to maintain a given output torque. An interface board 321 contains the analog and digital circuit elements not found on the microcontroller 319, but required for operation of the system (as specified in the block diagram of FIG. 10). Some riders may not be concerned with maximizing battery life, and can specify this with a user preference switch, which is located on a user interface 345. A pair of front brake pickup brushes 346 conduct electrical impulses from the brakes to the interface board 321, as described with regard to the wheel 100. A speaker 347 provides the rider with command confirmation or system status information.

Figure 25:
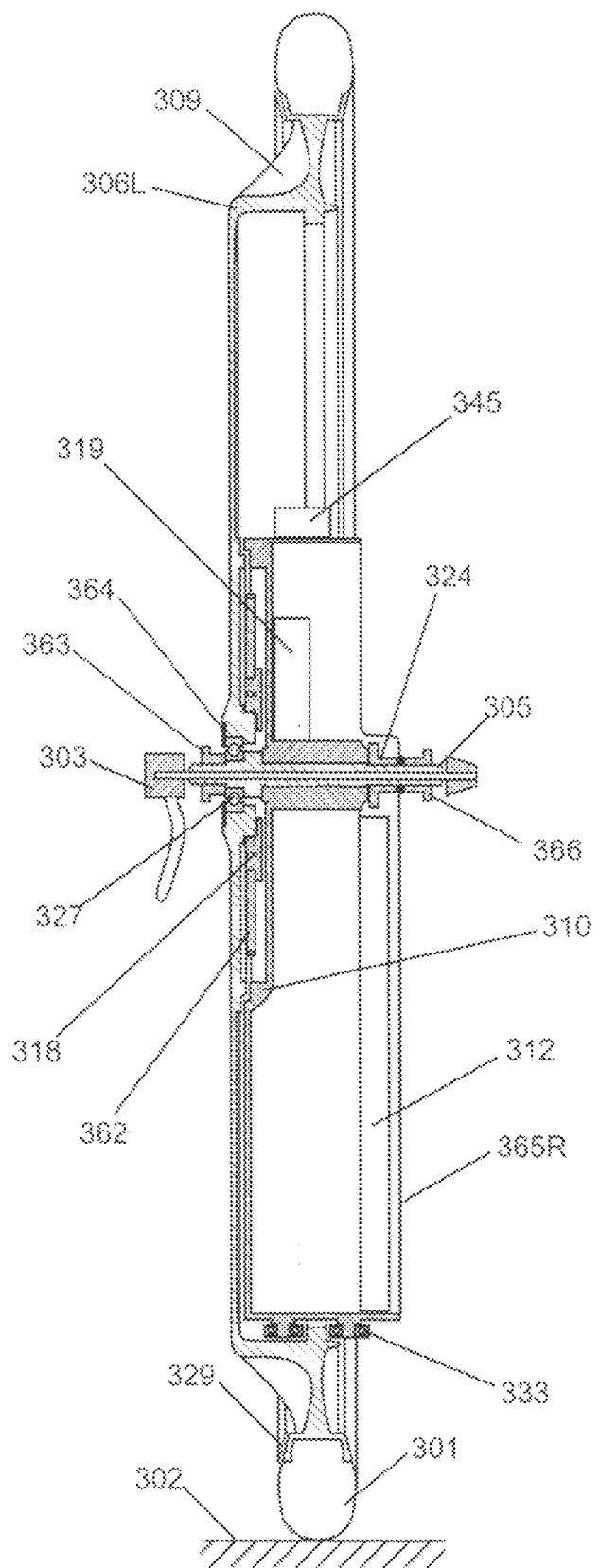
FIG. 25 is a cross-sectional view A-A of the wheel of FIG. 24.

FIG. 25 is a cross-sectional view A-A of the wheel of FIG. 24. A large spur gear 362 is attached to the left external support 306L through a freewheel 318. Thus, the large spur gear 362 does not turn as the bicycle moves forward, unless it is driven by the drive motor 311. Alternatively, rotational energy could be transferred from the drive motor 311 to the tire 301 by a belt, chain, or similar transmission. Hub bearings 327 are radial contact ball bearings, held against the axle 305 by a bearing retaining nut 363. A bearing retaining ring 364, which can be a snap ring, captures the hub bearing 327 within the left external support 306L. A right non-rotating cover 365R is attached to the wheel 300 by a cover retaining nut 366.

A quick release assembly 303 functions in the usual way, such that compression from the quick release assembly 303 rigidly attaches the wheel 300 to a standard bicycle, with the axle 305 fitting into a bicycle fork dropout. The axle 305 is attached to the bearing retaining nut 363 and the cover retaining nut 366, each of which contact the inside of respective bicycle fork dropouts. The axle 305 is secured to the internal support 310 with an axle nut 324. A brake sensor strip 329 is attached to the rim 307.

Figure 26:
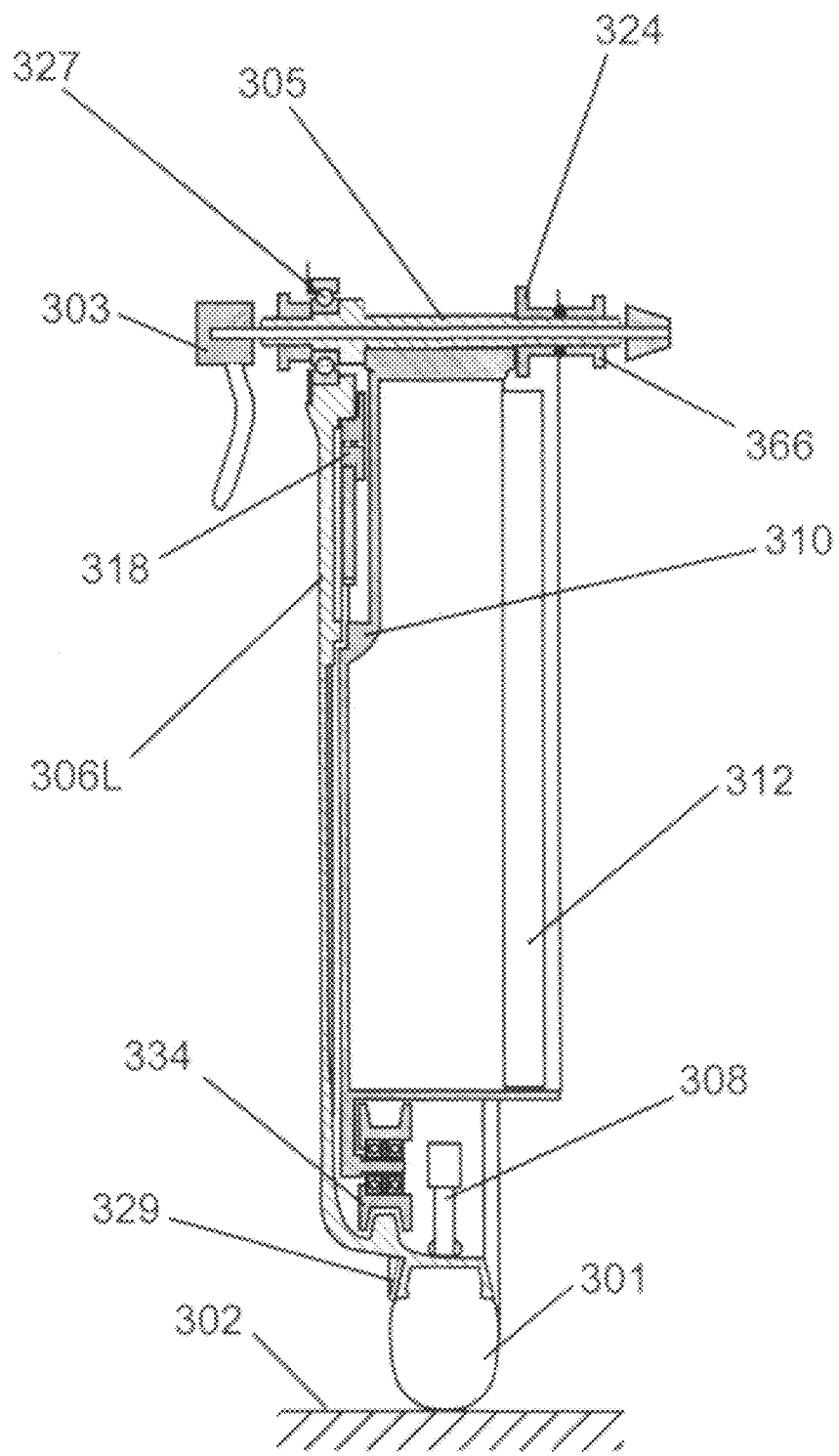
FIG. 26 is a cross-sectional view of the lower half of A-A of a wheel similar to that of FIG. 24, showing an alternate support roller arrangement.

FIG. 26 is a cross-sectional view of the lower half of A-A of a wheel similar to that of FIG. 24, showing an alternate support roller arrangement. The axis of a support roller 334 is parallel to the wheel axis. A groove in the support roller (outer bearing sleeve) 334 guides a ring formed as part of the left external support 306L. The sides of the groove in the support roller 334 intermittently contact the sides of the ring in the left external support 306L, reducing axial movement of the tire 301 when axial forces are applied to the tire 301, especially during a turn. Alternatively, the truing bearings may be lightly preloaded to maintain continuous contact between the support roller 334 and the left external support 306L ring sides. The support roller 334 is free to rotate about a shaft that is extended from the internal support 310. The support roller 334 is placed to the side of a tube stem 308. The heavy batteries 312 can be placed somewhat lower in this arrangement, and the left external support 306L may be lighter and less expensive. Alternatively, a tubeless or non-pneumatic tire would not include the tube stem 308, allowing the batteries 312 to be placed even lower.

Figure 27:
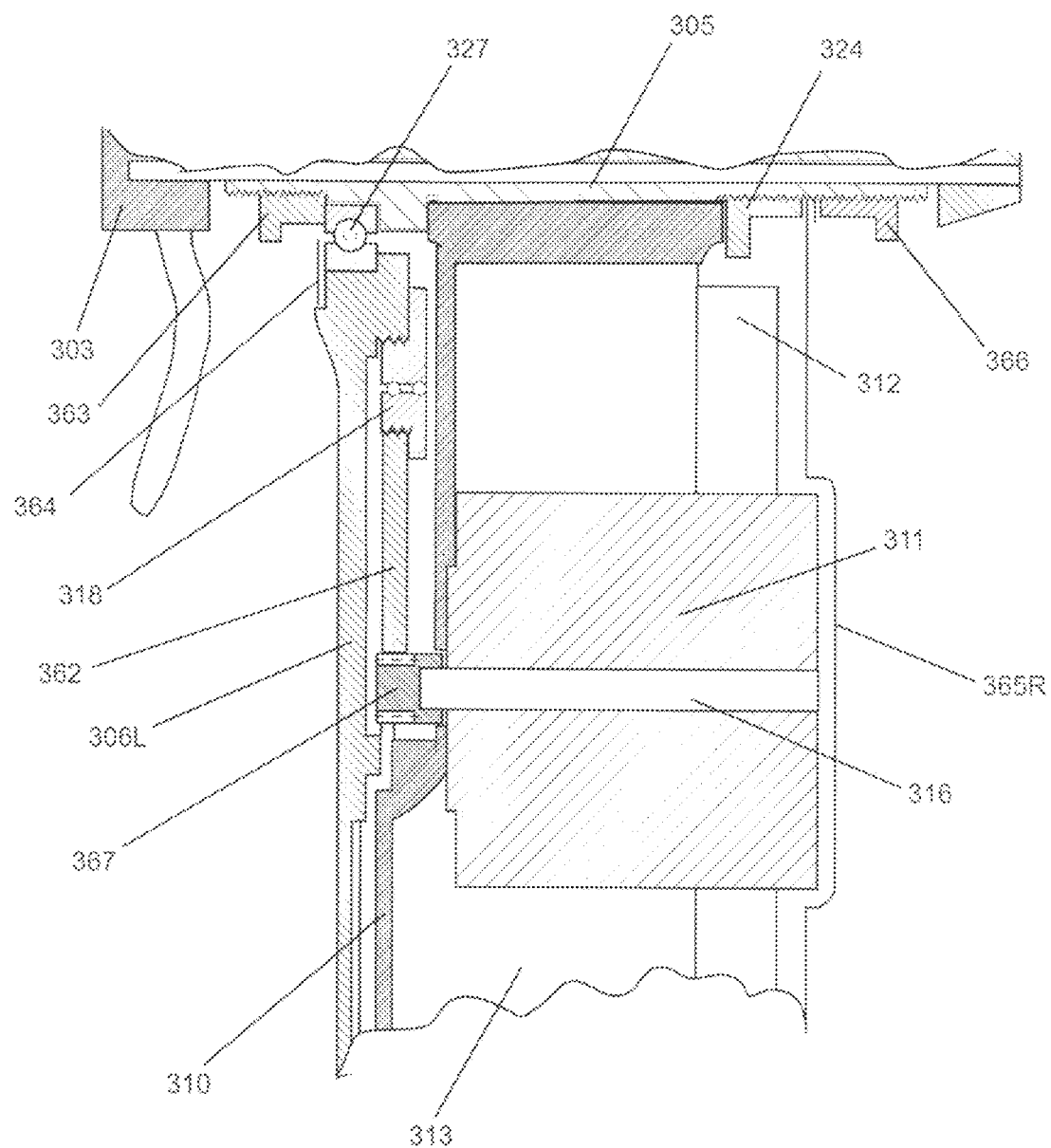
FIG. 27 is a cross-sectional view B-B of the wheel of FIG. 24.

FIG. 27 is a cross-sectional view B-B of the wheel of FIG. 24. The drive motor 311 drives the large spur gear 362 through a small spur gear 367, with the spur gears 362 and 367 having intermeshing teeth. The small spur gear 367 is attached to a motor shaft 316. The large spur gear 362 threads on to the freewheel 318, which in turn threads onto the left external support 306L. Alternatively, the freewheel 318 might attach to the left external support 306L or the large spur gear 362 by other means, such as a weld, or the parts may be combined.

The internal support 310 is attached directly to the axle 305, along a substantial portion of its length and adjacent the narrow hub bearings 327. This feature allows for strong support of the massive active drive components by the axle 305. Supporting drive elements directly on the axle enables simple attachment of this wheel 300 to a bicycle.

It may prove possible to eliminate truing bearings altogether, if the left external support member 306L is stiff enough to support axial loading during turns without substantial axial deflection. The wheel 300 would be somewhat tolerant of axial deflection because the rotary motion transmission coupling the drive system on the internal support 310 is closer to the axle 305. Also note that the small spur gear 367, large spur gear 362, and axle 305 all share parallel axes. Spur gears, pulleys, and sprockets are all more tolerant of axial than radial misalignment.

The wheel 300 allows for lower placement of several batteries 312, and for more flexibility in the choice of drive transmission and gear reduction. Possibilities include the use of one or more of single or multiple pairs of various types of gears; pulleys and belt(s); sprockets and chain(s); friction drives; and/or other arrangements.

Fourth Exemplary Version of the Invention (FIGS. 28-32)

FIG. 28 is an external view of the rear of a wheel 400 which might be accommodated in the front fork of a standard bicycle. The wheel 400 includes a tire 401, which contacts a pavement 402 during normal use. A standard quick release assembly 403 attaches the wheel 400 to a bicycle fork 472. The wheel 400 has a "dished" construction, i.e., several spokes 468 are closer to the wheel centerline on the right (drive) side. This allows room for a large spur gear 462, which is attached to a freewheel 418. A small spur gear 467 engages the large spur gear 462. The small spur gear 467 is supported and driven by a motor shaft 416. A left external enclosure 469L and a right external enclosure 469R are secured to the nonrotating axle by a left support locknut 470L and a right support locknut 470R. There is no physical connection between the left external enclosure 469L and the right external enclosure 469R, except through a hub housing 477.

A pair of front brake pickup brushes 446L and 446R extend from the front of the left external enclosure 469L and the right external enclosure 469R, to contact a metal rim (407, depicted in FIG. 29) on each side. Applying pressure to the bicycle brake lever compresses a pair of conducting brake pads 475L and 475R against the metal rim, completing an electrical circuit which includes the brake pickup brushes 446L and 446R. A tachometer magnet 471 is attached to one of the spokes 468. The tachometer magnet 471 is sensed by a hall effect tachometer to measure bicycle speed. A user interface 445 is exposed on the left external enclosure 469L, and may provide a charging jack and user preference switch.

FIG. 29 is an external view of the right side of a drive attachment of FIG. 28. The wheel 400 attaches to the bicycle fork 472 in the conventional manner, with the standard quick release assembly 403. The hub is of special construction to allow attachment of the right external enclosure 469R and left external enclosure 469L to the hub axle. The wheel is driven by a freewheel coupled large spur gear 462.

The tire 401 is supported on a rim 407. The rim 407 is supported about the hub with several spokes 468. Alternatively, the rim 16 could be supported about the hub by a composite disk, as is commonly seen on racing bicycles. This disk usually consists of a pair of thin carbon fiber disks glued to a thicker layer of foam. The composite disk is narrower than a spoke assembly, usually not wider than the rim.

FIG. 30 is an external view of the right side of the drive attachment of FIG. 28, with the electronics enclosure cover removed. This shows details within the right external enclosure 469R. A drive motor 411 is located to place the small spur gear 467 at the proper spacing from the large spur gear 462, by taking the pitch diameter of each gear into account, for most efficient drive transmission. Other rotary motion transmission mechanisms are possible, such as belt or chain drives, friction drives, and/or other forms of gears.

Several batteries 412 are oriented vertically, so that the right external enclosure 469R is relatively thin, except about the drive motor 411. A PWM motor driver 420 is lighter than the batteries 412, so it is placed near the top of the enclosure. Several electrical feedthroughs 473 carry power and data between the left external enclosure 469L and the right external enclosure 469R. The electrical feedthroughs 473 carry power through separate #14 conductors at zero, 28.5, and 48 Volts. A data cable transmits information to and from the PWM motor driver 420, the drive motor 411, and the front brake pickup brushes 446.

FIG. 31 is an external view of the left side of the drive attachment of FIG. 28, with the electronics enclosure cover removed. Lighter electronic components, including a microcontroller 419 and an interface board 421 are placed near the top of the left external enclosure 469L. The interface board 421 contains the hall effect sensor for measuring bicycle speed, in addition to the elements described in the first version of the invention. The plurality of electrical feedthroughs 473 are directly opposite their counterparts on right external enclosure 469R, to facilitate fishing the leads through the hub. A manual control jack 474 allows direct control of the system by the rider, with an external control switch, or continuously variable, throttle-like power control, attached to the bicycle handlebar. The system can also be controlled through the brake pad communication protocol described in the first version of the invention, provided the 475R and the 475L have been replaced with electrically conductive, and connected, pads. Audio feedback is provided to the rider by a speaker 447.

FIG. 32 is a removed cross-section A-A of FIG. 30. This shows how the hub is constructed to allow rigid attachment of, and electrical connections between, the left external enclosure 469L and the right external enclosure 469R. The wheel 400 is attached to the bicycle in the conventional way, by compressing a pair of bicycle fork dropouts 442L and 442R against components attached to the non-rotating axle. Compression is provided with the standard quick release assembly 403C,D,E,F. A pair of axle endcaps 476L and 476R provide surfaces to secure the dropouts 442L and 442R. A pair of dropout tangs 443L and 443R are welded to the respective axle endcaps 476L and 476R. The axle endcaps 476L and 476R are welded to the ends of an axle 405. The axle 405 is hollow to allow room for the conductors carrying power and information between the left external enclosure 469L and the right external enclosure 469R. Holes are drilled into the axle endcaps 476L and 476R for the electrical feedthroughs 473.

A hub housing 477 rotates about the axle 405. The hub housing 477 contains a hub bearing cup 426, which provides a bearing surface for a hub bearing 427. The hub bearing 427 is constrained by a hub bearing cone 428, as in a conventional bicycle wheel hub. Each hub bearing cone 428 is fixed into place by tightening against a respective right bearing cone locknut 404R and a left bearing cone locknut 404L. The right external enclosure 469R is secured against the right bearing cone locknut 404R by the right support locknut 470R. A keyway 478 prevents rotation of the right external enclosure 469R about the axle 405. The left external enclosure 469L is secured in a similar manner against the left bearing cone locknut 404L. The freewheel 418 threads onto the hub housing 477, and supports the large spur gear 462 allowing the wheel 400 to turn without turning the motor shaft 416.

Fifth Exemplary Version of the Invention (FIGS. 33-35)

FIG. 33 is an external view of the rear of a wheel 500 for the front of a standard bicycle, constructed in accordance with the fifth version of the invention of the invention. A quick release 503 secures the wheel to a standard bicycle fork 572 in the usual manner. A removable neck section 579 can be removed to facilitate replacing a tire 501. The removable neck section 579 contains electrical connectors for the conductors carrying power and information between a left external enclosure 569L and a right external enclosure 569R. The removable neck section 579 is attached to a left external support neck 581L and a right external support neck 581R, and secured by bolts that will appear in FIG. 34. A large spur gear 562 is driven by a small spur gear 567, which is connected to a motor shaft 516. Other rotary motion transmission mechanisms are possible, such as belt or chain drives, friction drives, and/or other forms of gears. A hub motor could also be used to turn the wheel instead of the large spur gear 562. A freewheel 518 attaches the large spur gear 562 to a hub 585, permitting travel unimpeded by motor drag while the drive motor is off, slow, or disabled. The drive motor is located in a right external enclosure 569R, along with the control electronics, and some of the batteries, in an arrangement similar to that depicted in the fourth version of the invention. The rest of the drive components are in a left external enclosure 569L, including a hall effect wheel tachometer which senses rotation of a tachometer magnet 571 that is attached to one of several spokes 568. Components are arranged to place their total center of gravity at a point between the center of the axle 505 and the intersection of the tire 501 with the pavement 502, preferably as close to the pavement 502 as possible. The right external enclosure 569R and the left external enclosure 569L are prevented from twisting by a pair of reinforcement webs 583L and 583R. The right external support neck 581R and the left external support neck 581L each support a pair of front brake pickup brushes 546L and 546R. Note that this wheel is dished, as a conventional multispeed freewheel assembly, since the spokes 568 are arranged asymmetrically, i.e., closer to the wheel centerline on the freewheel side.

FIG. 34 is an external view of the right side of a drive attachment of FIG. 33. The tire 501 is attached to a rim 507 in standard fashion. A bicycle fork 572 is shown without the brake for clarity. The bicycle fork dropout fits into a dropout tang 543R and 543L, on each side. To install this device, the rider holds a handle 584, and lifts the bicycle by its handlebar, sliding the bicycle fork dropout over the dropout tangs 543R and 543L. The hand that held the handle 584 then can be used to close the quick release assembly 503 without the drive attachment pivoting about the hub. A cable 580 connects the two enclosures which contain drive components shown in the previous version of the invention. The right external support neck 581R attaches to the left external support neck 581L with a pair of neck bolts 582.

The usual rider interface components are located at the top of the right external support neck 581R. It is also possible to put a forward facing headlamp and associated switch here. A brake sensor strip 529 is attached to the rim 507. Some riders may not be concerned with maximizing battery life, and can specify this with the user preference switch, located on the user interface 545. A speaker 547 may provide the rider with audio confirmation of commands, and system status updates. A manual control jack 574 may alternatively allow open loop control of the drive with a throttle style control mounted on the bicycle handlebar. This control method is less complicated than the semi-autonomous control described in FIG. 10, and allows the rider to obtain "power on demand."

The reinforcement web 583 may be extended vertically to dampen axial oscillations of the left external enclosure 59L and the right external enclosure 59R. The reinforcement web 67 could even extend upward to become a windshield, (if composed of a transparent material) and forward to become a drag reducing cowling.

FIG. 35 is a cross-sectional rear view of the hub assembly and fastening points of the drive attachment of FIG. 34, section A-A. A right external enclosure support 599R and a left external enclosure support 599L are sandwiched between respective pairs of locknuts. These pairs consist of a right bearing cone locknut 504R and a right support locknut 570R, and a left bearing cone locknut 504L and a left support locknut 570L. Outer support locknuts fit into counterbored lands on respective enclosure supports. The locknuts are not removed unless the hub requires maintenance. The right external enclosure 569R and the left external enclosure 569L attach to respective enclosure supports 585R and 585L with bolts accessible from within the respective enclosures. A right dropout tang 543R and a left dropout tang 543L are part of the right external enclosure 569R and the left external enclosure 569L. The bicycle fork 572 is attached to an axle 505 with the usual quick release assembly 503. Note that the axle 505 and quick release skewer pass through the hub 585 and freewheel 518, but that the cross-sectional details of the hub and freewheel insides are omitted.

Sixth Exemplary Version of the Invention (FIGS. 36-37)

FIG. 36 is an external rear view of a wheel 600 for the front of a standard bicycle, constructed in accordance with the sixth version of the invention of the invention. The wheel 600 includes a tire 601, which contacts a pavement 602 during normal use. A large spur gear 662 is attached to a coaster brake 686, which is part of a hub 685. A coaster brake clamp 687 attaches to an external support neck 681, which extends down in a fork around the small wheel. When the front brake lever is squeezed, a right brake pad 675R approaches a left brake pad 675L, and compresses a brake switch located between a left brake contact point 688L and a right brake contact point 688R. The brake switch is pressure sensitive, and the electronics respond by telling a drive motor 611 (shown in FIG. 37) to apply reverse torque, in direct proportion to the force applied to the brake switch. This actuates the coaster brake 686, to help slow the bicycle with a deceleration proportional to the amount of force the rider applies to the front brake lever. An alternative braking mechanism could use a caliper brake instead of the coaster brake.

Note that the tire 601 is less than half the diameter of previous version of the inventions. This feature allows electrical energy and information to be transferred between active drive components contained in a left external enclosure 669L and a right external enclosure 669R. The electrical energy and information is transmitted through a cable located in a reinforcement web 683. The wheel 600 is secured by a quick release assembly 603A, which closes on a bicycle fork 672, at the dropouts. A secondary quick release assembly 603B prevents the wheel from pivoting about the primary quick release assembly 603A. The secondary quick release assembly closes on a dropout 642 that is attached to the top of the external support neck 681. A right dropout tang 643R and a left dropout tang 643L may be strong enough to prevent the entire attachment from twisting about the dropout of the bicycle fork 672, but the secondary quick release assembly 603B has been added as a safety measure. This quick release assembly 603B holds a dropout 642 to the front brake support bolt.

Rotational energy is transmitted from a motor shaft 616. The motor shaft 616 is attached to a small spur gear 667. The small spur gear 667 meshes with the large spur gear 662, providing an angular velocity reduction. The large spur gear 662 is attached to the coaster brake 686. The coaster brake is attached to the hub 685 in the usual manner, so that rotational energy is transmitted to the tire 601 only in one direction.

The axle 605 does not extend past the outer edges of a pair of dropouts 642L and 642R. The dropouts 642L and 642R are attached to the ends of the fork extension of the external support neck 681. The tire 601 can be changed by removing access panels from the outboard sides of the left external enclosure 669L and the right external enclosure 669R, and removing the quick release assembly, skewer and all from the interior of the axle 605. The coaster brake clamp 687 is disconnected, and the wheel slides down, out of the pair of dropouts 642L and 642R. A hall effect tachometer probe 690 is attached to the left external enclosure 669L, at a point behind the axle 605, so as not to interfere with wheel removal. A tachometer magnet 671 is attached to one of several spokes 668. The tachometer magnet 671 sensed by the hall effect tachometer probe 690, to measure bicycle speed. The right external enclosure 669R and the left external enclosure 669L are prevented from twisting by the reinforcement web 683.

FIG. 37 is an external view of the right side of the drive attachment of FIG. 36. The tire 601 is attached to a rim 607 in standard fashion. To install this device, the rider holds a handle 684, and lifts the bicycle by its handlebar, sliding the bicycle fork 672 dropout over the dropout tangs 643R and 643L. Some riders may not be concerned with maximizing battery life, and can specify this with a user preference switch, which is located in a user interface 645. A speaker 647 may provide the rider with audio feedback regarding system status and command confirmation. A manual control jack 674 may allow optional, direct control of the system by the rider, with an external control switch or continuously variable, throttle-like power control attached to the bicycle handlebar.

An alternative drive transmission for the wheel 600 uses a gear head for speed reduction. The gearhead output is directly coupled to the rotating hub 685. The motor shaft 616 is coupled directly to the gearhead input. This provides compact and efficient drive transmission, coaxially with the tire 601, especially if a planetary type gearhead is used. Freewheeling can be obtained using a bearing arrangement similar to that which will be described in the seventh version of the invention, FIG. 39.

Seventh Exemplary Version of the Invention (FIGS. 38-40)

FIG. 38 is an external view of the right side of a wheel 700 which might be accommodated in the front of a standard bicycle, and which illustrates a variation of the support roller arrangement shown in FIG. 26. Here, one or more support rollers are used for driving the wheel (by frictional engagement) while providing radial as well as axial support. This support is preferably accomplished with three support rollers spaced at 120 degree intervals about the inner circumference of the rim. These support rollers are supported by a non-rotating internal support member, and springs attached between these parts serve to ensure that contact is made between the support rollers and the rim while the bicycle is moving. One support roller is placed near the bottom of the rim, near where the tire contacts the pavement. This support roller is better frictionally coupled to the rim than the upper support rollers, and thus the lower support roller is preferably used to drive the rim. This method does away with rotating radial rim support, as the rim is supported exclusively by the three support rollers.

The wheel 700 includes a tire 701, which contacts the pavement 702 during normal use. The tire 701 is attached to a rim 707 in standard fashion. An anti-rotation peg 761 is brought into contact with the leading edge of the bicycle fork when the wheel 700 is installed on the bicycle. The anti-rotation peg 761 is attached to an internal support member 710. The anti-rotation peg 761 thus prevents the internal support member 710 from rotating in the opposite direction from which the tire 701 is driven by a drive motor 711. An axle nut 724 attaches the internal support member 710 to an axle 705. The drive motor 711 is attached to the internal support member 710 so that the axis of the drive motor 711 is parallel to the wheel axis, and coaxial with the lowermost support roller, as will be shown in FIG. 39. A pair of uppermost support rollers 734A,B are lightly preloaded to maintain contact with a ring in an external support 706. The material chosen for the external support 706 may be hard-coat anodized aluminum or other material.

The wheel 700 allows for lower placement of several batteries 712. It also allows efficient, direct drive transmission with substantial speed reduction and torque increase. The external support structure 706 includes several external support structure ribs 709, which strengthen the mechanical attachment between the rim 707 and the interior of the wheel 700. The internal support member 710 includes a pair of internal support member ribs 713, which strengthen the internal support member 710, serve as cooling fins, and divide the internal support member 710 into separate compartments.

Control of the drive motor 711 is preferably accomplished by direct, open loop means, as with a throttle type control. A motor torque control voltage is sent from an external throttle potentiometer to a PWM motor driver 720, which sends pulsed electrical energy from the batteries 712 to the drive motor 711 to maintain a given output torque. A user interface 747 includes a charging jack and connector for the external throttle potentiometer. Control of the motor in this and all other embodiments can alternatively be through a microcontroller.

FIG. 39 is a cross-sectional view AA of the wheel of FIG. 38. A quick release assembly 703 functions in the usual way, such that compression from the quick release assembly 703 rigidly attaches the wheel 700 to the standard bicycle, with the axle 705 fitting into a bicycle fork dropout. The axle 705 is attached with a pair of axle nuts 724L and 724R, each of which contact the inside of respective bicycle fork dropouts. The axle 705 is also secured to the internal support member 710 by the axle nuts 724L,R.

The axis of a support roller 734C is parallel to the wheel axis. A groove in the support roller 734C guides a ring formed as part of the external support structure 706. The bottom of the groove in the support roller 734C continuously contacts the inner diameter of the ring in the external support structure 706, with the vehicle mass providing normal force for good frictional coupling. The edges of the groove in the support roller 734C may contact the edge of the ring in the external support structure 706, reducing axial movement of the tire 701 when axial forces are applied to the tire 701, especially during a turn. Note that the radius of the inside corner in the groove in the support roller 734C is slightly greater than the radius on the portion of the ring in the external support structure 706 which may be in contact with the support roller 743C. This difference in radii decreases undesirable friction between the two parts while an axial load is applied to the tire 701.

The support roller 734C is generally free to rotate about a bearing spindle 732, since the roller is supported by a pair of angular contact ball bearings 733A,B. The bearing spindle 732 is also free to rotate with respect to the internal support member rib 713, since the spindle is supported by a pair of bearings 796L and 796R. The bearing spindle 732 is rigidly, coaxially attached to a motor shaft 716, by a drive shaft coupling 789. A clutch bearing 795 ensures that the bearing spindle 732 and motor shaft 716 do not turn as the bicycle moves forward unless driven by the drive motor 711. The outer housing of the clutch bearing 795 is attached to the support roller 734C, while the inner rollers of the clutch bearing 795 contacts the bearing spindle 732. Alternatively, a clutch or freewheel may be incorporated into the drive shaft coupling 789, and the support roller 734C may be rotationally fixed to the bearing spindle 732. Other methods of power transmission or bearing mounting will be apparent to those skilled in the art. Other power transmission options may include use of spur or bevel gears instead of or in addition to friction coupling.

The uppermost support rollers 734A and 734B are the outermost portion of adjustable height, stud mounted track rollers, and they have grooves similar to the groove in the support roller 734C. Because the uppermost support rollers 734A and 734B are mounted on an eccentric shaft (i.e., the mounting stud is not concentric with the support rollers), rotating the mounting stud adjusts the roller position. These mounting studs are each attached to a roller support bracket 794A,B. Each roller support bracket 794A,B includes a journaled support that is free to rotate about the mounting stud axis, and with respect to the internal support member rib 713. A pair of torsion springs 71A,B maintain pressure between the support rollers 734A,B and the external support 706. The pair of torsion springs 71A,B are oriented so that the support rollers 734A,B are each extended radially outward (toward the tire) in the relaxed state. During assembly, the roller support bracket is attached to the internal support member rib, while the stud is rotated to move the support roller 734A or B away from the external support 706. Thermal expansion differentials between the internal support member ribs 713 and the external support structure 706 are automatically compensated for by movement of the uppermost support rollers 734A,B. Alternatively, only one of the two uppermost support roller assemblies may incorporate spring loading. Also, compression springs and linear slides may be used (instead of torsion springs 71A,B) to maintain pressure between the uppermost support rollers 734A,B and the external support 706. Other methods of roller mounting and radial preloading will be apparent to those skilled in the art.

Alternatively, the cross-section of the ring in the external support 706 is preferably configured with some protrusion or concavity which mates with a concavity (or protrusion) in the support rollers 734A,B,C. As depicted in FIG. 39, the external support 706 has a ring which is received in a groove in the support rollers 734A,B,C. Because of the large normal force between the lowermost support roller 734C and the external support 706, rigid materials can be chosen for both parts without slipping when powered by the drive motor 711. Although rigid materials typically have a lower coefficient of friction, using them here may result in more efficient and durable power transmission. Steel may be the preferred support roller material, and hard coat anodized aluminum the preferred external support material. Other plastic, metal, or composite materials may also be chosen for these components, in the interest of reducing undesirable friction and wear, or improving manufacturability.

In a simple version of the wheel 700, the external support 706 may consist merely of a stock bicycle rim 707. The rim 707 preferably features beveled side walls, and the support rollers 734A,B,C are machined to conform to the cross-section of the rim 707. A timing belt and pulley arrangement (or other rotational coupling) may transfer rotational energy to the bottom support roller 734C from the motor 711, allowing placement of the motor 711 at a desired height above the pavement 702. The support rollers 734A,B,C may include a groove to accommodate the tube stem as it passes through each roller while the tire 701 and rim 707 rotate. (An alternate tire arrangement could place the inflation valve flush with or below the inner surface of the rim 707. This involves using a tubeless tire, and inflating with a flush mounted valve. Such flush mounted valves are commonly found on basketballs and other inflatable athletic equipment.)

Referring to FIG. 38, decreasing radial dimensions of the internal support 710 and the inner diameter of the external support 706 can reduce cost, friction, weight, and rotational inertia. The minimum internal diameter of the external support 706 is approximately equal to the sum of the diameters of the axle nut 724R, drive motor 711, and support roller 734C. Several batteries 712 are mounted by rigid attachment to the smaller internal support. The batteries 712 are hung below the axle and adjacent to the external support 706. This is accomplished in a manner similar to that described in the fourth or fifth embodiments, as depicted in FIGS. 29 through 32 and FIGS. 33 through 35, respectively.

FIG. 40 is a cross-sectional view of the lower half of A-A of a wheel similar to that of FIG. 38, showing an alternate drive/support roller arrangement. The wheel external support structure 706 is supported by the drive/support roller 734B and a hub bearing 727. The hub bearing 727 includes an inner race that is attached to the stationary axle 705 by the axle nut 724L. The outer race of the hub bearing 727 is enclosed by a support roller 734A. The support roller 734A is composed of two halves, held together by several screws 73. The outer face of the support roller 734A is one of the last components to be added during assembly. An annular groove cut into the support roller 734A mates with an annular track in the external support structure 706. There is some clearance between these two parts to allow for thermal expansion of the internal support member rib 713. Differential expansion will occur even if the same materials are chosen for the internal support member rib 713 and the external support structure 706, due to heating of the internal support member rib 713 by the motor 711. Between 0.005 and 0.02 inches of clearance should adequately compensate for this expansion. During encounters with irregularities in the pavement 702, the hub bearing 727 acts to keep the external support structure 706 concentric with the axle 705. The gap between the support roller 734A and the external support structure 706 might be partially filled with foam or a suitable elastomer to ensure that the latter two parts rotate with the same angular velocity, even if the two parts are concentric.

The clutch bearing 795 serves to permit freewheeling of the support roller 734B and bearing spindle 732, as well as coupling the drive shaft to splines in the motor shaft 711. The support roller 734B is rotationally fixed to the bearing spindle 732 with a keyway 778. A pair of spacer rings 77L and 77R are placed over the bearing spindle 732, and in axial contact with the support roller 734B and the inner race of the respective bearings 796L and 796R. A pair of roller retaining rings 764L,R fit into grooves cut into the bearing spindle 732. These retaining rings 764L,R may be combined with preloading springs if desired.

Referring to FIG. 40, reducing the inner diameter of the portion of the external support structure 706 in contact with the drive/support roller 734B, reduces friction and wear. Manufacturing cost, weight, and rotational inertia can also be reduced by using conventional bicycle spokes to connect a conventional bicycle rim to a reduced outer diameter of the external support structure 706. The several batteries 712 are placed adjacent the right side of the of the conventional bicycle spokes, as close to the pavement 702 as possible, and rigidly attached to the internal support member rib 713. The portion of the external support 706 extending vertically towards the axle 705 is made thicker to provide axial rigidity. The hub bearings 727 are replaced by an outer bronze sleeve bearing and a stationary steel inner sleeve, located between the axle 705 and external support 706. A pair of needle roller bearings and washers (similar to McMaster Carr #5909K32 and K35) on either side of the external support 706 provide axial constraint. Locknuts on either side of the axle 705 control the preloading of the needle roller bearings. The function of the support roller 734A, and the several screws 73 is replaced by an elastomer located between the stationary steel inner sleeve and the axle. To compensate for radial misalignment, this elastomer is deformed in one only place as the wheel rotates. The drive/support roller 734B is reduced in diameter as the inner diameter of the external support 706 is reduced. Axial rigidity is provided at the wheel hub by the pair of needle roller bearings, instead of at the contact between the drive/support roller 734B. Hence, the drive support roller 734B can be omitted, along with the keyway 778. The bearing spindle 732 now also performs the function of the drive/support roller.

Eighth Exemplary Version of the Invention (FIGS. 41-43)

FIG. 41 is an external view of the right side of a wheel 800 which may be accommodated within the front fork of a standard bicycle. The wheel 800 includes a tire 801, which rides on the pavement 802 in normal use. The tire 801 is inflated by a tube stem 808. A non-rotating cover 865R occupies the central portion of the wheel 800. The wheel 800 may be quickly attached or removed from bicycle in the usual manner, by adjusting a quick release assembly 803. The non-rotating cover 865R contains several cooling ribs 81, oriented horizontally to take advantage of airflow around the moving bicycle. The non-rotating cover 865R also holds a user interface 845, which may include a manual control jack and/or a charging jack, and a speaker 847. The manual control jack may permits the rider to connect a manual/open loop control (such as a throttle), or other more direct means of communicating the commands described in FIG. 9. It is also possible to put a forward facing headlamp and associated switch on the surface of the non-rotating cover 865R. A right external support structure 806R is provided as a narrow annulus in this embodiment, and is there to cover the bearings and bevel gear. Construction may otherwise be similar to that of the wheel 100. A left external support structure 806L supports a rim 807. Several external support structure ribs 809 strengthen the mechanical attachment between the rim 807 and the interior of the wheel 800. Several external support structure bolts 822 attach the right external support structure 806R to internal rotating members, as will be revealed in detail in the following drawings.

FIG. 42 is view of the right side of the wheel 800 of FIG. 41, with the non-rotating cover removed. An internal support member 810 supports two rows of bearings in the annular region outside of the bevel gear. The wheel 800 features placement of bearings, which serve the same function as hub bearings, close to the wheel rim 807, so that the internal support member 810 is exposed. This has the advantage of allowing axial expansion of the dimensions of the internal support member 810 without interfering with frame members of the bicycle.

Several internal support member ribs 813 strengthen the internal support member 810. An axle nut 824R secures the axle to the non-rotating internal support member 810. Thermally conductive grease placed between the internal support member 810 and the non-rotating cover 865R aids in transferring heat away from the drive components.

A drive motor 811 provides propulsive force to the wheel 800. A bevel gear 817 is concentrically attached to the rim 807 and tire 801, so that the bevel gear 817 rotates as the bicycle moves. The bevel gear 817 engages a pinion gear 815. The pinion gear 815 is attached to the output shaft of the drive motor through a freewheel 818, such that the motor shaft does not rotate unless driven by the motor 811.

A microcontroller 819 controls the motor 811, as described in the flowchart and block diagrams of FIGS. 9 and 10. A PWM motor driver 820 controls the flow of electrical energy to the drive motor 811. An interface board 821 includes analog electronic components required for motor control. A pair of front brake pickup brushes 846 detect braking or control codes. Alternatively, the drive motor 811 may be controlled in an open loop manner, with a throttle style control attached to the bicycle.

The inner race for the bearings is attached to the internal support member 810 with several inner bearing race bolts 82. The outer race consists of two halves held together with several outer bearing race bolts 83. Several batteries 812 are positioned asymmetrically about the drive motor 811 to allow the pinion gear 815 to be located above the bottom of the wheel. This placement is preferred, since there is a gap in the support for the inner bearing race near the pinion gear 815. Batteries could be moved toward the bottom of the wheel, while expanding the axial dimensions of the non-rotating cover in this region to enclose them. This would further lower the bicycle center of gravity.

FIG. 43 is a removed cross-sectional view B-B of FIG. 42. This shows the placement of several support rollers 896L and 896R, here provided in the form of bearings. A dust shield 837 prevents dust from entering the region enclosing the rollers 896L and 896R. Bearing races are designed to be assembled in a certain order. A left outer bearing race is part of the bevel gear 817. The rollers 896L are greased and loaded into this race first, then an inner bearing race 898 is installed above the rollers 896L. Another string of rollers 896R is greased and loaded into the inner bearing race 898, and then a right outer bearing race 897R is attached to the bevel gear 817 with several outer bearing bolts 83. Finally, the internal support member 810 is attached to the inner bearing race 898 with several inner bearing bolts 82. Other arrangements and types of rollers and bearings might be used instead.

Ninth Exemplary Version of the Invention (FIG. 44)

The wheels described above may be used in vehicles other than bicycles, and may also be used to propel users even where they are not present in a classical "vehicle." To illustrate, FIG. 44 is an external rear view of a handle 900 which might use the wheels 100, 200, 300, or 700 to propel (pull) a skateboarder or in-line skater. The handle 900 includes a brake lever 992, which controls the distance between a left brake pad 975L and a right brake pad 975R. A pair of dropouts 942L and 942R holds the wheel. Motor start thresholds are set lower for use with this handle 900. Alternatively, motor torque is controlled by raising and lowering the handle 900, changing the pitch of the wheel. In this mode, a microcontroller interprets the road grade sensor signal as a throttle-style, power on demand input. Dropping the handle disables the motor.

Tenth Exemplary Version of the Invention (FIGS. 45-52)

FIG. 45 shows a view of the right side of a wheel 1000 specifically configured for use with a bicycle. The wheel 1000 includes a tire 1001, which contacts a pavement 1002 during normal use. The tire 1001 is a standard 700 c×32 mm. The wheel 1000 attaches to a bicycle 1019 with a quick release assembly 1003, such as is found on many bicycles currently sold. The tire 1001 is attached to a rim 1007 in the usual way for a tire of the indicated dimensions. The rim 1007 is a Fairlane, manufactured by Bontrager. This rim 1007 features an asymmetric spoke bed, and was originally designed for a dished rear wheel. The rim 1007 is attached a hub housing 1006 with several spokes 1068. Other components shown in this view do not rotate with the tire 1001.

A motor mount 1010 supports the active elements of the wheel 1000 which provide propulsion. The motor mount 1010 supports a drive motor 1011, which is a compact NdBFe permanent magnet motor capable of providing 245 Watts of continuous output power, at about 91% system efficiency at 2870 rpm. The drive motor 1011 in this embodiment is a brushless motor, "Standard 4 inch", manufactured by Transmagnetics (www.Transmag.com). The motor mount 1010 supports a battery 1012, which consists of forty rechargeable D size cells, and provides 48 total Volts and total capacity of nine Amp-hours. The batteries 1012 in this embodiment are #D9000H, manufactured by Aero, Inc. The motor mount 1010 is an aluminum plate with sufficient stiffness and strength to support the heavy batteries 1012 and the powerful drive motor 1011, while dampening oscillations due to roughness in the pavement 1002. The motor mount 1010 is attached to several aluminum cooling fin channels 1013, which strengthen the motor mount 1010, and remove waste heat from the drive motor 1011. Thermally conductive grease is placed between the drive motor 1011, motor mount 1010, and the cooling fin channels 1013 during assembly and attachment with several bolts 1022.

Drive transmission components are protected from dust and moisture by a hub cover 1009. Several alignment pins 1015 maintain accurate positioning of the drive motor 1011 with respect to drive transmission components that will be depicted in FIG. 48. A pin removal thread 1017 located between two alignment pins 1015 simplifies disassembly. A bolt driven into the pin removal thread 1017 will force the pinned components apart.

Rotation of the motor mount 1010 while the drive motor 1011 is providing power to the wheel 1000, is prevented by an anti-rotation leg 1061A,B,C. The anti-rotation leg 1061A,B,C is attached to an anti-rotation contact pad 1021. The anti-rotation contact pad 1021 contacts the handlebar of the bicycle 1019. Proper positioning of the anti-rotation pad on any bicycle is accomplished by loosening several wing nuts 1082A,B,C, followed by proper adjustment and retightening.

Control of the drive motor 1011 is accomplished with a throttle control potentiometer 1023. The throttle control potentiometer 1023 is attached to the anti-rotation leg 1061C, so that it is close to the bicycle handlebar. A throttle control lever 1024 extends from the throttle control potentiometer, so that the rider can reach it with the right thumb. A motor controller 1020 uses the value of the throttle control potentiometer to control the drive motor 1011 output power. The motor controller 1020 is a pulse width modulated controller available from Transmagnetics (www.transmag.com). The throttle control lever 1024 is spring loaded, so that it returns to the unpowered state as the thumb is removed. As the rider uses the hand to apply the brakes, the thumb is almost necessarily removed from the throttle control.

FIG. 46 shows an end view of the wheel 1000. Note that the several spokes 1068 are arranged in a dished configuration, to make room for drive components on the right side of the wheel 1000. The entire assembly is narrow enough to fit standard bicycles without modification. An axle 1005 is sized according to standard dimensions, and fits into the standard bicycle fork dropout.

The axle 1005 supports hub bearings, as will be shown in FIG. 49. One hub bearing is enclosed by a thrust bearing outer cover 1027. The axle 1005 is also attached to a horizontal drive support 1025, and a vertical drive support 1026. Both the horizontal drive support 1025 and the vertical drive support 1026 are attached to the motor mount 1010.

FIG. 47 is a right side view of the wheel 1000, with the hub cover 1009, and motor mount 1010 removed to show internal hub details. The horizontal drive support 1025 and the vertical drive 1026 support fit into the hub housing 1006. Both drive supports provide rigid mechanical coupling between the axle 1005 and the motor mount 1010.

Rotational energy is transmitted from the drive motor 1011 to the tire 1001 through a drive spindle 1032, as will be detailed in FIG. 48. The drive spindle is supported on one side by drive spindle bearing 1033B. The drive spindle 1032 is frictionally coupled to the hub housing 1006. The ratio between the drive spindle 1032 and the hub housing 1006 is approximately 12. This ratio is chosen for optimum motor efficiency in powering a bicycle at the 10 to 20 mile per hour speed range on level pavement, with the four inch Transmagnetics motor.

Inside the tire 1001 is an inflatable tube, indicated by a tube stem 1008. Alternatively, the tire 1001 may be tubeless.

FIG. 48 is a cross sectional view AA of FIG. 45. The quick release assembly 1003A,B,C,E functions in the usual way. Compression between the quick release assembly part 1003B and a left outer locknut 1004A rigidly attaches the wheel 1000 to a bicycle fork dropout 1019, with the axle 1005, fitting into the dropout 1019. The quick release assembly part 1003E serves a similar function on the right side of the wheel 1000.

The drive spindle 1032 is frictionally coupled to the hub housing 1006, with the vehicle weight providing force normal to the contact surface. The drive spindle is supported by two drive spindle bearings 1033A and 1033B. The drive spindle bearings 1033A,B are size R8 steel ball bearings. The outer races of the drive spindle bearings 1033A,B are attached to the vertical drive support 1026. The vertical drive support 1026 is attached to the axle 1005. It will be shown in FIG. 49 that the main vertical support of the hub housing 1006 is through the drive spindle 1032. Rotation of the drive spindle 1032 forces the hub housing 1006 to rotate, with a reduction ratio equal to the ratio of the inner diameter of the hub housing 1006 to the diameter of the drive spindle 1032.

Durability of the friction drive transmission is achieved with careful choice of materials. The hub housing 1006 is fabricated from 7075 aluminum, with T651 temper, and hard coat anodized. The drive spindle 1032 is hardened steel. Alternatively, the hub housing 1006 can also be steel, or the contacting portion of the hub housing 1006 could be a harder material than the base.

Traction fluid, such as Santotrac 50 (www.santotrac.com) increases friction drive efficiency, and reduces component wear. Traction fluid is applied to the surface of the drive spindle 1032 with a traction fluid wick 1057. The traction fluid wick 1057 is a cylinder of hard felt located in the vertical drive support 1026. A wick sleeve 1041 conforms to the diameter of the drive spindle 1032, holding the traction fluid wick 1057 in contact with the drive spindle 1032. A spring 1056 provides light contact force to the traction fluid wick 1057. Traction fluid is introduced to the traction fluid wick 1057 by removing the traction fluid port plug 1014, and inserting a filling tube through the hole in the vertical drive support 1026.

A motor shaft 1016 transmits rotational energy from the drive motor 1011 to the drive spindle 1032. The drive spindle 1032 is coupled to the drive motor shaft 1016 through a freewheeling roller clutch bearing 1018, such that the tire 1001 will turn without rotating the drive motor shaft 1016, if the drive motor 1011 is unpowered. The roller clutch bearing 1018 thus enables the rider to pedal with no resistance from the drive motor 1011 if the bicycle is traveling too slowly or quickly for the drive motor 1011 to be of assistance, or if the drive motor 1011 is disabled. The roller clutch bearing is similar to McMaster-Carr part number 2489K11.

The hub cover 1009 is attached to the horizontal drive support 1025 with bolts and a sealant 1042. A felt dust shield 1035B in the form of a ring is attached near the inside edge of the hub cover 1009. The felt dust shield 1035A contacts the rotating hub housing 1006, and seals the drive components from contaminants.

FIG. 49 shows the enlarged, removed cross sectional view of the central hub bearing region of FIG. 48. Bearings shown in this view provide low friction rotation of the hub housing 1006 about the axle 1005. These bearings also constrain the hub housing 1006 and rim 1007 with respect to the axle 1005, in the following degrees of freedom: Axially, limiting motion of the hub housing 1006 left to right. Torsionally, limiting spin of the hub housing 1006 about the axle 1005, in the plane of FIG. 49. Radially, limiting excursions from concentricity of the rim with respect to the axle.

Axial and torsional constraints are provided by a pair of needle roller thrust bearings 1043A and 1043B. These thrust bearings are similar to McMaster-Carr part number 5909K32. A set of washers 1040A,B,C,D serve as raceway surfaces for the needle rollers. Axial preloading force is adjusted with the locknuts 1004A and 1004B, with a axle washer 1028 providing isolation. Complimentary locknuts and washer are attached to the axle on the other side of the vertical drive support 1026. A felt dust shield 1035B seals the needle roller bearing 1043A from contaminants.

Radial constraint is achieved with a sleeve bearing 1036. The sleeve bearing 1036 is journaled about an outer concentric support 1039. The outer concentric support 1039 is resiliently attached to the axle 1005. An inner concentric support 1038 includes an inner diameter that is relatively closely fitted to the axle. A pair of O-rings 1037A and 1037B are inserted into gaps cut between the inner concentric support 1038 and the outer concentric support 1039. Cylindrical contact regions are located between these concentric supports, close to the axial center. As the outer concentric support 1039 departs from concentricity with the axle, the O-rings 1037A,B are compressed until the cylindrical contact regions meet.

Referring back to FIG. 48, because the vertical drive support 1026 and drive spindle 1032 nominally define the vertical spacing between the hub housing and axle such that the inner and outer concentric supports 1038 and 1039 are indeed concentric, most of the vertical force between the pavement 1002 and the axle 1005 is transmitted through contact between the drive spindle 1032 and hub housing 1006. This occurs as long as the O-rings 1037A,B are not fully compressed at the bottom, because the force required to compress the O-rings 1037A,B to the point of contact between the inner and outer concentric supports 1038 and 1039, is small compared to the weight of the vehicle. The central contact gap between the inner and outer concentric supports 1038 and 1039 is about 0.02 inches. This gap compensates for thermal expansion differences between the vertical drive support 1026 and the hub housing 1006. Original differences due to dimensional tolerances are also compensated for by this bearing configuration.

Modifications to the Tenth Version

Referring to FIG. 45, the drive motor 1011 may be an internal combustion engine, and the battery 1012 may be a gas or liquid fuel tank. Alternatively, the drive motor 1011 may be a brush commutated electric motor, and the motor controller 1020 may be suitable to a brush commutated electric motor. The battery 1012 may be a fuel cell and fuel tank. The motor controller 1020 may be of semi-autonomous configuration, as described in FIGS. 9 and 10 of the attached material.

Referring to FIG. 45, the anti-rotation leg 1061A may support a variety of accessories, and may be extended to temporarily attach to the bicycle handlebar at several points with Velcro or a other suitable quick release mechanism. Accessories may include indicators, such as battery charge or temperature; motor RPM, power, or temperature; and bicycle speed or distance traveled. Illumination accessories may include directional or brake signals, or a headlamp. A windshield may also be attached to the anti-rotation leg 1061A.

Referring to FIG. 46, a kickstand may be attached to the bottom of the battery 1012, such that the wheel 1000 may be stored upright, independent of the bicycle 1019. The long anti-rotation leg 1061A,B,C can also function as a handle, to move the wheel independently of the bicycle.

Referring to FIG. 48, other measures to reduce wear include means to detect slipping of the bearing spindle 1032 with respect to the hub housing 1006, and disabling or slowing the drive motor 1011. The angular acceleration of the motor shaft 1016 can be measured by a tachometer and analog differentiator. The motor may be immediately slowed or disabled if this acceleration exceeds a certain threshold. Alternatively, the angular velocities of the tire 1001 and motor shaft 1016 can be compared and the drive motor 1011 may be slowed or disabled if the ratio significantly departs from that determined by the diameters of the bearing spindle 1032 and the hub housing 1006. As an alternative to traction fluid, traction grease, such as Santotrac EP-2, could be applied to the driving portion of the hub housing 1006.

Referring to FIG. 48, this version may be adapted to drive the rear wheel of a bicycle, with a freewheel and cogs rotating about the left side of the axle 1005, between the dropouts and the hub housing 1006. The inner diameter of the pedal driven freewheel is rotationally coupled to the hub housing 1006, with a spider coupling extending about the thrust bearing outer cover 1027. The roller clutch bearing 1018 is reversed to drive the wheel in the opposite direction form that described previously.

Further refinements to the tenth exemplary version are described in FIGS. 50-52.

FIG. 50 is view of the right side of the wheel of FIG. 45 from the first addendum, with the hub cover and motor mount removed, and showing a first alternative friction drive contact force multiplication method. A drive ring 1056 is composed of polyurethane, and cast onto the inner diameter of the hub housing 1006. Alternatively, the drive ring 1056 may be composed of steel, another durable metal, or a high friction coefficient composite, such as a brake lining material. The drive support 1026 supports the drive spindle 1032, such that a line between the axle 1005 and the drive spindle 1032 forms an angle (alpha) from horizontal that is greater than zero, and less than 90 degrees. The normal force between the drive spindle 1032 and the drive ring 1056 is multiplied by the inverse of the sine of alpha. Increasing the normal force increases the torque that can be applied to the drive spindle 1032 without slipping, and hence, increases the torque that can ultimately be applied to the tire. An idler roller 1053 contacts the drive ring 1056 opposite the drive spindle 1032. The idler roller 1053 supplies the horizontal component of force necessary to oppose the normal force on the drive spindle 1032, so that this force is not taken up by the axle 1005. The idler roller 1053 rotates about an idler roller shaft 1055. An idler bearing 1054 permits the idler roller shaft 1055 to spin.

FIG. 51 is an enlarged, removed cross sectional view of the drive spindle contact area, with section in the same plane as FIG. 48 from the first addendum, and showing a second alternative friction drive contact force multiplication method. The drive spindle 1032 includes beveled flanges that contact radii on the edge of the drive ring 1056. As above, the drive ring 1056 is attached to the hub housing 1006. Normal forces between the drive spindle 1032 and drive ring 1056 are increased by force balance requirements, in a manner similar to that described in the discussion of FIG. 50.

FIG. 52 is an enlarged, removed cross sectional view of the drive spindle contact area, with section in the same plane as FIG. 48 from the first addendum, and showing a third alternative friction drive contact force multiplication method. The drive spindle 1032 includes radii that contact beveled walls in a recess cut into the drive ring 1056. As above, the drive ring 1056 is attached to the hub housing 1006. Normal forces between the drive spindle 1032 and drive ring 1056 are increased by force balance requirements, in a manner similar to that described in the discussion of FIG. 50.

Eleventh Exemplary Version of the Invention (FIGS. 53-56)

The eleventh version is similar to the tenth version, in terms of external appearance, with the addition of an aft anti-rotation pad to contact the trailing edge of the handlebar and prevent drive component rotation which may be due to friction alone. The eleventh version also departs from the tenth version with an internal gear and toothed pinion replacing friction drive, for increased torque capability. An alternate hub bearing arrangement is also described.

FIG. 53 shows a view of the right side of a wheel 1100 specifically configured for use with a bicycle. The wheel 1100 includes a tire 1101, which contacts a pavement 1102 during normal use. The tire 1101 is a standard 700 c×32 mm. The wheel 1100 attaches to a bicycle 1119 with a quick release assembly 1103A-E, such as is found on many bicycles currently sold. The tire 1101 is attached to a rim 1107 in the usual way for a tire of the indicated dimensions. The rim 1107 is similar to a Fairlane model rim, currently manufactured by Bontrager. This rim 1107 features an asymmetric spoke bed, and was originally designed for a dished rear wheel. The rim 1107 is attached a hub housing 1106 with several spokes 1168. Other components shown in this view do not rotate with the tire 1101.

A motor mount 1110 supports the active elements of the wheel 1100 which provide propulsion. The motor mount 1110 supports a drive motor 1111, which is a compact NdBFe permanent magnet motor capable of providing 245 Watts of continuous output power, at about 91% system efficiency at 2870 rpm. The drive motor 1111 in this embodiment is similar to a brushless motor, "Standard 4 inch", manufactured by Transmagnetics (www.Transmag.com). The motor mount 1110 supports a battery 1112, which consists of forty rechargeable D size cells, and provides 48 total Volts and total capacity of nine Amp-hours. The batteries 1112 in this embodiment are similar to model #D9000H, currently manufactured by Aero, Inc. The motor mount 1110 is an aluminum plate with sufficient stiffness and strength to support the heavy batteries 1112 and the powerful drive motor 1111, while dampening oscillations due to roughness in the pavement 1102. The motor mount 1110 is attached to several aluminum cooling fin channels 1113, which strengthen the motor mount 1110, and remove waste heat from the drive motor 1111. Thermally conductive grease is placed between the drive motor 1111, motor mount 1110, and the cooling fin channels 1113 during assembly and attachment with several bolts 1122.

Drive transmission components are protected from dust and moisture by a hub cover 1109. Several alignment pins 1115 maintain accurate positioning of the drive motor 1111 with respect to drive transmission components that will be depicted in FIG. 56. A pin removal thread 1117 located between two alignment pins 1115 simplifies disassembly. A bolt driven into the pin removal thread 1117 will force the pinned components apart.

Rotation of the motor mount 1110 in either direction, is prevented by an anti-rotation leg 1161A,B,C. The anti-rotation leg 1161A,B,C is attached to a pair of anti-rotation contact pads 1121A and 1121B. The anti-rotation contact pads 1121AB contact the handlebar of the bicycle 1119. Proper positioning of the anti-rotation pads on any bicycle is accomplished by loosening several wing nuts 1182A,B,C,D,E followed by proper adjustment and retightening. Alternatively, a collet style adjustment can be used with cylindrical anti-rotation leg components.

Control of the drive motor 1111 is accomplished with a throttle control potentiometer 1123. A cable 1166 carries the throttle control signal to the motor controller 1120. The throttle control potentiometer 1123 is attached to the anti-rotation leg 1161C, so that it is close to the bicycle handlebar. A throttle control lever 1124 extends from the throttle control potentiometer, so that the rider can reach it with the right thumb. A motor controller 1120 uses the value of the throttle control potentiometer to control the drive motor 1111 output power. The motor controller 1120 is similar to a pulse width modulated controller currently available from Transmagnetics (www.transmag.com). The throttle control lever 1124 is spring loaded, so that it returns to the unpowered state as the thumb is removed. As the rider uses the hand to apply the brakes, the thumb is almost necessarily removed from the throttle control.

FIG. 54 shows an end view of the wheel 1100. Note that the several spokes 1168 are arranged in a dished configuration, to make room for drive components on the right side of the wheel 1100. The entire assembly is narrow enough to fit standard bicycles without modification.

An axle 1105 is sized according to standard dimensions, and fits into the standard bicycle fork dropout. The axle 1105 supports hub bearings, as will be shown in FIG. 56. The axle 1105 is also attached to a horizontal drive support 1125, and a vertical drive support 1126. Both the horizontal drive support 1125 and the vertical drive support 1126 are attached to the motor mount 1110.

FIG. 55 is a right side view of a hub assembly for the wheel 1100, with the hub cover 1109, and motor mount 1110 removed to show internal hub details. The horizontal drive support 1125 and the vertical drive 1126 support fit into the hub housing 1106. Both drive supports provide rigid mechanical coupling between the axle 1105 and the motor mount 1110. The motor mount 1110 is fastened to the drive supports 1125 and 1126 by bolts anchored to several threaded inserts 1172.

Rotational energy is transmitted from the drive motor 1111 to the tire 1101 through a drive spindle 1132, as will be detailed in FIG. 56. The drive spindle is supported on one side by drive spindle bearing 1133B. The drive spindle 1132 is rotationally coupled to the hub housing 1106 with a internal gear 1162. The internal gear 1162 is attached to the hub housing 1106 with several internal gear bolts 1194. The ratio between a pinion cut into the drive spindle 1132 and the internal gear 1162 is approximately 12. This ratio is chosen for optimum motor efficiency in powering a bicycle at the 10 to 20 mile per hour speed range on level pavement, with the four inch Transmagnetics motor. A hub bearing bushing 1127R supports the inner race of a hub bearing 1143R about the axle 1105, as will be seen in the next drawing.

FIG. 56 is a cross sectional view AA of FIG. 53. The quick release assembly 1103A,B,C,E functions in the usual way. Compression between the quick release assembly part 1103B and a left outer locknut 1104A rigidly attaches the wheel 1100 to a bicycle fork dropout 1119, with the axle 1105, fitting into the dropout 1119. The quick release assembly part 1103E serves a similar function on the right side of the wheel 1100.

The drive spindle 1132 is rotationally coupled to the hub housing 1106, through pinion teeth cut into the drive spindle 1132, which mesh with teeth in the internal gear 1162. The drive spindle is supported by two drive spindle bearings 1133A and 1133B. Inner races of the bearings 1133AB are attached to the drive spindle 1132 with a press fit and retaining compound. The drive spindle bearings 1133A,B are similar to size R8 steel ball bearings. The outer races of the drive spindle bearings 1133A,B are attached to the vertical drive support 1126, and secured with retaining compound. The vertical drive support 1126 is attached to the axle 1105, and secured by a pair of locknuts 1104B and 1104C.

A motor shaft 1116 transmits rotational energy from the drive motor 1111 to the drive spindle 1132. The drive spindle 1132 is coupled to the drive motor shaft 1116 through a freewheeling roller clutch bearing 1118, such that the tire 1101 will turn without rotating the drive motor shaft 1116, if the drive motor 1111 is unpowered. The roller clutch bearing 1118 thus enables the rider to pedal with no resistance from the drive motor 1111 if the bicycle is traveling too slowly or quickly for the drive motor 1111 to be of assistance, or if the drive motor 1111 is disabled. The roller clutch bearing 1118 is similar to McMaster-Carr part number 2489K11.

The motor shaft 1116 is mechanically coupled to the roller clutch bearing 1118 in a manner that compensates for shaft misalignment. A shaft coupling pin 1177C is press fit into the motor shaft 1116. The shaft coupling pin 1177C slip fit into two holes in opposite sides of a shaft coupling ring 1178. A pair of shaft coupling pins 1177A and 1177B are perpendicular to the shaft coupling pin 1177C, and press fit into opposite sides of the shaft coupling ring 1178. The shaft coupling pins 1177AB are slip fit into holes in a roller clutch housing 1134. The roller clutch housing 1134 is bonded to the roller clutch bearing 1118 with retaining compound.

Radial, axial, and torsional constraint of the rim 1107 with respect to the axle 1105, is provided by the hub bearings 1143L and 1143R. Hub bearings 1143LR are thin section angular contact ball bearings, similar to RBC Bearings part #KA025AR0*RBC. Large diameter angular contact bearings were chosen because of possible high moment loading, especially during a turn. As will be apparent to those skilled in the art, double row angular contact bearings (such as #5204A, currently manufactured by SKF), smaller diameter angular contact bearings, Conrad bearings, needle, or tapered roller bearings may also prove effective, especially if moment loads are other than anticipated.

The outer races of the hub bearings 1143LR are mechanically attached to the hub housing 1106, by compression by several race clamp bolts 1195. This compression is applied through an outer race clamp 1145, an outer race spacer 1144, and a flange in the inner diameter of the hub housing 1106.

The hub cover 1109 is attached to the motor mount 1110 with bolts passing through hub cover standoffs 1154. The labyrinth dust shield cut into the hub housing 1106 and hub cover 1109, seals the drive components from contaminants.

The following alternative configurations are similar to this version. Referring to FIG. 53, the drive motor 1111 may be an internal combustion engine, and the battery 1112 may be a gas or liquid fuel tank. Alternatively, the drive motor 1111 may be a brush commutated electric motor, and the motor controller 1120 may be suitable to a brush commutated electric motor. The battery 1112 may be a fuel cell and fuel tank. The motor controller 1120 may be of semi-autonomous configuration, as described in FIGS. 9 and 10 of the attached material.

Also referring to FIG. 53, the anti-rotation leg 1161A may support a variety of accessories, and may be extended to temporarily attach to the bicycle handlebar at several points with Velcro or a other suitable quick release mechanism. Accessories may include indicators, such as battery charge or temperature; motor RPM, power, or temperature; and bicycle speed or distance traveled. Illumination accessories may include directional or brake signals, or a headlamp. A windshield may also be attached to the anti-rotation leg 1161A.

Referring to FIG. 54, a kickstand may be attached to the bottom of the battery 1112, such that the wheel 1100 may be stored upright, independent of the bicycle 1119. The long anti-rotation leg 1161A,B,C can also function as a handle, to move the wheel independently of the bicycle.

The eleventh version can be adapted to drive the rear wheel of a bicycle, with a freewheel and cogs rotating about the right side of the axle, between the dropouts and the hub housing. Motor drive components are located on the left side of the wheel. The inner diameter of the pedal driven freewheel is rotationally coupled to the hub housing. A short anti-rotation peg contacts the frame from below.

Twelfth Exemplary Version of the Invention (FIGS. 57-58)

FIG. 57 is a right side view of a hub assembly 1200, for a wheel similar to the wheel 1100 described in FIGS. 53 and 54. Referring to FIG. 53, a hub cover, similar to 1109, and a motor mount, similar to 1110, are removed to show internal details of the hub 1200. The twelfth version differs from the eleventh version in that a two stage spur gear transmission is used, along with an alternate hub bearing arrangement. Note that the axis of the drive motor, similar to 1111, is moved slightly aft, to accommodate the position of a drive shaft 1237.

A drive support 1226 fits into a hub housing 1206. The drive support 1226 provides rigid mechanical coupling between an axle 1205 and the motor mount. The motor mount 1210 is fastened to the drive support 1226 by bolts anchored to several threaded inserts 1272.

Rotational energy is transmitted from the drive motor to the tire through a two stage gear train, as will be fully detailed in FIG. 58. This drive train includes the drive shaft 1237 that is coupled to the drive motor shaft, with a flexible mechanical coupling, such as a helical beam coupling similar to McMaster-Carr part #6208K5. A drive pinion 1238 is attached to or cut from the drive shaft 1237. The drive pinion is similar to QTCGears part #SSG1-21 (www.qtcgears.com). Teeth in the drive pinion 1238 mesh with teeth in a large idler gear 1240. The large idler gear 1240 is similar to QTCGears part #SSG1-

80. The large idler gear 1240 is attached to an idler shaft 1239. The idler shaft is supported by a pair of radial ball bearings 1241B, and 1241A (shown in FIG. 58). A small idler gear 1248 is located behind and attached to the large idler gear 1240, as shown in FIG. 58. The small idler gear 1248 is similar to QTCGears part #SSG1.5-17. The small idler gear 1248 includes teeth which mesh with teeth in a freewheel gear 1231. The freewheel gear is similar to QTCGears part #SSG1.5-50. The freewheel gear is attached to a freewheel outer body 1230. The freewheel outer body 1230 rotates freely in one direction with respect to a concentric freewheel inner body 1229. The freewheel outer body 1230 locks with respect to the freewheel inner body 1229 as the freewheel gear is driven by the motor. The freewheel assembly, which includes the inner body 1229 and the outer body 1230, is fabricated from an item similar to a model #SF-MX30 single speed freewheel currently manufactured by Shimano, by grinding the sprocket teeth off to obtain a surface to bond to the inner diameter of the freewheel gear 1231.

The drive ratio between the drive pinion 1238 and the freewheel gear 1231 is approximately 12. This ratio is chosen for optimum motor efficiency in powering a bicycle at the 10 to 20 mile per hour speed range on level pavement, with the four inch Transmagnetics motor.

Axial constraint of the hub is provided on the right side by truing bearings enclosed in a pair of truing sleeves 1236A and 1236B. The truing sleeves 1236AB contact an annular truing race 1235, and both parts are made of a durable material, such as hardened steel. The truing bearings act to resist the large overturn moment of lateral force applied to the tire at the road surface, as will be seen more clearly in FIG. 58.

FIG. 58 is a removed cross sectional view AA of the hub assembly 1200 shown in FIG. 57.

The idler shaft 1239 is supported by two idler bearings 1241A and 1241B. Inner races of the bearings 1241AB are attached to the idler shaft 1239 with a press fit and retaining compound. The outer races of the idler bearings 1241A,B are attached to the drive support 1226, and secured with retaining compound. The drive support 1226 is attached to the axle 1205, and secured by compression between a step in the axle 1205 and truing bearing preload force, which is adjusted by the left thrust bearing cover 1252 and the locknut 1249.

The motor shaft is mechanically coupled to the drive shaft 1237 in a manner that compensates for shaft misalignment, with a helical beam coupling or similar device equivalent to McMaster-Carr part #6208K5. The drive shaft 1237 is supported by a drive shaft bearing 1247. The drive shaft bearing 1247 is a needle roller bearing, similar to McMaster-Carr part #5905K84. The drive shaft bearing 1247 provides radial, but not axial constraint to the drive shaft 1237. Axial constraint of the drive shaft 1237 is maintained by the mechanical coupling to the motor shaft.

Axial and torsional constraint of the hub housing 1206 and rim with respect to the axle 1205, is provided by a left thrust bearing 1251, and a pair of truing bearings 1246A and 1246B. The truing bearing 1246B is hidden from view in this section. The truing bearings 1246AB rotate about a respective pair of truing shafts 1242A and 1242B. The truing shafts 1242AB are attached to the drive support 1226 by press fit, and secured with a retaining compound. Because the road surface provides axial force to wheel, the truing bearings 1246AB are placed in a vertical plane that includes the centerline of the axle 1205.

The left thrust bearing 1251 is a needle roller thrust bearing similar to McMaster-Carr part #5909K22, including race washers #5909K82. A left thrust bearing cover 1252 ensures that the left thrust bearing 1251 turns concentrically about the axle 1205, and applies preloading force to the left thrust bearing 1251 and truing bearings 1246AB. A locknut 1249 ensures that preloading remains constant, even if a small torque is applied to the left thrust bearing cover 1252.

Radial constraint of the hub housing 1206 and rim with respect to the axle 1205 is provided by a radial hub bearing 1250. The radial hub bearing 1250 is similar to an R8 Conrad bearing. The inner race of the radial hub bearing 1250 is press fit onto the axle 1205, and secured with a retaining compound; the outer race is axially preloaded by a finger spring 1254, which presses against the hub housing 1206.

Thirteenth Exemplary Version of the Invention
(FIGS. 59-62)

The thirteenth version is similar to the fifth version, in that drive components are placed on both sides of the wheel, and supported close to the axle ends. A bridge structure over the top of the tire includes electrical cables to carry power and information between the two sides. The bridge structure is easily separated, for tire or inner tube repair.

The thirteenth version departs from the fifth version with the extensive use of needle roller bearings to reduce the size of the hub and drive components. A two stage, sealed, integral gearhead may drive the wheel from either side. A centrally supported, large flanged hub allows an axially symmetric spoke pattern and drive component support.

FIG. 59 shows a view of the right side of a wheel 1300 specifically configured for use with a bicycle. The wheel 1300 includes a tire 1301, which contacts a pavement 1302 during normal use. The tire 1301 is a standard 700 c×32 mm. The wheel 1300 attaches to a bicycle 1319 with a quick release assembly 1303A-E, such as is found on many bicycles currently sold. The tire 1301 is attached to a rim 1307 in the usual way for a tire of the indicated dimensions. The rim 1307 is similar to a standard, typically aluminum alloy, bicycle wheel rim. The rim 1307 is attached a hub housing 1306 with several spokes 1368. Other components shown in this view do not rotate with the tire 1301.

A motor mount 1310R supports the active elements of the wheel 1300 which provide propulsion. The motor mount 1310R supports a drive motor 1311R, which is a compact NdBFe permanent magnet motor capable of providing 245 Watts of continuous output power, at about 91% system efficiency at 2870 rpm. The drive motor 1311R in this embodiment is similar to a brushless motor, "Standard 4 inch", currently manufactured by Transmagnetics (www.Transmag.com). The motor mount 1310R supports a battery 1312R, which consists of forty rechargeable D size cells, and provides 48 total Volts and total capacity of nine Amp-hours. The batteries 1312R in this embodiment are similar to model #D9000H, currently manufactured by Aero, Inc. The motor mount 1310R is an aluminum plate with sufficient stiffness and strength to support the heavy batteries 1312R and the powerful drive motor 1311R, while dampening oscillations due to roughness in the pavement 1302. The motor mount 1310R is attached to several aluminum cooling fin channels 1313, which strengthen the motor mount 1310R, and remove waste heat from the drive motor 1311R. Thermally conductive grease is placed between the drive motor 1311R, motor mount 1310R, and the cooling fin channels 1313 during assembly and attachment with several bolts 1322.

Rotation of the motor mount 1310 in either direction, is prevented by an anti-rotation leg 1361A-G. The anti-rotation leg 1361A-G is attached to a pair of anti-rotation contact pads 1321A and 1321B. The anti-rotation contact pads 1321AB contact the handlebar of the bicycle 1319. Proper positioning of the anti-rotation pad on any bicycle is accomplished by loosening several wing nuts 1382A-E followed by proper adjustment and retightening.

Control of the drive motor 1311R is accomplished with a throttle control 1323. A cable 1366 carries electrical information to and from the throttle control 1323. The throttle control 1323 is attached to the anti-rotation leg 1361A, so that it is close to the bicycle handlebar. An efficiency control knob 1367 protrudes from the top of the throttle control 1323. The efficiency control knob 1367 sets how the motors are operated, depending on the preference of the rider to maximize battery life or bicycle speed and acceleration. A throttle control lever 1324 extends from the throttle control potentiometer, so that the rider can reach it with the right thumb. A motor controller 1320R uses the signal from the throttle control to control the drive motor 1311R output power or torque. The motor controller 1320R is a pulse width modulated controller, similar to models currently available from Transmagnetics (www.transmag.com). The throttle control lever 1324 is spring loaded, so that it returns to the unpowered state as the thumb is removed. As the rider uses the hand to apply the brakes, the thumb is almost necessarily removed from the throttle control.

FIG. 60 shows an end view of the wheel 1300. Note that the several spokes 1368 are arranged in a symmetric configuration, to make room for duplicate drive components on the either side of the wheel 1300. The entire assembly is narrow enough to fit standard bicycles without modification. An axle 1305 is sized according to standard dimensions, and fits into the standard bicycle fork dropout.

The quick release assembly 1303A-E functions in the usual way. Compression between the quick release assembly part 1303B and a left outer locknut 1349D (shown in FIG. 62) rigidly attaches the wheel 1300 to a bicycle fork dropout, with the end of the axle 1305, fitting into the dropout. The quick release assembly part 1303E serves a similar function on the right side of the wheel 1300.

The anti-rotation leg 1361A-G forms a bridge over the top of the tire 1301. This bridge structure is required to support a cable 1366 carrying electrical power and information between the two sides of the wheel 1300. In order the change a flat tire, the rider must be able to separate this bridge structure. This is accomplished by removing a wing nut 1382F, so that anti-rotation leg components 1361E and 1361D can be separated. A cable connector 1369 is also opened, splitting the cable 1366. As the anti-rotation leg 1361D is rotated forward (out of the page), a gap forms so that the tire 1301 can be removed.

The axle 1305 supports hub bearings, as will be shown in FIG. 62. The axle 1305 is also attached to a pair of drive supports 1326L and 1326R. Each horizontal drive support 1326L and 1326R is attached to a respective motor mount 1310L and 1310R. A speedometer probe 1370 generates an electrical signal related to the bicycle speed. This speed signal is used by a microprocessor in the throttle control 1323 to determine optimum motor torque.

FIG. 61 is a right side view of a hub assembly for the wheel 1300, with the anti-rotation leg 1361A-G, and motor mount 1310R removed to show more internal hub details. The drive support 1326R support fits into the hub housing 1306. Each drive support 1326L and 1326R provides rigid mechanical coupling between the axle 1305 and the respective motor mount 1310L and 1310R. The drive support 1326R is attached to the axle 1305 with a pair of locknuts 1349A and 1349B.

Rotational energy is transmitted from the shaft of the drive motor 1311R to a drive shaft 1337R. The motor shaft is mechanically coupled to the drive shaft 1337R in a manner that compensates for shaft misalignment, with a helical beam coupling or similar device. This coupling is not shown, but is similar to McMaster-Carr part #6208K5. The drive shaft 1337R is rotationally coupled to the hub housing 1306 through a two stage gear train. A drive pinion 1338R is attached to the drive shaft 1337R with a retaining compound. The drive pinion 1338R includes teeth which mesh with a large idler gear 1340R. The large idler gear 1340R rotates about an idler shaft 1339R. The idler shaft 1339R is press fit into the drive support 1326R. The second reduction stage is hidden in this view, but will be detailed in FIG. 62. The ratio between the drive pinion 1338R and the hub housing 1306 is approximately 12. This ratio is chosen for optimum motor efficiency in powering a bicycle at the 10 to 20 mile per hour speed range on level pavement, with the four inch Transmagnetics motor.

A speedometer magnet 1371 is attached to the hub housing 1306. Motion of the speedometer magnet is sensed by the speedometer sensor 1370 shown in FIG. 60. Several threaded inserts 1372 provide attachment points for bolts securing the motor mount 1310R and the anti-rotation leg 1361F to the drive support 1326R.

FIG. 62 is a removed cross sectional view AA of FIG. 61. Since this section faces the rear of the bicycle, items on the rider's right appear on the left side of this drawing, and are designated with an R suffix. If duplicated on the left side, only those items directly referenced in the text are numbered in the drawing.

Radial constraint of the hub housing 1306 and rim with respect to the axle 1305 is provided by a pair of radial hub bearings 1350L and 1350R. The radial hub bearings 1350LR are needle roller bearings, similar to McMaster-Carr part #5905K23. The outer diameter of the axle 1305 forms an inner race for the radial hub bearings 1350LR. The outer shell of the radial hub bearings 1350LR is press fit into the inner diameter of a freewheel inner body 1329. The freewheel inner body is rigidly attached to the center of the hub housing 1306 with several press fit retaining pins 1342, and retaining compound. Note that the large surface area and wide axial spacing of the radial hub bearings 1350LR provides high moment (torsional) load capacity.

Axial constraint of the hub housing 1306 and rim with respect to the axle 1305, is provided by a pair of hub thrust bearings 1351L and 1351R. The hub thrust bearings 1351L and 1351R are similar to McMaster-Carr part #5909K31, including race washers #5909K44. The locknuts 1349A-D provide hub thrust bearing preloading force, and ensure that preloading remains constant.

The drive shaft 1337R is supported by a drive shaft bearing 1347R. The drive shaft bearing 1347R is a needle roller bearing, similar to McMaster-Carr part #5905K84. The drive shaft bearing 1347R provides radial, but not axial constraint to the drive shaft 1337R. Axial constraint of the drive shaft 1337R is maintained by the coupling to the motor shaft, and a thrust bearing 1360R.

Rotational energy is transmitted from the drive motor to the tire through a two stage gear train. The drive pinion 1338R is attached to or cut from the drive shaft 1337R. The drive pinion is similar to QTCGears part #KHG1-20R (www.qtcgears.com). Teeth in the drive pinion 1338R mesh with teeth in a large idler gear 1340R. The large idler gear 1340R is similar to QTCGears part #KHG1-80L. The large idler gear 1340R is attached to a small idler gear 1348R by an idler hub 1364R. Both idler gears 1340R and 1348R are journaled about an idler shaft 1339R by an idler bearing 1341R. The small idler gear 1348R is similar to QTCGears part #SSG1.5-17. The small idler gear 1348R includes teeth which mesh with teeth in a freewheel gear 1331R. The freewheel gear is similar to QTCGears part #SSG1.5-50. The freewheel gear is attached to the outer shell of a freewheel clutch bearing 1330R. The freewheel clutch bearing 1330R rotates freely in one direction about the freewheel inner body 1329. The freewheel clutch bearing 1330R locks with respect to the freewheel inner body 1329 as the freewheel gear 1331R is driven by the motor. The freewheel clutch bearing 1330R is similar to McMaster-Carr part #2489K14.

Geartrain thrust bearings are required because needle roller radial bearings do not provide axial constraint. The first stage gears are helical gears, which produce an axial force during rotation. The drive pinion thrust bearing 1360R absorbs that part of the helical gear axial force imparted by the drive pinion 1338R. An idler outboard thrust bearing 1358R does the same for the large idler gear 1340R. Since they are continuously loaded during operation, both the drive pinion thrust bearing 1360R and the idler outboard thrust bearing 1358R are needle roller thrust bearings similar to McMaster-Carr part #5909K11. An inboard idler thrust bearing 1359R is not continuously loaded by the idler gears. The inboard idler thrust bearing 1359R is a plain thrust bearing, composed of oil impregnated bronze, or a low friction plastic. The freewheel gear 1331R is axially constrained between a freewheel inboard thrust bearing 1356R, and a freewheel outboard thrust bearing 1357R. Both freewheel thrust bearings are plain thrust bearings, composed of oil impregnated bronze, or a low friction plastic. The freewheel thrust bearings 1356R and 1357R contact either side of the housing of freewheel roller clutch 1330R.

Lubricant and dust sealing is provided by the freewheel inboard thrust bearing 1356R. Additionally, a labyrinth seal is formed by a concentric protrusion from the freewheel inner body 1329, which extends into a groove cut into a transmission cover 1355R. The transmission cover 1355R is attached to the drive support 1326R by several transmission cover screws 1363. The inboard surface of the freewheel inboard thrust bearing 1356R contacts the transmission cover 1355R. Note that this is the only dynamic transmission seal, and as described it is adequate to retain grease and prevent contaminants from entering. Alternatively, this seal could be made liquid tight, static seals could be gasketed, and an oil bath could be used to lubricate the transmission and wheel bearings.

Dynamic gear ratio optimization is possible in this version. Note that the left first stage gear ratio, formed by the drive pinion 1338L and the large idler gear 1340L, is different from that on the right. Referring to FIG. 60, the throttle control 1323 includes a microprocessor that uses rider efficiency preference, motor current and bicycle speed to determine the most efficient torque ratio between the two drive motors 1311R and 1311L. Both motors are simultaneously operated more often if the rider does not care how long a battery charge will last. Alternatively, the gear ratios may be the same for both drive motors, and a simple open loop controller can be used. In this case, the batteries 1312L and 1312R may form the same or a separate power bus. Other alternative variations of this version are described below.

The radial hub bearings 1350LR and hub thrust bearings 1351LR may be replaced with a more conventional cone and cup design. A pair of hardened steel cones are press fit into bored out axle holes of the (typically aluminum) drive supports 1326LR. A pair of cups are machined into the end surfaces of the freewheel inner body 1329. The spaces between the cones and cups on each side are loaded with ball bearings and grease during assembly.

Another alternative hub bearing design would use the freewheel inboard and outboard thrust bearings 1356LR and 1357LR to take up moment loading. These thrust bearings would be of needle roller construction, and the labyrinth seal diameter would be increased, along with the concentric hole in the transmission cover 1355LR, so that the freewheel inboard thrust bearings 1356LR would contact a races placed on either side of the hub housing 1306. Hardened steel race washers for the freewheel outboard thrust bearings 1357LR would be placed in grooves cut in the drive supports 1326LR. Ground surfaces on the faces of the freewheel gears 1331LR would provide opposing races for both freewheel inboard and outboard thrust bearings 1356LR and 1357LR.

Referring to FIG. 59, the drive motor 1311R may be an internal combustion engine, and the battery 1312R may be a gas or liquid fuel tank. Alternatively, the drive motor 1311R may be a brush commutated electric motor, and the motor controller 1320R may be suitable to a brush commutated electric motor. The battery 1312R may be a fuel cell and fuel tank. The motor controller 1320R may be of semi-autonomous configuration, as described in FIGS. 9 and 10 of the attached material.

Referring to FIG. 59, the anti-rotation leg 1361A may support a variety of accessories, and may be extended to temporarily attach to the bicycle handlebar at several points with Velcro or a other suitable quick release mechanism. Accessories may include indicators, such as battery charge or temperature; motor RPM, power, or temperature; and bicycle speed or distance traveled. Illumination accessories may include directional or brake signals, or a headlamp. A windshield may also be attached to the anti-rotation leg 1361A.

Referring to FIG. 60, a kickstand may be attached to the bottom of the battery 1312R, such that the wheel 1300 may be stored upright, independent of the bicycle 1319. The long anti-rotation leg 1361A-G can also function as a handle, to move the wheel independently of the bicycle. A pair of handles may be attached to the anti-rotation leg 1361A-G, so that a user could hold the wheel 1300 with both hands, and one thumb could reach the throttle control lever 1324, while being pulled by the wheel 1300 and wearing skates or riding a skateboard. Addition of a caliper brake to the anti-rotation leg 1361E would be required for safety with this latter refinement.

Numerous drive configurations are possible using building blocks outlined in this version. Referring to FIG. 60, note the following alternatives:

1. Either drive motor 1311L or 1311R may be omitted, along with gear train components and cooling fins.
2. Either battery 1312L or 1312R may be omitted.
3. anti-rotation leg 1361A-G may be replaced with an anti-rotation peg, that contacts the frame close to the wheel, and a semi-autonomous controller or independently attached throttle control.
4. Right side drive components could be replaced by a conventional freewheel and sprocket, for manual drive using a conventional chain, if installed in the bicycle rear wheel dropouts. The conventional freewheel would thread on to an extension of the right side of the freewheel inner body 1329, shown in FIG. 62.
5. A bicycle may be fitted with powered front and rear wheels, with the highest gear ratio in the rear wheel for more efficient hill climbing. This bicycle may feature two or three motors and identical or different drive train ratios.

Fourteenth Exemplary Version of the Invention
(FIGS. 63-69)

The fourteenth version is similar to the fifth version, in that drive components are placed on both sides of the wheel, and supported close to the axle ends. A bridge structure over the top of the tire includes electrical cables to carry power and information between the two sides. The bridge structure is easily separated or removed, for tire or inner tube repair.

The fourteenth version departs from the thirteenth version with the use of a double row angular contact bearing to support the wheel about the axle. A two stage, sealed, integral gearhead may drive the wheel from one side. A centrally supported, large flanged hub allows an axially symmetric spoke pattern and drive component support.

FIG. 63 shows a view of the right side of a wheel 1400 specifically configured for use with a bicycle. The wheel 1400 includes a tire 1401, which contacts a pavement 1402 during normal use. The tire 1401 is a standard 700 c×32 mm. The wheel 1400 attaches to a bicycle 1419 with a quick release assembly 1403A-E, such as is found on many bicycles currently sold. Alternatively, nuts may be used to secure the wheel 1400 to a bicycle 1419, for a more permanent installation. The tire 1401 is attached to a rim 1407 in the usual way for a tire of the indicated dimensions. The rim 1407 is similar to a standard, typically aluminum alloy, bicycle wheel rim. The rim 1407 is attached a hub housing 1406 with several spokes 1468. Other components shown in this view do not rotate with the tire 1401.

A motor mount 1410 supports the active elements of the wheel 1400 which provide propulsion. The motor mount 1410 supports a drive motor 1411, which is a compact NdBFe permanent magnet motor capable of providing 615 Watts of continuous output power, at about 88% system efficiency at 3175 rpm. The drive motor 1411 in this embodiment is similar to a brushless motor, "Extended 4 inch", currently manufactured by Transmagnetics (www.Transmag.com). The left side of the wheel supports a battery 1412, which consists of thirty rechargeable D size cells, and provides 36 total Volts and total capacity of nine Amp-hours. The batteries 1412R in this embodiment are similar to model #D9000H, currently manufactured by Aero, Inc. The motor mount 1410 is an aluminum plate with sufficient stiffness and strength to support the powerful drive motor 1411, while dampening oscillations due to roughness in the pavement 1402. The motor mount 1410 is attached to several aluminum cooling fin channels 1413, which strengthen the motor mount 1410, and remove waste heat from the drive motor 1411. Thermally conductive grease is placed between the drive motor 1411, motor mount 1410, and the cooling fin channels 1413 during assembly and attachment with several bolts 1422. A drive support 1426 contains the drive transmission, and supports the motor mount 1410. The drive support 1426 is cast or machined from aluminum, or another suitably light and stiff material.

Rotation of the motor mount 1410 in either direction, is prevented by an anti-rotation leg 1461A-G. The anti-rotation leg 1461A-G is attached to a pair of anti-rotation contact pads 1421A and 1421B. The anti-rotation contact pads 1421AB contact the handlebar of the bicycle 1419. Proper positioning of the anti-rotation pad on any bicycle is accomplished by loosening several wing nuts 1482A-E followed by proper adjustment and retightening.

Control of the drive motor 1411 is accomplished with a throttle control 1423. A cable 1466 carries electrical information to and from the throttle control 1423. The throttle control 1423 is attached to the anti-rotation leg 1461A, so that it is close to the bicycle handlebar. A throttle control lever 1424 extends from the throttle control potentiometer, so that the rider can reach it with the right thumb. A motor controller 1420 uses the signal from the throttle control to control the drive motor 1411 output speed, power or torque. The motor controller 1420 is a pulse width modulated controller, similar to models currently available from Transmagnetics (www.transmag.com). The throttle control lever 1424 is spring loaded, so that it returns to the unpowered state as the thumb is removed. As the rider uses the hand to apply the brakes, the thumb is almost necessarily removed from the throttle control.

FIG. 64 shows an end view of the wheel 1400. Note that the several spokes 1468 are arranged in a symmetric configuration, to make room for drive components on the either side of the wheel 1400. The entire assembly is narrow enough to fit standard bicycles without modification. An axle 1405 is sized according to standard dimensions, and fits into the standard bicycle fork dropout.

The quick release assembly 1403A-E functions in the usual way. Compression between the quick release assembly part 1403B and a left outer locknut 1449B (shown in FIG. 66) rigidly attaches the wheel 1400 to a bicycle fork dropout, with the end of the axle 1405, fitting into the dropout. The quick release assembly part 1403E serves a similar function on the right side of the wheel 1400.

The anti-rotation leg 1461A-G forms a bridge over the top of the tire 1401. This bridge structure is required to support a cable 1466 carrying electrical power and information between the two sides of the wheel 1400. In order the change a flat tire, the rider must be able to separate this bridge structure. This is accomplished by removing a wing nut 1482F, so that anti-rotation leg components 1461E and 1461D can be separated. A cable connector 1469 is also opened, splitting the cable 1466. As the anti-rotation leg 1461D is rotated forward (out of the page), a gap forms so that the tire 1401 can be removed. As depicted, the anti-rotation leg 1461A-G is composed mainly of aluminum angle. Alternatively, the anti-rotation leg 1461A-G may be of tubular construction, and may be separated from the drive support 1426 and the battery support 1475 for repair of the tire 1401.

The axle 1405 supports hub bearings, as will be shown in FIG. 67. The axle 1405 is also attached to a drive support 1426 and a battery support 1475. The drive support 1426 is attached to a motor mount 1410. A motor mount standoff 1453 provides an aft attachment point between the motor mount 1410 and the drive support 1426. The battery support 1475 is bolted to a section of the anti-rotation leg 1461G. The anti-rotation leg section 1461G also serves to support the battery 1412.

FIG. 65 is a right side view of a hub assembly for the wheel 1400, with the anti-rotation leg 1461A-G, and motor mount 1410R removed to show more internal hub details. The drive support 1426 fits into the hub housing 1406. The drive support 1426 provides rigid mechanical coupling between the axle 1405 and the motor mount 1410. The drive support 1426 is attached to the axle 1405 with a nut 1449A. Several threaded inserts 1472 placed in the drive support 1426 provide anchor points for the anti-rotation leg 1461A-G and the motor mount 1410.

As will be shown more clearly in FIG. 67, an idler shaft 1439 supports a large idler gear 1440 within the drive support 1426. Several spring plungers 1492 ensure that a freewheel gear (also illustrated in FIG. 67) runs true.

FIG. 66 is a left side view of a hub assembly for the wheel 1400, with the anti-rotation leg 1461A-G and battery 1412 removed to show more details. The battery support 1475 provides rigid mechanical coupling between the axle 1405 and the heavy battery 1412. The battery support 1475 is attached to the axle 1405 with a nut 1449B.

FIG. 67 is a removed cross sectional view A-A of the hub of FIG. 65 and FIG. 66. Since this section faces the rear of the bicycle, items on the rider's right appear on the left side of this drawing. This view shows how the hub housing 1406 is journaled about the axle 1405. Drivetrain components are also depicted, with the exception of a drive pinion 1438, which will be shown in FIG. 69. The ratio between the drive pinion 1438 and the hub housing 1406 is approximately 12. This ratio is chosen for optimum motor efficiency in powering a bicycle at the 10 to 20 mile per hour speed range on level pavement, with the four inch Transmagnetics motor.

Radial and axial constraint of the hub housing 1406 and rim with respect to the axle 1405 is provided by a main hub bearing 1450. The main hub bearing 1450 is a double row angular contact bearing, similar to SKF part #3304A. The outer diameter of the axle 1405 supports the inner race of the main hub bearing 1450, and is attached by a slip fit, with axial compression provided between the nut 1449B and the axle 1405. The outer race of the main hub bearing 1450 is press fit into the inner diameter of a freewheel inner body 1429. The freewheel inner body is rigidly attached to the center of the hub housing 1406 with several retaining screws 1442, and retaining compound.

Rotational energy is transmitted from the drive motor 1411 to the tire 1401 through a two stage gear train. Teeth in the drive pinion 1438 (shown in FIG. 69) mesh with teeth in a large idler gear 1440. The large idler gear 1440 is similar to QTCGears part #KHG1-80L. The large idler gear 1440 is attached, via a press fit and retaining compound, to the hub of a small idler gear 1448. Both idler gears 1440 and 1448 are journaled about an idler shaft 1439R by an idler bearing 1441. The idler bearing 1441 is a needle roller bearing, and is retained by an idler hub 1464. The idler bearing 1441 and the idler hub 1464 are press fit into the hub of the small idler gear 1448. The idler shaft 1439 is press fit into the drive support 1426. The small idler gear 1448 is similar to QTCGears part #SSG1.5-17. The small idler gear 1448 includes teeth which mesh with teeth in a freewheel gear 1431. The freewheel gear is similar to QTCGears part #SSG1.5-50. The freewheel gear is attached to the outer shell of a freewheel clutch bearing 1430. The freewheel clutch bearing 1430 rotates freely in one direction about the freewheel inner body 1429. The freewheel clutch bearing 1430 locks with respect to the freewheel inner body 1429 as the freewheel gear 1431 is driven by the motor, thereby driving the bicycle 1419 forward. The freewheel clutch bearing 1430 is similar to McMaster-Carr part #6392K33. Alternatively, a conventional bicycle freewheel device may be used instead of the freewheel clutch bearing 1430.

Geartrain thrust bearings are required because needle roller radial bearings do not provide axial constraint. The first stage gears are helical gears, which produce an axial force during rotation. An idler outboard thrust bearing 1458 absorbs that part of the helical gear axial force imparted by the large idler gear 1440. As will be shown in FIG. 69, the bearings in the drive motor 1411 accomplish the same for axial force imparted by the drive pinion 1438. Since it is continuously loaded during operation, the idler outboard thrust bearing 1458 is a needle roller thrust bearing similar to McMaster-Carr part #5909K11. An inboard idler thrust bearing 1459 is not continuously loaded by the idler gears. The inboard idler thrust bearing 1459 is a plain thrust bearing, composed of oil impregnated bronze, or a low friction plastic. The freewheel gear 1431 is axially constrained by a freewheel inboard thrust bearing 1456, and a freewheel outboard thrust bearing 1457. Both freewheel thrust bearings are plain thrust bearings, composed of oil impregnated bronze, or a low friction plastic. The freewheel thrust bearings 1456 and 1457 are press fit into recesses cut into the freewheel gear 1431. The freewheel thrust bearings 1456 and 1457 also provide radial support of the freewheel gear 1431, so that the freewheel clutch bearing 1430 remains concentric with the freewheel inner body 1429. A freewheel thrust washer 1473 serves as a continuous race for the outboard freewheel thrust bearing 1457. Several spring plungers 1492 axially preload the inboard and outboard freewheel thrust bearings 1456 and 1457.

Lubricant and dust sealing is provided by the freewheel inboard thrust bearing 1456. Additionally, a labyrinth seal is formed by a concentric protrusion from the hub housing 1406, which extends into a groove cut into a transmission cover 1455. The transmission cover 1455 is attached to the drive support 1426 by several transmission cover screws 1463. Note that this is the only dynamic transmission seal, and as described it is adequate to retain grease and prevent contaminants from entering. Alternatively, this seal could be made liquid tight, static seals could be gasketed, and an oil bath could be used to lubricate the transmission and wheel bearings.

FIG. 68 is an exploded view of the hub assembly of FIG. 65 and FIG. 66. Note that during assembly, the idler gears 1440 and 1448 are installed before the freewheel gear 1431. Since all parts shown in this figure were introduced in the discussion of FIG. 67, their function will not be redescribed.

FIG. 69 is an exploded view of the motor mount assembly for the wheel of FIG. 63. Rotational energy is transmitted from the shaft of the drive motor 1411 to the drive pinion 1438. The drive shaft of the motor 1411 is rotationally coupled to the hub housing 1406 through the two stage gear train. The drive pinion 1438 is attached to the shaft of the drive motor 1411 with a retaining compound. The drive pinion 1438 includes teeth which mesh with the large idler gear 1440. The drive pinion is similar to QTCGears part #KHG1-20R (www.qtcgears.com). The drive pinion 1438 may alternatively be cut from the shaft of the drive motor 1411.

A motor alignment bushing 1490 ensures that the drive motor 1411 is attached to the drive support 1426 at the proper distance from the idler shaft 1439, as required for proper meshing of associated gear teeth. The drive motor 1411 and alignment bushing 1490 are attached to motor mount 1410 by several bolts 1422 and lockwashers 1494.

Modifications to the Fourteenth Version

Referring to FIG. 63, the drive motor 1411 may be an internal combustion engine, and the battery 1412 may be a gas or liquid fuel tank. Alternatively, the drive motor 1411 may be a brush commutated electric motor, and the motor controller 1420 may be suitable to a brush commutated electric motor. The battery 1412 may be a fuel cell and fuel tank. The motor controller 1420 may be of semi-autonomous configuration, as described in FIGS. 9 and 10 of the attached material.

Referring to FIG. 63, the anti-rotation leg 1461A may support a variety of accessories, and may be extended to temporarily attach to the bicycle handlebar at several points with Velcro or another suitable quick release mechanism. Accessories may include indicators, such as battery charge or temperature; motor RPM, power, or temperature; and bicycle speed or distance traveled. Illumination accessories may include directional or brake signals, or a headlamp. A windshield may also be attached to the anti-rotation leg 1461A.

Referring to FIG. 64, a kickstand may be attached to the bottom of the battery 1412, such that the wheel 1400 may be stored upright, independent of the bicycle 1419. The long anti-rotation leg 1461A-G can also function as a handle, to move the wheel independently of the bicycle. A pair of handles may be attached to the anti-rotation leg 1461A-G, so that a user could hold the wheel 1400 with both hands, and one thumb could reach the throttle control lever 1424, while being pulled by the wheel 1400 and wearing skates or riding a skateboard. Addition of a caliper brake to the anti-rotation leg 1461E would be required for safety with this latter refinement.

Numerous drive configurations are possible using building blocks outlined in this version. Referring to FIG. 64, note the following alternatives:

1. A battery 1412 may be placed on either, or both, sides of the wheel 1400.
2. The anti-rotation leg 1461A-G may be replaced with an anti-rotation peg, that contacts the frame close to the wheel, and a semi-autonomous controller or independently attached throttle control.
3. A conventional freewheel and sprocket, for manual drive using a conventional chain, may be included on one side of the wheel 1400 if installed in the bicycle rear wheel dropouts. The conventional freewheel would thread on to an extension of the right side of the freewheel inner body 1429, shown in FIG. 67, and motor drive components and battery would be placed on the opposite side of the wheel 1400.
4. A bicycle may be fitted with powered front and rear wheels, with the highest gear ratio in the rear wheel for more efficient hill climbing. This bicycle may feature two motors and identical or different drive train ratios.

Fifteenth Exemplary Version of the Invention (FIGS. 70-71)

The fifteenth version is similar to the fifth version, in that drive components are placed on both sides of the wheel, and supported close to the axle ends. A bridge structure over the top of the tire includes electrical cables to carry power and information between the two sides. The bridge structure is easily separated or removed, for tire or inner tube repair.

The fifteenth version departs from the thirteenth version with the use of a double row angular contact bearing to support the wheel about the axle. A centrally supported, large flanged hub allows an axially symmetric spoke pattern and drive component support. The fifteenth version departs from the fourteenth version with the use of a single stage geartrain.

FIG. 70 shows a view of the right side of a wheel 1500 specifically configured for use with a bicycle. The wheel 1500 includes a tire 1501, which contacts a pavement 1502 during normal use. The tire 1501 is a standard 700 c×32 mm. The wheel 1500 attaches to a bicycle 1519 with a quick release assembly 1503A-E, such as is found on many bicycles currently sold. Alternatively, nuts may be used to secure the wheel 1400 to a bicycle 1419, for a more permanent installation. The tire 1501 is attached to a rim 1507 in the usual way for a tire of the indicated dimensions. The rim 1507 is similar to a standard, typically aluminum alloy, bicycle wheel rim. The rim 1507 is attached a hub housing 1506 with several spokes 1568. Other components shown in this view do not rotate with the tire 1501.

A motor mount 1510 supports the active elements of the wheel 1500 which provide propulsion. The motor mount 1510 supports a drive motor 1511, which is a compact NdBFe permanent magnet motor capable of providing 615 Watts of continuous output power, at about 88% system efficiency at 3175 rpm. The drive motor 1511 in this embodiment is similar to a brushless motor, "Extended 4 inch", currently manufactured by Transmagnetics (www.Transmag.com). The right side of the wheel supports a battery 1512R, which consists of thirty rechargeable D size cells, and provides 36 total Volts and total capacity of nine Amp-hours. The batteries 1512R in this embodiment are similar to model #D9000H, currently manufactured by Aero, Inc. The motor mount 1510 is an aluminum plate with sufficient stiffness and strength to support the powerful drive motor 1511, while dampening oscillations due to roughness in the pavement 1502. The motor mount 1510 is attached to several aluminum cooling fin channels 1513, which strengthen the motor mount 1510, and remove waste heat from the drive motor 1511. Thermally conductive grease is placed between the drive motor 1511, motor mount 1510, and the cooling fin channels 1513 during assembly and attachment with several bolts 1522. A drive support 1526 covers the drive transmission, and supports the motor mount 1510. The drive support 1526 is cast or machined from aluminum, or another suitably light and stiff material.

Rotation of the motor mount 1510 in either direction, is prevented by an anti-rotation leg 1561A-G. The anti-rotation leg 1561A-G is attached to a pair of anti-rotation contact pads 1521A and 1521B. The anti-rotation contact pads 1521AB contact the handlebar of the bicycle 1519. Proper positioning of the anti-rotation pad on any bicycle is accomplished by loosening several wing nuts 1582A-E followed by proper adjustment and retightening.

Control of the drive motor 1511 is accomplished with a throttle control 1523. A cable 1566 carries electrical information to and from the throttle control 1523. The throttle control 1523 is attached to the anti-rotation leg 1561A, so that it is close to the bicycle handlebar. A throttle control lever 1524 extends from the throttle control potentiometer, so that the rider can reach it with the right thumb. A motor controller 1520 uses the signal from the throttle control to control the drive motor 1511 output speed, power or torque. The motor controller 1520 is a pulse width modulated controller, similar to models currently available from Transmagnetics (www.transmag.com). The throttle control lever 1524 is spring loaded, so that it returns to the unpowered state as the thumb is removed. As the rider uses the hand to apply the brakes, the thumb is almost necessarily removed from the throttle control.

FIG. 71 is a removed cross sectional view A-A of the wheel of FIG. 70. Since this section faces the rear of the bicycle, items on the rider's right appear on the left side of this drawing. This view shows how the hub housing 1506 is journaled about the axle 1505. Drivetrain components are also depicted. The ratio between the drive pinion 1538 and the hub housing 1506 is approximately 12. This ratio is chosen for optimum motor efficiency in powering a bicycle at the 10 to 20 mile per hour speed range on level pavement, with the four inch Transmagnetics motor.

Note that the several spokes 1568 are arranged in a symmetric configuration, to make room for drive components on the either side of the wheel 1500. The entire assembly is narrow enough to fit standard bicycles without modification. An axle 1505 is sized according to standard dimensions, and fits into the standard bicycle fork dropout.

The quick release assembly 1503A-E functions in the usual way. Compression between the quick release assembly part 1503A and a left outer locknut 1549D rigidly attaches the wheel 1500 to a bicycle fork dropout, with the end of the axle 1505, fitting into the dropout. The quick release assembly part 1503E serves a similar function on the right side of the wheel 1500.

The anti-rotation leg 1561A-G forms a bridge over the top of the tire 1501. This bridge structure is required to support the cable 1566 carrying electrical power and information between the two sides of the wheel 1500. In order the change a flat tire, the rider must be able to separate or remove this bridge structure. In a manner similar to that described in the fourteenth version by FIG. 64, this may be accomplished by removing a wing nut 1582F, so that anti-rotation leg components 1561E and 1561D can be separated. A cable connector 1569 is also opened, splitting the cable 1566. As the anti-rotation leg 1561D is rotated forward (out of the page), a gap forms so that the tire 1501 can be removed. As depicted, the anti-rotation leg 1561A-G is composed mainly of aluminum angle. Alternatively, the anti-rotation leg 1561A-G may be of tubular construction.

The axle 1505 supports main hub bearing 1550. The axle 1505 is also attached to a drive support 1526 and a battery support 1575. The drive support 1526 is attached to a motor mount 1510. The battery support 1575 is bolted to a section of the anti-rotation leg 1561G.

The drive support 1526 provides rigid mechanical coupling between the axle 1505 and the motor mount 1510. The drive support 1526 is attached to the axle 1505 with a pair of locknuts 1549AB. Several threaded inserts 1572 placed in the drive support 1526 provide anchor points for the portion of the anti-rotation leg 1561C and the motor mount 1510.

The battery support 1575 provides rigid mechanical coupling between the axle 1505 and the heavy battery 1512L. The battery support 1575 is attached to the axle 1505 with a pair of locknuts 1549CD. A battery support bracket 1576 suspends the battery 1512L from the battery support 1575.

Radial and axial constraint of the hub housing 1506 and rim with respect to the axle 1505 is provided by a main hub bearing 1550. The main hub bearing 1550 is a double row angular contact bearing, similar to SKF part #3304A. The outer diameter of the axle 1505 supports the inner race of the main hub bearing 1550, and is attached by a slip fit, with axial compression provided between the nut 1549B and the axle 1505. The outer race of the main hub bearing 1550 is press fit into the inner diameter of a freewheel inner body 1529. The freewheel inner body is rigidly attached to the center of the hub housing 1506 with several retaining screws 1542, and retaining compound.

Rotational energy is transmitted from the drive motor 1511 to the tire 1501 through a single stage gear train. Teeth in the drive pinion 1538 mesh with teeth in a freewheel gear 1531. The freewheel gear 1531 is attached to the outer shell of a freewheel clutch bearing 1530. The freewheel clutch bearing 1530 rotates freely in one direction about the freewheel inner body 1529. The freewheel clutch bearing 1530 locks with respect to the freewheel inner body 1529 as the freewheel gear 1531 is driven by the motor, thereby driving the bicycle 1519 forward. The freewheel clutch bearing 1530 is similar to McMaster-Carr part #6392K33. Alternatively, a conventional bicycle freewheel device may be used instead of the freewheel clutch bearing 1530.

Freewheel thrust bearings are required because needle roller radial bearings do not provide axial constraint. The freewheel gear 1531 is axially constrained by a freewheel inboard thrust bearing 1556, and a freewheel outboard thrust bearing 1557. Both freewheel thrust bearings are plain thrust bearings, composed of oil impregnated bronze, or a low friction plastic. The freewheel thrust bearings 1556 and 1557 are press fit into recesses cut into the freewheel gear 1531. The inboard freewheel thrust bearing 1556 also provides radial support of the freewheel gear 1531, so that the freewheel clutch bearing 1530 remains concentric with the freewheel inner body 1529. A freewheel thrust washer 1573 serves as a continuous race for the outboard freewheel thrust bearing 1557. Several springs 1592 axially preload the inboard and outboard freewheel thrust bearings 1556 and 1557.

Rotational energy is transmitted from the shaft of the drive motor 1511 to the drive pinion 1538. The drive pinion 1538 is attached to the shaft of the drive motor 1511 with a shaft coupling 1534, which may be of helical beam design to compensate for shaft misalignment. This coupling is similar to McMaster-Carr part #6208K5. The drive pinion 1538 includes teeth which mesh with the freewheel gear 1531. The drive pinion 1538 may alternatively be cut from the shaft or the drive motor 1511.

The drive pinion 1538 is supported by a drive shaft bearing 1547. The drive shaft bearing 1547 is a needle roller bearing, similar to McMaster-Carr part #5905K84. The drive shaft bearing 1547 provides radial, but not axial constraint to the drive pinion 1538. Axial constraint of the drive pinion 1538 is maintained by the shaft coupling 1534, and the bearings of the drive motor 1511.

Alternative variations of this version are described below.

Referring to FIG. 70, the drive motor 1511 may be an internal combustion engine, and the battery 1512LR may be a gas or liquid fuel tank. Alternatively, the drive motor 1511 may be a brush commutated electric motor, and the motor controller 1520 may be suitable to a brush commutated electric motor. The battery 1512LR may be a fuel cell and fuel tank. The motor controller 1520 may be of semi-autonomous configuration, as described in FIGS. 9 and 10 of the attached material.

Referring to FIG. 70, the anti-rotation leg 1561A may support a variety of accessories, and may be extended to temporarily attach to the bicycle handlebar at several points with Velcro or another suitable quick release mechanism. Accessories may include indicators, such as battery charge or temperature; motor RPM, power, or temperature; and bicycle speed or distance traveled. Illumination accessories may include directional or brake signals, or a headlamp. A windshield may also be attached to the anti-rotation leg 1561A.

Referring to FIG. 70, a kickstand may be attached to the bottom of the battery 1512, such that the wheel 1500 may be stored upright, independent of the bicycle 1519. The long anti-rotation leg 1561A-G can also function as a handle, to move the wheel independently of the bicycle. A pair of handles may be attached to the anti-rotation leg 1561A-G, so that a user could hold the wheel 1500 with both hands, and one thumb could reach the throttle control lever 1524, while being pulled by the wheel 1500 and wearing skates or riding a skateboard. Addition of a caliper brake to the anti-rotation leg 1561E would be required for safety with this latter refinement.

Referring to FIG. 71, the freewheel inboard thrust bearing 1556 and the freewheel outboard thrust bearing 1557 may be eliminated if helical gear teeth are cut into the drive pinion 1538 and the freewheel gear 1531, and the handedness of the helical teeth is chosen such that the freewheel gear 1531 is pushed towards the right as the motor is engaged, and the freewheel gear 1531 is driven to the left as the motor is disengaged.

Numerous drive configurations are possible using building blocks outlined in this version. Referring to FIG. 71, note the following alternatives:

1. A battery 1512 may be placed on either, or both, sides of the wheel 1500.

2. The anti-rotation leg 1561A-G may be replaced with an anti-rotation peg, that contacts the frame close to the wheel, and a semi-autonomous controller or independently attached throttle control.
3. A conventional freewheel and sprocket, for manual drive using a conventional chain, may be included on one side of the wheel 1500 if installed in the bicycle rear wheel dropouts. The conventional freewheel would thread on to an extension of the right side of the freewheel inner body 1529, shown in FIG. 71, and motor drive components and battery would be placed on the opposite side of the wheel 1500.
4. A bicycle may be fitted with powered front and rear wheels, with the highest gear ratio in the rear wheel for more efficient hill climbing. This bicycle may feature two motors and identical or different drive tram ratios.

Sixteenth Exemplary Version of the Invention (FIGS. 72-73)

The sixteenth version is similar to the fifth version, in that drive components are placed on both sides of the wheel, and supported close to the axle ends. A bridge structure over the top of the tire includes electrical cables to carry power and information between the two sides. The bridge structure is easily separated or removed, for tire or inner tube repair.

The sixteenth version departs from the thirteenth version with the use of a double row angular contact bearing to support the wheel about the axle. A centrally supported, large flanged hub allows an axially symmetric spoke pattern and drive component support. The sixteenth version departs from the fifteenth version with the use of a direct drive hub motor.

FIG. 72 shows a view of the right side of a wheel 1600 specifically configured for use with a bicycle. The wheel 1600 includes a tire 1601, which contacts a pavement 1602 during normal use. The tire 1601 is a standard 700 c×32 mm. The wheel 1600 attaches to a bicycle 1619 with a quick release assembly 1603A-E, such as is found on many bicycles currently sold. Alternatively, nuts may be used to secure the wheel 1400 to a bicycle 1419, for a more permanent installation. The tire 1601 is attached to a rim 1607 in the usual way for a tire of the indicated dimensions. The rim 1607 is similar to a standard, typically aluminum alloy, bicycle wheel rim. The rim 1607 is attached a hub housing 1606 with several spokes 1668. Other components shown in this view do not rotate with the tire 1601. A brushless permanent magnet drive motor is integral to the hub in this design.

Each side of the wheel supports a battery 1612R and 1612L (shown in FIG. 73), which consists of thirty rechargeable D size cells, and provides 36 total Volts and total capacity of nine Amp-hours. The individual cells located in the battery 1612R and 1612L are similar to model #D9000H, currently manufactured by Aero, Inc. The battery brackets 1676R and 1676L are aluminum plates with sufficient stiffness and strength to support the respective battery, while dampening oscillations due to roughness in the pavement 1602. The battery bracket 1676R is attached to several aluminum cooling fin channels 1613, which strengthen the battery bracket 1676R, and remove waste heat from the drive motor and battery 1612R. Thermally conductive grease is placed between the battery bracket 1676R and the cooling fin channels 1613 during assembly and attachment with several bolts 1622. A stator support 1626 supports several stator coils 1638 (shown in FIG. 73), and supports the battery bracket 1676R. The stator support 1626 is cast or machined from aluminum, or another suitably light and stiff material.

Rotation of the battery bracket 1676R in either direction, is prevented by an anti-rotation leg 1661A-G. The anti-rotation leg 1661A-G is attached to a pair of anti-rotation contact pads 1621A and 1621B. The anti-rotation contact pads 1621AB contact the handlebar of the bicycle 1619. Proper positioning of the anti-rotation pad on any bicycle is accomplished by loosening several wing nuts 1682A-E followed by proper adjustment and retightening.

The anti-rotation leg 1661A-G forms a bridge over the top of the tire 1601. This bridge structure is required to support the cable 1666 carrying electrical power and information between the two sides of the wheel 1600. In order the change a flat tire, the rider must be able to separate or remove this bridge structure. In a manner similar to that described in the fourteenth version by FIG. 64, this may be accomplished by removing a wing nut 1682F, so that anti-rotation leg components 1661E and 1661D can be separated. A cable connector 1669 is also opened, splitting the cable 1666. As the anti-rotation leg 1661D is rotated forward (out of the page), a gap forms so that the tire 1601 can be removed. As depicted, the anti-rotation leg 1661A-G is composed mainly of aluminum angle. Alternatively, the anti-rotation leg 1661A-G may be of tubular construction.

Control of the drive motor is accomplished with a throttle control 1623. A cable 1666 carries electrical information to and from the throttle control 1623. The throttle control 1623 is attached to the anti-rotation leg 1661A, so that it is close to the bicycle handlebar. A throttle control lever 1624 extends from the throttle control potentiometer, so that the rider can reach it with the right thumb. A motor controller 1620 uses the signal from the throttle control to control the drive motor output speed, power or torque. The motor controller 1620 is a pulse width modulated controller. The throttle control lever 1624 is spring loaded, so that it returns to the unpowered state as the thumb is removed. As the rider uses the hand to apply the brakes, the thumb is almost necessarily removed from the throttle control.

FIG. 73 is a removed cross sectional view A-A of the wheel of FIG. 72. Since this section faces the rear of the bicycle, items on the rider's right appear on the left side of this drawing. This view shows how the hub housing 1606 is journaled about the axle 1605. Drivetrain components are also depicted.

Note that the several spokes 1668 are arranged in a symmetric configuration, to make room for drive components on the either side of the wheel 1600. The entire assembly is narrow enough to fit standard bicycles without modification. An axle 1605 is sized according to standard dimensions, and fits into the standard bicycle fork dropout.

The quick release assembly 1603A-E functions in the usual way. Compression between the quick release assembly part 1603A and a left outer locknut 1649D rigidly attaches the wheel 1600 to a bicycle fork dropout, with the end of the axle 1605, fitting into the dropout. The quick release assembly part 1603E serves a similar function on the right side of the wheel 1600.

The axle 1605 supports main hub bearing 1650. The axle 1605 is also attached to a stator support 1626 and a battery support 1675. The stator support 1626 is attached to a battery bracket 1676R. The stator support 1626 provides rigid mechanical coupling between the axle 1605 and the battery bracket 1676R. The stator support 1626 is attached to the axle 1605 with a pair of locknuts 1649AB. Several threaded inserts 1672 placed in the stator support 1626 provide anchor points for the anti-rotation leg 1661A-G and the battery bracket 1676R.

The battery support 1675 provides rigid mechanical coupling between the axle 1605 and the heavy battery 1612L. The battery support 1675 is attached to the axle 1605 with a pair of locknuts 1649CD. A battery support bracket 1676 suspends the battery 1612L from the battery support 1675.

Radial and axial constraint of the hub housing 1606 and rim with respect to the axle 1605 is provided by a main hub bearing 1650. The main hub bearing 1650 is a double row angular contact bearing, similar to SKF part #3304A. The outer diameter of the axle 1605 supports the inner race of the main hub bearing 1650, and is attached by a slip fit, with axial compression provided between the nut 1649B and the axle 1605. The outer race of the main hub bearing 1650 is press fit into the inner diameter of a freewheel inner body 1629. The freewheel inner body is rigidly attached to the center of the hub housing 1606 with several retaining screws 1642, and retaining compound.

Rotational energy is transmitted from the drive motor to the tire 1601 through a rotor 1631. The rotor 1631 supports several permanent magnets 1634 such that a radial air gap exists between the permanent magnets 1634 and the stator coils 1638. The rotor is concentrically attached to the outer shell of a freewheel clutch bearing 1630. The freewheel clutch bearing 1630 rotates freely in one direction about the freewheel inner body 1629. The freewheel clutch bearing 1630 locks with respect to the freewheel inner body 1629 as the rotor 1631 is driven by force between the permanent magnets 1634 and the stator field coils 1638, thereby driving the bicycle 1619 forward. The freewheel clutch bearing 1630 is similar to McMaster-Carr part #6392K33. Alternatively, a conventional bicycle freewheel device may be used instead of the freewheel clutch bearing 1630.

Freewheel thrust bearings are required because needle roller radial bearings do not provide axial constraint. The rotor 1631 is axially constrained by a freewheel inboard thrust bearing 1656, and a freewheel outboard thrust bearing 1657. Both freewheel thrust bearings are plain thrust bearings, composed of oil impregnated bronze, or a low friction plastic. The freewheel thrust bearings 1656 and 1657 are press fit into recesses cut into the rotor 1631. The inboard freewheel thrust bearing 1656 also provides radial support of the rotor 1631, so that the freewheel clutch bearing 1630 remains concentric with the freewheel inner body 1629. A freewheel thrust washer 1673 serves as a continuous race for the outboard freewheel thrust bearing 1657. Several springs 1692 axially preload the inboard and outboard freewheel thrust bearings 1656 and 1657.

Modifications to the Sixteenth Version

Referring to FIG. 72, the drive motor may be a brush commutated electric motor, and the motor controller 1620 may be suitable to a brush commutated electric motor. The battery 1612LR may be a fuel cell and fuel tank. The motor controller 1620 may be of semi-autonomous configuration, as described in FIGS. 9 and 10 of the attached material.

Referring to FIG. 72, the anti-rotation leg 1661A may support a variety of accessories, and may be extended to temporarily attach to the bicycle handlebar at several points with Velcro or another suitable quick release mechanism. Accessories may include indicators, such as battery charge or temperature; motor RPM, power, or temperature; and bicycle speed or distance traveled. Illumination accessories may include directional or brake signals, or a headlamp. A windshield may also be attached to the anti-rotation leg 1661A.

Referring to FIG. 72, a kickstand may be attached to the bottom of the battery 1612, such that the wheel 1600 may be stored upright, independent of the bicycle 1619. The long anti-rotation leg 1661A-G can also function as a handle, to move the wheel independently of the bicycle. A pair of handles may be attached to the anti-rotation leg 1661A-G, so that a user could hold the wheel 1600 with both hands, and one thumb could reach the throttle control lever 1624, while being pulled by the wheel 1600 and wearing skates or riding a skateboard. Addition of a caliper brake to the anti-rotation leg 1661E would be required for safety with this latter refinement.

Numerous drive configurations are possible using building blocks outlined in this version. Referring to FIG. 73, note the following alternatives:

1. A battery 1612 may be placed on either, or both, sides of the wheel 1600.
2. The anti-rotation leg 1661A-G may be replaced with an anti-rotation peg, that contacts the frame close to the wheel, and a semi-autonomous controller or independently attached throttle control.
3. A conventional freewheel and sprocket, for manual drive using a conventional chain, may be included on one side of the wheel 1600 if installed in the bicycle rear wheel dropouts. The conventional freewheel would thread on to an extension of the right side of the freewheel inner body 1629, shown in FIG. 73, and motor drive components and battery would be placed on the opposite side of the wheel 1600.
4. A bicycle may be fitted with powered front and rear wheels, with the highest gear ratio in the rear wheel for more efficient hill climbing. This bicycle may feature two motors and identical or different drive train ratios.

Seventeenth Exemplary Version of the Invention
(FIGS. 74-79)

The seventeenth version is similar to the fifth version, in that drive components are placed on both sides of the wheel, and supported close to the axle ends. A bridge structure over the top of the tire includes electrical cables to carry power and information between the two sides. The bridge structure is easily separated or removed, for tire or inner tube repair.

The seventeenth version is similar to the fifteenth version, with the use of a double row angular contact bearing to support the wheel about the axle. A centrally supported, large flanged hub allows an axially symmetric spoke pattern and drive component support. The seventeenth version departs from the fifteenth version in that the drive gear(s) are journaled directly about the axle, and with the use of a two speed geartrain.

FIG. 74 shows a view of the right side of a wheel 1700 specifically configured for use with a bicycle. The wheel 1700 includes a tire 1701, which contacts a pavement 1702 during normal use. The tire 1701 is a standard 700 c×32 mm. The wheel 1700 attaches to a bicycle 1719 with a quick release assembly 1703A-E, such as is found on many bicycles currently sold. Alternatively, nuts may be used to secure the wheel 1700 to a bicycle 1719, for a more permanent installation. The tire 1701 is attached to a rim 1707 in the usual way for a tire of the indicated dimensions. The rim 1707 is similar to a standard, typically aluminum alloy, bicycle wheel rim. The rim 1707 is attached a hub housing 1706 with several spokes 1768. Other components shown in this view do not rotate with the tire 1701.

A motor mount 1710 supports the active elements of the wheel 1700 which provide propulsion. The motor mount 1710 supports a drive motor 1711, which is a compact NdBFe permanent magnet motor capable of providing 615 Watts of continuous output power, at about 88% system efficiency at 3175 rpm. The drive motor 1711 in this embodiment is similar to a brushless motor, "Extended 4 inch", currently manufactured by Transmagnetics (www.Transmag.com). The right side of the wheel supports a battery 1712R, which consists of thirty rechargeable cells, and provides 36 total Volts and total capacity of nine Amp-hours. The motor mount 1710 is an aluminum plate with sufficient stiffness and strength to support the powerful drive motor 1711, while dampening oscillations due to roughness in the pavement 1702. The motor mount 1710 is attached to several aluminum cooling fin channels 1713, which strengthen the motor mount 1710, and remove waste heat from the drive motor 1711. Thermally conductive grease is placed between the drive motor 1711, motor mount 1710, and the cooling fin channels 1713 during assembly and attachment with several bolts 1722. A drive support 1726 covers the drive transmission, and supports the motor mount 1710. The drive support 1726 is cast or machined from aluminum, or another suitably light and stiff material.

Rotation of the motor mount 1710 in either direction, is prevented by an anti-rotation leg 1761A-E. The anti-rotation leg 1761A-E is attached to a pair of anti-rotation contact pads 1721A and 1721B. The anti-rotation contact pads 1721AB contact the handlebar of the bicycle 1719. Proper positioning of the anti-rotation pad on any bicycle is accomplished by loosening several wing nuts 1782A-F followed by proper adjustment and retightening.

Control of the drive motor 1711 is accomplished with a throttle control 1723. A cable 1766 carries electrical information to and from the throttle control 1723. The throttle control 1723 is attached to the anti-rotation leg 1761A, so that it is close to the bicycle handlebar. A throttle control lever 1724 extends from the throttle control potentiometer, so that the rider can reach it with the right thumb. A motor controller 1720 uses the signal from the throttle control to control the drive motor 1711 output speed, power or torque. The motor controller 1720 is a pulse width modulated controller, similar to models currently available from Transmagnetics (www.transmag.com). The throttle control lever 1724 is spring loaded, so that it returns to the unpowered state as the thumb is removed. As the rider uses the hand to apply the brakes, the thumb is almost necessarily removed from the throttle control.

FIG. 75 shows an end view of the wheel 1700. Note that the several spokes 1768 are arranged in a symmetric configuration, to make room for drive components on the either side of the wheel 1700. The entire assembly is narrow enough to fit standard bicycles without modification. An axle 1705 is sized according to standard dimensions, and fits into the standard bicycle fork dropout. Several locknuts 1749A-D hold the drive components and wheel bearings onto the axle 1705.

The quick release assembly 1703A-E functions in the usual way. Compression between the quick release assembly part 1703B and the left outer locknut 1749B rigidly attaches the wheel 1700 to a bicycle fork dropout, with the end of the axle 1705, fitting into the dropout. The quick release assembly part 1703E serves a similar function on the right side of the wheel 1700.

The anti-rotation leg 1761A-E forms a bridge over the top of the tire 1701. This bridge structure is required to support the cable 1766 carrying electrical power and information between the two sides of the wheel 1700. In order the change a flat tire, the rider must be able to separate or remove this bridge structure. This may be accomplished by removing a wing nut 1782F, so that anti-rotation leg components 1761E and 1761D can be separated. A cable connector 1769 is also opened, splitting the cable 1766. As the anti-rotation leg 1761D is rotated forward (out of the page), a gap forms so that the tire 1701 can be removed. As depicted, the anti-rotation leg 1761A-E is composed mainly of aluminum angle. Alternatively, the anti-rotation leg 1761A-E may be of tubular construction.

The axle 1705 supports hub bearings, as will be shown in FIG. 76. The axle 1705 is also attached to a drive support 1726 and a left battery support 1775. The drive support 1726 is attached to a motor mount 1710. A motor mount standoff 1753 provides an aft attachment point between the motor mount 1710 and the drive support 1726. The left battery support 1775 is bolted to a section of the anti-rotation leg 1761D. A left battery bracket 1776 is bolted to the left battery support 1775, and these parts support the battery 1712L through a cooling fin channel 1713. The battery 1712R is supported by the motor mount 1710 and a cooling fin channel 1713.

FIG. 76 is a removed cross sectional view A-A of the wheel of FIG. 74. Since this section faces the rear of the bicycle, items on the rider's right appear on the left side of this drawing. This view shows how the hub housing 1706 is journaled about the axle 1705. Drivetrain components are also depicted. The two speed ratios between the drive pinion 1738 and the hub housing 1706 are approximately 10 and 14. These ratios are chosen for optimum motor efficiency in powering a bicycle at the 7 to 28 mile per hour speed range on level pavement, with the four inch Transmagnetics motor.

Note that the several spokes 1768 are arranged in a symmetric configuration, to make room for drive components on the either side of the wheel 1700. The entire assembly is narrow enough to fit standard bicycles without modification. The axle 1705 is sized according to standard dimensions, and fits into the standard bicycle fork dropout.

The axle 1705 supports main hub bearing 1750. The steel axle 1705 is also attached to an aluminum drive support 1726 and a battery support 1775. The drive support 1726 is attached to a motor mount 1710. The drive support 1726 provides rigid mechanical coupling between the axle 1705 and the motor mount 1710. The drive support 1726 is attached to the axle 1705 with the pair of locknuts 1749AB. Several threaded inserts 1772 placed in the drive support 1726 provide anchor points for the portion of the anti-rotation leg 1761C and the motor mount 1710.

The left battery support 1775 provides rigid mechanical coupling between the axle 1705 and the heavy battery 1712L. The left battery support 1775 is attached to the axle 1705 with the pair of locknuts 1749CD. The left battery bracket 1776 suspends the battery 1712L from the left battery support 1775.

Radial and axial constraint of the hub housing 1706 and rim with respect to the axle 1705 is provided by a main hub bearing 1750. The main hub bearing 1750 is a double row angular contact bearing, similar to SKF part #3304A. The outer diameter of the axle 1705 supports the inner race of the main hub bearing 1750, and is attached by a slip fit, with axial compression provided between the nut 1749B and the axle 1705. The outer race of the main hub bearing 1750 is slip fit into the inner diameter of a freewheel inner body 1729. The freewheel inner body is rigidly attached to the center of the hub housing 1706 with several retaining screws 1742, and retaining compound.

Rotational energy is transmitted from the shaft of the drive motor 1711 to a drive pinion 1738. The drive pinion 1738 is attached to the shaft of the drive motor 1711 with a shaft coupling 1734, which may be of helical beam design to compensate for shaft misalignment. This coupling is similar to McMaster-Carr part #6208K5. The drive pinion 1738 may alternatively be cut from the shaft of the drive motor 1711.

The drive pinion 1738 is supported by a drive shaft bearing 1747. The drive shaft bearing 1747 is a needle roller bearing, similar to McMaster-Carr part #5905K84. The drive shaft bearing 1747 provides radial, but not axial constraint to the drive pinion 1738. Axial constraint of the drive pinion 1738 is maintained by the shaft coupling 1734, and the bearings of the drive motor 1711.

Rotational energy is transmitted from the drive motor 1711 to the tire 1701 through a two speed gear train. Teeth in the drive pinion 1738 mesh with teeth in an outer gear 1731. The outer gear 1731 is journaled about the axle 1705 by an outer gear bearing 1796. The outer gear 1731 includes internal teeth which mesh with teeth in one or more planet gears 1784. The planet gear also meshes with teeth in a sun gear 1785. The sun gear is rotationally fixed to, or may be part of, the axle 1705. The axle 1705 includes a radially asymmetric extension in the left end, which locks into the left battery support 1775, thereby preventing the axle 1705 from turning due to torque applied to the sun gear 1785. The planet gear is journaled about a planet shaft 1782 by a pair of planet gear bearings 1783. The planet shaft is press fit into a planet carrier 1780. The planet carrier 1780 is journaled about the axle 1705 by a planet carrier bearing 1781. Note that the pitch diameter of the inner teeth of the outer gear 1731 equals the pitch diameter of the sun gear 1785 plus twice the pitch diameter of the planet gear 1784. The planet carrier 1780 spins about the axle 1705 at a slower rate than the outer gear 1731. The ratio between these rates is the sum of the pitch diameters of the sun gear 1785 and the internal teeth of the outer gear 1731, divided by the pitch diameter of the internal teeth of the outer gear 1731. This ratio is about 1.37 as depicted here.

The hub housing 1706 locks with respect to either the outer gear 1731, or the planet carrier 1780 as the outer gear 1731 is driven by the motor, thereby driving the bicycle 1719 forward. This locking is provided by one of more pawls 1733. These spring loaded pawls 1733 engage ratchet teeth cut into an outer gear ratchet wheel 1732, or the outer diameter of the planet carrier 1780. The outer gear ratchet wheel is press fit into the outer gear 1731. The pawls 1733 allow freewheeling when the drive motor 1711 is idle, since the shape of the ratchet teeth is similar to that commonly found in bicycle freewheels currently in use. As will be shown in more clearly in FIG. 77, the pawls 1733 are rotationally coupled to the freewheel inner body 1729, but allowed to slide radially outward as the rotational velocity of the wheel increases, so that the inner surfaces of the pawls 1733 engage the planet carrier 1780 at low speeds, and the outer surfaces of the pawls 1733 engage the outer gear ratchet wheel 1732 at high speeds.

FIG. 77 is an end view of the automatic clutch assembly of the wheel of FIG. 74. The outer gear 1731 has been removed, but the outer gear ratchet wheel 1732 is left in place to show its relation to the pawls 1733. The pawls 1733 rotate about corresponding pawl pivot pins 1778. The pawl pivot pins 1778 are press fit into the freewheel inner body 1729. A one or more pawl torsion springs 1777 force the pawls 1733 radially inward, maintaining contact between the pawls 1733 and the outer diameter of the planet carrier 1780 at low speeds. The pawl torsion springs wrap around the pawl pivot pins 1778, and the spring ends fit into holes bored into the pawls 1733 and the freewheel inner body 1729. The outer gear ratchet wheel 1732, outer diameter of the planet carrier 1780, and the pawls 1733 are shaped to securely engage the pawls 1733 whenever torque is applied by the drive motor 1711.

The shifting procedure for this version is to slow the drive motor just after accelerating to shifting speed in the lower gear. This releases the pawls 1733 from contact with the outer diameter of the planet carrier 1780, and allows them to contact and engage the outer gear ratchet wheel 1732 when the drive motor is revved up again. Downshifting automatically occurs when the rider slows without driving the motor.

FIG. 78 is a side view of a battery compartment, with access panel removed, of the wheel of FIG. 74. An upper battery case channel 1786 is composed of aluminum, and is attached to a cooling fin channel 1713, as shown in FIG. 76. A forward support column 1793, and an aft support column 1792 is bolted to the upper battery case channel, and a lower battery case channel 1787. Several cylindrical battery cells 1794 are glued together with an electrically insulating adhesive in a hexagonal close packed geometry. The battery cells 1794 are glued with the insulating adhesive to upper and lower cell support channels 1788 and 1789. An aft battery case wall 1790 encloses the battery case aft end. A forward battery case wall 1791 encloses the battery case forward end. Several battery springs 1795 support the upper and lower cell support channels 1788 and 1789 between the upper and lower battery case channels 1786 and 1787. Several foam dampening elements 1797 serve to dampen oscillations of the battery springs 1795. The foam dampening elements are located adjacent some of the battery springs 1795, where they undergo the same compression.

FIG. 79 is a top view of the inside of the battery compartment of the wheel of FIG. 74. Slots cut into the upper (and lower) cell support channel 1788 (and 1789), so that they are free to slide on the forward (and aft) support column 1793 (and 1792), both vertically and horizontally, but constrained from movement into or out of the page containing FIG. 78. In this manner, the battery is shock mounted, but cannot twist about the vertical axis, and oscillations of the battery mass are not coupled to the bicycle steering axis. Thus, shimmy of the bicycle steering column is not increased by the added battery mass.

Modifications to the Seventeenth Version

Referring to FIG. 74, the drive motor 1711 may be an internal combustion engine, and the battery 1712LR may be a gas or liquid fuel tank. Alternatively, the drive motor 1711 may be a brush commutated electric motor, and the motor controller 1720 may be suitable to a brush commutated electric motor. The battery 1712LR may be a fuel cell and fuel tank. The motor controller 1720 may be of semi-autonomous configuration, as described in FIGS. 9 and 10 of the attached material.

Referring to FIG. 74, the anti-rotation leg 1761A may support a variety of accessories, and may be extended to temporarily attach to the bicycle handlebar at several points with Velcro or another suitable quick release mechanism. Accessories may include indicators, such as battery charge or temperature; motor RPM, power, or temperature; and bicycle speed or distance traveled. Illumination accessories may include directional or brake signals, or a headlamp. A windshield may also be attached to the anti-rotation leg 1761A.

Referring to FIG. 74, a kickstand may be attached to the bottom of the battery 1712R, such that the wheel 1700 may be stored upright, independent of the bicycle 1719. The long anti-rotation leg 1761A-E can also function as a handle, to move the wheel independently of the bicycle. A pair of handles may be attached to the anti-rotation leg 1761A-E, so that a user could hold the wheel 1700 with both hands, and one thumb could reach the throttle control lever 1724, while being pulled by the wheel 1700 and wearing skates or riding a skateboard. Addition of a caliper brake to the anti-rotation leg 1761E would be required for safety with this latter refinement.

Numerous drive configurations are possible using building blocks outlined in this version. Referring to FIG. 76, note the following alternatives:

1. A battery 1712 may be placed on either, or both, sides of the wheel 1700.
2. The anti-rotation leg 1761A-E may be replaced with an anti-rotation peg, that contacts the frame close to the wheel, and a semi-autonomous controller or independently attached throttle control.
3. A conventional freewheel and sprocket, for manual drive using a conventional chain, may be included on one side of the wheel 1700 if installed in the bicycle rear wheel dropouts. The conventional freewheel would thread on to an extension of the right side of the freewheel inner body 1729, shown in FIG. 76, and motor drive components and battery would be placed on the opposite side of the wheel 1700.
4. A bicycle may be fitted with powered front and rear wheels, with the highest gear ratio in the rear wheel for more efficient hill climbing. This bicycle may feature two motors and identical or different drive train ratios.
5. This version may be used with a direct drive hub motor, as described in the sixteenth version. The sixteenth version shows the motor rotor 1631 journaled about the freewheel inner body 1629, through a clutch bearing 1630. Incorporating the arrangement described in the seventeenth version, the motor rotor may be journaled directly about the axle by a bearing similar to the outer gear bearing 1796, and rotationally coupled to the wheel hub housing by a freewheeling pawl and ratchet wheel arrangement. Either single speed or two speed versions can be built using this configuration.
6. This version may be used with a single stage (and single speed) gear train, similar the that described in the fifteenth version. The fifteenth version shows the freewheel gear 1531 journaled about the freewheel inner body 1529, through a clutch bearing 1530. Incorporating the arrangement described in the seventeenth version, the freewheel gear 1531 may be journaled directly about the axle by a bearing similar to the outer gear bearing 1796, and rotationally coupled to the wheel hub housing by a freewheeling pawl and ratchet wheel arrangement.

Eighteenth Exemplary Version of the Invention (FIG. 80)

The eighteenth version may incorporate elements of any of the previous versions, with the addition of an energy storage device such as a battery or fuel cell assembly that is attached to a bicycle adjacent either side of the rear wheel.

FIG. 80 is an external view of the right side of a standard bicycle 1801 fitted with propulsion accessories. The bicycle 1801 is shaded in this figure, to distinguish it from the propulsion accessories. A front wheel drive system 1802 attaches the bicycle fork as described in previous embodiments. Although a front wheel drive system similar to version 17 is depicted, any of the versions described in the attached material may be substituted.

A rear mounted battery 1804LR consists of two halves placed on either side of a rear pannier rack 1803, so that 1804L is hidden in this view. The two halves of the rear mounted battery 1804L and 1804R are attached to each other by a support plate 1810. The support plate is attached to a rear pannier rack 1803 by several wing nuts 1805. Alternatively, bungee cords or tamper resistant fasteners may be used to secure the rear battery assembly to the rear pannier rack 1803. A handle 1806 enables easy transportation of the rear battery assembly. A short power cable 1811 electrically connects battery cells in the two rear mounted batteries 1804L and 1804R. A long power cable 1807 connects the rear mounted batteries 1804LR to the front wheel drive system 1802. The long power cable is secured to the bicycle frame with several removable straps 1809. The removable straps 1809 are Velcro, other similar material, or cable ties.

The rear mounted battery 1804LR may be used to furnish auxiliary power for longer rides, and may be omitted on shorter trips. Alternatively, the battery attached to the front wheel drive assembly 1802 (identified as 1712LR in the attached material) may be omitted entirely. An alternative battery mount can be attached to the bicycle frame, near the bottom bracket, resulting in a low center of gravity for the added mass.

Nineteenth Exemplary Version of the Invention (FIGS. 81-83)

The nineteenth version is similar to the eleventh version, in that an anti-rotation leg contacts the bicycle handlebar, preventing rotation of the motor assembly as it drives the wheel. The nineteenth version is similar to the second version, with the use of a friction drive roller mounted on a pivot to increase drive roller contact force as the motor drives the wheel. The nineteenth version departs from other versions in that the friction drive roller contacts the bicycle tire.

FIG. 81 shows a view of the right side of a wheel 1900 specifically configured for use with a bicycle. The wheel 1900 includes a tire 1901, which contacts a pavement 1902 during normal use. Alternatively, the pavement 1902 may be replaced by an off-road surface at the rider's discretion. The tire 1901 is a standard 700 c×32 mm. Other tire dimensions will be suitable for various types of bicycles and conditions, and may be alternatively used, but the dimensions indicated above are currently most common. The wheel 1900 attaches to a bicycle 1919 with a quick release assembly 1903A-E, such as is found on many bicycles currently sold. Alternatively, nuts may be used to secure the wheel 1900 to a bicycle 1919, for a more permanent installation. The tire 1901 is attached to a rim 1907 in the usual way for a tire of the indicated dimensions. The rim 1907 is similar to a standard, typically aluminum alloy, bicycle wheel rim. The rim 1907 is attached a hub housing 1906 with several spokes 1968.

A motor mount 1910 supports the mechanically active elements of the wheel 1900 which provide propulsion. The motor mount 1910 supports a drive motor 1911 (shown in FIG. 82), which is a compact NdBFe permanent magnet motor capable of providing 615 Watts of continuous output power, at about 88% system efficiency at 3175 rpm. The drive motor 1911 in this embodiment is similar to a brushless motor, "Extended 4 inch", currently manufactured by Transmagnetics (www.Transmag.com). The right side of the wheel supports a battery 1912, which consists of thirty rechargeable cells, and provides 36 total Volts and total capacity of nine Amp-hours. The battery 1912 is suspended by a battery support 1975, which is attached to the non-rotating central portion of the hub housing 1906. The battery support 1975 is composed of aluminum, but may be any other material chosen for high strength and low weight. The motor mount 1910 is an aluminum plate or other material with high thermal conductivity and sufficient stiffness and strength to support the powerful drive motor 1911, while dampening oscillations due to roughness in the pavement 1902.

Rotation of the motor mount 1910 in either direction about the wheel axle, due to application of motor power or drag from freewheel action while coasting, is prevented by an anti-rotation leg 1961A and 1961B. The anti-rotation leg 1961AB is attached to a pair of anti-rotation contact pads 1921A and 1921B. The anti-rotation contact pads 1921AB are composed of hard rubber or similar material, and contact the handlebar of the bicycle 1919. The tops of the anti-rotation contact pads 1921AB are tapered, to minimize any adjustment that may be required to fit various bicycle handlebar diameters. The anti-rotation leg 1961AB is fabricated from aluminum structural tubing, similar to McMaster Carr #4699T21. Sections of the anti-rotation leg 1961AB are connected together by a anti-rotation leg crossover 1962, similar to McMaster Carr #4698T23. Proper positioning of the anti-rotation pads 1921AB on any bicycle is accomplished by loosening several anti-rotation leg set screws 1982 followed by proper adjustment and retightening. Alternatively, the anti-rotation leg crossover 1962 may incorporate a split cylindrical design and hand actuated quick release levers for simple adjustment without the aid of tools. The bottom of the anti-rotation leg 1961AB is attached to the battery support 1975 by an anti-rotation leg support flange 1963, which is similar to McMaster Carr #4698T213.

The motor mount 1910 is allowed to rotate about a fixed pivot support 1933, so that as the motor 1911 drives the tire 1901 clockwise, the motor mount moves clockwise, forcing a drive roller tire 1932 into more intimate contact with the tire 1901. The rider may adjust the height of the fixed pivot support 1933 for optimum pivot contact angle. As described in the second version, the optimum pivot contact angle depends on the coefficient of friction between the drive roller and the surface being driven. Because this coefficient of friction depends strongly on variable surface conditions due to dust, moisture, and wear, it may be necessary to change the pivot contact angle. A pivot fixture bolt 1984R clamps the fixed pivot support to the anti-rotation leg 1961B. To facilitate this clamping, the fixed pivot support 1933 is partially cut in a plane perpendicular to the pivot fixture bolt 1984R and passing through the long axis of the anti-rotation leg 1961A. The fixed pivot support 1933 is composed of aluminum, but may be plastic or other low density, high strength material. The drive roller tire 1932 is glued to the outer circumferential surface of a drive roller 1931. The drive roller tire 1932 is rubber, but may be composed of another material chosen for high coefficient of friction. The drive roller 1931 is composed of aluminum, but may be fabricated from another low density, high strength material. The drive roller 1931 is secured to the shaft of the motor 1911 by a drive roller retaining bolt 1937, with axial compression supplied by a drive belleville washer 1937. A clutch bearing inside the drive roller provides freewheel action, as will be shown in FIG. 83.

Control of the drive motor 1911 is accomplished with a throttle control 1923. A cable 1966AB carries electrical information and power to and from the throttle control 1923. The throttle control 1923 is attached to the anti-rotation leg 1961A, by a panel connector similar to McMaster Carr #4698T151 (not shown), so that it is close to the bicycle handlebar. A throttle control lever 1924 extends from the throttle control potentiometer, so that the rider can reach it with the right thumb. The throttle control lever 1924 is spring loaded, so that it returns to the unpowered state as the thumb is removed. As the rider uses the hand to apply the brakes, the thumb is almost necessarily removed from the throttle control. Alternatively, the throttle control 1923 may be secured to the anti-rotation leg 1961A by an adjustable arm or "gooseneck" section to accommodate other handlebar styles. The throttle control 1923 may include a momentary contact "kill switch" capable of disabling the motor through a latching relay. Restarting the motor would require pushing a "start" button or turning a keyswitch.

FIG. 82 shows an end view of the wheel 1900. Note that a small diameter hub housing 1906 is used, and the spoke pattern is dished to accommodate drive component support on the right side only. Alternatively, the several spokes 1968 may be arranged in a symmetric configuration, and a larger diameter hub housing may be used, similar to that in the seventeenth version, allowing room for a battery on the either side of the wheel 1900. The entire assembly is narrow enough to fit standard bicycles without modification. An axle 1905 is sized according to standard dimensions, and fits into the standard bicycle fork dropout. Several locknuts 1949A-F hold the drive components and wheel bearings onto the axle 1905.

A motor controller 1920 uses the signal from the throttle control to control the drive motor 1911 output speed, power or torque. The motor controller 1920 is a pulse width modulated controller, similar to models currently available from Transmagnetics (www.transmag.com).

The quick release assembly 1903A-E functions in the usual way. Compression between the quick release assembly part 1903B and the left outer locknut 1949D rigidly attaches the wheel 1900 to a bicycle fork dropout, with the end of the axle 1905, fitting into the dropout. The quick release assembly part 1903E serves a similar function on the right side of the wheel 1900. The battery support 1975 provides rigid mechanical coupling between the axle 1905 and the heavy battery 1912. The battery support 1975 is attached to the axle 1905 between the pair of locknuts 1949AB and the pair of locknuts 1949EF. The battery support 1975 is bolted to a section of the anti-rotation leg 1961B.

The axle 1905 supports hub bearings, which are of the conventional cone and cup bearing design most commonly used in bicycle wheels. Alternatively, a double row angular contact bearing described in previous embodiments may be used with a larger diameter hub.

A rotating pivot support 1983 rotates about the cylindrical axis of the fixed pivot support 1933, and is attached to the motor mount 1910. A pivot torsion spring 1985 forces the motor mount 1910 towards the tire 1901, dampening any oscillations that may occur as the drive roller tire 1932 bounces on the tire 1901 while traveling on rough or uneven pavement 1902. The pivot torsion spring is similar to, but may be larger than, McMaster Carr #9287K105.

In order the change a flat tire, the rider must lift the motor mount 1910 so that the drive roller tire 1932 is not in contact with the tire 1901. The motor mount 1910 is attached to several aluminum cooling fin channels 1913, which strengthen the motor mount 1910, and remove waste heat from the drive motor 1911. Thermally conductive grease is placed between the drive motor 1911, motor mount 1910, and the cooling fin channels 1913 during assembly and attachment with several bolts 1922.

FIG. 83 is a removed sectional view A-A, showing the drive components of the wheel of FIG. 81. Details shown indicate how the motor mount 1910 swings about the fixed pivot support 1933, and how the drive motor 1911 transfers rotational energy to the drive roller 1931.

The motor mount 1910 is secured to the rotating pivot support 1983 by several pivot fixture support bolts 1984L. The rotating pivot support is journaled about the pivot shoulder bolt 1978 by a pivot sleeve bearing 1981. The pivot sleeve bearing is composed of bearing bronze or other suitable plain bearing material. Axial constraint of the rotating pivot support is provided by a pair of pivot thrust bearings 1979LR, in contact with several pivot flat washers 1980A-C. The pivot thrust bearings 1979LR are composed of bearing bronze or other suitable plain bearing material. The pivot shoulder bolt is secured to the fixed pivot support 1933 by threads that are fixtured with a threadlocking compound similar to products currently manufactured by Loctite. Other pivot bearing arrangements will be apparent to those skilled in the art, and may include rolling elements.

The drive roller 1931 is journaled about a motor shaft 1938 by a clutch bearing 1929, so that the drive roller 1931 will spin without turning the motor shaft 1938 as the tire 1901 rotates clockwise while the motor is unpowered. The clutch bearing 1929 locks onto the motor shaft 1938 as it is driven counter-clockwise by the motor 1911. The clutch bearing 1929 is similar to INA #HFL1626. Alternatively, a pawl and ratchet assembly may provide a functionally similar freewheel clutch action. A pair of drive thrust bearings 1935LR axially retains the drive roller 1931 on the motor shaft 1938. The drive thrust bearings 1935LR are press fit into steps cut into the ends of the drive roller 1931, and contact a pair of drive flat washers 1934LR. The drive flat washer 1934L contacts the motor mount 1910 on the left side of the drive roller 1931. The drive flat washer 1934R contacts the drive belleville washer 1936 on the right side of the drive roller 1931. The drive roller retaining bolt 1937 retains the drive roller assembly on the motor shaft 1938. Alternatively, a collar clamp secured to the end of the motor shaft 1938 may provide a similar retaining function. Other drive bearing arrangements will be apparent to those skilled in the art.

Modifications to the Nineteenth Version

Referring to FIG. 81, the drive motor 1911 may be an internal combustion engine, and the battery 1912 may be a gas or liquid fuel tank. An internal combustion engine may require a clutch to allow the motor to run without necessarily driving the wheel, a starter system, and controls for both. Internal combustion engine clutches and starters are well developed, and adaptation to this and other versions will be apparent to those skilled in the art. Alternatively, the drive motor 1911 may be a brush commutated electric motor, and the motor controller 1920 may be suitable to a brush commutated electric motor. The battery 1912 may be a fuel cell and fuel tank, or one of many available battery chemistries, such as lead-acid, nickel-cadmium, lithium ion, zinc-air, or others. The motor controller 1920 may be of semi-autonomous configuration, as described in FIGS. 9 and 10 of the attached material.

Referring to FIG. 81, the anti-rotation leg 1961A may support a variety of accessories, and may be extended to temporarily attach to the bicycle handlebar at several points with Velcro or another suitable quick release mechanism. Accessories may include indicators, such as battery charge or temperature; motor RPM, power, or temperature; and bicycle speed or distance traveled. Illumination accessories may include directional or brake signals, or a headlamp. A windshield may also be attached to the anti-rotation leg 1961A.

Referring to FIG. 81, a kickstand may be attached to the bottom of the battery 1912R, such that the wheel 1900 may be stored upright, independent of the bicycle 1919. The long anti-rotation leg 1961A-E can also function as a handle, to move the wheel independently of the bicycle. A pair of handles may be attached to the anti-rotation leg 1961A-E, so that a user could hold the wheel 1900 with both hands, and one thumb could reach the throttle control lever 1924, while being pulled by the wheel 1900 and wearing skates, or riding a skateboard or wheelchair. Addition of a caliper brake to the anti-rotation leg 1961E would be required for safety with this latter refinement.

Referring to FIG. 82, note that the battery 1912 may be placed on either, or both, sides of the wheel 1900.

Referring to FIG. 83, a two speed version can be built using this configuration and a planetary gear arrangement as described in the seventeenth version, to connect the motor 1911 to the drive roller 1931. Also referring to FIG. 83, the function of the drive clutch bearing may be replaced by a rider accessible mechanical lever that disengages the drive roller tire 1933 from the tire 1901, and temporarily locks into place.

Twentieth Exemplary Version of the Invention
(FIGS. 84-86)

The twentieth version is similar to the nineteenth version in that a friction drive roller contacts the bicycle tire. The twentieth version is similar to the eleventh version, in that an anti-rotation leg contacts the bicycle handlebar, preventing rotation of the motor assembly as it drives the wheel. The twentieth version is similar to the second version, with the use of a friction drive roller mounted on a pivot to increase drive roller contact force as the motor drives the wheel. The twentieth version departs from other versions in that the friction drive roller contacting the bicycle tire is an idler (wedge) roller located between the motor drive roller and bicycle tire. This new version improves upon mechanical efficiency by reducing transmission clutch mass and increasing the diameter of the roller driving the compressible pneumatic tire, and upon manufacturability by eliminating the need for a clutch bearing.

FIG. 84 shows a view of the right side of a wheel 2000 specifically configured for use with a bicycle. The wheel 2000 includes a tire 2001, which contacts a pavement 2002 during normal use. Alternatively, the pavement 2002 may be replaced by an off-road surface at the rider's discretion. The tire 2001 is a standard 700 c×32 mm. Other tire dimensions will be suitable for various types of bicycles and conditions, and may be alternatively used, but the dimensions indicated above are currently most common. The wheel 2000 attaches to a bicycle 2019 with a quick release assembly 2003A-E, such as is found on many bicycles currently sold. Alternatively, nuts may be used to secure the wheel 2000 to a bicycle 2019, for a more permanent installation. The tire 2001 is attached to a rim 2007 in the usual way for a tire of the indicated dimensions. The rim 2007 is similar to a standard, typically aluminum alloy, bicycle wheel rim. The rim 2007 is attached a hub housing 2006 with several spokes 2068.

A motor mount 2010 supports the mechanically active elements of the wheel 2000 which provide propulsion. The motor mount 2010 supports a drive motor 2011 (shown in FIG. 85), which is a compact NdBFe permanent magnet motor capable of providing 615 Watts of continuous output power, at about 88% system efficiency at 3175 rpm. The drive motor 2011 in this embodiment is similar to a brushless motor, "Extended 4 inch", currently manufactured by Transmagnetics (www.Transmag.com). The right side of the wheel supports a battery 2012, which consists of thirty rechargeable cells, and provides 36 total Volts and total capacity of nine Amp-hours. The battery 2012 is suspended by a battery support 2075, which is attached to the non-rotating central portion of the hub housing 2006. The battery support 2075 is composed of aluminum, but may be any other material chosen for high strength and low weight. The motor mount 2010 is an aluminum plate or other material with high thermal conductivity and sufficient stiffness and strength to support the powerful drive motor 2011. Proper positioning of the battery 2012 places the center of mass of the bicycle steering column slightly forward of the steering axis, dampening "shimmy," or oscillations due to roughness in the pavement 2002, yet allowing steering to occur as the bicycle is leaned from side to side.

Rotation of the motor mount 2010 in either direction about the wheel axle, due to application of motor power or drag from freewheel action while coasting, is prevented by an anti-rotation leg 2061A and 2061B. The anti-rotation leg 2061AB is attached to a pair of anti-rotation contact pads 2021A and 2021B. The anti-rotation contact pads 2021AB are composed of hard rubber or similar material, and contact the handlebar of the bicycle 2019. The tops of the anti-rotation contact pads 2021AB are tapered, to minimize any adjustment that may be required to fit various bicycle handlebar diameters. The anti-rotation leg 2061AB is fabricated from aluminum structural tubing, similar to McMaster Carr #4699T21. Sections of the anti-rotation leg 2061AB are connected together by a anti-rotation leg crossover 2062, similar to McMaster Carr #4698T23. Proper positioning of the anti-rotation pads 2021AB on any bicycle is accomplished by loosening several anti-rotation leg set screws 2082 followed by proper adjustment and retightening. Alternatively, the anti-rotation leg crossover 2062 may incorporate a split cylindrical design and hand actuated quick release levers for simple adjustment without the aid of tools. The bottom of the anti-rotation leg 2061AB is attached to the battery support 2075 by an anti-rotation leg support flange 2063, which is similar to McMaster Carr #4698T213.

A idler pivot support 2033 is press fit onto an idler shaft 2054. The idler shaft 2054 supports an idler roller 2053, such that the idler roller 2053 is journaled about the idler shaft 2054. The outer circumference of the idler roller 2053 adheres to an idler roller tire 2057, which is composed of solid rubber or another material possessing a high coefficient of friction. The idler pivot support 2033 is allowed to rotate about a motor shaft 2038 (shown in FIG. 86), so that as the tire 2001 is driven clockwise by the motor, the idler pivot support 2033 moves clockwise about the motor shaft 2038, forcing the idler roller tire 2057 into more intimate contact with the tire 2001. The rider may adjust the height of a transmission mount 2052 for optimum pivot contact angle. As described in the second version, the optimum pivot contact angle depends on the coefficient of friction between the drive roller and the surface being driven. Because this coefficient of friction depends strongly on variable surface conditions due to dust, moisture, and wear, it may be necessary to change the pivot contact angle, to prevent slipping or excessive radial loading. A transmission mount bolt 2051 clamps the transmission mount 2052 to the anti-rotation leg 2061B. To facilitate this clamping, the transmission mount 2052 is partially cut in a plane perpendicular to the transmission mount bolt 2051 and passing through the long axis of the anti-rotation leg 2061A. The transmission mount 2052 is composed of aluminum, but may be plastic or other low density, high strength material. The idler roller 2053 is composed of aluminum, but may be fabricated from another low density, high strength material. A spring inside the transmission mount 2052 provides freewheel action by keeping the idler roller tire 2057 off the surface of the tire 2001 when the motor is turned off, as will be shown in FIG. 86.

Control of the drive motor 2011 is accomplished with a throttle control 2023. A cable 2066AB carries electrical information and power to and from the throttle control 2023. The throttle control 2023 is attached to the anti-rotation leg 2061A, by a panel connector similar to McMaster Carr #4698T151 (not shown), so that it is close to the bicycle handlebar. A throttle control lever 2024 extends from the throttle control potentiometer, so that the rider can reach it with the right thumb. The throttle control lever 2024 is spring loaded, so that it returns to the unpowered state as the thumb is removed. As the rider uses the hand to apply the brakes, the thumb is almost necessarily removed from the throttle control. Alternatively, the throttle control 2023 may be secured to the anti-rotation leg 2061A by an adjustable arm or "gooseneck" section to accommodate other handlebar styles. The throttle control 2023 may include a momentary contact "kill switch" capable of disabling the motor through a latching relay. Restarting the motor would require pushing a "start" button or turning a keyswitch.

FIG. 85 shows an end view of the wheel 2000. Note that a small diameter hub housing 2006 is used, and the spoke pattern is dished to accommodate drive component support on the right side only. Alternatively, the several spokes 2068 may be arranged in a symmetric configuration, and a larger diameter hub housing may be used, similar to that in the seventeenth version, allowing room for a battery on the either side of the wheel 2000. The entire assembly is narrow enough to fit standard bicycles without modification. An axle 2005 is sized according to standard dimensions, and fits into the standard bicycle fork dropout. Several locknuts 2049A-F hold the drive components and wheel bearings onto the axle 2005. The axle 2005 supports hub bearings, which are of the conventional cone and cup bearing design most commonly used in bicycle wheels. Alternatively, a double row angular contact bearing described in previous embodiments may be used with a larger diameter hub.

A motor controller 2020 uses the signal from the throttle control to regulate the drive motor 2011 output speed, power or torque. The motor controller 2020 is a pulse width modulated controller, similar to models currently available from Transmagnetics (www.transmag.com).

The quick release assembly 2003A-E functions in the usual way. Compression between the quick release assembly part 2003B and the left outer locknut 2049D rigidly attaches the wheel 2000 to a bicycle fork dropout, with the end of the axle 2005, fitting into the dropout. The quick release assembly part 2003E serves a similar function on the right side of the wheel 2000. The battery support 2075 provides rigid mechanical coupling between the axle 2005 and the heavy battery 2012. The battery support 2075 is attached to the axle 2005 between the pair of locknuts 2049AB and the pair of locknuts 2049EF. The battery support 2075 is bolted to a section of the anti-rotation leg 2061B. In order the change a flat tire, the rider must lift the idler pivot support 2033 so that the idler roller tire 2057 is not in contact with the tire 2001.

FIG. 86 is a removed sectional view A-A, showing the drive components of the wheel of FIG. 84. Details shown indicate how the idler pivot support 2033 swings about the drive motor axis, and how the drive motor 2011 transfers rotational energy to the tire 2001.

A drive roller 2031 is secured to a motor shaft 2038 by a drive roller set screw 2030. The drive roller 2031 is attached to a drive roller tire 2032. The drive roller tire 2032 is composed of solid rubber or another material with a high coefficient of friction.

The idler pivot support 2033 rotates about the cylindrical axis of the drive motor 2011. The idler pivot support 2033 is journaled about a pivot shaft 2078 by a pivot sleeve bearing 2081 and a pivot thrust bearing 2079. The pivot shaft 2078 is axially aligned with the motor shaft 2038, and is press fit into the transmission mount 2052. The pivot sleeve bearing 2081 is a flanged sleeve bearing composed of a plain bearing material such as bearing bronze or plastic. A pivot torsion spring 2085 forces the idler pivot support 2033 away from the tire 2001, such that the idler roller tire 2057 does not touch the tire 2001 unless the idler roller 2053 is driven by the drive motor 2011. The pivot torsion spring 2085 is similar to McMaster Carr #9287K105. A pair of torsion spring stop pins 2059AB serve to transfer the force of pivot torsion spring 2085 between the transmission mount 2052 and the idler pivot support 2033. The torsion spring stop pin 2059A is press fit into the transmission mount 2052, and the torsion spring stop pin 2059B is press fit into the idler pivot support 2033.

The idler shaft 2054 is press fit into the idler pivot support 2033. The idler roller 2053 is journaled about the idler shaft 2054 by one or more idler bearings 2029. The idler bearings 2029 are cartridge steel ball bearings. The outer races of the idler bearings 2029 are secured to the inner diameter of the idler roller by a retaining compound. The inner races of the idler bearings 2029 slip over a idler bearing race support 2055. The inner races of the idler bearings 2029 are secured axially by compression between the idler pivot support 2033, an idler bearing spacer 2056, the idler bearing inner race support 2055, and an idler belleville washer 2036. The idler belleville washer 2036 is secured to the idler shaft 2054 by an idler roller retaining bolt 2037. The idler bearing spacer 2056 is composed of a resilient material such as rubber, and extends slightly past the end of the idler bearing race support 2055.

Grooves on the inner diameter of the idler bearing race support 2055 retain one or more preloading O-rings 2058. Note that the distance between the idler shaft 2054 and the motor shaft 2038 is slightly less than the sum of the radii of the drive roller tire 2032 and the idler roller tire 2057. The preloading O-rings 2058 are composed of rubber or other resilient material, and provide preloading compression force between the drive roller tire 2032 and the idler roller tire 2057. This preloading force ensures that as the motor shaft 2038 begins to turn, the idler roller tire 2057 is brought into contact with the tire 2001. At this point, the idler roller 2053 begins to function as a wedge roller described in the second embodiment, amplifying contact force between all rollers. Other pivot bearing arrangements will be apparent to those skilled in the art, and may include rolling elements. Other drive bearing arrangements will be apparent to those skilled in the art.

Modifications to the Twentieth Version

Referring to FIG. 84, the vertical section of the anti-rotation leg 2061B may be angled such that it is parallel to the headset of the bicycle 2019, with the anti-rotation leg crossover 2062 suitably modified to keep the section of the anti-rotation leg 2061A horizontal. If the bicycle 2019 includes a shock absorber on the front fork assembly, an anti-rotation leg shock absorber can also be placed in the section of the anti-rotation leg 2061B, between the transmission mount 2052 and the anti-rotation leg crossover 2062. This anti-rotation leg shock absorber ensures that the top of the anti-rotation leg 2061AB stays in contact with the bicycle handlebar, even as the bicycle passes over bumps in the pavement 2002. If the two shock absorbers are suitable matched, the anti-rotation pads should stay in the same place on the handlebars of the bicycle 2019. However, as an added safety feature, the height of the anti-rotation pads 2021AB should exceed the travel of the bicycle shock absorber, ensuring that the anti-rotation leg 2061AB remains engaged with the bicycle handlebar.

Referring to FIG. 84, the anti-rotation leg 2061A may support a variety of accessories, and may be extended to temporarily attach to the bicycle handlebar at several points with Velcro or another suitable quick release mechanism. Accessories may include indicators, such as battery charge or temperature; motor RPM, power, or temperature; and bicycle speed or distance traveled. Illumination accessories may include directional or brake signals, or a headlamp. A windshield may also be attached to the anti-rotation leg 2061A.

Referring to FIG. 84, a kickstand may be attached to the bottom of the battery 2012, such that the wheel 2000 may be stored upright, independent of, or along with the bicycle 2019. The long anti-rotation leg 2061A-E can also function as a handle, to move the wheel independently of the bicycle. A pair of handles may be attached to the anti-rotation leg 2061A-E, so that a user could hold the wheel 2000 with both hands, and one thumb could reach the throttle control lever 2024, while being pulled by the wheel 2000 and wearing skates, or riding a skateboard or wheelchair. Addition of a caliper brake to the anti-rotation leg 2061E would be required for safety with this latter refinement.

Referring to FIG. 85, the anti-rotation leg 2061AB may include members connecting to the left side of the axle 2005, in a manner similar to that shown in FIG. 64. This reinforcement of the anti-rotation leg 2061AB may be necessary to prevent lateral oscillation of the drive components attached near the top of the anti-rotation leg 2061AB. Alternatively, lateral reinforcement of the top of the anti-rotation leg 2061AB may be provided by including an additional furcation, such that anti-rotation pads contact the handlebar stem, or another longitudinal member of the steering column, of the bicycle 2019.

Referring to FIG. 85, the drive motor 2011 may be an internal combustion engine, and the battery 2012 may be a gas or liquid fuel tank. An internal combustion engine may require a clutch to allow the motor to run without necessarily driving the wheel, a starter system, and controls for both. Internal combustion engine clutches and starters are well developed, and adaptation to this and other versions will be apparent to those skilled in the art. Alternatively, the drive motor 2011 may be a brush commutated electric motor, and the motor controller 2020 may be suitable to a brush commutated electric motor. The battery 2012 may be a fuel cell and fuel tank, or one of many available battery chemistries, such as lead-acid, nickel-cadmium, lithium ion, zinc-air, or others. The motor controller 2020 may be of semi-autonomous configuration, as described in FIGS. 9 and 10 of the attached material.

Referring to FIG. 85, note that the battery 2012 may be placed on either, or both, sides of the wheel 2000. Also, the battery support 2075 may be attached outboard of the bicycle fork, on a suitably extended axle 2005. This would require using nuts to attach the wheel 2000 to the bicycle fork, but allow use of a conventional hub housing 2006, and a symmetric (not dished) spoke pattern.

Referring to FIG. 86, the first reduction stage of the drivetrain may be gear coupled, by including spur or helical gear teeth in the drive roller 2031 and the idler roller 2053, such that the teeth of the idler roller 2053 are recessed and do not contact the tire 2001.

Referring to FIG. 86, a two speed version can be built using this configuration and a planetary gear arrangement as described in the seventeenth version, to connect the motor 2011 to the idler roller 2053. Also referring to FIG. 86, the function of the drive clutch bearing may be replaced by a rider accessible mechanical lever that disengages the idler roller tire 2057 from the tire 2001, and temporarily locks into place.

Twenty-First Exemplary Version of the Invention
(FIGS. 87-88)

FIG. 87 shows an alternate mounting arrangement, attaching drive components to a mountain or hybrid bicycle with straight handlebars. This is applicable to all versions described in the attached material.

Rotation of the drive assembly in either direction about the wheel axle, due to application of motor power or drag from freewheel action while coasting, is prevented by an anti-rotation leg 2161A and 2161B. The anti-rotation leg 2161AB is attached to a pair of anti-rotation contact pads 2121C and 2121B. The anti-rotation contact pads 2121BC are composed of hard rubber or similar material, and contact the handlebar stem of a bicycle 2119. This handlebar stem contact improves lateral stability of the anti-rotation leg 2161AB. The handlebar of the bicycle 2119 interlocks with a contact slider 2131. The contact slider 2131 is free to move parallel to any shock absorber that may be mounted on the fork of the bicycle 2119, as it slides in dovetail slots cut into the anti-rotation contact pads 2121A and 2121B. The top of the anti-rotation contact slider 2131 is tapered, to minimize any adjustment that may be required to fit various bicycle handlebar diameters. Pressure is maintained at all times between the contact slider 2131 and the handlebar of the bicycle 2119 by a spring 2129. The spring 2129 is compressed between the contact slider 2131 and a contact slider base 2130. The contact slider base is attached to the a tubing elbow 2125.

The anti-rotation leg 2161AB is fabricated from aluminum structural tubing, similar to McMaster Carr #4699T21. Sections of the anti-rotation leg 2161AB are connected together by a anti-rotation leg crossover 2162, similar to McMaster Carr #4698T23. Proper positioning of the anti-rotation pads 2121A-C on any bicycle is accomplished by loosening several anti-rotation leg set screws followed by proper adjustment and retightening. Alternatively, the anti-rotation leg crossover 2162 may incorporate a split cylindrical design and hand actuated quick release levers for simple adjustment without the aid of tools. A tubing tee 2127, similar to McMaster Carr #4698T91, connects the anti rotation leg 2161A with the core of the anti-rotation contact pad 2121A. The tubing elbow 2125, similar to McMaster Carr #4698T31, connects the anti rotation leg 2161A with the core of the anti rotation contact pad 2121B. A tubing elbow 2132 connects the anti-rotation leg 2161A to the core of the anti-rotation contact pad 2121C.

Control of the drive motor is accomplished with a throttle control 2123. A cable 2166 carries electrical information and power to and from the throttle control 2123. The throttle control 2123 is attached to a throttle support plate 2128. The aluminum throttle support plate 2128 is bent to place the throttle control in the proper position. The throttle support plate 2128 is secured to the anti-rotation leg 2161A, by attachment to the contact slider 2131, so that it remains close to the bicycle handlebar, even during compression of any shock absorber that may be present on the fork of the bicycle 2119. A throttle control lever 2124 extends from the throttle control potentiometer, so that the rider can reach it with the right thumb. The throttle control lever 2124 is spring loaded, and in affixed to a linear slide potentiometer, so that it returns to the unpowered state as the thumb is removed. Moving the throttle control lever 2124 toward the handlebar stem causes acceleration. As the rider uses the hand to apply the brakes, the thumb is almost necessarily removed from the throttle control. This arrangement permits the rider to use the index finger to upshift the rear derailler, while applying pressure to the throttle control lever 2124, such that simultaneous, continuous power is derived from both the conventional pedal driven drivetrain and the motorized drivetrain. Alternatively, a rotary potentiometer coupled to a torsion spring and throttle lever may be used.

The throttle control 2123 includes a momentary contact kill switch 2143 capable of disabling the motor through a latching relay, as is commonly used in fail safe start/stop machinery control. Restarting the motor requires pushing a "start" button or turning a keyswitch (not shown). A power indicator 2142 illuminates when power is available to the system. An enable switch 2141 consists of a toggle switch that supplies power to the enable line of the motor controller. Alternatively, the throttle control 2123 may be secured to the anti-rotation leg 2161A by an adjustable arm or "gooseneck" section to accommodate other handlebar styles.

FIG. 88 shows an external view of an alternate hub battery support arrangement, which is applicable to the sixteenth, nineteenth, and twentieth versions. This support arrangement reduces the departure from standard bicycle wheel design significantly. An axle 2105 is fabricated with a smooth extension on one end. The smooth portion of the axle 2105 extends outboard of the dropout of the bicycle 2119. A longer quick release skewer axle 2103A accommodates the longer axle 2105. A standard wheel locknut 2149 contacts the inboard side of the dropout in the usual manner. The locknut 2149 threads onto the axle 2105 and serves to lock the bearing cone within the standard wheel hub (not shown). A bronze bushing 2156 slides over the smooth end of the axle 2105 during installation and removal, to allow clearance of a battery support 2175 past the tab commonly found on the end of bicycle fork dropouts. The bronze bushing 2156 is press fit into the battery support 2175. The battery support 2175 is secured to a battery case wall 2112 by several bolts 2151. The anti-rotation leg 2161B is welded to the battery support 2175. The anti-rotation leg 2161B is set into the battery support 2175 at an angle toward the handlebar, thereby reducing the length of the horizontal portion of the anti-rotation leg 2161A, and improving the lateral stability of the top of the anti-rotation leg 2161AB. During installation, a quick release eccentric lever 2103B compresses the dropout and the battery support 2175 against the locknut 2149. Removal of the motorized drivetrain and battery can be completed, while retaining human powered functionality, and without use of tools, if the battery support 2175 is replaced by a bushing of similar width, and a diameter comparable to the locknut 2149. Alternatively, nuts may replace the quick release mechanism to more permanently attach the drivetrain components to the axle 2105, by extending the outboard end of the axle 2105 and threading the axle end.

Modifications to, and Other Versions of, the Invention

Various preferred versions of the invention are shown and described above to illustrate different possible features of the invention and the varying ways in which these features may be combined. Apart from combining the different features of the foregoing versions in varying ways, other modifications are also considered to be within the scope of the invention. Following is an exemplary list of such modifications.

The foregoing versions of the wheels have generally been described as being installed as the front wheels in bicycles for the sake of simplicity. They might be used as rear wheels instead, or may be used for both wheels.

The aforementioned support rollers may take a variety of forms other than those described, and additional or fewer support rollers may be used. Support rollers at the top of the wheel and/or near the brake calipers are useful, since they may prevent misaligned caliper brakes from changing the axial position of the top of the rim. Additional support rollers may also reduce shimmy of the rim and tire at high speeds.

Drive motors could be internal combustion engines rather than electric motors. Similarly, the aforementioned batteries may be replaced (or supplemented) by other types of energy storage means, such as fuel cells, or fuel tanks for holding gasoline, propane, or other fuels.

The invention is not intended to be limited to the preferred versions, but rather is intended to be limited only by the claims set out below. Thus, the invention encompasses all different versions that fall literally or equivalently within the scope of these claims.

What is claimed is:

1. A wheel propulsion assembly for a bicycle having a steering column including a handlebar descending to a front fork, said fork having a pair of opposing legs, each leg having a lower dropout for receiving a wheel axle therein, said wheel propulsion assembly comprising:
    a. a wheel having a central wheel axle with wheel axle ends protruding from opposite sides of said wheel, said wheel axle ends being insertable within said lower dropouts of said fork legs for removable engagement therein;
    b. a restraining member anchored with respect to said wheel axle, said restraining member:
        (1) extending from said wheel to an engagement end distant from said wheel axle and outside said wheel diameter,
        (2) being sized and configured such that when said wheel is situated between said fork legs with its wheel axle ends within said lower dropouts, the restraining member extends upwardly from said wheel to engage said handlebar at its engagement end,
        (3) supporting a display adjacent its engagement end, said display being in communication with one or more sensors receiving measurements from said motor or said wheel;
    c. a motor anchored to said restraining member, wherein said motor drives said wheel, wherein said wheel propulsion assembly is removably installable within said front fork of said bicycle by inserting said wheel axle ends within said lower dropouts of said fork legs and engaging said engagement end of said restraining member to said handlebar.

2. The wheel propulsion assembly of claim 1 wherein said display indicates battery charge.

3. The wheel propulsion assembly of claim 1 wherein said display indicates motor temperature.

4. The wheel propulsion assembly of claim 1 wherein said display indicates motor RPM.

5. The wheel propulsion assembly of claim 1 wherein said display indicates motor power.

6. The wheel propulsion assembly of claim 1 wherein said display indicates bicycle speed.

7. The wheel propulsion assembly of claim 1 wherein said display indicates distance traveled.

* * * * *